US012553036B2

(12) United States Patent
Gao et al.

(10) Patent No.: US 12,553,036 B2
(45) Date of Patent: Feb. 17, 2026

(54) GM3 SYNTHASE VECTORS AND USES THEREOF

(71) Applicants: University of Massachusetts, Boston, MA (US); The Clinic for Special Children, Inc., Strasburg, PA (US)

(72) Inventors: Guangping Gao, Worcester, MA (US); Huiya Yang, Worcester, MA (US); Kevin A. Strauss, Strasburg, PA (US); Dan Wang, Worcester, MA (US)

(73) Assignees: University of Massachusetts, Westborough, MA (US); The Clinic for Special Children, Inc., Strasburg, PA (US)

(*) Notice: Subject to any disclaimer, the term of this patent is extended or adjusted under 35 U.S.C. 154(b) by 1164 days.

(21) Appl. No.: 17/602,348

(22) PCT Filed: Apr. 10, 2020

(86) PCT No.: PCT/US2020/027585
§ 371 (c)(1),
(2) Date: Oct. 8, 2021

(87) PCT Pub. No.: WO2020/210570
PCT Pub. Date: Oct. 15, 2020

(65) Prior Publication Data
US 2022/0162571 A1    May 26, 2022

Related U.S. Application Data

(60) Provisional application No. 62/833,136, filed on Apr. 12, 2019.

(51) Int. Cl.
*C12N 9/10* (2006.01)
*A61K 48/00* (2006.01)
*C12N 15/86* (2006.01)

(52) U.S. Cl.
CPC ........ *C12N 9/1081* (2013.01); *A61K 48/0058* (2013.01); *A61K 48/0075* (2013.01); *C12N 15/86* (2013.01); *C12Y 204/99009* (2013.01); *C12N 2750/14143* (2013.01); *C12N 2800/22* (2013.01); *C12N 2800/90* (2013.01); *C12N 2830/007* (2013.01); *C12N 2830/50* (2013.01); *C12N 2840/102* (2013.01)

(58) Field of Classification Search
CPC .................. C12N 9/1081; C12N 15/86; C12N 2750/14143; C12N 2800/22; C12N 2800/90; C12N 2830/007; C12N 2840/102; A61K 48/0058; C12Y 2004/99009
See application file for complete search history.

(56) References Cited

U.S. PATENT DOCUMENTS

| 5,399,363 | A | 3/1995 | Liversidge et al. |
| 5,478,745 | A | 12/1995 | Samulski et al. |
| 5,543,158 | A | 8/1996 | Gref et al. |
| 5,552,157 | A | 9/1996 | Yagi et al. |
| 5,565,213 | A | 10/1996 | Nakamori et al. |
| 5,567,434 | A | 10/1996 | Szoka, Jr. |
| 5,641,515 | A | 6/1997 | Ramtoola |
| 5,656,016 | A | 8/1997 | Ogden |
| 5,697,899 | A | 12/1997 | Hillman et al. |
| 5,738,868 | A | 4/1998 | Shinkarenko |
| 5,741,516 | A | 4/1998 | Webb et al. |
| 5,770,219 | A | 6/1998 | Chiang et al. |
| 5,779,708 | A | 7/1998 | Wu |
| 5,783,208 | A | 7/1998 | Venkateshwaran et al. |
| 5,795,587 | A | 8/1998 | Gao et al. |
| 5,797,898 | A | 8/1998 | Santini, Jr. et al. |
| 6,001,650 | A | 12/1999 | Colosi |
| 6,156,303 | A | 12/2000 | Russell et al. |
| 6,177,403 | B1 | 1/2001 | Stedman |
| 2003/0138772 | A1 | 7/2003 | Gao et al. |
| 2018/0066279 | A9 | 3/2018 | Gao et al. |
| 2024/0216542 | A1 | 7/2024 | Yang et al. |

FOREIGN PATENT DOCUMENTS

| WO | WO 1998/010088 A1 | 3/1998 |
| WO | WO 2011/133918 A1 | 10/2011 |
| WO | WO 2011/146804 A2 | 11/2011 |
| WO | WO 2020/210570 A2 | 10/2020 |
| WO | WO 2021/046245 A1 | 3/2021 |

OTHER PUBLICATIONS

Bowser et al. "Recessive GM3 synthase deficiency: Natural history, biochemistry, and therapeutic frontier." Molecular Genetics and Metabolism 126.4 (Jan. 21, 2019): 475-488. (Year: 2019).*
Yan, Ziying, et al. "Inverted terminal repeat sequences are important for intermolecular recombination and circularization of adeno-associated virus genomes." Journal of virology 79.1 (2005): 364-379. (Year: 2005).*
Naso et al. "Adeno-associated virus (AAV) as a vector for gene therapy." BioDrugs 31.4 (2017): 317-334. (Year: 2017).*
Ishii et al. "Expression cloning and functional characterization of human cDNA for ganglioside GM3 synthase." Journal of Biological Chemistry 273.48 (1998): 31652-31655. (Year: 1998).*
BLAST protein alignment (instant Seq ID No. 10 with Seq ID No. 10 of U.S. Appl. No. 18/557,102), National Library of Medicine BLAST search website, https://blast.ncbi.nlm.nih.gov/, accessed Mar. 19, 2025 (Year: 2025).*

(Continued)

*Primary Examiner* — Emily A Cordas
(74) *Attorney, Agent, or Firm* — Wolf, Greenfield & Sacks, P.C.

(57) ABSTRACT

Aspects of the disclosure relate to compositions and methods for expressing one or more Ganglioside GM3 synthase (GM3S) isoforms in a cell or subject. In some aspects, the disclosure relates to methods for treating GM3 synthase deficiency in a subject in need thereof.

9 Claims, 15 Drawing Sheets

Specification includes a Sequence Listing.

(56) References Cited

OTHER PUBLICATIONS

Extended European Search Report for Application No. 20787042.9, mailed Dec. 9, 2022.
International Search Report and Written Opinion for Application No. PCT/US2022/025208, mailed Jul. 7, 2022.
International Preliminary Report on Patentability for Application No. PCT/US2022/025208, mailed Nov. 9, 2023.
Andersen et al., Herpesvirus-mediated gene delivery into the rat brain: specificity and efficiency of the neuron-specific enolase promoter. Cell Mol Neurobiol. Oct. 1993; 13(5):503-15. doi: 10.1007/BF00711459.
Arbuthnot et al., In vitro and in vivo hepatoma cell-specific expression of a gene transferred with an adenoviral vector. Hum Gene Ther. Aug. 20, 1996;7(13):1503-14. doi: 10.1089/hum.1996.7.13-1503.
Boccuto et al., A mutation in a ganglioside biosynthetic enzyme, ST3GAL5, results in salt & pepper syndrome, a neurocutaneous disorder with altered glycolipid and glycoprotein glycosylation. Hum Mol Genet. Jan. 15, 2014;23(2):418-33. doi: 10.1093/hmg/ddt434. Epub Sep. 10, 2013.
Chan et al., Engineered AAVs for efficient noninvasive gene delivery to the central and peripheral nervous systems. Nat Neurosci. Aug. 2017;20(8):1172-1179. doi: 10.1038/nn.4593. Epub Jun. 26, 2017.
Chen et al., Expression of rat bone sialoprotein promoter in transgenic mice. J Bone Miner Res. May 1996;11(5):654-64. doi: 10.1002/jbmr.5650110513.
Foust et al., Intravascular AAV9 preferentially targets neonatal neurons and adult astrocytes. Nat Biotechnol. Jan. 2009;27(1):59-65. doi: 10.1038/nbt.1515. Epub Dec. 21, 2008.
Gossen et al., Transcriptional activation by tetracyclines in mammalian cells. Science. Jun. 23, 1995;268(5218):1766-9. doi: 10.1126/science.7792603.
Maheshri et al., Directed evolution of adeno-associated virus yields enhanced gene delivery vectors. Nat Biotechnol. Feb. 2006;24(2):198-204. doi: 10.1038/nbt1182. Epub Jan. 22, 2006.
Sandig et al., HBV-derived promoters direct liver-specific expression of an adenovirally transduced LDL receptor gene. Gene Ther. Nov. 1996;3(11):1002-9.
Stein et al., The osteocalcin gene: a model for multiple parameters of skeletal-specific transcriptional control. Mol Biol Rep. Aug. 1997;24(3):185-96. doi: 10.1023/a:1006803615430.
Wang et al., Early growth and development impairments in patients with ganglioside GM3 synthase deficiency. Clin Genet. May 2016;89(5):625-9. doi: 10.1111/cge.12703. Epub Jan. 20, 2016.
Zhou et al., Deletion of the B—B' and C—C' regions of inverted terminal repeats reduces rAAV productivity but increases transgene expression. Sci Rep. Jul. 14, 2017;7(1):5432. doi: 10.1038/s41598-017-04054-4.
Invitation to Pay Additional Fees for Application No. PCT/US2020/027585, mailed Jul. 17, 2020.
International Search Report and Written Opinion for Application No. PCT/US2020/027585, mailed Sep. 28, 2020.
International Preliminary Report on Patentability for Application No. PCT/US2020/027585, mailed Oct. 21, 2021.
[No Author Listed], *Homo sapiens* ST3 beta-galactoside alpha-2,3-sialyltransferase 5 (ST3GAL5), transcript variant 1, mRNA. NCBI Ref No. NM_003896.4. Jun. 26, 2021. 6 pages.
[No Author Listed], *Homo sapiens* ST3 beta-galactoside alpha-2,3-sialyltransferase 5 (ST3GAL5), transcript variant 2, mRNA. NCBI Ref No. NM_001042437.2. Feb. 9, 2022. 5 pages.
[No Author Listed], *Homo sapiens* ST3 beta-galactoside alpha-2,3-sialyltransferase 5 (ST3GAL5), transcript variant 5, mRNA. NCBI Ref No. NM_001354226.2. Feb. 17, 2021. 5 pages.
[No Author Listed], *Homo sapiens* ST3 beta-galactoside alpha-2,3-sialyltransferase 5 (ST3GAL5), transcript variant 6, mRNA. NCBI Ref No. NM_001354227.2. Feb. 19, 2021. 5 pages.
[No Author Listed], *Homo sapiens* ST3 beta-galactoside alpha-2,3-sialyltransferase 5 (ST3GAL5), transcript variant 8, mRNA. NCBI Ref No. NM_001354233.2. Feb. 10, 2022. 5 pages.
[No Author Listed], lactosylceramide alpha-2,3-sialyltransferase isoform 1 [*Homo sapiens*]. NCBI Ref No. NP_003887.3. Jun. 26, 2021. 3 pages.
[No Author Listed], lactosylceramide alpha-2,3-sialyltransferase isoform 2 [*Homo sapiens*]. NCBI Ref No. NP_001035902.1. Feb. 9, 2022. 3 pages.
[No Author Listed], lactosylceramide alpha-2,3-sialyltransferase isoform 3 [*Homo sapiens*]. NCBI Ref No. NP_001341155.1. Feb. 17, 2021. 3 pages.
[No Author Listed], lactosylceramide alpha-2,3-sialyltransferase isoform 4 [*Homo sapiens*]. NCBI Ref No. NP_001341156.1. Feb. 1, 20219. 3 pages.
Boshart et al., A very strong enhancer is located upstream of an immediate early gene of human cytomegalovirus. Cell. Jun. 1985;41(2):521-30. doi: 10.1016/s0092-8674(85)80025-8.
Bourlais et al., Ophthalmic drug delivery systems—recent advances. Prog Retin Eye Res. Jan. 1998;17(1):33-58. doi: 10.1016/s1350-9462(97)00002-5.
Bowser et al., Recessive GM3 synthase deficiency: Natural history, biochemistry, and therapeutic frontier. Mol Genet Metab. Apr. 2019;126(4):475-488. doi: 10.1016/j.ymgme.2019.01.013. Epub Jan. 21, 2019.
Davidson et al., A model system for in vivo gene transfer into the central nervous system using an adenoviral vector. Nat Genet. Mar. 1993;3(3):219-23. doi: 10.1038/ng0393-219.
Davidson et al., Recombinant adeno-associated virus type 2, 4, and 5 vectors: transduction of variant cell types and regions in the mammalian central nervous system. Proc Natl Acad Sci U S A. Mar. 28, 2000;97(7):3428-32. doi: 10.1073/pnas.97.7.3428.
Gossen et al., Tight control of gene expression in mammalian cells by tetracycline-responsive promoters. Proc Natl Acad Sci U S A. Jun. 15, 1992;89(12):5547-51. doi: 10.1073/pnas.89.12.5547.
Hansal et al., Induction of antigen-specific hyporesponsiveness by transplantation of hemopoietic cells containing an MHC class I transgene regulated by a lymphocyte-specific promoter. J Immunol. Aug. 1, 1998;161(3):1063-8.
Harvey et al., Inducible control of gene expression: prospects for gene therapy. Curr Opin Chem Biol. Aug. 1998;2(4):512-8. doi: 10.1016/s1367-5931(98)80128-2.
Magari et al., Pharmacologic control of a humanized gene therapy system implanted into nude mice. J Clin Invest. Dec. 1, 1997;100(11):2865-72. doi: 10.1172/JCI119835.
McCarty et al., Self-complementary AAV vectors; advances and applications. Mol Ther. Oct. 2008;16(10):1648-56. doi: 10.1038/mt.2008.171. Epub Aug. 5, 2008.
No et al., Ecdysone-inducible gene expression in mammalian cells and transgenic mice. Proc Natl Acad Sci U S A. Apr. 1, 19966;93(8):3346-51. doi: 10.1073/pnas.93.8.3346.
Piccioli et al., Neuroantibodies: ectopic expression of a recombinant anti-substance P antibody in the central nervous system of transgenic mice. Neuron. Aug. 1995;15(2):373-84. doi: 10.1016/0896-6273(95)90041-1.
Piccioli et al., Neuroantibodies: molecular cloning of a monoclonal antibody against substance P for expression in the central nervous system. Proc Natl Acad Sci U S A. Jul. 1, 1991;88(13):5611-5. doi: 10.1073/pnas.88.13.5611.
Stein et al., Systemic and central nervous system correction of lysosomal storage in mucopolysaccharidosis type VII mice. J Virol. Apr. 1999;73(4):3424-9. doi: 10.1128/JVI.73.4.3424-3429.1999.
Uemura et al., The cytoplasmic tail of GM3 synthase defines its subcellular localization, stability, and in vivo activity. Mol Biol Cell. Jul. 2009;20(13):3088-100. doi: 10.1091/mbc.e08-12-1219. Epub May 6, 2009.
Wang et al., Ligand-inducible and liver-specific target gene expression in transgenic mice. Nat Biotechnol. Mar. 1997;15(3):239-43. doi: 10.1038/nbt0397-239.

(56) References Cited

OTHER PUBLICATIONS

Wang et al., Positive and negative regulation of gene expression in eukaryotic cells with an inducible transcriptional regulator. Gene Ther. May 1997;4(5):432-41. doi: 10.1038/sj.gt.3300402.

* cited by examiner

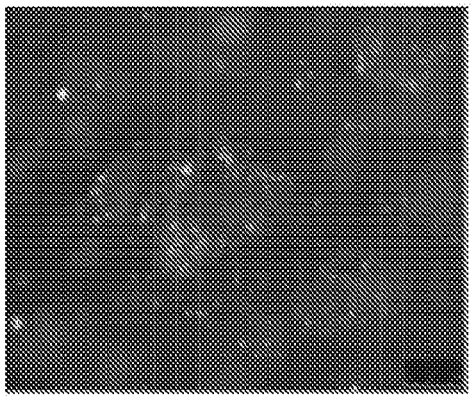
ST3GAL5 +/M fibroblast cells
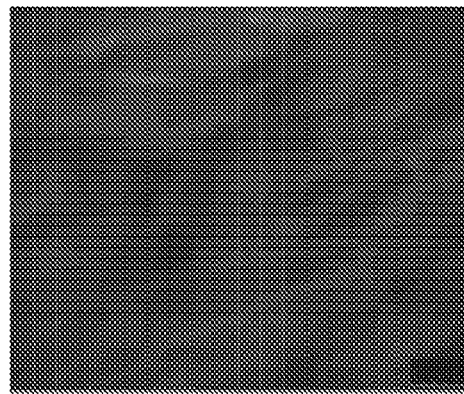
ST3GAL5 M/M fibroblast cells
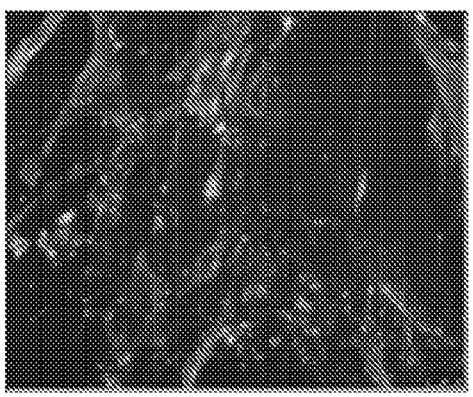
ST3GAL5 M/M fibroblast cells
Lentivirus_hST3GAL5 construct #2
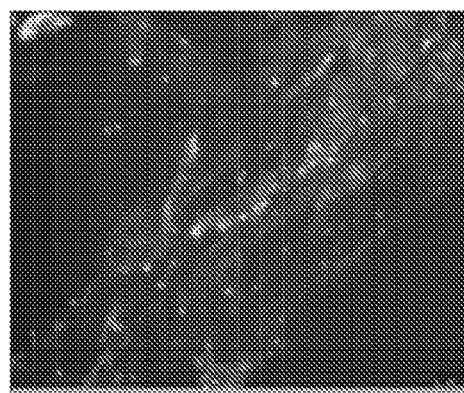
ST3GAL5 M/M fibroblast cells
Lentivirus_hST3GAL5 construct #3
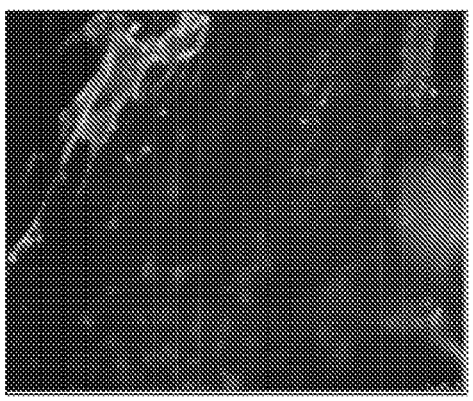
ST3GAL5 M/M fibroblast cells
Lentivirus_hST3GAL5 construct #4
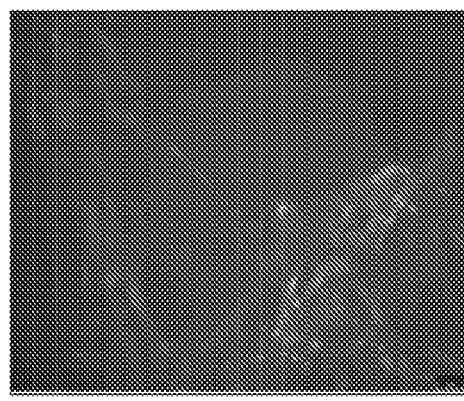
ST3GAL5 M/M fibroblast cells
Lentivirus_hST3GAL5 construct #5
DAPI
GM3
FIG. 5

| Vector | Age | Dose | Volume (ul) | Animals (death) |
|---|---|---|---|---|
| PBS | | | 100 | 9 |
| AAV9-hST3GAL5_construct #2 | P1 | $2 \times 10^{14}$ GC/kg | 100 | 6 (6 deaths) |
| AAV9-hST3GAL5_construct #3 | P1 | $2 \times 10^{14}$ GC/kg | 100 | 6 (6 deaths) |
| AAV9-hST3GAL5_construct #4 | P1 | $2 \times 10^{14}$ GC/kg | 100 | 6 (3 deaths) |
| AAV9-hST3GAL5_construct #5 | P1 | $2 \times 10^{14}$ GC/kg | 100 | 5 (5 deaths) |

FIG. 9A

| Vector | Age | Dose | Animals (death) |
|---|---|---|---|
| PBS | | | 3 |
| AAV9-hST3GA5L_construct #2 (M1) | Young adult | $1 \times 10^{14}$ GC/kg | 4 (1 deaths) |
| AAV9-hST3GA5L_construct #3 (M2) | Young adult | $1 \times 10^{14}$ GC/kg | 3 (2 deaths) |
| AAV9-hST3GA5L_construct #4 (M3) | Young adult | $1 \times 10^{14}$ GC/kg | 3 |
| AAV9-hST3GA5L_construct #5 (KM3) | Young adult | $1 \times 10^{14}$ GC/kg | 3 (3 deaths) |
| AAV9-hST3GA5L_construct #2 (M1) | Young adult | $2.7 \times 10^{13}$ GC/kg | 3 |
| AAV9-hST3GA5L_construct #3 (M2) | Young adult | $2.7 \times 10^{13}$ GC/kg | 3 |
| AAV9-hST3GA5L_construct #4 (M3) | Young adult | $2.7 \times 10^{13}$ GC/kg | 3 |
| AAV9-hST3GA5L_construct #5 (KM3) | Young adult | $2.7 \times 10^{13}$ GC/kg | 3 (1 deaths) |

FIG. 9B pAAV.hSyn1_hST3GAL5
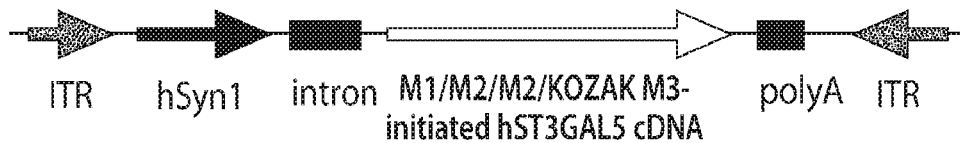
pAAV.hSyn1_hST3GAL5_miR122 binding sites
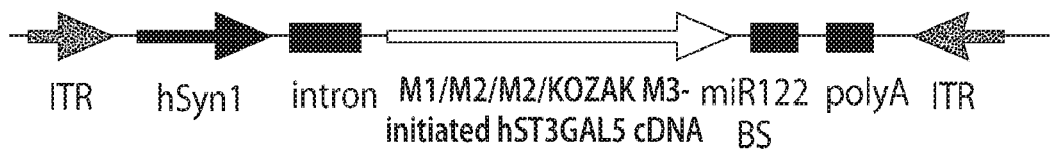
pAAV.hST3GAL5_1600_hST3GAL5
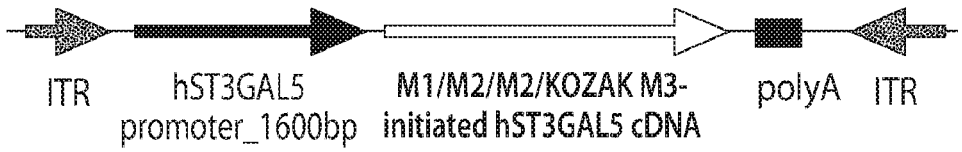
pAAV.hST3GAL5_177_hST3GAL5
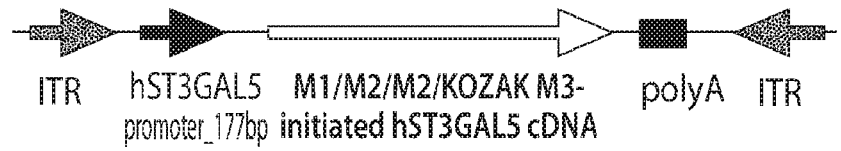
FIG. 11

GM3 SYNTHASE VECTORS AND USES THEREOF

RELATED APPLICATIONS

This application is a national stage filing under 35 U.S.C. § 371 of international PCT application PCT/US2020/027585, filed Apr. 10, 2020, which claims priority under 35 U.S.C. § 119(e) to U.S. provisional patent application Ser. No. 62/833,136, filed Apr. 12, 2019, the entire contents of each of which are incorporated herein by reference.

BACKGROUND

GM3 synthase (GM3S) deficiency is a rare monogenic neurological disorder common within Old Order Amish communities. In some cases, GM3S deficiency is associated with an ST3GAL5 c.862C>T founder variant segregating with a population-specific carrier frequency of ~4%. GM3S mediates synthesis of GM3, which serves as the common precursor for all cerebral gangliosides. GM3S deficiency abolishes ganglioside biosynthesis. ST3GAL5 c.862C>T homozygotes appear healthy at birth, but develop progressive microcephaly, neurodevelopmental stagnation, intractable epilepsy, irritability, insomnia, deafness, blindness, and dyskinesia within a few months of life. No treatment is currently available.

SUMMARY

Aspects of the disclosure relate to compositions and methods for expressing GM3 synthase (GM3S) proteins in a subject. The disclosure is based, in part, on expression constructs encoding one or more GM3S isoforms (e.g., one or more Ia Type 1 isoforms, Ia Type 2 isoforms, 1b Type 1 isoforms, Ib Type 2 isoforms, Ic isoforms, and combinations thereof). In some embodiments, expression constructs described by the disclosure are useful for treating diseases associated with GM3S deficiency.

Accordingly, in some aspects, the disclosure provides an isolated nucleic acid comprising: (i) a first region comprising a first adeno-associated virus (AAV) inverted terminal repeat (ITR); and (ii) a second region comprising a transgene having a nucleic acid sequence encoding one or more monosialodihexosylganglioside synthase (GM3S) protein isoforms.

In some aspects, the disclosure provides an isolated nucleic acid comprising: (i) a first region comprising a first adeno-associated virus (AAV) inverted terminal repeat (ITR); and (ii) a second region comprising a transgene having a nucleic acid sequence encoding one or more monosialodihexosylganglioside synthase (GM3S) Ia Type 2 protein isoforms. In some embodiments, the GM3S Ia Type 2 protein isoforms are encoded by the nucleic acid sequences set forth in SEQ ID NO: 40-42.

In some embodiments, a transgene encodes a one or more GM3S Ia isoforms. In some embodiments, one or more GM3S isoforms are GM3S Ia Type 1 isoforms. In some embodiments, one or more GM3S Ia Type 1 isoforms are translated from an M2 initiation codon. In some embodiments, GM3S Ia Type 1 isoform translated from an M2 initiation codon are encoded by the nucleic acid sequence set forth in SEQ ID NO: 41. In some embodiments, one or more GM3S Ia Type 1 isoforms are translated from an M3 initiation codon. In some embodiments, GM3S Ia Type 1 isoform translated from an M3 initiation codon are encoded by the nucleic acid sequence set forth in SEQ ID NO: 42.

In some embodiments, one or more GM3S isoforms are GM3S Ia Type 2 isoforms. In some embodiments, one or more GM3S Ia Type 2 isoforms are translated from an M1 initiation codon. In some embodiments, GM3S Ia Type 2 isoform translated from an M1 initiation codon are encoded by the nucleic acid sequence set forth in SEQ ID NO: 39 or 40. In some embodiments, one or more GM3S Ia Type 2 isoforms are translated from an M2 initiation codon. In some embodiments, GM3S Ia Type 2 isoform translated from an M2 initiation codon are encoded by the nucleic acid sequence set forth in SEQ ID NO: 41. In some embodiments, one or more GM3S Ia Type 2 isoforms are translated from an M3 initiation codon. In some embodiments, GM3S Ia Type 2 isoform translated from an M3 initiation codon are encoded by the nucleic acid sequence set forth in SEQ ID NO: 42.

In some embodiments, a transgene encodes a one or more GM3S Ib isoforms. In some embodiments, one or more GM3S isoforms are GM3S Ib Type 1 isoforms. In some embodiments, one or more GM3S Ib Type 1 isoforms are translated from an M2 initiation codon. In some embodiments, GM3S Ib Type 1 isoform translated from an M2 initiation codon are encoded by the nucleic acid sequence set forth in SEQ ID NO: 41. In some embodiments, one or more GM3S Ib Type 1 isoforms are translated from an M3 initiation codon. In some embodiments, GM3S Ib Type 1 isoform translated from an M3 initiation codon are encoded by the nucleic acid sequence set forth in SEQ ID NO: 42.

In some embodiments, one or more GM3S isoforms are GM3S Ib Type 2 isoforms. In some embodiments, one or more GM3S Ib Type 2 isoforms are translated from an M2 initiation codon. In some embodiments, GM3S Ib Type 2 isoform translated from an M2 initiation codon are encoded by the nucleic acid sequence set forth in SEQ ID NO: 41. In some embodiments, one or more GM3S Ib Type 2 isoforms are translated from an M3 initiation codon. In some embodiments, GM3S Ib Type 2 isoform translated from an M3 initiation codon are encoded by the nucleic acid sequence set forth in SEQ ID NO: 42.

In some embodiments, a transgene encodes a one or more GM3S Ic isoforms. In some embodiments, one or more GM3S isoforms are translated from an M2' initiation codon. In some embodiments, one or more GM3S isoforms are translated from an M2 initiation codon. In some embodiments, GM3S Ic isoform translated from an M2 initiation codon are encoded by the nucleic acid sequence set forth in SEQ ID NO: 41. In some embodiments, one or more GM3S isoforms are translated from an M3 initiation codon. In some embodiments, GM3S Ic isoform translated from an M3 initiation codon are encoded by the nucleic acid sequence set forth in SEQ ID NO: 42.

In some embodiments, a transgene further comprises a 5' untranslated region (5'UTR), such as a ST3GAL5 5'UTR. In some embodiments, a transgene does not include a 5'UTR, such as a ST3GAL5 5'UTR.

In some embodiments, a transgene further comprises a Kozak sequence (GCCACC) operably linked to the nucleic acid sequence encoding the one or more GM3S protein isoforms. In some embodiments, a transgene does not comprise a Kozak sequence (GCCACC).

In some embodiments, each of the one or more GM3S protein isoforms comprises or consists of the amino acid sequence set forth in any one of SEQ ID NOs: 8-10.

In some embodiments, a transgene further comprises a promoter operably linked to the nucleic acid sequence encoding the one or more GM3 synthase protein isoforms. In some embodiments, a promoter is a chicken beta-actin (CBA) promoter. In some embodiments, a promoter (e.g., a CBA promoter) comprises a CMV enhancer sequence.

In some embodiments, a transgene further comprises a third region comprising a second adeno-associated virus (AAV) inverted terminal repeat (ITR), or a variant thereof. In some embodiments, a transgene is flanked by AAV ITRs. In some embodiments, an AAV ITR is an AAV2 ITR or a variant thereof.

In some embodiments, a nucleic acid sequence encoding one or more GM3S protein isoforms is codon-optimized.

In some aspects, the disclosure provides an isolated nucleic acid comprising the sequence set forth in any one of SEQ ID NOs: 1-7, and 11-38.

In some embodiments, an isolated nucleic acid described by the disclosure comprises a one or more miRNA binding sites (e.g., a fourth region comprising one or more miRNA binding sites). In some embodiments, one or more miRNA binding sites are miR-122 binding sites. In some embodiments, one or more miRNA binding sites are positioned between the last codon of a nucleic acid sequence encoding one or more GM3S protein isoforms and a polyA tail region.

In some aspects, the disclosure provides a vector comprising an isolated nucleic acid as described herein. In some embodiments, the vector is a plasmid. In some embodiments, the vector is a viral vector. In some embodiments, the viral vector is an adenoviral vector, adeno-associated virus (AAV) vector, lentiviral vector, retroviral vector, or Baculovirus vector.

In some aspects, the disclosure provides a host cell comprising an isolated nucleic acid or a vector as described herein.

In some aspects, the disclosure provides a recombinant adeno-associated virus (rAAV) comprising: (i) a capsid protein; and (ii) an isolated nucleic acid as described herein. In some embodiments, a capsid protein is an AAV9 capsid protein or a variant thereof. In some embodiments, an AAV9 capsid protein variant is AAV.PHP.B capsid protein or AAB.PHP.eB capsid protein.

In some embodiments, an rAAV is formulated for delivery to the brain.

In some aspects, the disclosure provides a composition comprising an rAAV as described herein, and a pharmaceutical acceptable excipient.

In some aspects, the disclosure provides a method for expressing one or more GM3S protein isoforms in a cell, the method comprising delivering to the cell an isolated nucleic acid, vector, or rAAV as described herein.

In some aspects, the disclosure provides a method for treating a GM3 synthase (GM3S) deficiency in a subject in need thereof, the method comprising administering to a subject having a GM3 synthase (GM3S) deficiency an effective amount of an isolated nucleic acid, vector, or rAAV as described herein.

In some embodiments, a subject is a human. In some embodiments, a subject is characterized as having one or more mutations in a ST3GAL5 gene. In some embodiments, one or more mutations occurs at position c.862. In some embodiments, the mutation is C862T of SEQ ID NO: 39. In some embodiments, one or more mutations occurs at position c.1063. In some embodiments, the mutation is G1063A of SEQ ID NO: 39. In some embodiments, one or more mutations occurs at positions c.584 and c.601. In some embodiments, the mutations are at positions c.G584C of SEQ ID NO: 39 and c.G601A of SEQ ID NO: 39.

In some embodiments, the administration results in delivery of an isolated nucleic acid or rAAV to the brain of the subject. In some embodiments, administration occurs via systemic injection or direct injection to the central nervous system (CNS). In some embodiments, systemic injection is intravenous injection. In some embodiments, direct injection to the central nervous system (CNS) is intracerebral administration, intrathecal administration, or a combination thereof.

BRIEF DESCRIPTION OF DRAWINGS

FIG. 1A shows a schematic of a hST3GAL5-1a-2 RNA variant has at least three protein products that initiate from different start codons. FIG. 1B shows seven AAV constructs expressing the human ST3GAL5 cDNA, driven by the CMV/CB promoter. FIG. 1C shows a Western blot showing hST3GAL5 expression following transfection in Hela cells with the corresponding plasmids. All the plasmids can produce the desired isoforms and the 5'-UTR decreases the protein expression in Hela cells.

FIG. 2A shows patient-derived fibroblast cells genotype information. FIG. 2B shows a Western blot showing hST3GAL5 expression following transfection in fibroblast cells with the corresponding plasmids. All the plasmids produce the desired isoforms.

FIG. 3A shows rAAV genome delivery data. FIG. 3B shows transgene expression data. Each dot represents the tissue from one animal (n=3~5).

FIG. 4A shows 18:1 subspecies of ganglioside standards. FIG. 4B shows 20:1 subspecies of ganglioside standards. From top to bottom: GM1, GM2, GM3, GD1b, GD2, and GD3 FIG. 5 shows anti-GM3 immunofluorescence analysis in transfected fibroblast cells.

FIG. 5 shows healthy control derived fibroblast cells. ST3GAL5+/M is the healthy control line. ST3GAL5 M/M is generated from patient. ST3GAL5 M/M either remains untreated, or treated with lentivirus

FIG. 7A shows a flow chart showing the cortical neuron generation timeline. FIG. 7B shows immunofluorescence staining showing the cortical neuron markers from D44 induced cortical neurons.

FIGS. 9A-9B are tables showing the animal survival post AAV9_hST3GAL5 vectors injection at multiple doses. FIG. 9A is a table showing neonatal facial vein injection of the rAAV listed therein. FIG. 9B is a table showing young adult tail vein injection of the rAAV listed therein.

FIG. 11 shows examples of constructs expressing hST3GAL5 under different expression cassettes. Cartoons showing four AAV expression cassettes expressing the human ST3GAL5 cDNA, driven by hSyn1 promoter, hST3GAL5 promoter and miR122 binding sites, hST3GAL5 endogenous full-length promoter, and hST3GAL5 endogenous truncated promoter.

FIG. 12A shows rAAV genome delivery by ddPCR. FIGS. 12B-12C show transgene expression by ddPCR and Western blot. Each dot represents the tissue from one animal (n=3~5).

DETAILED DESCRIPTION

Figure 1A:
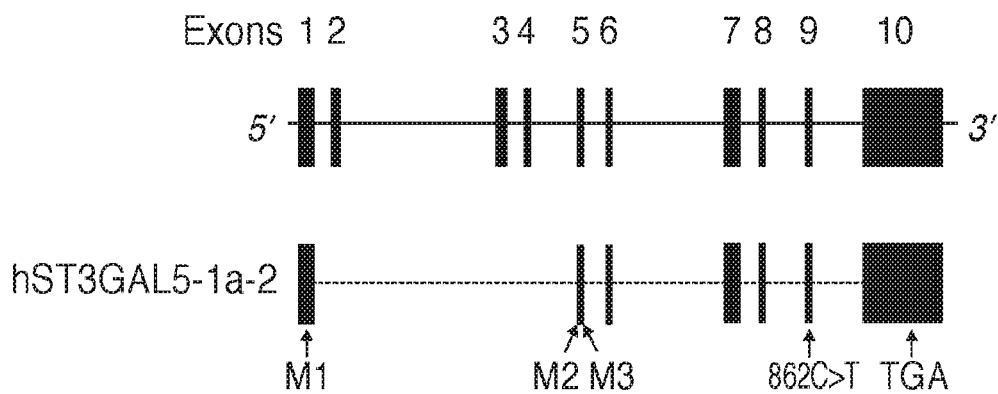
FIGS. 1A-1C show human ST3GAL5 protein isoforms and constructs expressing hST3GAL5 and their expression in Hela cells.

In some aspects, the disclosure relates to compositions and methods for expressing a transgene encoding one or more GM3 synthase (GM3S) proteins in a cell or subject. In some embodiments, the transgene encodes an isolated nucleic acid. In some embodiments, the isolated nucleic acid is comprised in a recombinant adeno-associated virus (rAAV).

Methods and compositions described by the disclosure may be utilized, in some embodiments, to treat diseases and disorders associated with GM3S deficiency.

Isolated Nucleic Acids

A "nucleic acid" sequence refers to a DNA or RNA sequence. In some embodiments, proteins and nucleic acids of the disclosure are isolated. As used herein, the term "isolated" means artificially produced. As used herein, with respect to nucleic acids, the term "isolated" means: (i) amplified in vitro by, for example, polymerase chain reaction (PCR); (ii) recombinantly produced by cloning; (iii) purified, as by cleavage and gel separation; or (iv) synthesized by, for example, chemical synthesis. An isolated nucleic acid is one which is readily manipulable by recombinant DNA techniques well known in the art. Thus, a nucleotide sequence contained in a vector in which 5' and 3' restriction sites are known or for which polymerase chain reaction (PCR) primer sequences have been disclosed is considered isolated but a nucleic acid sequence existing in its native state in its natural host is not. An isolated nucleic acid may be substantially purified, but need not be. For example, a nucleic acid that is isolated within a cloning or expression vector is not pure in that it may comprise only a tiny percentage of the material in the cell in which it resides. Such a nucleic acid is isolated, however, as the term is used herein because it is readily manipulable by standard techniques known to those of ordinary skill in the art. As used herein with respect to proteins or peptides, the term "isolated" refers to a protein or peptide that has been isolated from its natural environment or artificially produced (e.g., by chemical synthesis, by recombinant DNA technology, etc.).

Aspects of the disclosure relate to isolated nucleic acids encoding one or more GM3S proteins. GM3 synthase (GM3S), also referred to as Lactosylceramide alpha-2,3-sialyltransferase and SAT1, is an enzyme that catalyzes formation of ganglioside GM3 using a lactosylceramide substrate. In some embodiments, a human GM3S protein is encoded by an mRNA transcript having the sequence set forth in any one of NCBI Reference Sequence Accession Numbers: NM_001042437, NM_003896, NM_001354226, NM_001354227, and NM_001354233. In some embodiments, a human GM3S protein comprises the amino acid sequence set forth in any one of NCBI Reference Sequence Accession Numbers: NP_001035902, NP_003887, NP_001341155, NP_001341156, and NP_001341162.

Human GM3S transcripts (e.g., GM3S proteins translated from such transcripts) are generally classified into three isoforms, GM3S-Ia, -Ib, and -Ic, according to the position of transcription initiation, exon 1, 2, or 4. Additionally, GM3S-Ia and -Ib isoforms are each further classified into two types: GM3S-Ia Type 1 and Type 2 variants, and GM3S-Ib Type 1 and Type 2 variants, respectively, reflecting alternative splicing of exon 3. The structural features of GM3 isoforms are known, for example as described in Uemura et al. *Mol Biol Cell*. 20(13):3088-3100.

In some embodiments, an isolated nucleic acid includes an RNA transcript having one or more initiation codons (referred to as M1, M2, M3, etc.) which encodes one or more variants of a GM3S isoform (e.g., one or more variants of a Ia Type 1 isoform, one or more variants of a Ia Type 2 isoform, one or more variants of a Ib Type I isoform, one or more variants of a Ib Type 2 isoform, etc.). An initiation codon may be a codon encoding a methionine (M, encoded by AUG codon) or a codon encoding an amino acid that is not methionine but is capable of initiation of protein translation (e.g., leucine, encoded by CUG codon). In some embodiments, an initiation codon consists of the nucleotide sequence AUG.

The position of the one or more initiation codons within an isolated nucleic acid may vary. In some embodiments, an initiation codon is positioned at the N-terminus of a nucleic acid sequence encoding one or more GM3S proteins (e.g., the first three nucleotides of the nucleic acid encode an AUG codon). In some embodiments, an initiation codon is positioned between 10 nucleotide bases and 50 nucleotide bases downstream from the N-terminus of a nucleic acid sequence encoding one or more GM3S proteins. In some embodiments, an initiation codon is positioned between 20 nucleotide bases and 100 nucleotide bases downstream from the N-terminus of a nucleic acid sequence encoding one or more GM3S proteins. In some embodiments, an initiation codon is positioned between 50 nucleotide bases and 500 nucleotide bases downstream from the N-terminus of a nucleic acid sequence encoding one or more GM3S proteins. In some embodiments, an initiation codon encodes a methionine (M) positioned between 1 amino acid and 30 amino acids downstream from the N-terminus of a nucleic acid sequence encoding one or more GM3S proteins. In some embodiments, an initiation codon encodes a methionine (M) positioned between 10 amino acid and 100 amino acids downstream from the N-terminus of a nucleic acid sequence encoding one or more GM3S proteins.

The disclosure is based, in part, on expression constructs encoding one or more GM3S isoforms or variants (e.g., one or more Ia Type 1 isoforms, Ia Type 2 isoforms, 1b Type 1 isoforms, Ib Type 2 isoforms, Ic isoforms, and combinations thereof). In some embodiments, an isolated nucleic acid encodes one or more GM3S Ia Type 1 variants (e.g., M1 isoform, M2 isoform, M3 isoform, or any combination of the foregoing.) In some embodiments, an isolated nucleic acid encodes one or more GM3S Ia Type 2 variants (e.g., M1 isoform, M2 isoform, M3 isoform, or any combination of the foregoing). In some embodiments, an isolated nucleic acid encodes one or more GM3S Ib Type 1 variants (e.g., M2 isoform, M3 isoform, or a combination thereof). In some embodiments, an isolated nucleic acid encodes one or more GM3S Ib Type 2 variants (e.g., M2 isoform, M3 isoform, or a combination thereof). In some embodiments, an isolated nucleic acid encodes one or more GM3S Ic Type 1 variants (e.g., M2' isoform, M2 isoform, M3 isoform, or any combination of the foregoing).

In some aspects, the disclosure relates to isolated nucleic acids comprising or lacking certain regulatory sequences. In some embodiments, isolated nucleic acids and rAAVs described herein comprise (or lack) one or more of the following structural features (e.g., control or regulatory sequences): a 5' untranslated region (5'UTR), a promoter, an intron, a Kozak sequence, one or more miRNA binding sites, a rabbit beta-globulin (RBG) poly A sequence, and a 3' untranslated region (3'UTR). In some embodiments, one or more of the foregoing control sequences is operably linked to a nucleic acid sequence encoding one or more GM3S proteins.

The disclosure is based, in part, on isolated nucleic acids encoding one or more GM3S proteins (e.g., one or more GM3S isoforms or variants, for example GM3S Ia Type 2 M1, M2, and M3 variants, etc.) that lack a 5' UTR (e.g., a ST5GAL5 5' UTR) and/or lack a Kozak sequence (e.g., GCCACC). Without wishing to be bound by any particular theory, constructs lacking a 5' UTR and/or a Kozak sequence express increased levels of multiple isoforms of GM3S proteins relative to expression constructs which include a 5' UTR and/or a Kozak sequence.

As used herein, a nucleic acid sequence (e.g., coding sequence) and regulatory sequences are said to be "operably linked" when they are covalently linked in such a way as to place the expression or transcription of the nucleic acid sequence under the influence or control of the regulatory sequences. If it is desired that the nucleic acid sequences be translated into a functional protein, two DNA sequences are said to be operably linked if induction of a promoter in the 5' regulatory sequences results in the transcription of the coding sequence and if the nature of the linkage between the two DNA sequences does not (1) result in the introduction of a frame-shift mutation, (2) interfere with the ability of the promoter region to direct the transcription of the coding sequences, or (3) interfere with the ability of the corresponding RNA transcript to be translated into a protein. Thus, a promoter region would be operably linked to a nucleic acid sequence if the promoter region were capable of effecting transcription of that DNA sequence such that the resulting transcript might be translated into the desired protein or polypeptide. Similarly two or more coding regions are operably linked when they are linked in such a way that their transcription from a common promoter results in the expression of two or more proteins having been translated in frame.

In some embodiments, a transgene comprises a nucleic acid sequence encoding one or more GM3S proteins operably linked to a promoter. A "promoter" refers to a DNA sequence recognized by the synthetic machinery of the cell, or introduced synthetic machinery, required to initiate the specific transcription of a gene. The phrases "operatively linked," "operatively positioned," "under control" or "under transcriptional control" means that the promoter is in the correct location and orientation in relation to the nucleic acid to control RNA polymerase initiation and expression of the gene.

Generally, a promoter can be a constitutive promoter, inducible promoter, or a tissue-specific promoter.

Examples of constitutive promoters include, without limitation, the retroviral Rous sarcoma virus (RSV) LTR promoter (optionally with the RSV enhancer), the cytomegalovirus (CMV) promoter (optionally with the CMV enhancer) [see, e.g., Boshart et al., Cell, 41:521-530 (1985)], the SV40 promoter, the dihydrofolate reductase promoter, the β-actin promoter, the phosphoglycerol kinase (PGK) promoter, and the EF1α promoter [Invitrogen]. In some embodiments, a promoter is an RNA pol II promoter. In some embodiments, a promoter is an RNA pol III promoter, such as U6 or H1. In some embodiments, a promoter is an RNA pol II promoter.

Examples of inducible promoters regulated by exogenously supplied promoters include the zinc-inducible sheep metallothionine (MT) promoter, the dexamethasone (Dex)-inducible mouse mammary tumor virus (MMTV) promoter, the T7 polymerase promoter system (WO 98/10088); the ecdysone insect promoter (No et al., Proc. Natl. Acad. Sci. USA, 93:3346-3351 (1996)), the tetracycline-repressible system (Gossen et al., Proc. Natl. Acad. Sci. USA, 89:5547-5551 (1992)), the tetracycline-inducible system (Gossen et al., Science, 268:1766-1769 (1995), see also Harvey et al., Curr. Opin. Chem. Biol., 2:512-518 (1998)), the RU486-inducible system (Wang et al., Nat. Biotech., 15:239-243 (1997) and Wang et al., Gene Ther., 4:432-441 (1997)) and the rapamycin-inducible system (Magari et al., J. Clin. Invest., 100:2865-2872 (1997)). Still other types of inducible promoters which may be useful in this context are those which are regulated by a specific physiological state, e.g., temperature, acute phase, a particular differentiation state of the cell, or in replicating cells only.

In another embodiment, the native promoter for the transgene (e.g., ST3GAL5 promoter or hSyn1 promoter) will be used. The native promoter may be preferred when it is desired that expression of the transgene should mimic the native expression. The native promoter may be used when expression of the transgene must be regulated temporally or developmentally, or in a tissue-specific manner, or in response to specific transcriptional stimuli. In a further embodiment, other native expression control elements, such as enhancer elements, polyadenylation sites or Kozak consensus sequences may also be used to mimic the native expression.

In some embodiments, the regulatory sequences impart tissue-specific gene expression capabilities. In some cases, the tissue-specific regulatory sequences bind tissue-specific transcription factors that induce transcription in a tissue specific manner. Such tissue-specific regulatory sequences (e.g., promoters, enhancers, etc.) are well known in the art. Exemplary tissue-specific regulatory sequences include, but are not limited to the following tissue specific promoters: retinoschisin proximal promoter, interphotoreceptor retinoid-binding protein enhancer (RS/IRBPa), rhodopsin kinase (RK), liver-specific thyroxin binding globulin (TBG) promoter, an insulin promoter, a glucagon promoter, a somatostatin promoter, a pancreatic polypeptide (PPY) promoter, a synapsin-1 (Syn) promoter, a creatine kinase (MCK) promoter, a mammalian desmin (DES) promoter, a α-myosin heavy chain (α-MHC) promoter, or a cardiac Troponin T (cTnT) promoter. Other exemplary promoters include Beta-actin promoter, hepatitis B virus core promoter, Sandig et al., Gene Ther., 3:1002-9 (1996); alpha-fetoprotein (AFP) promoter, Arbuthnot et al., Hum. Gene Ther., 7:1503-14 (1996)), bone osteocalcin promoter (Stein et al., Mol. Biol. Rep., 24:185-96 (1997)); bone sialoprotein promoter (Chen et al., J. Bone Miner. Res., 11:654-64 (1996)), CD2 promoter (Hansal et al., J. Immunol., 161:1063-8 (1998); immunoglobulin heavy chain promoter; T cell receptor α-chain promoter, neuronal such as neuron-specific enolase (NSE) promoter (Andersen et al., Cell. Mol. Neurobiol., 13:503-15 (1993)), neurofilament light-chain gene promoter (Piccioli et al., Proc. Natl. Acad. Sci. USA, 88:5611-5 (1991)), and the neuron-specific vgf gene promoter (Piccioli et al., Neuron, 15:373-84 (1995)), among others which will be apparent to the skilled artisan.

In some aspects, the disclosure relates to isolated nucleic acids comprising a transgene encoding one or more GM3S proteins, and one or more miRNA binding sites. Without wishing to be bound by any particular theory, incorporation of miRNA binding sites into gene expression constructs allows for regulation of transgene expression (e.g., inhibition of transgene expression) in cells and tissues where the corresponding miRNA is expressed. In some embodiments, incorporation of one or more miRNA binding sites into a transgene allows for de-targeting of transgene expression in a cell-type specific manner. In some embodiments, one or more miRNA binding sites are positioned in a 3' untranslated region (3' UTR) of a transgene, for example between the last codon of a nucleic acid sequence encoding one or more GM3S proteins, and a poly A sequence.

In some embodiments, a transgene comprises one or more (e.g., 1, 2, 3, 4, 5, or more) miRNA binding sites that de-target expression of the one or more GM3S proteins from liver cells. For example, in some embodiments, a transgene comprises one or more miR-122 binding sites.

In some embodiments, a transgene comprises one or more (e.g., 1, 2, 3, 4, 5, or more) miRNA binding sites that de-target expression of the one or more GM3S proteins from immune cells (e.g., antigen presenting cells (APCs), such as macrophages, dendrites, etc.). Incorporation of miRNA binding sites for immune-associated miRNAs may de-target transgene expression from antigen presenting cells and thus reduce or eliminate immune responses (cellular and/or humoral) produced in the subject against products of the transgene, for example as described in US 2018/0066279, the entire contents of which are incorporated herein by reference.

As used herein an "immune-associated miRNA" is an miRNA preferentially expressed in a cell of the immune system, such as an antigen presenting cell (APC). In some embodiments, an immune-associated miRNA is an miRNA expressed in immune cells that exhibits at least a 2-fold, 3-fold, 4-fold, 5-fold, 6-fold, 7-fold, 8-fold, 9-fold, 10-fold higher level of expression in an immune cell compared with a non-immune cell (e.g., a control cell, such as a HeLa cell, HEK293 cell, mesenchymal cell, etc.). In some embodiments, the cell of the immune system (immune cell) in which the immune-associated miRNA is expressed is a B cell, T cell, Killer T cell, Helper T cell, γδ T cell, dendritic cell, macrophage, monocyte, vascular endothelial cell. or other immune cell. In some embodiments, the cell of the immune system is a B cell expressing one or more of the following markers: B220, BLAST-2 (EBVCS), Bu-1, CD19, CD20 (L26), CD22, CD24, CD27, CD57, CD72, CD79a, CD79b, CD86, chB6, D8/17, FMC7, L26, M17, MUM-1, Pax-5 (BSAP), and PC47H. In some embodiments, the cell of the immune system is a T cell expressing one or more of the following markers: ART2, CD1a, CD1d, CD11b (Mac-1), CD134 (OX40), CD150, CD2, CD25 (interleukin 2 receptor alpha), CD3, CD38, CD4, CD45RO, CD5, CD7, CD72, CD8, CRTAM, FOXP3, FT2, GPCA, HLA-DR, HML-1, HT23A, Leu-22, Ly-2, Ly-m22, MICG, MRC OX 8, MRC OX-22, OX40, PD-1 (Programmed death-1), RT6, TCR (T cell receptor), Thy-1 (CD90), and TSA-2 (Thymic shared Ag-2). In some embodiments, the immune-associated miRNA is selected from: miR-15a, miR-16-1, miR-17, miR-18a, miR-19a, miR-19b-1, miR-20a, miR-21, miR-29a/b/c, miR-30b, miR-31, miR-34a, miR-92a-1, miR-106a, miR-125a/b, miR-142-3p, miR-146a, miR-150, miR-155, miR-181a, miR-223 and miR-424, miR-221, miR-222, let-7i, miR-148, and miR-152.

The isolated nucleic acids of the disclosure may be recombinant adeno-associated virus (AAV) vectors (rAAV vectors). In some embodiments, an isolated nucleic acid as described by the disclosure comprises a region (e.g., a first region) comprising a first adeno-associated virus (AAV) inverted terminal repeat (ITR), or a variant thereof. The isolated nucleic acid (e.g., the recombinant AAV vector) may be packaged into a capsid protein and administered to a subject and/or delivered to a selected target cell. "Recombinant AAV (rAAV) vectors" are typically composed of, at a minimum, a transgene and its regulatory sequences, and 5' and 3' AAV inverted terminal repeats (ITRs). The transgene may comprise a region encoding, for example, a protein and/or an expression control sequence (e.g., a poly-A tail), as described elsewhere in the disclosure.

Generally, ITR sequences are about 145 bp in length. Preferably, substantially the entire sequences encoding the ITRs are used in the molecule, although some degree of minor modification of these sequences is permissible. The ability to modify these ITR sequences is within the skill of the art. (See, e.g., texts such as Sambrook et al., "Molecular Cloning. A Laboratory Manual", 2d ed., Cold Spring Harbor Laboratory, New York (1989); and K. Fisher et al., J Virol., 70:520 532 (1996)). An example of such a molecule employed in the disclosure is a "cis-acting" plasmid containing the transgene, in which the selected transgene sequence and associated regulatory elements are flanked by the 5' and 3' AAV ITR sequences. The AAV ITR sequences may be obtained from any known AAV, including presently identified mammalian AAV types. In some embodiments, the isolated nucleic acid further comprises a region (e.g., a second region, a third region, a fourth region, etc.) comprising a second AAV ITR. In some embodiments, an isolated nucleic acid encoding a transgene is flanked by AAV ITRs (e.g., in the orientation 5'-ITR-transgene-ITR-3'). In some embodiments, the AAV ITRs are AAV2 ITRs.

Recombinant Adeno-Associated Viruses (rAAVs) and Other Vectors

Aspects of the disclosure relate to vectors comprising an isolated nucleic acid encoding one or more GM3S proteins. As used herein, the term "vector" includes any genetic element, such as a plasmid, phage, transposon, cosmid, chromosome, artificial chromosome, virus, virion, etc., which is capable of replication when associated with the proper control elements and which can transfer gene sequences between cells. In some embodiments, a vector is a viral vector, such as an rAAV vector, a lentiviral vector, an adenoviral vector, a retroviral vector, etc. Thus, the term includes cloning and expression vehicles, as well as viral vectors. In some embodiments, useful vectors are contemplated to be those vectors in which the nucleic acid segment to be transcribed is positioned under the transcriptional control of a promoter.

In some aspects, the disclosure provides isolated adeno-associated viruses (AAVs). As used herein with respect to AAVs, the term "isolated" refers to an AAV that has been artificially produced or obtained. Isolated AAVs may be produced using recombinant methods. Such AAVs are referred to herein as "recombinant AAVs". Recombinant AAVs (rAAVs) preferably have tissue-specific targeting capabilities, such that a transgene of the rAAV will be delivered specifically to one or more predetermined tissue(s) (e.g., ocular tissues, neurons). The AAV capsid is an important element in determining these tissue-specific targeting capabilities (e.g., tissue tropism). Thus, an rAAV having a capsid appropriate for the tissue being targeted can be selected.

In some embodiments, rAAVs of the disclosure comprise a nucleotide sequence as set forth in any one of SEQ ID NOs: 1-7 and 11-38, or encode one or more GM3s proteins each having an amino acid sequence as set forth in any one of SEQ ID NOs: 8-10. In some embodiments, rAAVs of the disclosure comprise a nucleotide sequence that is 99% identical, 95% identical, 90% identical, 85% identical, 80% identical, 75% identical, 70% identical, 65% identical, 60% identical, 55% identical, or 50% identical to a nucleotide sequence as set forth in SEQ ID NOs: 1-7 and 11-38.

Methods for obtaining recombinant AAVs having a desired capsid protein are well known in the art. (See, for example, US 2003/0138772), the contents of which are incorporated herein by reference in their entirety). Typically the methods involve culturing a host cell which contains a nucleic acid sequence encoding an AAV capsid protein; a functional rep gene; a recombinant AAV vector composed of AAV inverted terminal repeats (ITRs) and a transgene; and sufficient helper functions to permit packaging of the recombinant AAV vector into the AAV capsid proteins. In some embodiments, capsid proteins are structural proteins encoded by the cap gene of an AAV. AAVs comprise three capsid proteins, virion proteins 1 to 3 (named VP1, VP2 and VP3), all of which are transcribed from a single cap gene via alternative splicing. In some embodiments, the molecular weights of VP1, VP2 and VP3 are respectively about 87 kDa, about 72 kDa and about 62 kDa. In some embodiments, upon translation, capsid proteins form a spherical 60-mer protein shell around the viral genome. In some embodiments, the functions of the capsid proteins are to protect the viral genome, deliver the genome and interact with the host. In some aspects, capsid proteins deliver the viral genome to a host in a tissue specific manner.

In some embodiments, an AAV capsid protein has a tropism for CNS tissue (e.g., brain tissue, spinal tissue, etc.). In some embodiments, an AAV capsid protein targets neuronal cells. In some embodiments, an AAV capsid protein is capable of crossing the blood-brain barrier (BBB).

In some embodiments, an AAV capsid protein is of an AAV serotype selected from the group consisting of AAV1, AAV2, AAV3, AAV4, AAV5, AAV6, AAV7, AAV8, AAV9, AAV9.hr, AAVrh8, AAVrh10, AAVrh39, AAVrh43, AAV.PHP.B, AAV.PHP.eB, and variants of any of the foregoing. In some embodiments, an AAV capsid protein is of a serotype derived from a non-human primate, for example AAVrh8 serotype.

In some embodiments, an rAAV vector or rAAV particle comprises a mutant ITR that lacks a functional terminal resolution site (TRS). The term "lacking a terminal resolution site" can refer to an AAV ITR that comprises a mutation (e.g., a sense mutation such as a non-synonymous mutation, or missense mutation) that abrogates the function of the terminal resolution site (TRS) of the ITR, or to a truncated AAV ITR that lacks a nucleic acid sequence encoding a functional TRS (e.g., a ΔTRS ITR). Without wishing to be bound by any particular theory, a rAAV vector comprising an ITR lacking a functional TRS produces a self-complementary rAAV vector, for example as described by McCarthy (2008) Molecular Therapy 16(10):1648-1656.

The components to be cultured in the host cell to package a rAAV vector in an AAV capsid may be provided to the host cell in trans. Alternatively, any one or more of the required components (e.g., recombinant AAV vector, rep sequences, cap sequences, and/or helper functions) may be provided by a stable host cell which has been engineered to contain one or more of the required components using methods known to those of skill in the art. Most suitably, such a stable host cell will contain the required component(s) under the control of an inducible promoter. However, the required component (s) may be under the control of a constitutive promoter. Examples of suitable inducible and constitutive promoters are provided herein, in the discussion of regulatory elements suitable for use with the transgene. In still another alternative, a selected stable host cell may contain selected component(s) under the control of a constitutive promoter and other selected component(s) under the control of one or more inducible promoters. For example, a stable host cell may be generated which is derived from 293 cells (which contain E1 helper functions under the control of a constitutive promoter), but which contain the rep and/or cap proteins under the control of inducible promoters. Still other stable host cells may be generated by one of skill in the art.

In some embodiments, the disclosure relates to a host cell containing a nucleic acid that comprises a coding sequence encoding a transgene (e.g., one or more GM3S proteins). A "host cell" refers to any cell that harbors, or is capable of harboring, a substance of interest. Often a host cell is a mammalian cell. In some embodiments, a host cell is a neuron. In some embodiments, a host cell is a photoreceptor cell. A host cell may be used as a recipient of an AAV helper construct, an AAV minigene plasmid, an accessory function vector, or other transfer DNA associated with the production of recombinant AAVs. The term includes the progeny of the original cell which has been transfected. Thus, a "host cell" as used herein may refer to a cell which has been transfected with an exogenous DNA sequence. It is understood that the progeny of a single parental cell may not necessarily be completely identical in morphology or in genomic or total DNA complement as the original parent, due to natural, accidental, or deliberate mutation. In some embodiments, the host cell is a mammalian cell, a yeast cell, a bacterial cell, an insect cell, a plant cell, or a fungal cell. In some embodiments, the host cell is a neuron or a glial cell (e.g., astrocyte, oligodendrocyte, etc.).

The recombinant AAV vector, rep sequences, cap sequences, and helper functions required for producing the rAAV of the disclosure may be delivered to the packaging host cell using any appropriate genetic element (vector). The selected genetic element may be delivered by any suitable method, including those described herein. The methods used to construct any embodiment of this disclosure are known to those with skill in nucleic acid manipulation and include genetic engineering, recombinant engineering, and synthetic techniques. See, e.g., Sambrook et al., Molecular Cloning: A Laboratory Manual, Cold Spring Harbor Press, Cold Spring Harbor, N.Y. Similarly, methods of generating rAAV virions are well known and the selection of a suitable method is not a limitation on the disclosure. See, e.g., K. Fisher et al., J. Virol., 70:520-532 (1993) and U.S. Pat. No. 5,478,745.

In some embodiments, recombinant AAVs may be produced using the triple transfection method (described in detail in U.S. Pat. No. 6,001,650). Typically, the recombinant AAVs are produced by transfecting a host cell with an AAV vector (comprising a transgene flanked by ITR elements) to be packaged into AAV particles, an AAV helper function vector, and an accessory function vector. An AAV helper function vector encodes the "AAV helper function" sequences (e.g., rep and cap), which function in trans for productive AAV replication and encapsidation. Preferably, the AAV helper function vector supports efficient AAV vector production without generating any detectable wildtype AAV virions (e.g., AAV virions containing functional rep and cap genes). Non-limiting examples of vectors suitable for use with the disclosure include pHLP19, described in U.S. Pat. No. 6,001,650 and pRep6cap6 vector, described in U.S. Pat. No. 6,156,303, the entirety of both incorporated by reference herein. The accessory function vector encodes nucleotide sequences for non-AAV derived viral and/or cellular functions upon which AAV is dependent for replication (e.g., "accessory functions"). The accessory functions include those functions required for AAV replication, including, without limitation, those moieties involved in activation of AAV gene transcription, stage specific AAV mRNA splicing, AAV DNA replication, synthesis of cap expression products, and AAV capsid assembly. Viral-based accessory functions can be derived from any of the known helper viruses such as adenovirus, herpes virus (other than herpes simplex virus type-1), and vaccinia virus.

In some aspects, the disclosure provides transfected host cells. The term "transfection" is used to refer to the uptake of foreign DNA by a cell, and a cell has been "transfected" when exogenous DNA has been introduced inside the cell membrane. A number of transfection techniques are generally known in the art. See, e.g., Graham et al. (1973) Virology, 52:456, Sambrook et al. (1989) Molecular Cloning, a laboratory manual, Cold Spring Harbor Laboratories, New York, Davis et al. (1986) Basic Methods in Molecular Biology, Elsevier, and Chu et al. (1981) Gene 13:197. Such techniques can be used to introduce one or more exogenous nucleic acids, such as a nucleotide integration vector and other nucleic acid molecules, into suitable host cells.

As used herein, the terms "recombinant cell" refers to a cell into which an exogenous DNA segment, such as DNA segment that leads to the transcription of a biologically-active polypeptide or production of a biologically active nucleic acid such as an RNA, has been introduced.

Methods

Methods for delivering a transgene (e.g., an isolated nucleic acid encoding one or more GM3S proteins) to a subject are provided by the disclosure. In some embodiments, a subject tis administered one or more (e.g., 1, 2, 3, 4, 5, 6, or more) rAAVs, each rAAV encoding a different transgene (e.g., each encoding a different GM3S protein). The methods typically involve administering to a subject an effective amount of an isolated nucleic acid encoding the transgene. In some embodiments, expression constructs described by the disclosure are useful for treating diseases associated by GM3S deficiency.

In some aspects, the disclosure provides a method for treating a GM3 synthase (GM3S) deficiency in a subject in need thereof, the method comprising administering to a subject having a GM3 synthase (GM3S) deficiency an effective amount of an isolated nucleic acid, vector, or rAAV as described herein. A subject may be any mammalian organism, for example a human, non-human primate, horse, pig, dog, cat rodent, etc. In some embodiments a subject is a human.

As used herein, "GM3 synthase deficiency" refers to a neurological disorder that is characterized by recurrent seizures (e.g., epileptic seizures, grand mal seizures, etc.) and cognitive defects (e.g., severe intellectual disability), insomnia, deafness, blindness, and dyskinesia. Typically, subjects having GM3S deficiency comprise one or more mutations in a ST3GAL5 gene. A mutation may be a point mutation, non-sense mutation, non-sense mutation, frameshift mutation, etc. Examples of mutations include mutations at position c.862 (e.g., c.C862T), position c.1063 (e.g., c.G1063A), and positions c.584 and c.601 (e.g., c.G584C and c.G601A).

An "effective amount" of a substance is an amount sufficient to produce a desired effect. In some embodiments, an effective amount of an isolated nucleic acid is an amount sufficient to transfect (or infect in the context of rAAV mediated delivery) a sufficient number of target cells of a target tissue of a subject. In some embodiments, a target tissue is central nervous system (CNS) tissue (e.g., brain tissue, spinal cord tissue, cerebrospinal fluid (CSF), etc.). In some embodiments, an effective amount of an isolated nucleic acid (e.g., which may be delivered via an rAAV) may be an amount sufficient to have a therapeutic benefit in a subject, e.g., to increase the expression of GM3S proteins, to extend the lifespan of a subject, to improve in the subject one or more symptoms of disease (e.g., a symptom of GM3S deficiency), etc. The effective amount will depend on a variety of factors such as, for example, the species, age, weight, health of the subject, and the tissue to be targeted, and may thus vary among subject and tissue as described elsewhere in the disclosure.

As used herein, the term "treating" refers to the application or administration of a composition encoding one or more GM3S proteins to a subject, who has a disease associated with GM3S deficiency, a symptom of a disease associated with GM3S deficiency, or a predisposition toward a disease associated with GM3S deficiency (e.g., one or more mutations in the ST3GAL5 gene), with the purpose to cure, heal, alleviate, relieve, alter, remedy, ameliorate, improve, or affect the disorder, the symptom of the disease, or the predisposition toward a disease associated with GM3S deficiency.

Alleviating a disease associated with GM3S deficiency includes delaying the development or progression of the disease, or reducing disease severity. Alleviating the disease does not necessarily require curative results. As used therein, "delaying" the development of a disease (such as a disease associated with GM3S deficiency) means to defer, hinder, slow, retard, stabilize, and/or postpone progression of the disease. This delay can be of varying lengths of time, depending on the history of the disease and/or individuals being treated. A method that "delays" or alleviates the development of a disease, or delays the onset of the disease, is a method that reduces probability of developing one or more symptoms of the disease in a given time frame and/or reduces extent of the symptoms in a given time frame, when compared to not using the method. Such comparisons are typically based on clinical studies, using a number of subjects sufficient to give a statistically significant result.

"Development" or "progression" of a disease means initial manifestations and/or ensuing progression of the disease. Development of the disease can be detectable and assessed using standard clinical techniques as well known in the art. However, development also refers to progression that may be undetectable. For purpose of this disclosure, development or progression refers to the biological course of the symptoms. "Development" includes occurrence, recurrence, and onset. As used herein "onset" or "occurrence" of a disease associated with GM3S deficiency includes initial onset and/or recurrence.

In some embodiments, administration occurs via systemic injection or direct injection to the central nervous system (CNS). In some embodiments, systemic injection is intravenous injection. In some embodiments, direct injection to the central nervous system (CNS) is intracerebral administration, intrathecal administration, or a combination thereof.

Administration

The isolated nucleic acids and rAAVs of the disclosure may be delivered to a subject in compositions according to any appropriate methods known in the art. For example, an rAAV, preferably suspended in a physiologically compatible carrier (i.e., in a composition), may be administered to a subject, i.e. host animal, such as a human, mouse, rat, cat, dog, sheep, rabbit, horse, cow, goat, pig, guinea pig, hamster, chicken, turkey, or a non-human primate (e.g., Macaque). In some embodiments a host animal does not include a human.

Delivery of the rAAVs to a mammalian subject may be by, for example, intramuscular injection or by administration into the bloodstream of the mammalian subject. Administration into the bloodstream may be by injection into a vein, an artery, or any other vascular conduit. In some embodiments, the rAAVs are administered into the bloodstream by way of isolated limb perfusion, a technique well known in the surgical arts, the method essentially enabling the artisan to isolate a limb from the systemic circulation prior to administration of the rAAV virions. A variant of the isolated limb perfusion technique, described in U.S. Pat. No. 6,177,403, can also be employed by the skilled artisan to administer the virions into the vasculature of an isolated limb to potentially enhance transduction into muscle cells or tissue. Moreover, in certain instances, it may be desirable to deliver the virions to the CNS of a subject. By "CNS" is meant all cells and tissue of the brain and spinal cord of a vertebrate. Thus, the term includes, but is not limited to, neuronal cells, glial cells, astrocytes, cerebrospinal fluid (CSF), interstitial spaces, bone, cartilage and the like. Recombinant AAVs may be delivered directly to the CNS or brain by injection into, e.g., the ventricular region, as well as to the striatum (e.g., the caudate nucleus or putamen of the striatum), spinal cord and neuromuscular junction, or cerebellar lobule, with a needle, catheter or related device, using neurosurgical techniques known in the art, such as by stereotactic injection (see, e.g., Stein et al., J Virol 73:3424-3429, 1999; Davidson et al., PNAS 97:3428-3432, 2000; Davidson et al., Nat. Genet. 3:219-223, 1993; and Alisky and Davidson, Hum. Gene Ther. 11:2315-2329, 2000). In some embodiments, rAAV as described in the disclosure are administered by intravenous injection. In some embodiments, the rAAV are administered by intracerebral injection. In some embodiments, the rAAV are administered by intrathecal injection. In some embodiments, the rAAV are administered by intrastriatal injection. In some embodiments, the rAAV are delivered by intracranial injection. In some embodiments, the rAAV are delivered by cisterna magna injection. In some embodiments, the rAAV are delivered by cerebral lateral ventricle injection.

Aspects of the instant disclosure relate to compositions comprising one or more recombinant AAVs, each rAAV comprising a capsid protein and a nucleic acid encoding a transgene, wherein the transgene comprises a nucleic acid sequence encoding one or more GM3S proteins. In some embodiments, each GM3S protein independently comprises or consists of the sequence set forth in any one of SEQ ID NOs: 8-10. In some embodiments, the nucleic acid further comprises AAV ITRs. In some embodiments, the rAAV comprises an rAAV vector represented by the sequence set forth in any one of SEQ ID NO: 1-7, and 11-38, or a portion thereof. In some embodiments, a composition further comprises a pharmaceutically acceptable carrier.

The compositions of the disclosure may comprise an rAAV alone, or in combination with one or more other viruses (e.g., a second rAAV encoding having one or more different transgenes). In some embodiments, a composition comprises 1, 2, 3, 4, 5, 6, 7, 8, 9, 10, or more different rAAVs each having one or more different transgenes.

Suitable carriers may be readily selected by one of skill in the art in view of the indication for which the rAAV is directed. For example, one suitable carrier includes saline, which may be formulated with a variety of buffering solutions (e.g., phosphate buffered saline). Other exemplary carriers include sterile saline, lactose, sucrose, calcium phosphate, gelatin, dextran, agar, pectin, peanut oil, sesame oil, and water. The selection of the carrier is not a limitation of the present disclosure.

Optionally, the compositions of the disclosure may contain, in addition to the rAAV and carrier(s), other conventional pharmaceutical ingredients, such as preservatives, or chemical stabilizers. Suitable exemplary preservatives include chlorobutanol, potassium sorbate, sorbic acid, sulfur dioxide, propyl gallate, the parabens, ethyl vanillin, glycerin, phenol, and parachlorophenol. Suitable chemical stabilizers include gelatin and albumin.

The rAAVs are administered in sufficient amounts to transfect the cells of a desired tissue and to provide sufficient levels of gene transfer and expression without undue adverse effects. Conventional and pharmaceutically acceptable routes of administration include, but are not limited to, direct delivery to the selected organ (e.g., intraportal delivery to the liver), oral, inhalation (including intranasal and intratracheal delivery), intraocular, intravenous, intracerebroventricular, intramuscular, subcutaneous, intradermal, intratumoral, and other parental routes of administration. Routes of administration may be combined, if desired.

The dose of rAAV virions required to achieve a particular "therapeutic effect," e.g., the units of dose in genome copies/per kilogram of body weight (GC/kg), will vary based on several factors including, but not limited to: the route of rAAV virion administration, the level of gene or RNA expression required to achieve a therapeutic effect, the specific disease or disorder being treated, and the stability of the gene or RNA product. One of skill in the art can readily determine a rAAV virion dose range to treat a patient having a particular disease or disorder based on the aforementioned factors, as well as other factors that are well known in the art.

An effective amount of an rAAV is an amount sufficient to target infect an animal, target a desired tissue. In some embodiments, an effective amount of an rAAV is an amount sufficient to produce a stable somatic transgenic animal model. The effective amount will depend primarily on factors such as the species, age, weight, health of the subject, and the tissue to be targeted, and may thus vary among animal and tissue. For example, an effective amount of the rAAV is generally in the range of from about 1 ml to about 100 ml of solution containing from about $10^9$ to $10^{16}$ genome copies. In some cases, a dosage between about $10^{11}$ to $10^{13}$ rAAV genome copies is appropriate. In certain embodiments, $10^{12}$ or $10^{13}$ rAAV genome copies is effective to target CNS tissue. In some cases, stable transgenic animals are produced by multiple doses of an rAAV.

In some embodiments, a dose of rAAV is administered to a subject no more than once per calendar day (e.g., a 24-hour period). In some embodiments, a dose of rAAV is administered to a subject no more than once per 2, 3, 4, 5, 6, or 7 calendar days. In some embodiments, a dose of rAAV is administered to a subject no more than once per calendar week (e.g., 7 calendar days). In some embodiments, a dose of rAAV is administered to a subject no more than bi-weekly (e.g., once in a two calendar week period). In some embodiments, a dose of rAAV is administered to a subject no more than once per calendar month (e.g., once in 30 calendar days). In some embodiments, a dose of rAAV is administered to a subject no more than once per six calendar months.

In some embodiments, a dose of rAAV is administered to a subject no more than once per calendar year (e.g., 365 days or 366 days in a leap year).

In some embodiments, rAAV compositions are formulated to reduce aggregation of AAV particles in the composition, particularly where high rAAV concentrations are present (e.g., ~$10^{13}$ GC/ml or more). Methods for reducing aggregation of rAAVs are well known in the art and, include, for example, addition of surfactants, pH adjustment, salt concentration adjustment, etc. (See, e.g., Wright F R, et al., Molecular Therapy (2005) 12, 171-178, the contents of which are incorporated herein by reference.)

Formulation of pharmaceutically-acceptable excipients and carrier solutions is well-known to those of skill in the art, as is the development of suitable dosing and treatment regimens for using the particular compositions described herein in a variety of treatment regimens.

Typically, these formulations may contain at least about 0.1% of the active compound or more, although the percentage of the active ingredient(s) may, of course, be varied and may conveniently be between about 1 or 2% and about 70% or 80% or more of the weight or volume of the total formulation. Naturally, the amount of active compound in each therapeutically-useful composition may be prepared is such a way that a suitable dosage will be obtained in any given unit dose of the compound. Factors such as solubility, bioavailability, biological half-life, route of administration, product shelf life, as well as other pharmacological considerations will be contemplated by one skilled in the art of preparing such pharmaceutical formulations, and as such, a variety of dosages and treatment regimens may be desirable.

In certain circumstances it will be desirable to deliver the rAAV-based therapeutic constructs in suitably formulated pharmaceutical compositions disclosed herein either subcutaneously, intraopancreatically, intranasally, parenterally, intravenously, intramuscularly, intrathecally, or orally, intraperitoneally, or by inhalation. In some embodiments, the administration modalities as described in U.S. Pat. Nos. 5,543,158; 5,641,515 and 5,399,363 (each specifically incorporated herein by reference in its entirety) may be used to deliver rAAVs. In some embodiments, a preferred mode of administration is by portal vein injection.

The pharmaceutical forms suitable for injectable use include sterile aqueous solutions or dispersions and sterile powders for the extemporaneous preparation of sterile injectable solutions or dispersions. Dispersions may also be prepared in glycerol, liquid polyethylene glycols, and mixtures thereof and in oils. Under ordinary conditions of storage and use, these preparations contain a preservative to prevent the growth of microorganisms. In many cases the form is sterile and fluid to the extent that easy syringability exists. It must be stable under the conditions of manufacture and storage and must be preserved against the contaminating action of microorganisms, such as bacteria and fungi. The carrier can be a solvent or dispersion medium containing, for example, water, ethanol, polyol (e.g., glycerol, propylene glycol, and liquid polyethylene glycol, and the like), suitable mixtures thereof, and/or vegetable oils. Proper fluidity may be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

For administration of an injectable aqueous solution, for example, the solution may be suitably buffered, if necessary, and the liquid diluent first rendered isotonic with sufficient saline or glucose. These particular aqueous solutions are especially suitable for intravenous, intramuscular, subcutaneous and intraperitoneal administration. In this connection, a sterile aqueous medium that can be employed will be known to those of skill in the art. For example, one dosage may be dissolved in 1 ml of isotonic NaCl solution and either added to 1000 ml of hypodermoclysis fluid or injected at the proposed site of infusion, (see for example, "Remington's Pharmaceutical Sciences" 15th Edition, pages 1035-1038 and 1570-1580). Some variation in dosage will necessarily occur depending on the condition of the host. The person responsible for administration will, in any event, determine the appropriate dose for the individual host.

Sterile injectable solutions are prepared by incorporating the active rAAV in the required amount in the appropriate solvent with various of the other ingredients enumerated herein, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

The rAAV compositions disclosed herein may also be formulated in a neutral or salt form. Pharmaceutically-acceptable salts, include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like. Upon formulation, solutions will be administered in a manner compatible with the dosage formulation and in such amount as is therapeutically effective. The formulations are easily administered in a variety of dosage forms such as injectable solutions, drug-release capsules, and the like.

As used herein, "carrier" includes any and all solvents, dispersion media, vehicles, coatings, diluents, antibacterial and antifungal agents, isotonic and absorption delaying agents, buffers, carrier solutions, suspensions, colloids, and the like. The use of such media and agents for pharmaceutical active substances is well known in the art. Supplementary active ingredients can also be incorporated into the compositions. The phrase "pharmaceutically-acceptable" refers to molecular entities and compositions that do not produce an allergic or similar untoward reaction when administered to a host.

Delivery vehicles such as liposomes, nanocapsules, microparticles, microspheres, lipid particles, vesicles, and the like, may be used for the introduction of the compositions of the present disclosure into suitable host cells. In particular, the rAAV vector delivered transgenes may be formulated for delivery either encapsulated in a lipid particle, a liposome, a vesicle, a nanosphere, or a nanoparticle or the like.

Such formulations may be preferred for the introduction of pharmaceutically acceptable formulations of the nucleic acids or the rAAV constructs disclosed herein. The formation and use of liposomes is generally known to those of skill in the art. Recently, liposomes were developed with improved serum stability and circulation half-times (U.S. Pat. No. 5,741,516). Further, various methods of liposome and liposome like preparations as potential drug carriers have been described (U.S. Pat. Nos. 5,567,434; 5,552,157; 5,565,213; 5,738,868 and 5,795,587).

Liposomes have been used successfully with a number of cell types that are normally resistant to transfection by other procedures. In addition, liposomes are free of the DNA length constraints that are typical of viral-based delivery systems. Liposomes have been used effectively to introduce genes, drugs, radiotherapeutic agents, viruses, transcription factors and allosteric effectors into a variety of cultured cell lines and animals. In addition, several successful clinical trials examining the effectiveness of liposome-mediated drug delivery have been completed.

Liposomes are formed from phospholipids that are dispersed in an aqueous medium and spontaneously form multilamellar concentric bilayer vesicles (also termed multilamellar vesicles (MLVs). MLVs generally have diameters of from 25 nm to 4 μm. Sonication of MLVs results in the formation of small unilamellar vesicles (SUVs) with diameters in the range of 200 to 500 Å, containing an aqueous solution in the core.

Alternatively, nanocapsule formulations of the rAAV may be used. Nanocapsules can generally entrap substances in a stable and reproducible way. To avoid side effects due to intracellular polymeric overloading, such ultrafine particles (sized around 0.1 μm) should be designed using polymers able to be degraded in vivo. Biodegradable polyalkyl-cyanoacrylate nanoparticles that meet these requirements are contemplated for use.

In addition to the methods of delivery described above, the following techniques are also contemplated as alternative methods of delivering the rAAV compositions to a host. Sonophoresis (i.e., ultrasound) has been used and described in U.S. Pat. No. 5,656,016 as a device for enhancing the rate and efficacy of drug permeation into and through the circulatory system. Other drug delivery alternatives contemplated are intraosseous injection (U.S. Pat. No. 5,779,708), microchip devices (U.S. Pat. No. 5,797,898), ophthalmic formulations (Bourlais et al., 1998), transdermal matrices (U.S. Pat. Nos. 5,770,219 and 5,783,208) and feedback-controlled delivery (U.S. Pat. No. 5,697,899).

Example

Figure 1B:
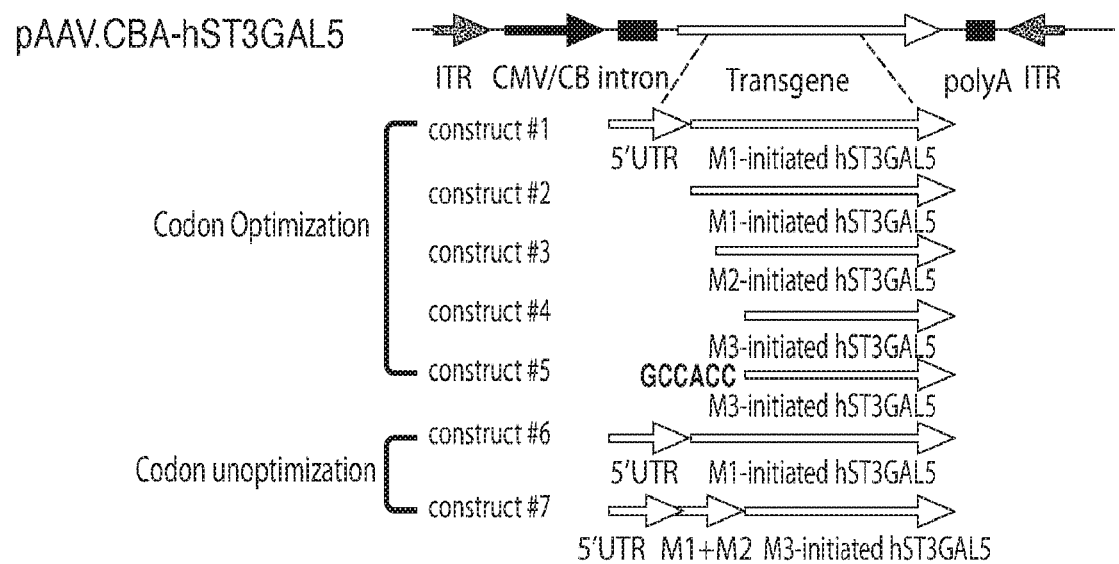

One GM3S mRNA variant (hST3GAL5-1a-2) has been observed to be the most abundant isoform in human tissues, including brain. However, hST3GAL5-1a-2 can produce at least three protein products that initiate from different start codons (FIG. 1A). Therefore, multiple hST3GAL5 constructs that differ in their initiating start codons, codon optimization, and the presence of the full length 5'-UTR (FIG. 1B) were produced.

Figure 1C:
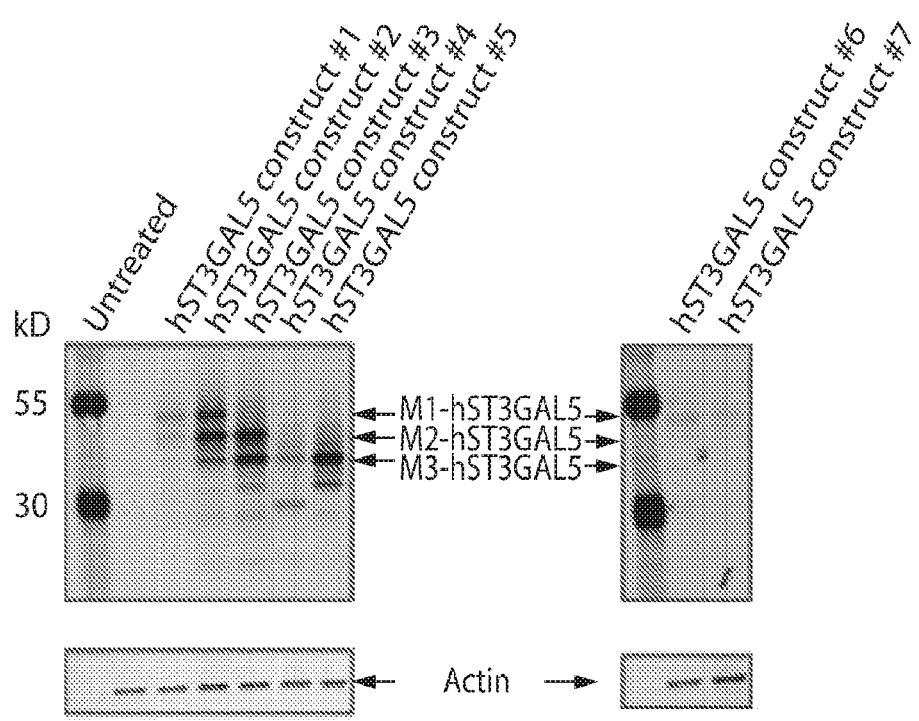

Expression efficiency of the constructs was investigated by transfecting HeLa cells, which normally have no detectable endogenous ST3GAL5 expression. All constructs expressed the desired GM3S isoform. It was noted that constructs having a 5'-UTR exhibited reduced gene expression (FIG. 1C). Constructs without the 5'-UTR were investigated further.

Figure 2A:
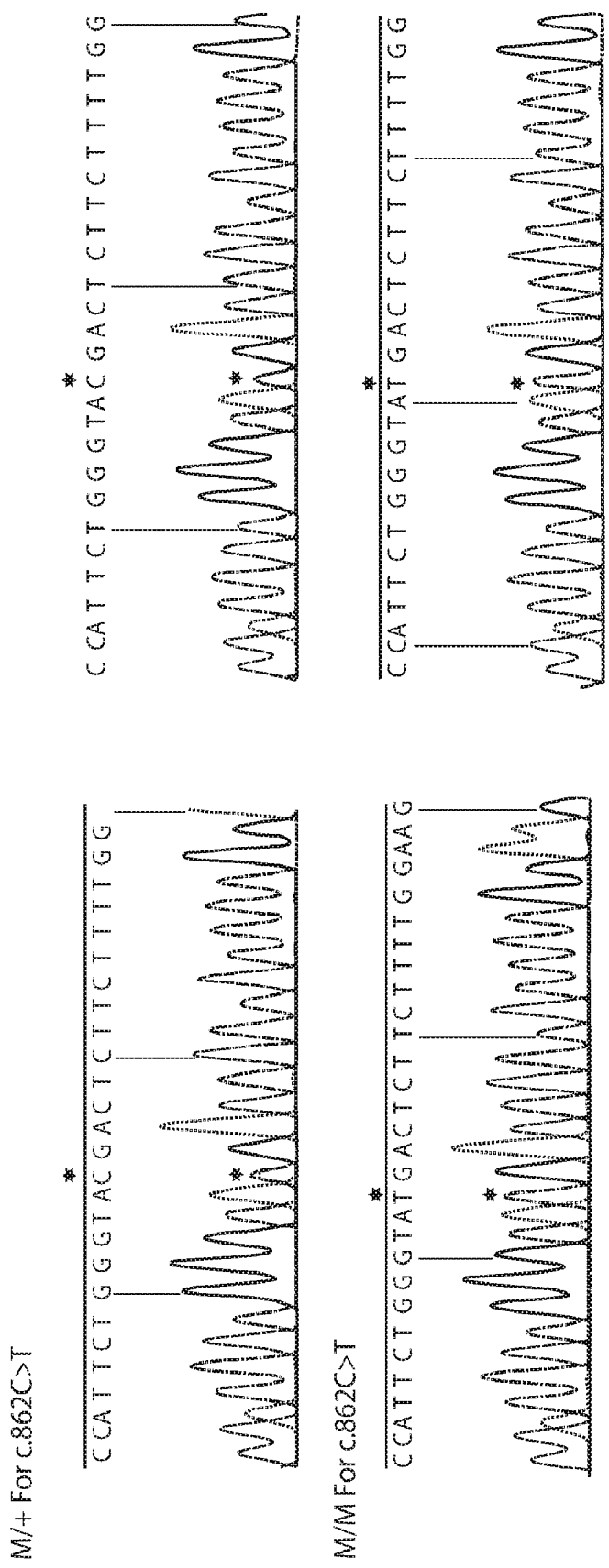
FIGS. 2A-2B show constructs expressing hST3GAL5 protein in patient-derived fibroblast cells.
Figure 2B:
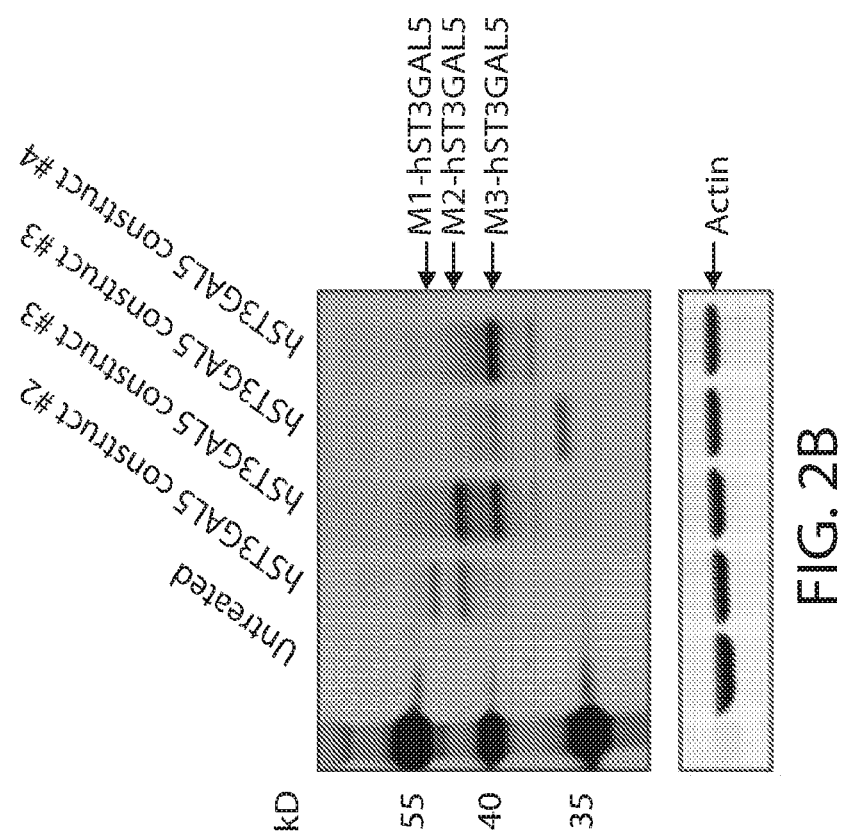
Figure 4A:
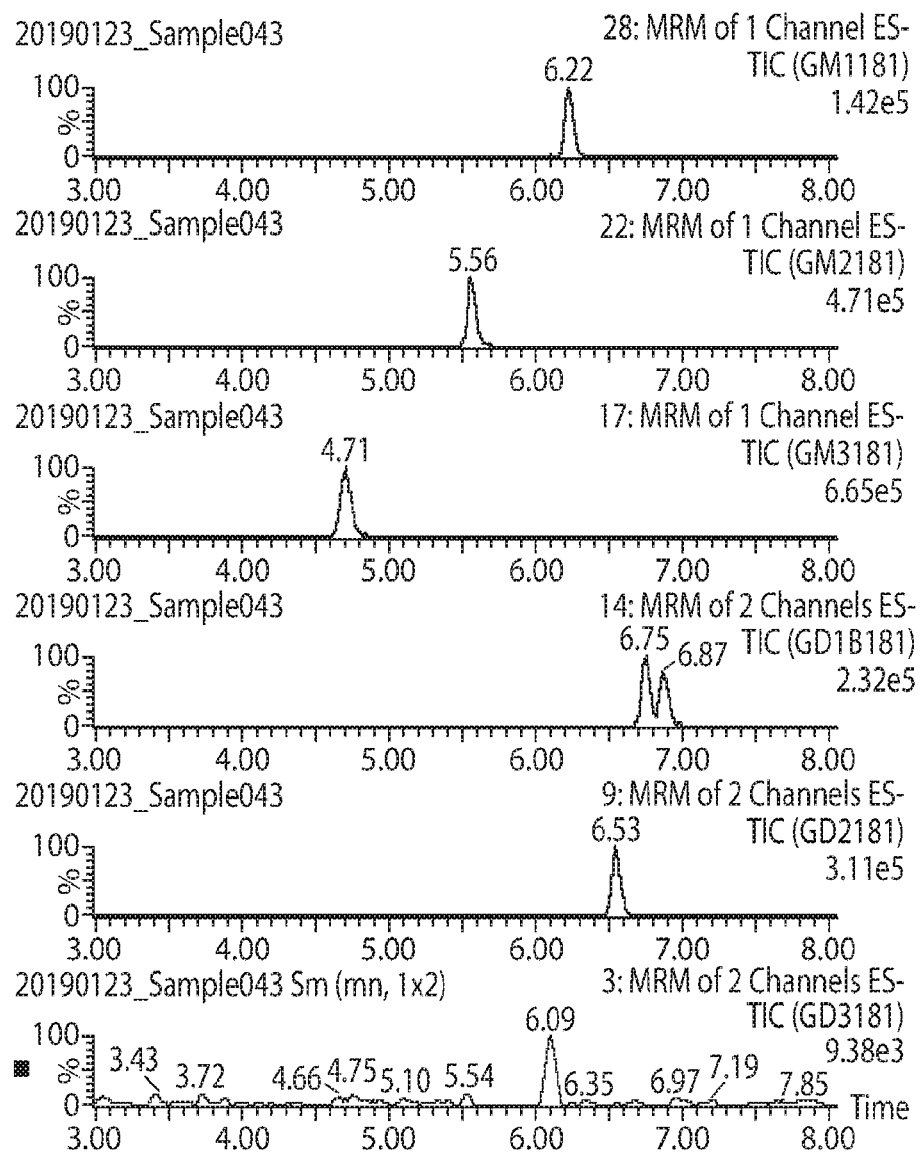
FIGS. 4A-4B show Liquid chromatography-Tandem mass spectrometry (LC-MS/MS) analysis of ganglioside standards using Hydrophilic interaction liquid chromatography (HILIC) column chemistry.
Figure 4B:
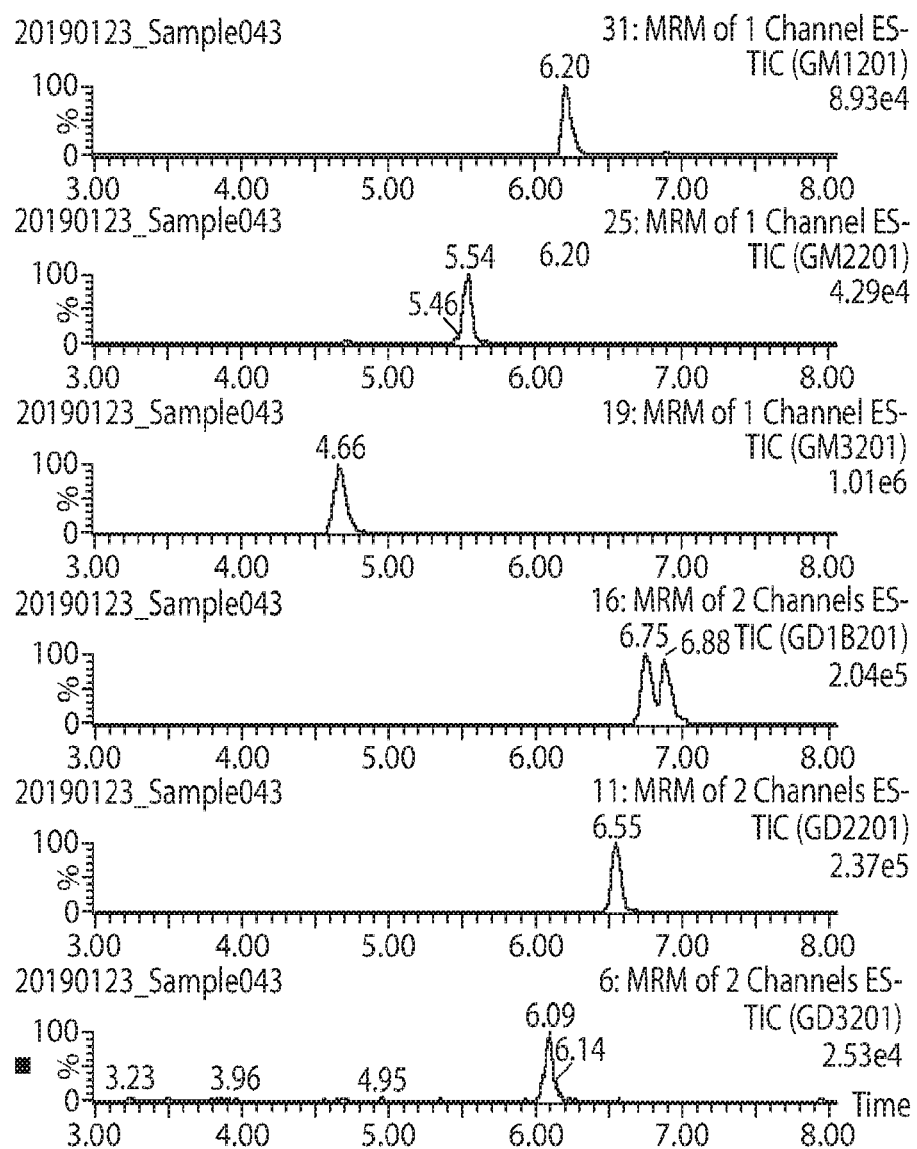
Figure 7A:
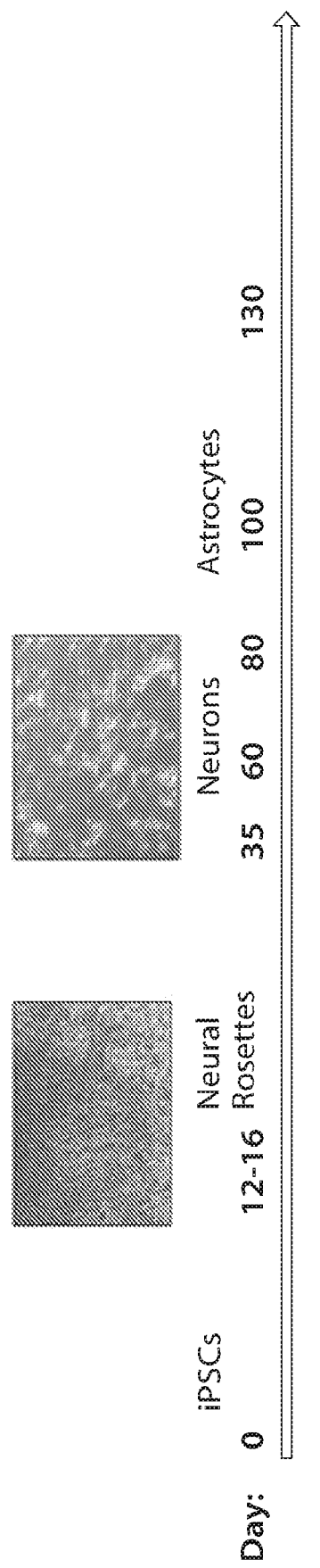
FIGS. 7A-7B show patient iPSC-induced cortical neurons.
Figure 7B:
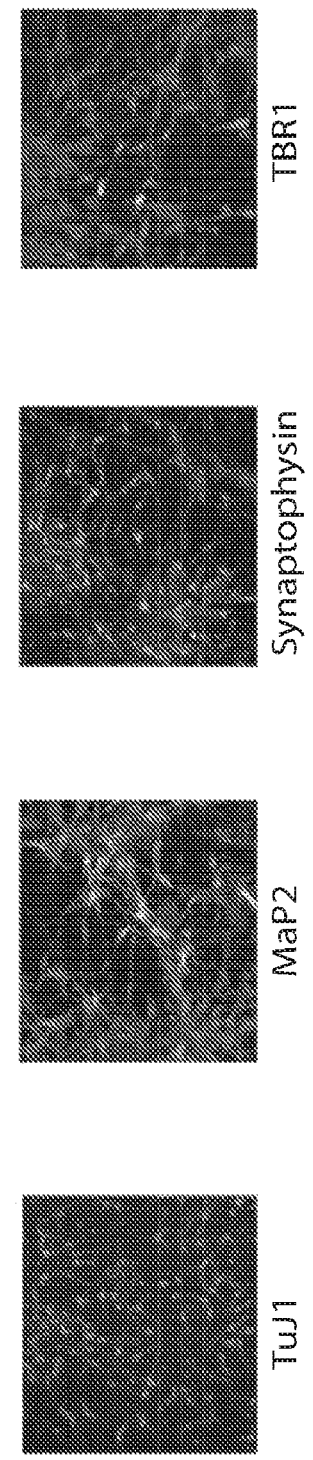
Figure 8:
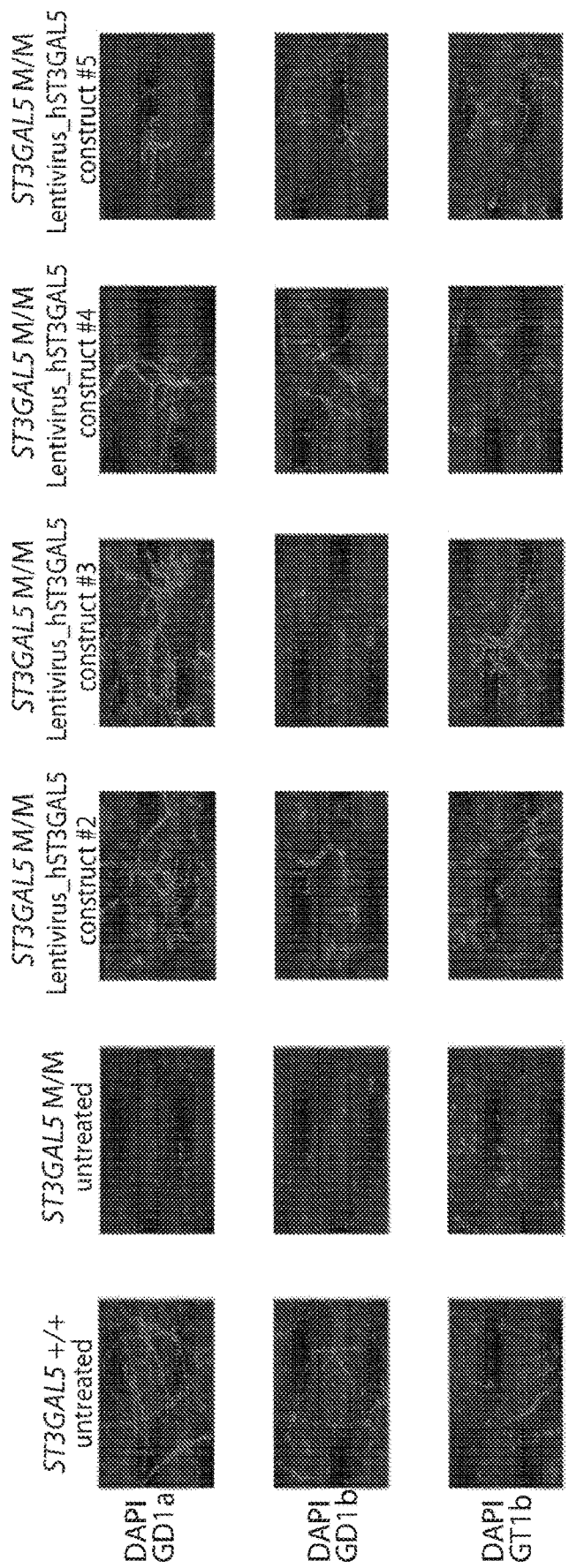
FIG. 8 shows anti-brain gangliosides analysis in iPSC-induced cortical neurons. The figure includes DAPI stain for nucleus, and GD1a, GD1b, or GT1b staining from top row to bottom row. ST3GAL5+/+ is the healthy control line. ST3GAL5 M/M is generated from patient iPSC. ST3GAL5 M/M either remains untreated, or treated with lentivirus.

Transfection with ST3GAL5 constructs restored GM3S production in patient-derived fibroblasts (FIG. 2). Anti-GM3 antibody assays were performed to assess GM3 expression in patient-derived fibroblasts (FIG. 5). In addition, human ST3GAL5 cDNAs encoding each isoform of the ST3GAL5 protein were delivered into iPSC-derived cortical neurons from patients with ST3GAL5 deficiency by lentiviral-mediated gene delivery (FIGS. 7A-7B). hST3GAL5 gene replacement in iPSC-derived cortical neurons reconstituted GM3 as well as its major downstream a- and b-series brain gangliosides (e.g., GD1a, GD1b, and GT1b) (FIG. 8). These in vitro data demonstrates the strong therapeutic potential of human ST3GAL5 cDNA gene replacement therapy. Liquid chromatography-tandem mass spectrometry (LC-MS/MS) technique is used to analyze the downstream gangliosides biosynthesis. Example LC-MS/MS data is shown in FIGS. 4A-4B.

Figure 3A:
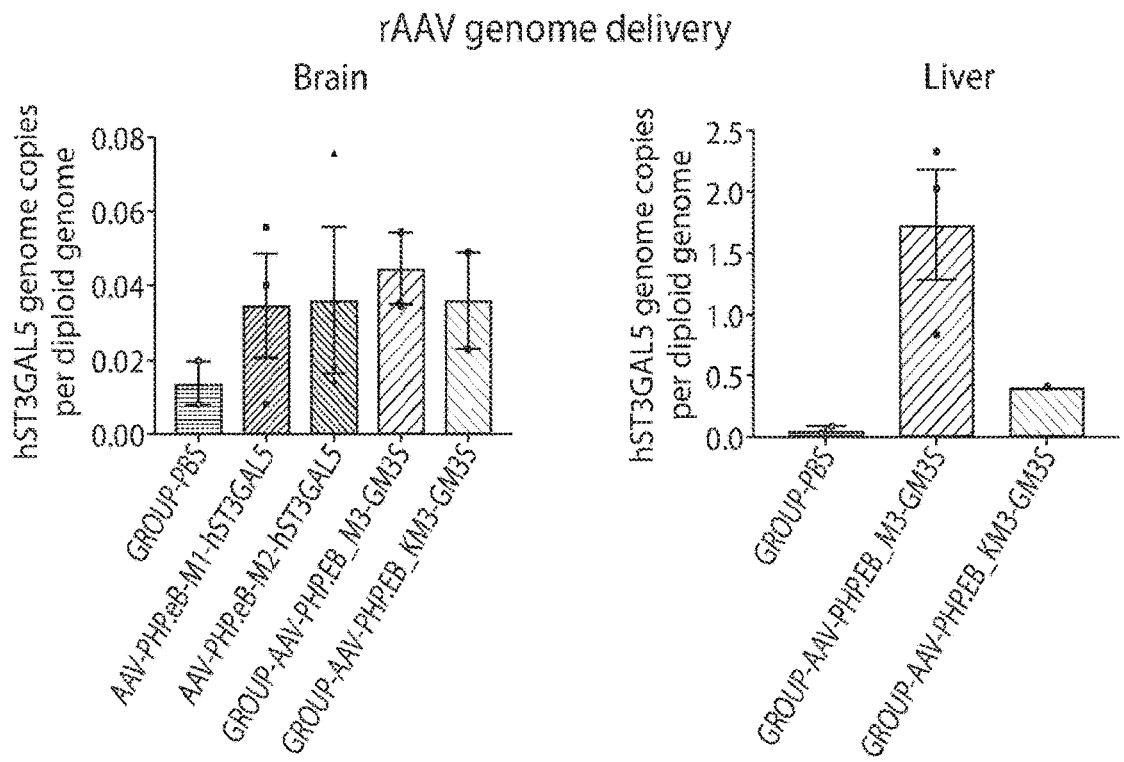
FIGS. 3A-3B show quantification of in vivo rAAV genome delivery and transgene expression of wild-type mice by droplet digital PCR (ddPCR).
Figure 3B:
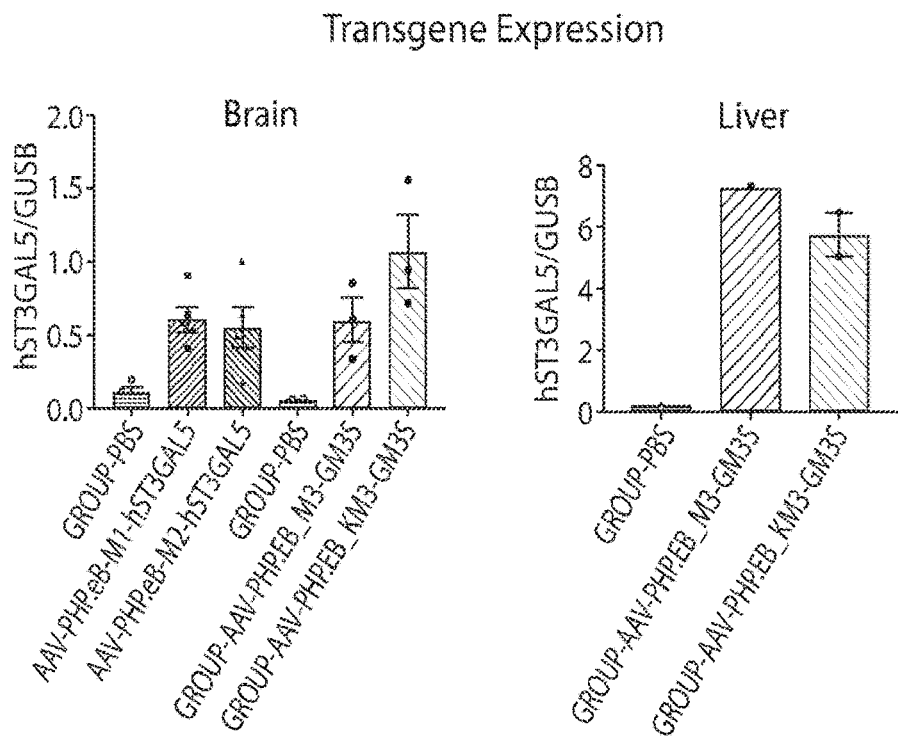

The hST3GAL5 constructs were packaged into AAV9 or AAV-PHP.eB capsids that efficiently target murine neurons and astrocytes. To examine the safety and efficacy of transgene expression, AAV vectors were injected via facial vein into neonatal wild type mice. There was no observed dose-related toxicity. AAV vector delivery and GM3S protein over-expression in the brain were quantified by Droplet Digital PCR (ddPCR) and western blot, respectively (FIGS. 3A-3B), and no short-term vector-associated toxicity (FIG. 13) was observed.

Figure 6:
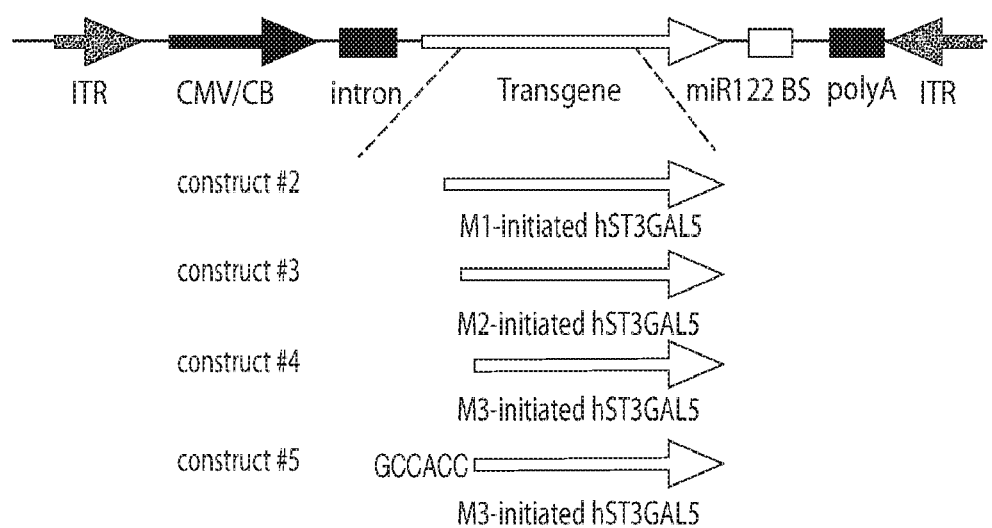
FIG. 6 shows a schematic of constructs expressing hST3GAL5 and miR-122 binding sites. Four AAV constructs expressing the human ST3GAL5 cDNA, driven by the CMV/CB promoter are shown. Three miR-122 binding sites are added at the end of the transgene.
Figure 10:
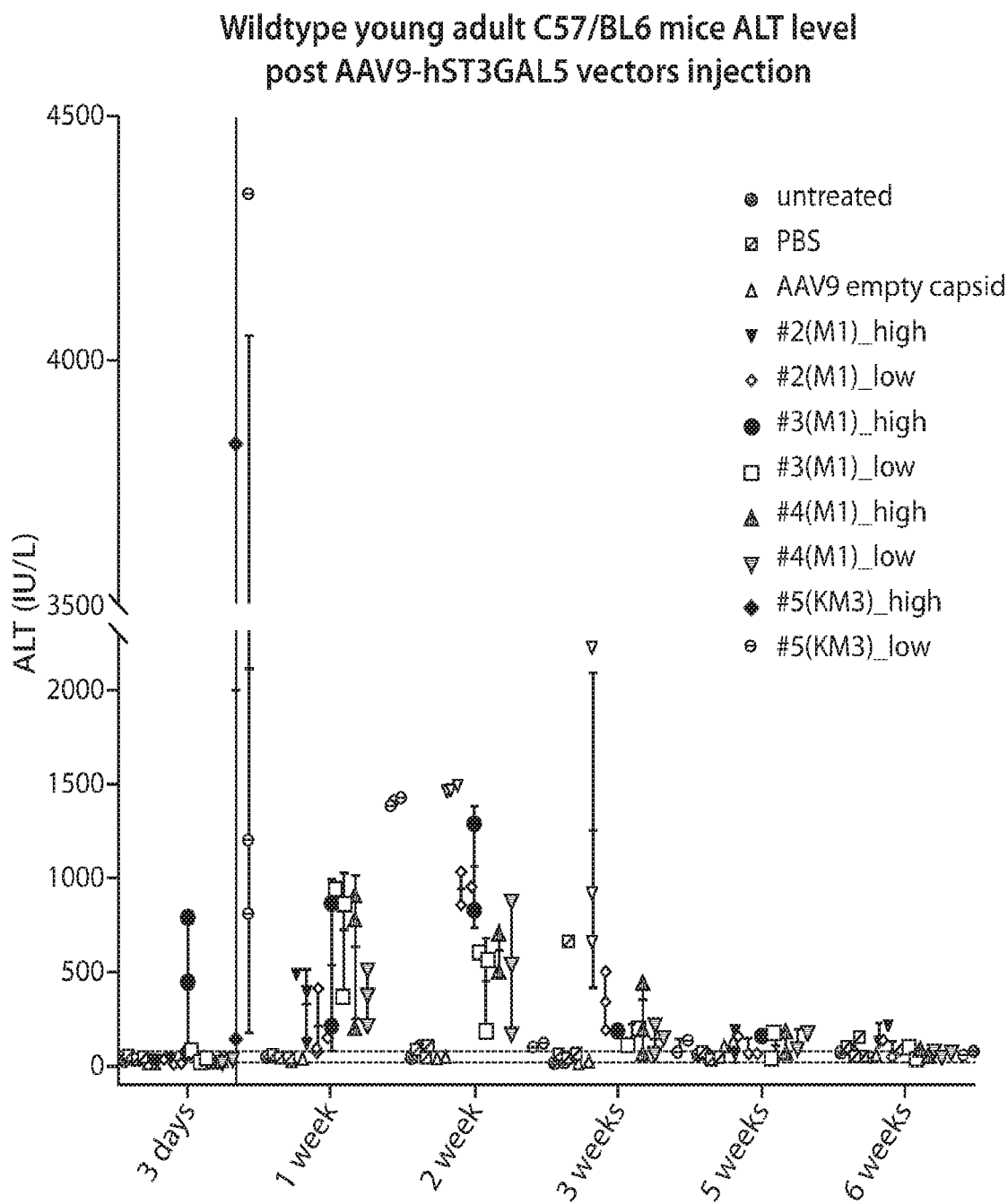
FIG. 10 shows the ALT level of wildtype young adult C57/BL6 mice post AAV9_hST3GAL5 vector I.V. injection. Blood are taken from animals weekly. Each dot represents the tissue from one animal (n=3~5).

However, AAV9-hST3GAL5 vector at dosage $2 \times 10^{14}$ vg/kg for neonates, and at $1 \times 10^{14}$ vg/kg for young adults compromised survival (FIGS. 9A-9B), while a dosage at $2.7 \times 10^{13}$ vg/kg were tolerable in wild type mice (FIG. 9B). In addition, after recording elevations of hepatic alanine aminotransferase following AAV9-hST3GAL5 injection (FIG. 10), four hST3GAL5-microRNA-122 (miR-122) binding sites constructs were also produced (FIG. 6) to attempted to de-target hST3GAL5 transgene expression from liver through endogenous miR-122 (FIG. 6). Studies were designed to elucidate pathomechanism and to optimize the vector design to mitigate vector associated toxicity (FIG. 11).

Figure 12A:
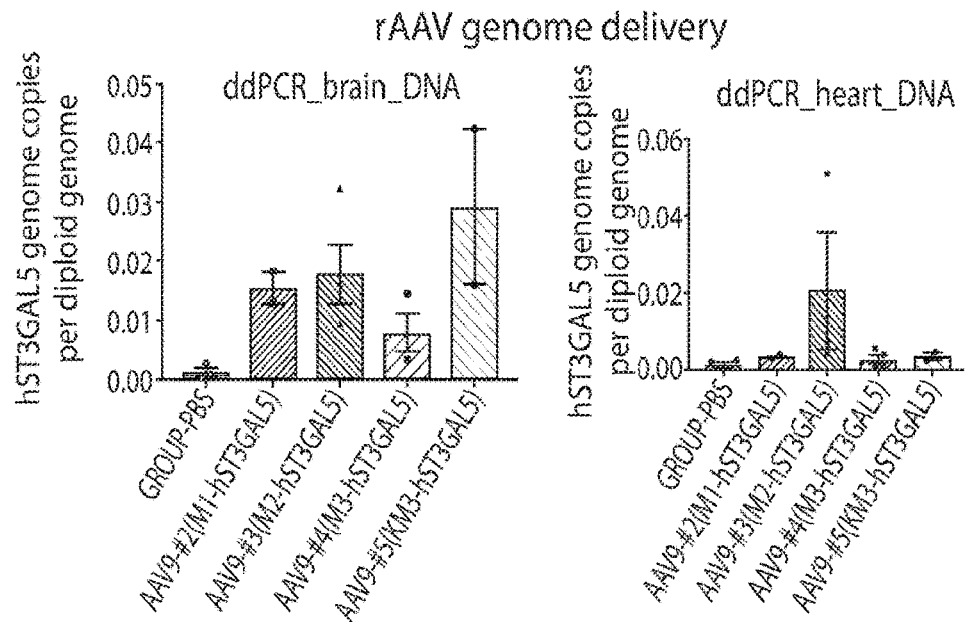
FIGS. 12A-12C show quantification of in vivo rAAV genome delivery and transgene expression of wild-type mice by droplet digital PCR (ddPCR) and Western blot.
Figure 12B:
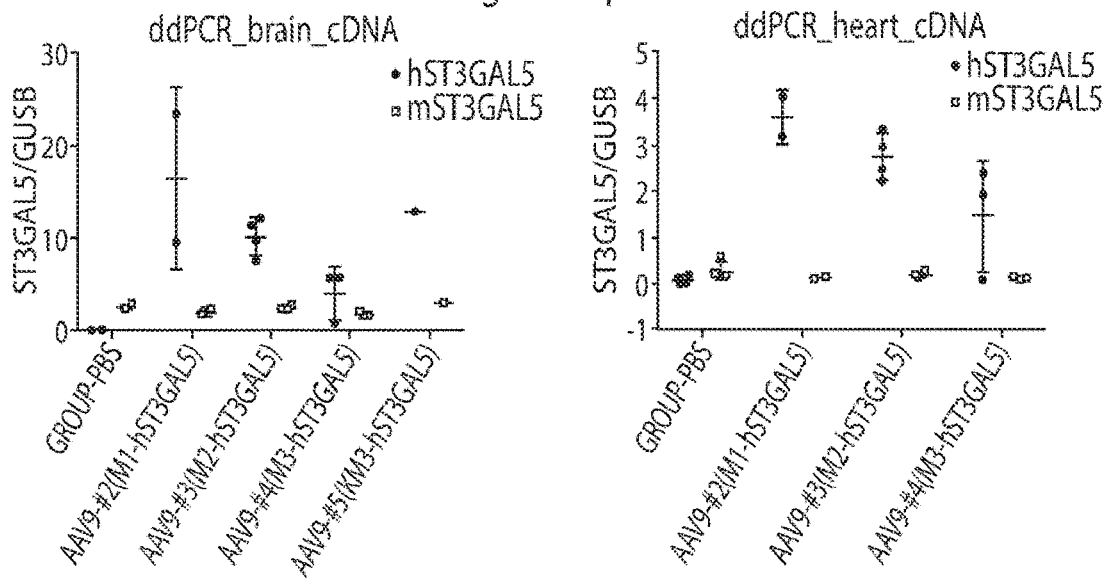
Figure 12C:
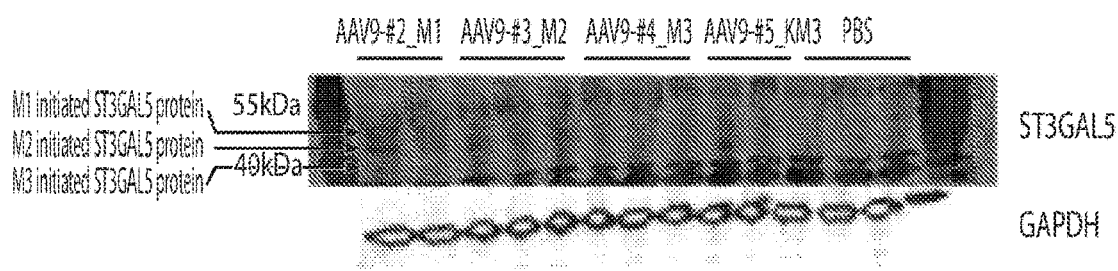

In parallel, neonatal wild type mice were injected with AAV9-ST3GAL5 protein isoforms via direct CNS injection. Enhanced rAAV genome biodistribution and hST3GAL5 over-expression was measured in the brain tissue by Droplet Digital PCR (ddPCR) and Western blot, respectively (FIGS. 12A-12B). No short-term vector-associated toxicity (FIGS. 12A-12B) was observed.

SEQUENCE LISTING

SEQUENCE LISTING

The contents of the text file submitted electronically herewith are incorporated herein by reference in their entirety: A computer readable format copy of the Sequence Listing (filename: U0120.70113WO00-SEQ.txt, date recorded: Apr. 8, 2019, file size ~254,509 bytes).
The skilled artisan recognizes that certain sequences in the Sequence Listing are

SEQUENCE LISTING represented as linear nucleic acid sequences corresponding to circular plasmid sequences. Accordingly, in some embodiments, sequences described herein represent a contiguous polynucleoide (e.g., sequences sharing a continuous phosphate backbone), such that the first base and the last base of the linear representation are positioned next to one another. The Sequence listing contains the sequences as shown below:

>construct #1_pAAVCBA opt_FL_h ST3GAL5-1a-2 (SEQ ID NO: 1)

>construct #3_pAAVCBA Opt_M2_hST3GAL51a-2 (SEQ ID NO: 3)

>construct #4_pAAVCBA Opt_M3_hST3GAL5-1a-2 (SEQ ID NO: 4)

>construct #5_pAAVCBA Opt_KM3_hST3GAL5-1a-2 (SEQ ID NO: 5)

>construct #6_pAAVCBA FL_hST3GAL5-1a-2 (SEQ ID NO: 6)

> construct #7 pAAVCBA_FL_opt_M3_hST3GAL5-1a-2 (SEQ ID NO: 7)

>Human GM3S Ia Type 2 isoform M1 variant amino acid sequence (SEQ ID NO: 8)

>Human GM3S Ia Type 2 isoform M2 variant amino acid sequence (SEQ ID NO: 9)

>Human GM3S Ia Type 2 isoform M3 variant amino acid sequence (SEQ ID NO: 10)

>construct #2_miR122 BS pAAV CBA opt_M1_hST3GAL5-1a-2_mir122 binding (SEQ ID NO: 11)

>construct #3_miR122 BS pAAV CBA opt_M2_hST3GAL5-1a-2_mir122 binding (SEQ ID NO: 12)

>construct #4_miR122 BS pAAV CBA opt_M3_hST3GAL5-1a-2_mir122 binding (SEQ ID NO: 13)

>construct #5_miR122 BS pAAV CBA opt_KM3_hST3GAL5-1a-2_mir122 binding (SEQ ID NO: 14)

>pAAV_hSyn1_EGFP_miR122BS (SEQ ID NO: 15)

>pAAV_hSyn1_intron_EGFP_miR122BS (SEQ ID NO: 16)

>pAAV_hSyn1_intron_opt_KM3_hST3GAL5-1a-2_miR122BS (SEQ ID NO: 17)

>pAAV_hSyn1_intron_opt_M1_hST3GAL5-1a-2_miR122BS (SEQ ID NO: 18)

>pAAV_hSyn1_intron_opt_M2_hST3GAL5-1a-2_miR122BS (SEQ ID NO: 19)

>pAAV_hSyn1_intron_opt_M3_hST3GAL5-1a-2_miR122BS (SEQ ID NO: 20)

>pAAV_hSyn1_opt_KM3_hST3GAL5-1a-2 (SEQ ID NO: 21)

>pAAV_hSyn1_opt_KM3_hST3GAL5-1a-2_miR122BS (SEQ ID NO: 22)

>pAAV_hSyn1_opt_M1_hST3GAL5-1a-2 (SEQ ID NO: 23)

>pAAV_hSyn1_opt_M1_hST3GAL5-1a-2_miR122BS (SEQ ID NO: 24)

>pAAV_hSyn1_opt_M2_hST3GAL5-1a-2 (SEQ ID NO: 25)

>pAAV_hSyn1_opt_M2_hST3GAL5-1a-2_miR122BS (SEQ ID NO: 26)

>pAAV_hSyn1_opt_M3_hST3GAL5-1a-2 (SEQ ID NO: 27)

>pAAV_hSyn1_opt_M3_hST3GAL5-1a-2_miR122BS (SEQ ID NO: 28)

>pAAV_phST3GAL5_177_EGFP (SEQ ID NO: 29)

>pAAV_phST3GAL5_177_KM3_hST3GAL5-1a-2 (SEQ ID NO: 30)

>pAAV_phST3GAL5_177_M1_hST3GAL5-1a-2 (SEQ ID NO: 31)

>pAAV_phST3GAL5_177_M2_hST3GAL5-1a-2 (SEQ ID NO: 32)

>pAAV_phST3GAL5_177_M3_hST3GAL5-1a-2 (SEQ ID NO: 33)

>pAAV_phST3GAL5_1600_EGFP (SEQ ID NO: 34)

>pAAV_phST3GAL5_1600_KM3_hST3GAL5-1a-2 (SEQ ID NO: 35)

SEQUENCE LISTING

>pAAV_phST3GAL5_1600_M1_hST3GAL5-1a-2 (SEQ ID NO: 36)

>pAAV_phST3GAL5_1600_M2_hST3GAL5-1a-2 (SEQ ID NO: 37)

>pAAV_phST3GAL5_1600_M3_hST3GAL5-1a-2 (SEQ ID NO: 38)

> Wild-type Human GM3S Ia Type 2 isoform M1 variant coding sequence_codon un-optimized (SEQ ID NO: 39)

> Human GM3S Ia Type 2 isoform M1 variant coding sequence_codon optimized (SEQ ID NO: 40)

> Human GM3S Ia Type 2 isoform M2 variant coding sequence_codon optimized (SEQ ID NO: 41)

> Human GM3S Ia Type 2 isoform M3 variant coding sequence_codon optimized (SEQ ID NO: 42)

> Human GM3S Ia Type 2 isoform KM3 variant coding sequence_codon optimized (SEQ ID NO: 43)

What is claimed is:

1. An isolated nucleic acid comprising:
   (i) a first region comprising a first adeno-associated virus (AAV) inverted terminal repeat (ITR); and
   (ii) a second region comprising a transgene comprising a nucleic acid sequence that consists of the nucleotide sequence set forth in SEQ ID NO: 43 and encodes a monosialodihexosylganglioside synthase (GM3S) Ia Type 2 protein isoform.

2. The isolated nucleic acid of claim 1, wherein the transgene further comprises a promoter operably linked to the nucleic acid sequence encoding the GM3 synthase Ia Type 2 protein isoform.

3. The isolated nucleic acid of claim 2, wherein the promoter is a chicken beta-actin (CBA) promoter comprising a CMV enhancer sequence.

4. The isolated nucleic acid of claim 1, further comprising a third region comprising a second adeno-associated virus (AAV) inverted terminal repeat (ITR), or a variant thereof, wherein the first region and the third region flank the transgene.

5. The isolated nucleic acid of claim 4, wherein the first region and/or the third region is an AAV2 ITR or a variant thereof.

6. The isolated nucleic acid of claim 1, further comprising a fourth region comprising one or more miRNA binding sites.

7. The isolated nucleic acid of claim 6, wherein the one or more miRNA binding sites are miR-122 binding sites.

8. A vector comprising the isolated nucleic acid of claim 1.

9. A host cell comprising the isolated nucleic acid of claim 1.

* * * * *

SEQUENCE LISTING

<160> NUMBER OF SEQ ID NOS: 43

<210> SEQ ID NO 1
<211> LENGTH: 3732
<212> TYPE: DNA
<213> ORGANISM: Artificial Sequence
<220> FEATURE:
<223> OTHER INFORMATION: Synthetic Polynucleotide

<400> SEQUENCE: 1

```
ctgcgcgctc gctcgctcac tgaggccgcc cgggcaaagc ccgggcgtcg ggcgaccttt      60
ggtcgcccgg cctcagtgag cgagcgagcg cgcagagagg gagtggccaa ctccatcact     120
aggggttcct tgtagttaat gattaacccg ccatgctact tatctaccag ggtaatgggg     180
atcctctaga actatagcta gtcgacattg attattgact agttattaat agtaatcaat     240
tacggggtca ttagttcata gcccatatat ggagttccgc gttacataac ttacggtaaa     300
tggcccgcct ggctgaccgc ccaacgaccc ccgcccattg acgtcaataa tgacgtatgt     360
tcccatagta acgccaatag ggactttcca ttgacgtcaa tgggtggagt atttacggta     420
aactgcccac ttggcagtac atcaagtgta tcatatgcca agtacgcccc ctattgacgt     480
caatgacggt aaatggcccg cctggcatta tgcccagtac atgaccttat gggactttcc     540
tacttggcag tacatctacg tattagtcat cgctattacc atggtcgagg tgagccccac     600
gttctgcttc actctcccca tctcccccccc ctccccaccc ccaattttgt atttatttat     660
tttttaatta ttttgtgcag cgatggggc ggggggggg ggggggcgcg cgccaggcgg      720
ggcggggcg ggcgaggggc ggggcggggc gaggcggaga ggtgcggcgg cagccaatca     780
gagcggcgcg ctccgaaagt ttccttttat ggcgaggcgg cggcggcggc ggccctataa     840
aaagcgaagc gcgcggcggg cggggagtcg ctgcgacgct gccttcgccc cgtgccccgc     900
tccgccgccg cctcgcgccg cccgccccgg ctctgactga ccgcgttact cccacaggtg     960
agcgggcggg acggcccttc tcctccgggc tgtaattagc gcttggttta atgacgcgct    1020
gtttcttttc tgtggctgcg tgaaagcctt gaggggctcc gggagggccc tttgtgcggg    1080
gggagcggct cggggggtgc gtgcgtgtgt gtgtgcgtgg ggagcgccgc gtgcggctcc    1140
gcgctgcccg gcggctgtga gcgctgcggg cgcggcgcgg ggctttgtgc gctccgcagt    1200
```

```
gtgcgcgagg ggagcgcggc cgggggcggt gccccgcggt gcgggggggg ctgcgagggg    1260
aacaaaggct gcgtgcgggg tgtgtgcgtg ggggggtgag caggggtgt gggcgcgtcg     1320 gtcgggctgc aaccccccct gcaccccct ccccgagttg ctgagcacgg cccggcttcg     1380 ggtgcgggc tccgtacggg gcgtggcgcg gggctcgccg tgccgggcgg ggggtggcgg     1440 caggtgggg tgccgggcgg ggcggggccg cctcgggccg gggagggctc gggggagggg     1500
cgcggcggcc cccggagcgc cggcggctgt cgaggcgcgg cgagccgcag ccattgcctt    1560
ttatggtaat cgtgcgagag ggcgcaggga cttcctttgt cccaaatctg tgcggagccg    1620
aaatctggga ggcgccgccg cacccctct agcgggcgcg gggcgaagcg gtgcggcgcc     1680
ggcaggaagg aaatgggcgg ggagggcctt cgtgcgtcgc cgcgccgccg tcccttctc     1740 cctctccagc ctcggggctg tccgcggggg gacggctgcc ttcgggggg acggggcagg     1800 gcggggttcg gcttctggcg tgtgaccggc ggctctagag cctctgctaa ccatgttcat    1860
gccttcttct ttttcctaca gctcctgggc aacgtgctgg ttattgtgct gtctcatcat    1920
tttggcaaag aattccacgc gcccctcctc cgcatctgag cggggagcg gcggccccca    1980 gctgaatggg cgcgagagcg gcgctggggg cgggtgggg gcgggggtac cgggctggcg     2040
gccggccggc gcccctcat tagtatgaga actaaagcag caggttgtgc agagagaaga    2100
ccactccagc ctagaactga agcagcagca gcaccagcag gtagagcaat gccatccgag    2160
tacacctacg tgaagctgcg gtctgactgc agccgcccat ccctgcagtg gtacacaaga    2220
gcccagagca agatgaggag accctccctg ctgctgaagg atatcctgaa gtgcaccctg    2280
ctggtgtttg gcgtgtggat cctgtacatc ctgaagctga actacaccac agaggagtgt    2340
gacatgaaga agatgcacta cgtggaccct gatcacgtga agagggccca gaagtacgct    2400
cagcaggtgc tgcagaagga gtgtagacca aagtttgcca agacaagcat ggctctgctg    2460
ttcgagcacc ggtactccgt ggatctgctg cctttttgtgc agaaggcccc aaaggactct    2520
gaggctgaga gcaagtacga tccccctttc ggctttcgca agttcagctc caaggtgcag    2580
accctgctgg agctgctgcc agagcacgac ctgcccgagc acctgaaggc taagacatgc    2640
aggaggtgcg tggtcatcgg atccggagga atcctgcacg gactggagct gggacacacc    2700
ctgaaccagt tcgacgtggt catcaggctg aactccgccc cagtggaggg ctactctgag    2760
cacgtgggaa acaagaccac aatcagaatg acatacccg agggagctcc tctgtctgac    2820
ctggagtact acagcaacga tctgttcgtg gccgtgctgt ttaagtctgt ggacttcaac    2880
tggctgcagg ctatggtgaa gaaggagacc ctgcccttt gggtgcggct gttcttttgg    2940
aagcaggtgg ccgagaagat cccactgcag cccaagcact tccgcatcct gaaccctgtg    3000
atcatcaagg agacagcttt tgacatcctg cagtactccg agcccagtc taggttctgg    3060 ggcagagata agaacgtgcc taccatcgga gtgatcgccg tggtgctggc tacacacctg    3120
tgcgacgagg tgtctctggc cggctttgga tacgatctga accagcctag gaccccactg    3180
cactactttg acagccagtg tatggccgct atgaacttcc agaccatgca caacgtgacc    3240
acagagacaa agttcctgct gaagctggtg aaagaggggg tggtgaaaga cctgagcggg    3300
ggtattgacc gagagttttg aacgcgtggt acctctagag tcgacccggg cggctcgag     3360 gacggggtga actacgcctg aggatccgat ctttttccct ctgccaaaaa ttatggggac    3420
atcatgaagc cccttgagca tctgacttct ggctaataaa ggaaatttat ttcattgca    3480 atagtgtgtt ggaattttt tgtgtctctca ctcggaagca attcgttgat ctgaatttcg    3540
```

-continued

| | |
|---|---|
| accacccata ataccatta ccctggtaga taagtagcat ggcgggttaa tcattaacta | 3600 |
| caaggaaccc ctagtgatgg agttggccac tccctctctg cgcgctcgct cgctcactga | 3660 |
| ggccgggcga ccaaaggtcg cccgacgccc gggctttgcc cgggcggcct cagtgagcga | 3720 |
| gcgagcgcgc ag | 3732 |

```
<210> SEQ ID NO 2
<211> LENGTH: 3603
<212> TYPE: DNA
<213> ORGANISM: Artificial Sequence
<220> FEATURE:
<223> OTHER INFORMATION: Synthetic Polynucleotide

<400> SEQUENCE: 2
```

| | |
|---|---|
| ctgcgcgctc gctcgctcac tgaggccgcc cgggcaaagc ccgggcgtcg ggcgaccttt | 60 |
| ggtcgcccgg cctcagtgag cgagcgagcg cgcagagagg gagtggccaa ctccatcact | 120 |
| aggggttcct tgtagttaat gattaacccg ccatgctact tatctaccag ggtaatgggg | 180 |
| atcctctaga actatagcta gtcgacattg attattgact agttattaat agtaatcaat | 240 |
| tacggggtca ttagttcata gcccatatat ggagttccgc gttacataac ttacggtaaa | 300 |
| tggcccgcct ggctgaccgc ccaacgaccc cgcccattg acgtcaataa tgacgtatgt | 360 |
| tcccatagta acgccaatag ggactttcca ttgacgtcaa tgggtggagt atttacggta | 420 |
| aactgcccac ttggcagtac atcaagtgta tcatatgcca gtacgccccc ctattgacgt | 480 |
| caatgacggt aaatggcccg cctggcatta tgcccagtac atgaccttat gggactttcc | 540 |
| tacttggcag tacatctacg tattagtcat cgctattacc atggtcgagg tgagccccac | 600 |
| gttctgcttc actctcccca tctccccccc ctccccaccc ccaattttgt atttatttat | 660 |
| tttttaatta ttttgtgcag cgatggggggc ggggggggg gggggcgcg cgccaggcgg | 720 |
| ggcggggcgg ggcgaggggc ggggcgggc gaggcggaga ggtgcggcgg cagccaatca | 780 |
| gagcggcgcg ctccgaaagt ttccttttat ggcgaggcgg cggcggcggc ggccctataa | 840 |
| aaagcgaagc gcgcggcggg cggggagtcg ctgcgacgct gccttcgccc cgtgccccgc | 900 |
| tccgccgccg cctcgcgccg cccgcccggg ctctgactga ccgcgttact cccacaggtg | 960 |
| agcgggcggg acggcccttc tcctccgggc tgtaattagc gcttggttta atgacggctt | 1020 |
| gtttcttttc tgtggctgcg tgaaagcctt gaggggctcc ggagggccc tttgtgcggg | 1080 |
| gggagcggct cgggggtgc gtgcgtgtgt gtgtgcgtgg ggagcgccgc gtgcggctcc | 1140 |
| gcgctgcccg gcgctgtga gcgctgcggg gcgcggcgcgg gctttgtgc gctccgcagt | 1200 |
| gtgcgcgagg ggagcgcggc cgggggcggt gccccgcggt gcgggggggg ctgcgagggg | 1260 |
| aacaaaggct gcgtgcgggg tgtgtgcgtg ggggggtgag caggggtgt gggcgcgtcg | 1320 |
| gtcgggctgc aaccccccct gcaccccct ccccgagttg ctgagcacgg cccggcttcg | 1380 |
| ggtgcgggc tccgtacggg gcgtggcgcg ggctcgccg tgccgggcgg ggggtggcgg | 1440 |
| caggtggggg tgccgggcgg ggcggggccg cctcgggccg ggagggctc ggggaggggg | 1500 |
| cgcggcggcc cccggagcgc cggcggctgt cgaggcgcgg cgagccgcag ccattgcctt | 1560 |
| ttatggtaat cgtgcgagag ggcgcaggga cttcctttgt cccaaatctg tgcggagccg | 1620 |
| aaatctggga ggcgccgccg caccccctct agcgggcgcg gggcgaagcg gtgcggcgcc | 1680 |
| ggcaggaagg aaatgggcgg ggagggcctt cgtgcgtcgc cgcgccgccg tccccttctc | 1740 |
| cctctccagc ctcgggggctg tccgcggggg gacggctgcc ttcgggggggg acggggcagg | 1800 |
| gcggggttcg gcttctggcg tgtgaccggc ggctctagag cctctgctaa ccatgttcat | 1860 |

-continued

```
gccttcttct ttttcctaca gctcctgggc aacgtgctgg ttattgtgct gtctcatcat      1920
tttggcaaag aattcatgag aactaaagca gcaggttgtg cagagagaag accactccag      1980
cctagaactg aagcagcagc agcaccagca ggtagagcaa tgccatccga gtacacctac      2040
gtgaagctgc ggtctgactg cagccgccca tccctgcagt ggtacacaag agcccagagc      2100
aagatgagga gaccctccct gctgctgaag gatatcctga agtgcaccct gctggtgttt      2160
ggcgtgtgga tcctgtacat cctgaagctg aactacacca cagaggagtg tgacatgaag      2220
aagatgcact acgtggaccc tgatcacgtg aagagggccc agaagtacgc tcagcaggtg      2280
ctgcagaagg agtgtagacc aaagtttgcc aagacaagca tggctctgct gttcgagcac      2340
cggtactccg tggatctgct gccttttgtg cagaaggccc aaaggactc tgaggctgag       2400 agcaagtacg atccccttt cggctttcgc aagttcagct ccaaggtgca gaccctgctg       2460
gagctgctgc cagagcacga cctgcccgag cacctgaagg ctaagacatg caggaggtgc      2520
gtggtcatcg atccggagg aatcctgcac ggactggagc tgggacacac cctgaaccag      2580
ttcgacgtgg tcatcaggct gaactccgcc ccagtggagg gctactctga gcacgtggga    2640
aacaagacca caatcagaat gacatacccc gagggagctc ctctgtctga cctggagtac      2700
tacagcaacg atctgttcgt ggccgtgctg tttaagtctg tggacttcaa ctggctgcag      2760
gctatggtga agaaggagac cctgcccttt gggtgcggc tgttcttttg gaagcaggtg       2820
gccgagaaga tcccactgca gcccaagcac ttccgcatcc tgaaccctgt gatcatcaag      2880
gagacagctt ttgacatcct gcagtactcc gagccccagt ctaggttctg gggcagagat      2940
aagaacgtgc ctaccatcgg agtgatcgcc gtggtgctgg ctacacacct gtgcgacgag      3000
gtgtctctgg ccggctttgg atacgatctg aaccagccta ggaccccact gcactacttt      3060
gacagccagt gtatggccgc tatgaacttc cagaccatgc acaacgtgac cacagagaca      3120
aagttcctgc tgaagctggt gaaagagggg gtggtgaaag acctgagcgg gggtattgac      3180
cgagagtttt gaacgcgtgg tacctctaga gtcgacccgg gcggcctcga ggacggggtg      3240
aactacgcct gaggatccga tcttttttccc tctgccaaaa attatgggga catcatgaag      3300 cccttgagc atctgacttc tggctaataa aggaaattta ttttcattgc aatagtgtgt       3360
tggaattttt tgtgtctctc actcggaagc aattcgttga tctgaatttc gaccacccat      3420
aatacccatt accctggtag ataagtagca tggcgggtta atcattaact acaaggaacc      3480
cctagtgatg gagttggcca ctccctctct gcgcgctcgc tcgctcactg aggccgggcg      3540
accaaaggtc gcccgacgcc cgggctttgc ccgggcggcc tcagtgagcg agcgagcgcg      3600
cag                                                                  3603
```

<210> SEQ ID NO 3
<211> LENGTH: 3519
<212> TYPE: DNA
<213> ORGANISM: Artificial Sequence
<220> FEATURE:
<223> OTHER INFORMATION: Synthetic Polynucleotide

<400> SEQUENCE: 3

```
ctgcgcgctc gctcgctcac tgaggccgcc cgggcaaagc ccgggcgtcg gcgaccttt        60 ggtcgcccgg cctcagtgag cgagcgagcg cgcagagagg gagtggccaa ctccatcact     120
aggggttcct tgtagttaat gattaaccccg ccatgctact tatctaccag ggtaatgggg    180
atcctctaga actatagcta gtcgacattg attattgact agttattaat agtaatcaat    240
```

```
tacggggtca ttagttcata gcccatatat ggagttccgc gttacataac ttacggtaaa    300
tggcccgcct ggctgaccgc ccaacgaccc ccgcccattg acgtcaataa tgacgtatgt    360
tcccatagta acgccaatag ggactttcca ttgacgtcaa tgggtggagt atttacggta    420
aactgcccac ttggcagtac atcaagtgta tcatatgcca agtacgcccc ctattgacgt    480
caatgacggt aaatggcccg cctggcatta tgcccagtac atgaccttat gggactttcc    540
tacttggcag tacatctacg tattagtcat cgctattacc atggtcgagg tgagccccac    600
gttctgcttc actctcccca tctcccccccc ctccccaccc ccaattttgt atttatttat    660
ttttaatta ttttgtgcag cgatgggggc ggggggggg ggggggcgcg cgccaggcgg    720
ggcggggcgg ggcgaggggc ggggcgggc gaggcggaga ggtgcggcgg cagccaatca    780
gagcggcgcg ctccgaaagt ttcctttat ggcgaggcgg cggcggcggc ggccctataa    840
aaagcgaagc gcgcggcggg cggggagtcg ctgcgacgct gccttcgccc cgtgccccgc    900
tccgccgccg cctcgcgccg cccgcccccgg ctctgactga ccgcgttact cccacaggtg    960
agcgggcggg acggcccttc tcctccgggc tgtaattagc gcttggttta atgacggctt   1020
gtttcttttc tgtggctgcg tgaaagcctt gaggggctcc gggagggccc tttgtgcggg   1080
gggagcggct cggggggtgc gtgcgtgtgt gtgtgcgtgg ggagcgccgc gtgcggctcc   1140
gcgctgcccg gcggctgtga gcggctgcggg cgcggcgcgg gctttgtgc gctccgcagt   1200
gtgcgcgagg ggagcgcggc cggggcggt gccccgcgt gcggggggg ctgcgagggg   1260
aacaaaggct gcgtgcgggg tgtgtgcgtg gggggtgag caggggtgt gggcgcgtcg   1320
gtcgggctgc aacccccct gcaccccct ccccgagttg ctgagcacgg cccggcttcg   1380
ggtgcgggc tccgtacggg gcgtggcgcg gggctcgccg tgccgggcgg ggggtggcgg   1440
caggtggggg tgccgggcgg ggcggggccg cctcgggccg ggggagggctc ggggagggg   1500
cgcggcggcc cccggagcgc cggcggctgt cgaggcgcgg cgagccgcag ccattgcctt   1560
ttatggtaat cgtgcgagag ggcgcaggga cttcctttgt cccaaatctg tgcggagccg   1620
aaatctggga ggcgccgccg cacccccctct agcgggcgcg gggcgaagcg gtgcggcgcc   1680
ggcaggaagg aaatgggcgg ggagggcctt cgtgcgtcgc cgcgccgccg tccccttctc   1740
cctctccagc ctcggggctg tccgcgggg gacggctgcc ttcgggggg acggggcagg   1800
gcggggttcg gcttctggcg tgtgaccggc ggctctagag cctctgctaa ccatgttcat   1860
gccttcttct ttttcctaca gctcctgggc aacgtgctgg ttattgtgct gtctcatcat   1920
tttggcaaag aattcatgcc atccgagtac acctacgtga agctgcggtc tgactgcagc   1980
cgcccatccc tgcagtggta cacaagagcc agagcaaga tgaggagacc ctccctgctg   2040
ctgaaggata tcctgaagtg caccctgctg gtgtttggcg tgtggatcct gtacatcctg   2100
aagctgaact acaccacaga ggagtgtgac atgaagaaga tgcactacgt ggaccctgat   2160
cacgtgaaga gggcccagaa gtacgctcag caggtgctgc agaaggagtg tagaccaaag   2220
tttgccaaga caagcatggc tctgctgttc gagcaccggt actccgtgga tctgctgcct   2280
tttgtgcaga aggccccaaa ggactctgag gctgagagca gtacgatcc ccctttcggc   2340
tttcgcaagt tcagctccaa ggtgcagacc ctgctggagc tgctgccaga gcacgacctg   2400
cccgagcacc tgaaggctaa gacatgcagg aggtgcgtgg tcatcggatc cggaggaatc   2460
ctgcacggac tggagctggg acacaccctg aaccagttcg acgtggtcat caggctgaac   2520
tccgcccag tggagggcta ctctgagcac gtgggaaaca agaccacaat cagaatgaca   2580
taccccgagg gagctcctct gtctgacctg gagtactaca gcaacgatct gttcgtggcc   2640
```

```
gtgctgttta agtctgtgga cttcaactgg ctgcaggcta tggtgaagaa ggagaccctg    2700
cccttttggg tgcggctgtt cttttggaag caggtggccg agaagatccc actgcagccc    2760
aagcacttcc gcatcctgaa ccctgtgatc atcaaggaga cagcttttga catcctgcag    2820
tactccgagc cccagtctag gttctggggc agagataaga acgtgcctac catcggagtg    2880
atcgccgtgg tgctggctac acacctgtgc gacgaggtgt ctctggccgg ctttggatac    2940
gatctgaacc agcctaggac cccactgcac tactttgaca gccagtgtat ggccgctatg    3000
aacttccaga ccatgcacaa cgtgaccaca gagacaaagt tcctgctgaa gctggtgaaa    3060
gagggggtgg tgaaagacct gagcgggggt attgaccgag agttttgaac gcgtggtacc    3120
tctagagtcg acccgggcgg cctcgaggac ggggtgaact acgcctgagg atccgatctt    3180
tttccctctg ccaaaaatta tggggacatc atgaagcccc ttgagcatct gacttctggc    3240
taataaagga aatttatttt cattgcaata gtgtgttgga attttttgtg tctctcactc    3300
ggaagcaatt cgttgatctg aatttcgacc acccataata cccattaccc tggtagataa    3360
gtagcatggc gggttaatca ttaactacaa ggaacccta gtgatggagt tggccactcc    3420
ctctctgcgc gctcgctcgc tcactgaggc cgggcgacca aggtcgcccc gacgcccggg    3480
ctttgcccgg gcggcctcag tgagcgagcg agcgcgcag                           3519
```

```
<210> SEQ ID NO 4
<211> LENGTH: 3419
<212> TYPE: DNA
<213> ORGANISM: Artificial Sequence
<220> FEATURE:
<223> OTHER INFORMATION: Synthetic Polynucleotide

<400> SEQUENCE: 4
```

```
ctgcgcgctc gctcgctcac tgaggccgcc cgggcaaagc ccgggcgtcg ggcgaccttt      60
ggtcgcccgg cctcagtgag cgagcgagcg cgcagagagg gagtggccaa ctccatcact     120
aggggttcct tgtagttaat gattaacccg ccatgctact tatctaccag ggtaatgggg     180
atcctctaga actatagcta gtcgacattg attattgact agttattaat agtaatcaat     240
tacggggtca ttagttcata gcccatatat ggagttccgc gttacataac ttacggtaaa     300
tggcccgcct ggctgaccgc ccaacgaccc ccgcccattg acgtcaataa tgacgtatgt     360
tcccatagta acgccaatag ggactttcca ttgacgtcaa tgggtggagt atttacggta     420
aactgcccac ttggcagtac atcaagtgta tcatatgcca agtacgcccc ctattgacgt     480
caatgacggt aaatggcccg cctggcatta tgcccagtac atgaccttat gggactttcc     540
tacttggcag tacatctacg tattagtcat cgctattacc atggtcgagg tgagccccac     600
gttctgcttc actctcccca tctcccccc ctccccaccc caatttgt atttatttat         660 tttttaatta ttttgtgcag cgatggggc gggggggg ggggggcgcg cgccaggcgg        720
ggcggggcgg ggcgaggggc ggggcgggc gaggcggaga ggtgcggcgg cagccaatca      780
gagcggcgcg ctccgaaagt tccttttat ggcgaggcgg cggcggcggc ggccctataa      840
aaagcgaagc gcgcggcggg cggggagtcg ctgcgacgct gccttcgccc cgtgccccgc     900
tccgccgccg cctcgcgccg cccgccccgg ctctgactga ccgcgttact cccacaggtg    960
agcgggcggg acggcccttc tcctccgggc tgtaattagc gcttggttta atgacggctt    1020
gtttcttttc tgtggctgcg tgaaagcctt gaggggctcc gggagggccc tttgtgcggg    1080
gggagcggct cgggggtgc gtgcgtgtgt gtgtgcgtgg ggagcgccgc gtgcggctcc    1140
```

```
gcgctgcccg gcggctgtga gcgctgcggg cgcggcgcgg ggctttgtgc gctccgcagt    1200
gtgcgcgagg ggagcgcggc cggggcggt gccccgcgt gcgggggggg ctgcgagggg    1260
aacaaaggct gcgtgcgggg tgtgtgcgtg ggggggtgag cagggggtgt gggcgcgtcg    1320
gtcgggctgc aacccccct gcacccccct ccccgagttg ctgagcacgg cccggcttcg    1380 ggtgcgggc tccgtacggg gcgtggcgcg gggctcgccg tgccgggcgg ggggtggcgg    1440
caggtggggg tgccgggcgg ggcggggccg cctcgggccg gggagggctc ggggagggg    1500 cgcggcggcc cccggagcgc cggcggctgt cgaggcgcgg cgagccgcag ccattgcctt    1560
ttatggtaat cgtgcgagag ggcgcaggga cttcctttgt cccaaatctg tgcggagccg    1620
aaatctggga ggcgccgccg cacccctct agcgggcgcg gggcgaagcg gtgcggcgcc    1680
ggcaggaagg aaatgggcgg ggagggcctt cgtgcgtcgc cgcgccgccg tccccttctc    1740
cctctccagc ctcggggctg tccgcgggg gacggctgcc ttcggggggg acggggcagg    1800
gcggggttcg gcttctggcg tgtgaccggc ggctctagag cctctgctaa ccatgttcat    1860
gccttcttct ttttcctaca gctcctgggc aacgtgctgg ttattgtgct gtctcatcat    1920
tttggcaaag aattcatgag gagaccctcc ctgctgctga aggatatcct gaagtgcacc    1980
ctgctggtgt ttggcgtgtg gatcctgtac atcctgaagc tgaactacac cacagaggag    2040
tgtgacatga agaagatgca ctacgtggac cctgatcacg tgaagagggc ccagaagtac    2100
gctcagcagg tgctgcagaa ggagtgtaga ccaaagtttg ccaagacaag catggctctg    2160
ctgttcgagc accggtactc cgtggatctg ctgccttttg tgcagaaggc cccaaaggac    2220
tctgaggctg agagcaagta cgatcccct ttcggctttc gcaagttcag ctccaaggtg    2280
cagaccctgc tggagctgct gccagagcac gacctgcccg agcacctgaa ggctaagaca    2340
tgcaggaggt gcgtggtcat cggatccgga ggaatcctgc acggactgga gctgggacac    2400
accctgaacc agttcgacgt ggtcatcagg ctgaactccg ccccagtgga gggctactct    2460
gagcacgtgg gaaacaagac cacaatcaga atgacatacc ccgagggagc tcctctgtct    2520
gacctggagt actacagcaa cgatctgttc gtggccgtgc tgtttaagtc tgtggacttc    2580
aactggctgc aggctatggt gaagaaggag accctgccct tttgggtgcg gctgttcttt    2640
tggaagcagg tggccgagaa gatcccactg cagcccaagc acttccgcat cctgaaccct    2700
gtgatcatca aggagacagc ttttgacatc ctgcagtact ccgagcccca gtctaggttc    2760
tggggcagag ataagaacgt gcctaccatc ggagtgatcg ccgtggtgct ggctacacac    2820
ctgtgcgacg aggtgtctct ggccggcttt ggatacgatc tgaaccagcc taggacccca    2880
ctgcactact ttgacagcca gtgtatggcc gctatgaact ccagaccat gcacaacgtg    2940 accacagaga caaagttcct gctgaagctg gtgaaagagg gggtggtgaa agacctgagc    3000
gggggtattg acctggtacc tctagagtcg acccgggcgg cctcgaggac ggggtgaact    3060
acgcctgagg atccgatctt tttccctctg ccaaaaatta tggggacatc atgaagcccc    3120
ttgagcatct gacttctggc taataaagga aatttatttt cattgcaata gtgtgttgga    3180 atttttgtg tctctcactc ggaagcaatt cgttgatctg aatttcgacc acccataata    3240
cccattaccc tggtagataa gtagcatggc gggttaatca ttaactacaa ggaacccta    3300 gtgatggagt tggccactcc ctctctgcgc gctcgctcgc tcactgaggc cgggcgacca    3360
aaggtcgccc gacgcccggg ctttgcccgg gcggcctcag tgagcgagcg agcgcgcag    3419

<210> SEQ ID NO 5
<211> LENGTH: 3441
```

```
<212> TYPE: DNA
<213> ORGANISM: Artificial Sequence
<220> FEATURE:
<223> OTHER INFORMATION: Synthetic Polynucleotide

<400> SEQUENCE: 5
ctgcgcgctc gctcgctcac tgaggccgcc cgggcaaagc ccgggcgtcg ggcgaccttt      60
ggtcgcccgg cctcagtgag cgagcgagcg cgcagagagg gagtggccaa ctccatcact     120
aggggttcct tgtagttaat gattaacccg ccatgctact tatctaccag ggtaatgggg     180
atcctctaga actatagcta gtcgacattg attattgact agttattaat agtaatcaat     240
tacgggtca ttagttcata gcccatatat ggagttccgc gttacataac ttacggtaaa     300
tggcccgcct ggctgaccgc ccaacgaccc ccgcccattg acgtcaataa tgacgtatgt     360
tcccatagta acgccaatag ggactttcca ttgacgtcaa tgggtggagt atttacggta     420
aactgcccac ttggcagtac atcaagtgta tcatatgcca agtacgcccc ctattgacgt     480
caatgacggt aaatggcccg cctggcatta tgcccagtac atgaccttat gggactttcc     540
tacttggcag tacatctacg tattagtcat cgctattacc atggtcgagg tgagccccac     600
gttctgcttc actctcccca tctccccccc ctccccaccc ccaattttgt atttatttat     660
tttttaatta ttttgtgcag cgatggggg cgggggggggg ggggggcgcg cgccaggcgg     720
ggcggggcgg ggcgaggggc ggggcgggc gaggcggaga ggtgcggcgg cagccaatca     780
gagcggcgcg ctccgaaagt ttccttttat ggcgaggcgg cggcggcggc ggccctataa     840
aaagcgaagc gcgcggcggg cggggagtcg ctgcgacgct gccttcgccc cgtgccccgc     900
tccgccgccg cctcgcgccg cccgcccgg ctctgactga ccgcgttact cccacaggtg     960
agcgggcggg acggcccttc tcctccgggc tgtaattagc gcttggttta atgacggctt    1020
gtttcttttc tgtggctgcg tgaaagcctt gaggggctcc gggagggccc tttgtgcggg    1080
gggagcggct cggggggtgc gtgcgtgtgt gtgtgcgtgg ggagcgccgc gtgcggctcc    1140
gcgctgcccg gcggctgtga gcgctgcggg cgcggcgcg ggctttgtgc gctccgcagt    1200
gtgcgcgagg ggagcgcggc cggggcggt gccccgcgt gcgggggggg ctgcgagggg    1260
aacaaaggct gcgtgcgggg tgtgtgcgtg gggggtgag caggggtgt gggcgcgtcg    1320
gtcgggctgc aacccccct gcacccccct ccccgagttg ctgagcacgg cccggcttcg    1380
ggtgcggggc tccgtacggg gcgtggcgcg ggctcgccg tgccgggcgg ggggtggcgg    1440
caggtggggg tgccgggcgg ggcggggccg cctcgggccg gggagggctc ggggagggg    1500
cgcggcggcc cccggagcgc cggcggctgt cgaggcgcgg cgagccgcag ccattgcctt    1560
ttatggtaat cgtgcgagag ggcgcaggga cttcctttgt cccaaatctg tgcggagccg    1620
aaatctggga ggcgccgccg cacccctct agcgggcgcg gggcgaagcg gtgcggcgcc    1680
ggcaggaagg aaatgggcgg ggagggcctt cgtgcgtcgc cgcgccgccg tccccttctc    1740
cctctccagc ctcggggctg tccgcgggg gacggctgcc ttcgggggg acggggcagg    1800
gcggggttcg gcttctggcg tgtgaccggc ggctctagag cctctgctaa ccatgttcat    1860
gccttcttct ttttcctaca gctcctgggc aacgtgctgg ttattgtgct gtctcatcat    1920
tttggcaaag aattcgccac catgaggaga ccctccctgc tgctgaagga tatcctgaag    1980
tgcaccctgc tggtgtttgg cgtgtggatc ctgtacatcc tgaagctgaa ctacaccaca    2040
gaggagtgtg acatgaagaa gatgcactac gtggaccctg atcacgtgaa gagggcccag    2100
aagtacgctc agcaggtgct gcagaaggag tgtagaccaa agtttgccaa gacaagcatg    2160
```

```
gctctgctgt tcgagcaccg gtactccgtg gatctgctgc cttttgtgca gaaggcccca    2220
aaggactctg aggctgagag caagtacgat ccccctttcg gctttcgcaa gttcagctcc    2280
aaggtgcaga ccctgctgga gctgctgcca gagcacgacc tgcccgagca cctgaaggct    2340 aagcatgca ggaggtgcgt ggtcatcgga tccggaggaa tcctgcacgg actggagctg     2400
ggacacaccc tgaaccagtt cgacgtggtc atcaggctga actccgcccc agtggagggc    2460
tactctgagc acgtgggaaa caagaccaca atcagaatga catacccga gggagctcct    2520 ctgtctgacc tggagtacta cagcaacgat ctgttcgtgg ccgtgctgtt taagtctgtg    2580
gacttcaact ggctgcaggc tatggtgaag aaggagaccc tgcccttttg ggtgcggctg    2640
ttcttttgga agcaggtggc cgagaagatc ccactgcagc ccaagcactt ccgcatcctg    2700
aaccctgtga tcatcaagga cagctttt gacatcctgc agtactccga gccccagtct      2760
aggttctggg gcagagataa gaacgtgcct accatcggag tgatcgccgt ggtgctggct    2820
acacacctgt gcgacgaggt gtctctggcc ggctttggat acgatctgaa ccagcctagg    2880
accccactgc actactttga cagccagtgt atggccgcta tgaacttcca gaccatgcac    2940
aacgtgacca cagagacaaa gttcctgctg aagctggtga agagggggt ggtgaaagac     3000 ctgagcgggg gtattgaccg agagttttga acgcgtggta cctctagagt cgacccgggc    3060
ggcctcgagg acggggtgaa ctacgcctga ggatccgatc ttttttcctc tgccaaaaat    3120
tatggggaca tcatgaagcc ccttgagcat ctgacttctg gctaataaag gaaatttatt    3180
ttcattgcaa tagtgtgttg gaattttttg tgtctctcac tcggaagcaa ttcgttgatc    3240
tgaatttcga ccaccataa tacccattac cctggtagat aagtagcatg gcgggttaat     3300
cattaactac aaggaacccc tagtgatgga gttggccact ccctctctgc gcgctcgctc    3360
gctcactgag gccgggcgac caaaggtcgc ccgacgcccg ggctttgccc gggcggcctc    3420
agtgagcgag cgagcgcgca g                                              3441

<210> SEQ ID NO 6
<211> LENGTH: 3732
<212> TYPE: DNA
<213> ORGANISM: Artificial Sequence
<220> FEATURE:
<223> OTHER INFORMATION: Synthetic Polynucleotide

<400> SEQUENCE: 6
ctgcgcgctc gctcgctcac tgaggccgcc cgggcaaagc ccgggcgtcg ggcgaccttt    60
ggtcgcccgg cctcagtgag cgagcgagcg cgcagagagg gagtggccaa ctccatcact    120
aggggttcct tgtagttaat gattaacccg ccatgctact tatctaccag ggtaatgggg    180
atcctctaga actatagcta gtcgacattg attattgact agttattaat agtaatcaat    240 tacgggtgtca ttagttcata gcccatatat ggagttccgc gttacataac ttacggtaaa   300
tggcccgcct ggctgaccgc ccaacgaccc ccgcccattg acgtcaataa tgacgtatgt    360
tcccatagta acgccaatag ggactttcca ttgacgtcaa tgggtggagt atttacggta    420
aactgcccac ttggcagtac atcaagtgta tcatatgcca agtacgcccc ctattgacgt    480
caatgacggt aaatggcccg cctggcatta tgcccagtac atgaccttat gggactttcc    540
tacttggcag tacatctacg tattagtcat cgctattacc atggtcgagg tgagccccac    600
gttctgcttc actctcccca tctccccccc ctccccaccc ccaattttgt atttatttat    660
tttttaatta ttttgtgcag cgatggggggc gggggggggg gggggcgcg cgccaggcgg    720 ggcggggcgg ggcgaggggc ggggcggggc gaggcggaga ggtgcggcgg cagccaatca    780
```

-continued

```
gagcggcgcg ctccgaaagt ttccttttat ggcgaggcgg cggcggcggc ggccctataa    840
aaagcgaagc gcgcggcggg cggggagtcg ctgcgacgct gccttcgccc cgtgccccgc    900
tccgccgccg cctcgcgccg cccgccccgg ctctgactga ccgcgttact cccacaggtg    960
agcgggcggg acgcccttc tcctccgggc tgtaattagc gcttggttta atgacggctt    1020
gtttcttttc tgtggctgcg tgaaagcctt gaggggctcc gggagggccc tttgtgcggg    1080
gggagcggct cggggggtgc gtgcgtgtgt gtgtgcgtgg ggagcgccgc gtgcggctcc    1140
gcgctgcccg gcggctgtga gcgctgcggg cgcggcgcgg ggctttgtgc gctccgcagt    1200
gtgcgcgagg ggagcgcggc cggggcggt gccccgcgt gcgggggggg ctgcgagggg    1260
aacaaaggct gcgtgcgggg tgtgtgcgtg ggggggtgag caggggtgt gggcgcgtcg    1320 gtcgggctgc aacccccct gcacccccct ccccgagttg ctgagcacgg cccggcttcg    1380 ggtgcgggc tccgtacggg gcgtggcgcg gggctcgccg tgccgggcgg ggggtggcgg    1440
caggtggggg tgccgggcgg ggcggggccg cctcggccg ggagggctc gggggagggg    1500 cgcggcggcc cccggagcgc cggcggctgt cgaggcgcgg cgagccgcag ccattgcctt    1560
ttatggtaat cgtgcgagag ggcgcaggga cttcctttgt cccaaatctg tgcggagccg    1620
aaatctggga ggcgccgccg cacccctct agcgggcgcg gggcgaagcg gtgcggcgcc    1680
ggcaggaagg aaatgggcgg ggagggcctt cgtgcgtcgc cgcgccgccg tccccttctc    1740
cctctccagc ctcggggctg tccgcggggg gacggctgcc ttcgggggg acggggcagg    1800 gcggggttcg gcttctggcg tgtgaccggc ggctctagag cctctgctaa ccatgttcat    1860
gccttcttct ttttcctaca gctcctgggc aacgtgctgg ttattgtgct gtctcatcat    1920
tttggcaaag aattccacgc gccctcctc cgcatctgag cggggagcg gcggccccca    1980 gctgaatggg cgcgagagcg gcgctgggg cgggtggggg cgcggggtac cgggctggcg    2040 gccgccggc gcccctcat tagtatgcg acgaaggcgg cgggctgcgc ggagcggcgt    2100
cccctgcagc cgcggaccga ggcagcggcg gcacctgccg gccgagcaat gccaagtgag    2160
tacacctatg tgaaactgag aagtgattgc tcgaggcctt ccctgcaatg gtacacccga    2220
gctcaaagca agatgagaag gcccagcttg ttattaaaag acatcctcaa atgtacattg    2280
cttgtgtttg gagtgtggat cctttatatc ctcaagttaa attatactac tgaagaatgt    2340
gacatgaaaa aaatgcatta tgtggaccct gaccatgtaa agagagctca gaaatatgct    2400
cagcaagtct tgcagaagga atgtcgtccc aagtttgcca agacatcaat ggcgctgtta    2460
tttgagcaca ggtatagcgt ggacttactc ccttttgtgc agaaggcccc caaagacagt    2520
gaagctgagt ccaagtacga tcctcctttt gggttccgga agttctccag taaagtccag    2580
accctcttgg aactcttgcc agagcacgac ctccctgaac acttgaaagc caagacctgt    2640
cggcgctgtg tggttattgg aagcggagga atactgcacg gattagaact gggccacacc    2700
ctgaaccagt tcgatgttgt gataaggtta aacagtgcac cagttgaggg atattcagaa    2760
catgttggaa ataaaactac tataaggatg acttatccag agggcgcacc actgtctgac    2820
cttgaatatt attccaatga cttatttgtt gctgttttat ttaagagtgt tgatttcaac    2880
tggcttcaag caatggtaaa aaaggaaacc ctgccattct gggtacgact cttcttttgg    2940
aagcaggtgg cagaaaaaat cccactgcag ccaaaacatt tcaggatttt gaatccagtt    3000
atcatcaaag agactgcctt tgacatcctt cagtactcag agcctcagtc aaggttctgg    3060
ggccgagata agaacgtccc cacaatcggt gtcattgccg ttgtcttagc cacacatctg    3120
```

| | |
|---|---|
| tgcgatgaag tcagtttggc gggttttgga tatgacctca atcaacccag aacacctttg | 3180 |
| cactacttcg acagtcaatg catggctgct atgaactttc agaccatgca taatgtgaca | 3240 |
| acggaaacca agttcctctt aaagctggtc aaagagggag tggtgaaaga tctcagtgga | 3300 |
| ggcattgatc gtgaattttg aacgcgtggt acctctagag tcgacccggg cggcctcgag | 3360 |
| gacggggtga actacgcctg aggatccgat cttttcccct ctgccaaaaa ttatggggac | 3420 |
| atcatgaagc cccttgagca tctgacttct ggctaataaa ggaaatttat tttcattgca | 3480 |
| atagtgtgtt ggaattttt gtgtctctca ctcggaagca attcgttgat ctgaatttcg | 3540 |
| accacccata atacccatta ccctggtaga taagtagcat ggcgggttaa tcattaacta | 3600 |
| caaggaaccc ctagtgatgg agttggccac tccctctctg cgcgctcgct cgctcactga | 3660 |
| ggccgggcga ccaaaggtcg cccgacgccc gggctttgcc cgggcggcct cagtgagcga | 3720 |
| gcgagcgcgc ag | 3732 |

<210> SEQ ID NO 7
<211> LENGTH: 3732
<212> TYPE: DNA
<213> ORGANISM: Artificial Sequence
<220> FEATURE:
<223> OTHER INFORMATION: Synthetic Polynucleotide

<400> SEQUENCE: 7

| | |
|---|---|
| ctgcgcgctc gctcgctcac tgaggccgcc cgggcaaagc ccgggcgtcg ggcgaccttt | 60 |
| ggtcgcccgg cctcagtgag cgagcgagcg cgcagagagg gagtggccaa ctccatcact | 120 |
| aggggttcct tgtagttaat gattaacccg ccatgctact tatctaccag ggtaatgggg | 180 |
| atcctctaga actatagcta gtcgacattg attattgact agttattaat agtaatcaat | 240 |
| tacggggtca ttagttcata gcccatatat ggagttccgc gttacataac ttacggtaaa | 300 |
| tggcccgcct ggctgaccgc ccaacgaccc ccgcccattg acgtcaataa tgacgtatgt | 360 |
| tcccatagta acgccaatag ggactttcca ttgacgtcaa tgggtggagt atttacggta | 420 |
| aactgcccac ttggcagtac atcaagtgta tcatatgcca agtacgcccc ctattgacgt | 480 |
| caatgacggt aaatggcccg cctggcatta tgcccagtac atgaccttat gggactttcc | 540 |
| tacttggcag tacatctacg tattagtcat cgctattacc atggtcgagg tgagccccac | 600 |
| gttctgcttc actctcccca tctcccccc ctccccaccc caattttgt atttatttat | 660 |
| tttttaatta ttttgtgcag cgatggggg ggggggggg gggggcgcg cgccaggcgg | 720 |
| ggcggggcgg ggcgaggggc ggggcgggc gaggcggaga ggtgcggcgg cagccaatca | 780 |
| gagcggcgcg ctccgaaagt tcctttat ggcgaggcgg cggcggcggc ggccctataa | 840 |
| aaagcgaagc gcgcggcggg cggggagtcg ctgcgacgct gccttcgccc cgtgccccgc | 900 |
| tccgccgccg cctcgcgccg cccgccccgg ctctgactga ccgcgttact cccacaggtg | 960 |
| agcgggcggg acggcccttc tcctccggc tgtaattagc gcttggttta atgacggctt | 1020 |
| gtttcttttc tgtggctgcg tgaaagcctt gaggggctcc gggagggccc tttgtgcggg | 1080 |
| gggagcggct cgggggtgc gtgcgtgtgt gtgtgcgtgg ggagcgccgc gtgcggctcc | 1140 |
| gcgctgcccg gcggctgtga gcgctgcggg gcgcggcgcg ggctttgtgc gctccgcagt | 1200 |
| gtgcgcgagg ggagcgcggc cggggcggt gccccgcggt gcggggggg ctgcgagggg | 1260 |
| aacaaaggct gcgtgcgggg tgtgtgcgtg gggggtgag caggggtgt gggcgcgtcg | 1320 |
| gtcgggctgc aaccccccct gcacccccct ccccgagttg ctgagcacgg cccggcttcg | 1380 |
| ggtgcggggc tccgtacggg gcgtggcgcg gggctcgccg tgccgggcgg ggggtggcgg | 1440 |

```
caggtggggg tgccgggcgg ggcggggccg cctcgggccg gggagggctc ggggaggggg    1500
cgcggcggcc cccggagcgc cggcggctgt cgaggcgcgg cgagccgcag ccattgcctt    1560
ttatggtaat cgtgcgagag ggcgcaggga cttcctttgt cccaaatctg tgcggagccg    1620
aaatctggga ggcgccgccg cacccctct agcgggcgcg gggcgaagcg gtgcggcgcc     1680
ggcaggaagg aaatgggcgg ggagggcctt cgtgcgtcgc cgcgccgccg tcccttctc     1740 cctctccagc ctcggggctg tccgcggggg gacggctgcc ttcgggggg acggggcagg     1800 gcggggttcg gcttctggcg tgtgaccggc ggctctagag cctctgctaa ccatgttcat    1860
gccttcttct ttttcctaca gctcctgggc aacgtgctgg ttattgtgct gtctcatcat    1920
tttggcaaag aattccacgc gcccctcctc cgcatctgag cgggggagcg gcggccccca    1980
gctgaatggg cgcgagagcg gcgctggggg cgggtggggg cgcggggtac cgggctggcg    2040
gccggccggc gcccctcat tagtatgcgg acgaaggcgg cgggctgcgc ggagcggcgt     2100
cccctgcagc cgcggaccga ggcagcggcg gcacctgccg gccgagcaat gccaagtgag    2160
tacacctatg tgaaactgag aagtgattgc tcgaggcctt ccctgcaatg gtacacccga    2220
gctcaaagca agatgaggag accctccctg ctgctgaagg atatcctgaa gtgcaccctg    2280
ctggtgtttg gcgtgtggat cctgtacatc ctgaagctga actacaccac agaggagtgt    2340
gacatgaaga agatgcacta cgtggaccct gatcacgtga agagggccca gaagtacgct    2400
cagcaggtgc tgcagaagga gtgtagacca aagtttgcca agacaagcat ggctctgctg    2460
ttcgagcacc ggtactccgt ggatctgctg ccttttgtgc agaaggcccc aaaggactct    2520
gaggctgaga gcaagtacga tccccctttc ggctttcgca agttcagctc caaggtgcag    2580
accctgctgg agctgctgcc agagcacgac ctgcccgagc acctgaaggc taagacatgc    2640
aggaggtgcg tggtcatcgg atccggagga atcctgcacg gactggagct gggacacacc    2700
ctgaaccagt tcgacgtggt catcaggctg aactccgccc cagtggaggg ctactctgag    2760
cacgtgggaa acaagaccac aatcagaatg acatacccccg agggagctcc tctgtctgac    2820
ctggagtact acagcaacga tctgttcgtg gccgtgctgt ttaagtctgt ggacttcaac    2880
tggctgcagg ctatggtgaa gaaggagacc ctgccctttt gggtgcggct gttcttttgg    2940
aagcaggtgg ccgagaagat cccactgcag cccaagcact tccgcatcct gaaccctgtg    3000
atcatcaagg agacagcttt tgacatcctg cagtactccg agccccagtc taggttctgg    3060
ggcagagata agaacgtgcc taccatcgga gtgatcgccg tggtgctggc tacacacctg    3120
tgcgacgagg tgtctctggc cggctttgga tacgatctga accagcctag gaccccactg    3180
cactactttg acagccagtg tatggccgct atgaacttcc agaccatgca caacgtgacc    3240
acagagacaa agttcctgct gaagctggtg aaagagggggg tggtgaaaga cctgagcggg    3300
ggtattgacc gagagttttg aacgcgtggt acctctagag tcgacccggg cggcctcgag    3360
gacggggtga actacgcctg aggatccgat cttttttccct ctgccaaaaa ttatggggac    3420
atcatgaagc cccttgagca tctgacttct ggctaataaa ggaaatttat tttcattgca    3480
atagtgtgtt ggaatttttt gtgtctctca ctcggaagca attcgttgat ctgaatttcg    3540
accacccata atacccatta ccctggtaga taagtagcat ggcgggttaa tcattaacta    3600
caaggaaccc ctagtgatgg agttggccac tccctctctg cgcgctcgct cgctcactga    3660
ggccgggcga ccaaaggtcg cccgacgccc gggctttgcc cggcggcct cagtgagcga    3720 gcgagcgcgc ag                                                        3732
```

```
<210> SEQ ID NO 8
<211> LENGTH: 418
<212> TYPE: PRT
<213> ORGANISM: Artificial Sequence
<220> FEATURE:
<223> OTHER INFORMATION: Synthetic Polypeptide

<400> SEQUENCE: 8

Met Arg Thr Lys Ala Ala Gly Cys Ala Glu Arg Arg Pro Leu Gln Pro
1               5                   10                  15

Arg Thr Glu Ala Ala Ala Pro Ala Gly Arg Ala Met Pro Ser Glu
            20                  25                  30

Tyr Thr Tyr Val Lys Leu Arg Ser Asp Cys Ser Arg Pro Ser Leu Gln
                35                  40                  45

Trp Tyr Thr Arg Ala Gln Ser Lys Met Arg Arg Pro Ser Leu Leu Leu
    50                  55                  60

Lys Asp Ile Leu Lys Cys Thr Leu Leu Val Phe Gly Val Trp Ile Leu
65                  70                  75                  80

Tyr Ile Leu Lys Leu Asn Tyr Thr Thr Glu Glu Cys Asp Met Lys Lys
                85                  90                  95

Met His Tyr Val Asp Pro Asp His Val Lys Arg Ala Gln Lys Tyr Ala
            100                 105                 110

Gln Gln Val Leu Gln Lys Glu Cys Arg Pro Lys Phe Ala Lys Thr Ser
        115                 120                 125

Met Ala Leu Leu Phe Glu His Arg Tyr Ser Val Asp Leu Leu Pro Phe
130                 135                 140

Val Gln Lys Ala Pro Lys Asp Ser Glu Ala Ser Lys Tyr Asp Pro
145                 150                 155                 160

Pro Phe Gly Phe Arg Lys Phe Ser Ser Lys Val Gln Thr Leu Leu Glu
                165                 170                 175

Leu Leu Pro Glu His Asp Leu Pro Glu His Leu Lys Ala Lys Thr Cys
            180                 185                 190

Arg Arg Cys Val Val Ile Gly Ser Gly Gly Ile Leu His Gly Leu Glu
        195                 200                 205

Leu Gly His Thr Leu Asn Gln Phe Asp Val Val Ile Arg Leu Asn Ser
210                 215                 220

Ala Pro Val Glu Gly Tyr Ser Glu His Val Gly Asn Lys Thr Thr Ile
225                 230                 235                 240

Arg Met Thr Tyr Pro Glu Gly Ala Pro Leu Ser Asp Leu Glu Tyr Tyr
                245                 250                 255

Ser Asn Asp Leu Phe Val Ala Val Leu Phe Lys Ser Val Asp Phe Asn
            260                 265                 270

Trp Leu Gln Ala Met Val Lys Lys Glu Thr Leu Pro Phe Trp Val Arg
        275                 280                 285

Leu Phe Phe Trp Lys Gln Val Ala Glu Lys Ile Pro Leu Gln Pro Lys
290                 295                 300

His Phe Arg Ile Leu Asn Pro Val Ile Ile Lys Glu Thr Ala Phe Asp
305                 310                 315                 320

Ile Leu Gln Tyr Ser Glu Pro Gln Ser Arg Phe Trp Gly Arg Asp Lys
                325                 330                 335

Asn Val Pro Thr Ile Gly Val Ile Ala Val Val Leu Ala Thr His Leu
            340                 345                 350

Cys Asp Glu Val Ser Leu Ala Gly Phe Gly Tyr Asp Leu Asn Gln Pro
        355                 360                 365
```

```
Arg Thr Pro Leu His Tyr Phe Asp Ser Gln Cys Met Ala Ala Met Asn
    370                 375                 380

Phe Gln Thr Met His Asn Val Thr Thr Glu Thr Lys Phe Leu Leu Lys
385                 390                 395                 400

Leu Val Lys Glu Gly Val Val Lys Asp Leu Ser Gly Gly Ile Asp Arg
                405                 410                 415

Glu Phe
```

<210> SEQ ID NO 9
<211> LENGTH: 390
<212> TYPE: PRT
<213> ORGANISM: Artificial Sequence
<220> FEATURE:
<223> OTHER INFORMATION: Synthetic Polypeptide

<400> SEQUENCE: 9

```
Met Pro Ser Glu Tyr Thr Tyr Val Lys Leu Arg Ser Asp Cys Ser Arg
1               5                   10                  15

Pro Ser Leu Gln Trp Tyr Thr Arg Ala Gln Ser Lys Met Arg Arg Pro
            20                  25                  30

Ser Leu Leu Leu Lys Asp Ile Leu Lys Cys Thr Leu Leu Val Phe Gly
        35                  40                  45

Val Trp Ile Leu Tyr Ile Leu Lys Leu Asn Tyr Thr Thr Glu Glu Cys
    50                  55                  60

Asp Met Lys Lys Met His Tyr Val Asp Pro His Val Lys Arg Ala
65                  70                  75                  80

Gln Lys Tyr Ala Gln Gln Val Leu Gln Lys Glu Cys Arg Pro Lys Phe
                85                  90                  95

Ala Lys Thr Ser Met Ala Leu Leu Phe Glu His Arg Tyr Ser Val Asp
            100                 105                 110

Leu Leu Pro Phe Val Gln Lys Ala Pro Lys Asp Ser Glu Ala Glu Ser
        115                 120                 125

Lys Tyr Asp Pro Pro Phe Gly Phe Arg Lys Phe Ser Ser Lys Val Gln
130                 135                 140

Thr Leu Leu Glu Leu Leu Pro Glu His Asp Leu Pro Glu His Leu Lys
145                 150                 155                 160

Ala Lys Thr Cys Arg Arg Cys Val Val Ile Gly Ser Gly Gly Ile Leu
                165                 170                 175

His Gly Leu Glu Leu Gly His Thr Leu Asn Gln Phe Asp Val Val Ile
            180                 185                 190

Arg Leu Asn Ser Ala Pro Val Glu Gly Tyr Ser Glu His Val Gly Asn
        195                 200                 205

Lys Thr Thr Ile Arg Met Thr Tyr Pro Glu Gly Ala Pro Leu Ser Asp
210                 215                 220

Leu Glu Tyr Tyr Ser Asn Asp Leu Phe Val Ala Val Leu Phe Lys Ser
225                 230                 235                 240

Val Asp Phe Asn Trp Leu Gln Ala Met Val Lys Lys Glu Thr Leu Pro
                245                 250                 255

Phe Trp Val Arg Leu Phe Phe Trp Lys Gln Val Ala Glu Lys Ile Pro
            260                 265                 270

Leu Gln Pro Lys His Phe Arg Ile Leu Asn Pro Val Ile Ile Lys Glu
        275                 280                 285

Thr Ala Phe Asp Ile Leu Gln Tyr Ser Glu Pro Gln Ser Arg Phe Trp
290                 295                 300

Gly Arg Asp Lys Asn Val Pro Thr Ile Gly Val Ile Ala Val Val Leu
```

```
              305                 310                 315                 320
Ala Thr His Leu Cys Asp Glu Val Ser Leu Ala Gly Phe Gly Tyr Asp
                    325                 330                 335

Leu Asn Gln Pro Arg Thr Pro Leu His Tyr Phe Asp Ser Gln Cys Met
                340                 345                 350

Ala Ala Met Asn Phe Gln Thr Met His Asn Val Thr Thr Glu Thr Lys
                355                 360                 365

Phe Leu Leu Lys Leu Val Lys Glu Gly Val Val Lys Asp Leu Ser Gly
            370                 375                 380

Gly Ile Asp Arg Glu Phe
385                 390

<210> SEQ ID NO 10
<211> LENGTH: 362
<212> TYPE: PRT
<213> ORGANISM: Artificial Sequence
<220> FEATURE:
<223> OTHER INFORMATION: Synthetic Polypeptide

<400> SEQUENCE: 10

Met Arg Arg Pro Ser Leu Leu Leu Lys Asp Ile Leu Lys Cys Thr Leu
1               5                   10                  15

Leu Val Phe Gly Val Trp Ile Leu Tyr Ile Leu Lys Leu Asn Tyr Thr
                20                  25                  30

Thr Glu Glu Cys Asp Met Lys Lys Met His Tyr Val Asp Pro Asp His
            35                  40                  45

Val Lys Arg Ala Gln Lys Tyr Ala Gln Val Leu Gln Lys Glu Cys
50                  55                  60

Arg Pro Lys Phe Ala Lys Thr Ser Met Ala Leu Leu Phe Glu His Arg
65                  70                  75                  80

Tyr Ser Val Asp Leu Leu Pro Phe Val Gln Lys Ala Pro Lys Asp Ser
                85                  90                  95

Glu Ala Glu Ser Lys Tyr Asp Pro Pro Phe Gly Phe Arg Lys Phe Ser
            100                 105                 110

Ser Lys Val Gln Thr Leu Leu Glu Leu Leu Pro Glu His Asp Leu Pro
        115                 120                 125

Glu His Leu Lys Ala Lys Thr Cys Arg Arg Cys Val Val Ile Gly Ser
    130                 135                 140

Gly Gly Ile Leu His Gly Leu Glu Leu Gly His Thr Leu Asn Gln Phe
145                 150                 155                 160

Asp Val Val Ile Arg Leu Asn Ser Ala Pro Val Glu Gly Tyr Ser Glu
                165                 170                 175

His Val Gly Asn Lys Thr Thr Ile Arg Met Thr Tyr Pro Glu Gly Ala
            180                 185                 190

Pro Leu Ser Asp Leu Glu Tyr Tyr Ser Asn Asp Leu Phe Val Ala Val
        195                 200                 205

Leu Phe Lys Ser Val Asp Phe Asn Trp Leu Gln Ala Met Val Lys Lys
    210                 215                 220

Glu Thr Leu Pro Phe Trp Val Arg Leu Phe Phe Trp Lys Gln Val Ala
225                 230                 235                 240

Glu Lys Ile Pro Leu Gln Pro Lys His Phe Arg Ile Leu Asn Pro Val
                245                 250                 255

Ile Ile Lys Glu Thr Ala Phe Asp Ile Leu Gln Tyr Ser Glu Pro Gln
            260                 265                 270

Ser Arg Phe Trp Gly Arg Asp Lys Asn Val Pro Thr Ile Gly Val Ile
```

| | | | | | | | | 275 | | | | 280 | | | | 285 | | |
|---|---|---|---|---|---|---|---|---|---|---|---|---|---|---|---|---|---|---|
| Ala | Val | Val | Leu | Ala | Thr | His | Leu | Cys | Asp | Glu | Val | Ser | Leu | Ala | Gly |
| | | | | 290 | | | | | 295 | | | | | 300 | |

Phe Gly Tyr Asp Leu Asn Gln Pro Arg Thr Pro Leu His Tyr Phe Asp
305                 310                 315                 320

Ser Gln Cys Met Ala Ala Met Asn Phe Gln Thr Met His Asn Val Thr
                325                 330                 335

Thr Glu Thr Lys Phe Leu Leu Lys Leu Val Lys Glu Gly Val Val Lys
            340                 345                 350

Asp Leu Ser Gly Gly Ile Asp Arg Glu Phe
            355                 360

<210> SEQ ID NO 11
<211> LENGTH: 6496
<212> TYPE: DNA
<213> ORGANISM: Artificial Sequence
<220> FEATURE:
<223> OTHER INFORMATION: Synthetic Polynucleotide

<400> SEQUENCE: 11

```
tggtacccaa acaccattgt cacactccac aaacaccatt gtcacactcc acaaacacca      60
ttgtcacact ccaggtacct ctagagtcga cccgggcggc ctcgaggacg gggtgaacta     120
cgcctgagga tccgatcttt ttccctctgc caaaaattat ggggacatca tgaagcccct     180
tgagcatctg acttctggct aataaaggaa atttattttc attgcaatag tgtgttggaa     240
ttttttgtgt ctctcactcg gaagcaattc gttgatctga atttcgacca cccataatac     300
ccattaccct ggtagataag tagcatggcg ggttaatcat taactacaag gaaccctag     360
tgatggagtt ggccactccc tctctgcgcg ctcgctcgct cactgaggcc gggcgaccaa     420
aggtcgcccg acgcccgggc tttgcccggg cggcctcagt gagcgagcga gcgcgcagcc     480
ttaattaacc taattcactg gccgtcgttt tacaacgtcg tgactgggaa aaccctggcg     540
ttacccaact taatcgcctt gcagcacatc cccctttcgc cagctggcgt aatagcgaag     600
aggcccgcac cgatcgccct tcccaacagt tgcgcagcct gaatggcgaa tgggacgcgc     660
cctgtagcgg cgcattaagc gcggcgggtg tggtggttac gcgcagcgtg accgctacac     720
ttgccagcgc cctagcgccc gctcctttcg ctttcttccc ttcctttctc gccacgttcg     780
ccggcttttc ccgtcaagct ctaaatcggg gctccctttt agggttccga tttagtgctt     840
tacggcacct cgaccccaaa aaacttgatt agggtgatgg ttcacgtagt gggccatcgc     900
cctgatagac ggtttttcgc cctttgacgt tggagtccac gttctttaat agtggactct     960
tgttccaaac tggaacaaca ctcaacccta tctcggtcta ttcttttgat ttataaggga    1020
ttttgccgat ttcggcctat tggttaaaaa atgagctgat ttaacaaaaa tttaacgcga    1080
attttaacaa aatattaacg cttacaattt aggtggcact tttcggggaa atgtgcgcgg    1140
aacccctatt tgtttatttt tctaaataca ttcaaatatg tatccgctca tgagacaata    1200
accctgataa atgcttcaat aatattgaaa aaggaagagt atgagtattc aacatttccg    1260
tgtcgccctt attcccttt ttgcggcatt ttgccttcct gttttttgctc acccagaaac    1320
gctggtgaaa gtaaaagatg ctgaagatca gttgggtgca cgagtgggtt acatcgaact    1380
ggatctcaac agcggtaaga tccttgagag ttttcgcccc gaagaacgtt ttccaatgat    1440
gagcactttt aaagttctgc tatgtggcgc ggtattatcc cgtattgacg ccgggcaaga    1500
gcaactcggt cgccgcatac actattctca gaatgacttg gttgagtact caccagtcac    1560
```

-continued

```
agaaaagcat cttacggatg gcatgacagt aagagaatta tgcagtgctg ccataaccat   1620
gagtgataac actgcggcca acttacttct gacaacgatc ggaggaccga aggagctaac   1680
cgcttttttg cacaacatgg gggatcatgt aactcgcctt gatcgttggg aaccggagct   1740
gaatgaagcc ataccaaacg acgagcgtga caccacgatg cctgtagcaa tggcaacaac   1800
gttgcgcaaa ctattaactg gcgaactact tactctagct tcccggcaac aattaataga   1860
ctggatggag gcggataaag ttgcaggacc acttctgcgc tcggcccttc cggctggctg   1920
gtttattgct gataaatctg gagccggtga gcgtgggtct cgcggtatca ttgcagcact   1980
ggggccagat ggtaagccct cccgtatcgt agttatctac acgacgggga gtcaggcaac   2040
tatggatgaa cgaaatagac agatcgctga gataggtgcc tcactgatta gcattggta    2100 actgtcagac caagtttact catatatact ttagattgat ttaaaacttc attttttaatt  2160 taaaaggatc taggtgaaga tcctttttga taatctcatg accaaaatcc cttaacgtga   2220
gttttcgttc cactgagcgt cagacccccgt agaaaagatc aaaggatctt cttgagatcc  2280 ttttttttctg cgcgtaatct gctgcttgca acaaaaaaa ccaccgctac cagcggtggt   2340
ttgtttgccg gatcaagagc taccaactct ttttccgaag gtaactggct tcagcagagc   2400
gcagatacca aatactgttc ttctagtgta gccgtagtta ggccaccact tcaagaactc   2460
tgtagcaccg cctacatacc tcgctctgct aatcctgtta ccagtggctg ctgccagtgg   2520
cgataagtcg tgtcttaccg ggttggactc aagacgatag ttaccggata aggcgcagcg   2580
gtcgggctga acggggggtt cgtgcacaca gcccagcttg gagcgaacga cctacaccga   2640
actgagatac ctacagcgtg agctatgaga aagcgccacg cttcccgaag ggagaaaggc   2700
ggacaggtat ccggtaagcg gcagggtcgg aacaggagag cgcacgaggg agcttccagg   2760
gggaaacgcc tggtatcttt atagtcctgt cgggtttcgc cacctctgac ttgagcgtcg   2820
atttttgtga tgctcgtcag ggggggcgag cctatggaaa aacgccagca acgcggcctt   2880
tttacggttc ctggccttt gctggccttt tgctcacatg ttctttcctg cgttatcccc    2940
tgattctgtg gataaccgta ttaccgcctt tgagtgagct gataccgctc gccgcagccg   3000
aacgaccgag cgcagcgagt cagtgagcga ggaagcggaa gagcgcccaa tacgcaaacc   3060
gcctctcccc gcgcgttggc cgattcatta atgcagctgg cacgacaggt ttcccgactg   3120
gaaagcgggc agtgagcgca acgcaattaa tgtgagttag ctcactcatt aggcaccccca  3180 ggctttacac tttatgcttc cggctcgtat gttgtgtgga attgtgagcg gataacaatt   3240
tcacacagga aacagctatg accatgatta cgccagattt aattaaggcc ttaattaggc   3300
tgcgcgctcg ctcgctcact gaggccgccc gggcaaagcc cgggcgtcgg gcgacctttg   3360
gtcgcccggc ctcagtgagc gagcgagcgc gcagagaggg agtggccaac tccatcacta   3420
ggggttcctt gtagttaatg attaacccgc catgctactt atctaccagg gtaatgggga   3480
tcctctagaa ctatagctag tcgacattga ttattgacta gttattaata gtaatcaatt   3540
acggggtcat tagttcatag cccatatatg gagttccgcg ttacataact tacggtaaat   3600
ggcccgcctg gctgaccgcc caacgacccc cgcccattga cgtcaataat gacgtatgtt   3660
cccatagtaa cgccaatagg gactttccat tgacgtcaat gggtggagta tttacgtaa    3720 actgcccact tggcagtaca tcaagtgtat catatgccaa gtacgccccc tattgacgtc   3780
aatgacggta atggcccgc ctggcattat gcccagtaca tgaccttatg gactttcct     3840 acttggcagt acatctacgt attagtcatc gctattacca tggtcgaggt gagccccacg   3900
ttctgcttca ctctccccat ctcccccccc tccccacccc caattttgta tttatttatt   3960
```

```
ttttaattat tttgtgcagc gatgggggcg ggggggggggg ggggcgcgc gccaggcggg      4020 gcgggcggg gcgaggggcg gggcggggcg aggcggagag gtgcggcggc agccaatcag      4080
agcggcgcgc tccgaaagtt tccttttatg gcgaggcggc ggcggcggcg gccctataaa     4140
aagcgaagcg cgcggcgggc ggggagtcgc tgcgacgctg ccttcgcccc gtgcccgct      4200 ccgccgccgc ctcgcgccgc ccgccccggc tctgactgac cgcgttactc ccacaggtga     4260
gcgggcggga cggcccttct cctccgggct gtaattagcg cttggtttaa tgacggcttg     4320
tttcttttct gtggctgcgt gaaagccttg aggggctccg ggagggccct ttgtgcgggg     4380
ggagcggctc gggggtgcg tgcgtgtgtg tgtgcgtggg gagcgccgcg tgcggctccg      4440
cgctgcccgg cggctgtgag cgctgcgggc gggcgcggg gctttgtgcg ctccgcagtg     4500
tgcgcgaggg gagcgcggcc ggggcggtg ccccgcggtg cggggggggc tgcgagggga    4560
acaaaggctg cgtgcgggt gtgtgcgtgg ggggtgagc aggggtgtg ggcgcgtcgg     4620 tcgggctgca accccccctg caccccctc cccgagttgc tgagcacggc ccggcttcgg     4680
gtgcggggct ccgtacgggg cgtggcgcgg ggctcgccgt gccggcggg gggtggcggc     4740 aggtgggggt gccgggcggg gcggggccgc ctcgggccgg ggagggctcg ggggaggggc   4800
gcggcggccc ccggagcgcc ggcggctgtc gaggcgcggc gagccgcagc cattgccttt   4860
tatggtaatc gtgcgagagg gcgcagggac ttcctttgtc ccaaatctgt gcggagccga    4920
aatctgggag gcgccgccgc accccctcta gcgggcgcgg ggcgaagcgg tgcggcgccg    4980
gcaggaagga aatgggcggg gagggccttc gtgcgtcgcc gcgccgccgt ccccttctcc    5040
ctctccagcc tcgggctgt ccgcggggg acggctgcct tcgggggga cggggcaggg     5100 cggggttcgg cttctggcgt gtgaccggcg gctctagagc ctctgctaac catgttcatg    5160
ccttcttctt tttcctacag ctcctgggca acgtgctggt tattgtgctg tctcatcatt     5220
ttggcaaaga attcatgaga actaaagcag caggttgtgc agagagaaga ccactccagc    5280
ctagaactga agcagcagca gcaccagcag gtagagcaat gccatccgag tacacctacg    5340
tgaagctgcg gtctgactgc agccgcccat ccctgcagtg gtacacaaga gcccagagca   5400
agatgaggag accctccctg ctgctgaagg atatcctgaa gtgcaccctg ctggtgtttg   5460
gcgtgtggat cctgtacatc ctgaagctga actacaccac agaggagtgt gacatgaaga    5520
agatgcacta cgtggaccct gatcacgtga agagggccca gaagtacgct cagcaggtgc    5580
tgcagaagga gtgtagacca aagtttgcca agacaagcat ggctctgctg ttcgagcacc    5640
ggtactccgt ggatctgctg ccttttgtgc agaaggcccc aaaggactct gaggctgaga    5700
gcaagtacga tccccctttc ggcttttcgca agttcagctc caaggtgcag accctgctgg    5760
agctgctgcc agagcacgac ctgcccgagc acctgaaggc taagacatgc aggaggtgcg    5820
tggtcatcgg atccggagga atcctgcacg gactggagct gggacacacc ctgaaccagt    5880
tcgacgtggt catcaggctg aactccgccc agtggaggg ctactctgag cacgtgggaa    5940
acaagaccac aatcagaatg acataccccg agggagctcc tctgtctgac ctggagtact    6000
acagcaacga tctgttcgtg gccgtgctgt ttaagtctgt ggacttcaac tggctgcagg    6060
ctatggtgaa gaaggagacc ctgcccttt gggtgcggct gttctttggg aagcaggtgg    6120
ccgagaagat cccactgcag cccaagcact tccgcatcct gaaccctgtg atcatcaagg    6180
agacagcttt tgcatcctg cagtactccg agccccagtc taggtctctgg ggcagagata    6240 agaacgtgcc taccatcgga gtgatcgccg tggtgctggc tacacacctg tgcgacgagg    6300
```

```
tgtctctggc cggctttgga tacgatctga accagcctag gaccccactg cactactttg    6360
acagccagtg tatggccgct atgaacttcc agaccatgca caacgtgacc acagagacaa    6420
agttcctgct gaagctggtg aaagagggg tggtgaaaga cctgagcggg ggtattgacc    6480
gagagttttg aacgcg                                                    6496

<210> SEQ ID NO 12
<211> LENGTH: 6412
<212> TYPE: DNA
<213> ORGANISM: Artificial Sequence
<220> FEATURE:
<223> OTHER INFORMATION: Synthetic Polynucleotide

<400> SEQUENCE: 12
tggtacccaa acaccattgt cacactccac aaacaccatt gtcacactcc acaaacacca      60
ttgtcacact ccaggtacct ctagagtcga cccgggcggc ctcgaggacg gggtgaacta     120
cgcctgagga tccgatcttt ttccctctgc caaaaattat ggggacatca tgaagcccct     180
tgagcatctg acttctggct aataaaggaa atttattttc attgcaatag tgtgttggaa     240
ttttttgtgt ctctcactcg gaagcaattc gttgatctga atttcgacca cccataatac     300
ccattaccct ggtagataag tagcatggcg ggttaatcat taactacaag gaaccccctag    360 tgatggagtt ggccactccc tctctgcgcg ctcgctcgct cactgaggcc gggcgaccaa     420
aggtcgcccg acgcccgggc tttgcccggg cggcctcagt gagcgagcga gcgcgcagcc     480
ttaattaacc taattcactg gccgtcgttt tacaacgtcg tgactgggaa aaccctggcg     540
ttacccaact taatcgcctt gcagcacatc cccctttcgc cagctggcgt aatagcgaag     600
aggcccgcac cgatcgccct tcccaacagt tgcgcagcct gaatggcgaa tgggacgcgc     660
cctgtagcgg cgcattaagc gcggcgggtg tggtggttac gcgcagcgtg accgctacac     720
ttgccagcgc cctagcgccc gctcctttcg ctttcttccc ttcctttctc gccacgttcg     780 ccggcttttcc ccgtcaagct ctaaatcggg gctccctttt agggttccga tttagtgctt     840
tacggcacct cgaccccaaa aaacttgatt agggtgatgg ttcacgtagt gggccatcgc     900
cctgatagac ggtttttcgc cctttgacgt tggagtccac gttctttaat agtggactct     960
tgttccaaac tggaacaaca ctcaacccta tctcggtcta ttcttttgat ttataaggga    1020
ttttgccgat ttcggcctat tggttaaaaa atgagctgat ttaacaaaaa tttaacgcga    1080
attttaacaa aatattaacg cttacaattt aggtggcact tttcggggaa atgtgcgcgg    1140 aaccccctatt tgtttatttt tctaaataca ttcaaatatg tatccgctca tgagacaata    1200
accctgataa atgcttcaat aatattgaaa aaggaagagt atgagtattc aacatttccg    1260
tgtcgccctt attcccttttt ttgcggcatt ttgccttcct gttttttgctc acccagaaac    1320 gctggtgaaa gtaaaagatg ctgaagatca gttgggtgca cgagtgggtt acatcgaact    1380
ggatctcaac agcggtaaga tccttgagag ttttcgcccc gaagaacgtt ttccaatgat    1440
gagcactttt aaagttctgc tatgtggcgc ggtattatcc cgtattgacg ccgggcaaga    1500
gcaactcggt cgccgcatac actattctca gaatgacttg gttgagtact caccagtcac    1560
agaaaagcat cttacggatg gcatgacagt aagagaatta tgcagtgctg ccataaccat    1620
gagtgataac actgcggcca acttacttct gacaacgatc ggaggaccga aggagctaac    1680
cgcttttttg cacaacatgg ggatcatgt aactcgcctt gatcgttggg aaccggagct    1740
gaatgaagcc ataccaaacg acgagcgtga ccacacgatg cctgtagcaa tggcaacaac    1800
gttgcgcaaa ctattaactg gcgaactact tactctagct tcccggcaac aattaataga    1860
```

```
ctggatggag gcggataaag ttgcaggacc acttctgcgc tcggcccttc cggctggctg    1920
gtttattgct gataaatctg gagccggtga gcgtgggtct cgcggtatca ttgcagcact    1980
ggggccagat ggtaagccct cccgtatcgt agttatctac acgacgggga gtcaggcaac    2040 tatgatgaa cgaaatagac agatcgctga gataggtgcc tcactgatta agcattggta     2100
actgtcagac caagtttact catatatact ttagattgat ttaaaacttc attttaatt    2160 taaaaggatc taggtgaaga tcctttttga taatctcatg accaaaatcc cttaacgtga    2220
gttttcgttc cactgagcgt cagaccccgt agaaaagatc aaaggatctt cttgagatcc    2280 ttttttctg cgcgtaatct gctgcttgca acaaaaaaa ccaccgctac agcggtggt      2340 ttgtttgccg gatcaagagc taccaactct ttttccgaag gtaactggct tcagcagagc    2400
gcagatacca atactgttc ttctagtgta gccgtagtta ggccaccact tcaagaactc     2460
tgtagcaccg cctacatacc tcgctctgct aatcctgtta ccagtggctg ctgccagtgg    2520
cgataagtcg tgtcttaccg ggttggactc aagacgatag ttaccggata aggcgcagcg    2580
gtcgggctga acggggggtt cgtgcacaca gcccagcttg gagcgaacga cctacaccga    2640
actgagatac ctacagcgtg agctatgaga aagcgccacg cttcccgaag ggagaaaggc    2700
ggacaggtat ccggtaagcg gcagggtcgg aacaggagag cgcacgaggg agcttccagg    2760
gggaaacgcc tggtatcttt atagtcctgt cgggtttcgc cacctctgac ttgagcgtcg    2820
atttttgtga tgctcgtcag gggggcggag cctatggaaa aacgccagca acgcggcctt    2880
tttacggttc ctggcctttt gctggccttt tgctcacatg ttctttcctg cgttatcccc    2940
tgattctgtg gataaccgta ttaccgcctt tgagtgagct gataccgctc gccgcagccg    3000
aacgaccgag cgcagcgagt cagtgagcga ggaagcggaa gagcgcccaa tacgcaaacc    3060
gcctctcccc gcgcgttggc cgattcatta atgcagctgg cacgacaggt ttcccgactg    3120
gaaagcgggc agtgagcgca acgcaattaa tgtgagttag ctcactcatt aggcacccca    3180
ggctttacac tttatgcttc cggctcgtat gttgtgtgga attgtgagcg gataacaatt    3240
tcacacagga aacagctatg accatgatta cgccagattt aattaaggcc ttaattaggc    3300
tgcgcgctcg ctcgctcact gaggccgccc gggcaaagcc cgggcgtcgg gcgacctttg    3360
gtcgcccggc ctcagtgagc gagcgagcgc gcagagaggg agtggccaac tccatcacta    3420
ggggttcctt gtagttaatg attaacccgc catgctactt atctaccagg gtaatgggga    3480
tcctctagaa ctatagctag tcgacattga ttattgacta gttattaata gtaatcaatt    3540
acggggtcat tagttcatag cccatatatg gagttccgcg ttacataact tacggtaaat    3600
ggcccgcctg gctgaccgcc caacgacccc cgcccattga cgtcaataat gacgtatgtt    3660
cccatagtaa cgccaatagg gactttccat tgacgtcaat gggtggagta tttacggtaa    3720
actgcccact tggcagtaca tcaagtgtat catatgccaa gtacgccccc tattgacgtc    3780
aatgacggta aatggcccgc ctggcattat gcccagtaca tgaccttatg gactttcct     3840 acttggcagt acatctacgt attagtcatc gctattacca tggtcgaggt gagccccacg    3900
ttctgcttca ctctccccat ctccccccc tccccacccc caattttgta tttatttatt    3960
ttttaattat tttgtgcagc gatggggcg ggggggggg ggggcgcgc gccaggcggg       4020 gcggggcggg gcgaggggcg gggcgggcg aggcggagag gtgcggcggc agccaatcag    4080
agcggcgcgc tccgaaagtt tccttttatg gcgaggcggc ggcggcggcg gccctataaa    4140
aagcgaagcg cgcggcgggc ggggagtcgc tgcgacgctg ccttcgcccc gtgccccgct    4200
```

```
ccgccgccgc ctcgcgccgc ccgccccggc tctgactgac cgcgttactc ccacaggtga    4260
gcgggcggga cggcccttct cctccgggct gtaattagcg cttggtttaa tgacggcttg    4320
tttcttttct gtggctgcgt gaaagccttg aggggctccg ggagggccct ttgtgcgggg    4380
ggagcggctc ggggggtgcg tgcgtgtgtg tgtgcgtggg gagcgccgcg tgcggctccg    4440
cgctgcccgg cggctgtgag cgctgcgggc gcggcgcggg gctttgtgcg ctccgcagtg    4500
tgcgcgaggg gagcgcggcc ggggggcgtg ccccgcggtg cgggggggc tgcgagggga    4560 acaaaggctg cgtgcggggt gtgtgcgtgg ggggtgagc aggggtgtg ggcgcgtcgg    4620 tcgggctgca accccccctg cacccccctc cccgagttgc tgagcacggc ccggcttcgg    4680
gtgcggggct ccgtacgggg cgtggcgcgg ggctcgccgt gccgggcggg gggtggcggc    4740
aggtgggggt gccgggcggg gcggggccgc ctcgggccgg ggagggctcg gggagggggc    4800
gcggcggccc ccgagcgcc ggcggctgtc gaggcgcggc gagccgcagc cattgccttt    4860
tatggtaatc gtgcgagagg gcgcaggac ttcctttgtc ccaaatctgt gcggagccga    4920
aatctgggag gcgccgccgc accccctcta gcgggcgcgg ggcgaagcgg tgcggcgccg    4980
gcaggaagga aatgggcggg gagggccttc gtgcgtcgcc gcgccgccgt ccccttctcc    5040
ctctccagcc tcgggctgt ccgcgggggg acggctgcct tcgggggga cggggcaggg    5100 cggggttcgg cttctggcgt gtgaccggcg gctctagagc ctctgctaac catgttcatg    5160
ccttcttctt tttcctacag ctcctgggca acgtgctggt tattgtgctg tctcatcatt    5220
ttggcaaaga attcatgcca tccgagtaca cctacgtgaa gctgcggtct gactgcagcc    5280
gcccatccct gcagtggtac acaagagccc agagcaagat gaggagaccc tccctgctgc    5340
tgaaggatat cctgaagtgc accctgctgg tgtttggcgt gtggatcctg tacatcctga    5400
agctgaacta caccacagag gagtgtgaca tgaagaagat gcactacgtg gaccctgatc    5460
acgtgaagag ggcccagaag tacgctcagc aggtgctgca aaggagtgt agaccaaagt    5520 ttgccaagac aagcatggct ctgctgttcg agcaccggta ctccgtggat ctgctgcctt    5580 tgtgcagaa ggccccaaag gactctgagg ctgagagcaa gtacgatccc cctttcggct    5640
ttcgcaagtt cagctccaag gtgcagaccc tgctggagct gctgccagag cacgacctgc    5700
ccgagcacct gaaggctaag acatgcagga ggtgcgtggt catcggatcc ggaggaatcc    5760
tgcacggact ggagctggga cacaccctga accagttcga cgtggtcatc aggctgaact    5820
ccgccccagt ggagggctac tctgagcacg tgggaaacaa gaccacaatc agaatgacat    5880
accccgaggg agctccctg tctgacctgg agtactacag caacgatctg ttcgtggccg    5940
tgctgtttaa gtctgtggac ttcaactggc tgcaggctat ggtgaagaag gagaccctgc    6000
ccttttgggt gcggctgttc tttggaagc aggtggccga aagatccca ctgcagccca    6060 agcacttccg catcctgaac cctgtgatca tcaaggagac agcttttgac atcctgcagt    6120
actccgagcc ccagtctagg ttctgggca gagataagaa cgtgcctacc atcggagtga    6180
tcgccgtggt gctggctaca cacctgtgcg acgaggtgtc tctggccggc tttggatacg    6240
atctgaacca gcctaggacc ccactgcact actttgacag ccagtgtatg gccgctatga    6300
acttccagac catgcacaac gtgaccacag agacaaagtt cctgctgaag ctggtgaaag    6360
agggggtggt gaaagacctg agcggggta ttgaccgaga gttttgaacg cg            6412
```

<210> SEQ ID NO 13
<211> LENGTH: 6328
<212> TYPE: DNA
<213> ORGANISM: Artificial Sequence
<220> FEATURE:
<223> OTHER INFORMATION: Synthetic Polynucleotide

<400> SEQUENCE: 13

```
tggtacccaa acaccattgt cacactccac aaacaccatt gtcacactcc acaaacacca      60
ttgtcacact ccaggtacct ctagagtcga cccgggcggc ctcgaggacg gggtgaacta     120
cgcctgagga tccgatcttt ttccctctgc caaaaattat ggggacatca tgaagcccct     180
tgagcatctg acttctggct aataaaggaa atttattttc attgcaatag tgtgttggaa     240
ttttttgtgt ctctcactcg gaagcaattc gttgatctga atttcgacca cccataatac     300
ccattaccct ggtagataag tagcatggcg ggttaatcat taactacaag gaacccctag     360
tgatggagtt ggccactccc tctctgcgcg ctcgctcgct cactgaggcc gggcgaccaa     420
aggtcgcccg acgcccgggc tttgcccggg cggcctcagt gagcgagcga gcgcgcagcc     480
ttaattaacc taattcactg gccgtcgttt tacaacgtcg tgactgggaa accctggcg      540
ttacccaact taatcgcctt gcagcacatc cccctttcgc cagctggcgt aatagcgaag     600
aggcccgcac cgatcgccct tcccaacagt tgcgcagcct gaatggcgaa tgggacgcgc     660
cctgtagcgg cgcattaagc gcggcgggtg tggtggttac gcgcagcgtg accgctacac     720
ttgccagcgc cctagcgccc gctccttcg ctttcttccc ttcctttctc gccacgttcg     780
ccggctttcc ccgtcaagct ctaaatcggg ggctcccttt agggttccga tttagtgctt     840
tacggcacct cgaccccaaa aaacttgatt agggtgatgg ttcacgtagt gggccatcgc     900
cctgatagac ggttttttcgc cctttgacgt tggagtccac gttctttaat agtggactct     960
tgttccaaac tggaacaaca ctcaaccta tctcggtcta ttcttttgat ttataaggga    1020
ttttgccgat ttcggcctat tggttaaaaa atgagctgat ttaacaaaaa tttaacgcga    1080
attttaacaa aatattaacg cttacaattt aggtggcact tttcggggaa atgtgcgcgg    1140
aaccctatt tgtttatttt tctaaataca ttcaaatatg tatccgctca tgagacaata    1200
accctgataa atgcttcaat aatattgaaa aaggaagagt atgagtattc aacatttccg    1260
tgtcgccctt attcccttt ttgcggcatt ttgccttcct gttttgctc acccagaaac    1320
gctggtgaaa gtaaaagatg ctgaagatca gttgggtgca cgagtgggtt acatcgaact    1380
ggatctcaac agcggtaaga tccttgagag ttttcgcccc gaagaacgtt ttccaatgat    1440
gagcactttt aaagttctgc tatgtggcgc ggtattatcc cgtattgacg ccgggcaaga    1500
gcaactcggt cgccgcatac actattctca gaatgacttg gttgagtact caccagtcac    1560
agaaaagcat cttacggatg gcatgacagt aagagaatta tgcagtgctg ccataaccat    1620
gagtgataac actgcggcca acttacttct gacaacgatc ggaggaccga aggagctaac    1680
cgctttttttg cacaacatgg gggatcatgt aactcgcctt gatcgttggg aaccggagct    1740
gaatgaagcc ataccaaacg acgagcgtga caccacgatg cctgtagcaa tggcaacaac    1800
gttgcgcaaa ctattaactg gcgaactact tactctagct tcccggcaac aattaataga    1860
ctggatggag gcggataaag ttgcaggacc acttctgcgc tcggcccttc cggctggctg    1920
gtttattgct gataaatctg gagccggtga gcgtgggtct cgcggtatca ttgcagcact    1980
ggggccagat ggtaagccct cccgtatcgt agttatctac acgacgggga gtcaggcaac    2040
tatggatgaa cgaaatagac agatcgctga gataggtgcc tcactgatta agcattggta    2100
actgtcagac caagtttact catatatact ttagattgat ttaaaacttc atttttaatt    2160
taaaaggatc taggtgaaga tcctttttga taatctcatg accaaaatcc cttaacgtga    2220
```

```
gttttcgttc cactgagcgt cagacccgt agaaaagatc aaaggatctt cttgagatcc      2280 ttttttctg cgcgtaatct gctgcttgca aacaaaaaaa ccaccgctac cagcggtggt      2340
ttgtttgccg gatcaagagc taccaactct ttttccgaag gtaactggct tcagcagagc     2400
gcagatacca aatactgttc ttctagtgta gccgtagtta ggccaccact tcaagaactc    2460
tgtagcaccg cctacatacc tcgctctgct aatcctgtta ccagtggctg ctgccagtgg    2520
cgataagtcg tgtcttaccg ggttggactc aagacgatag ttaccggata aggcgcagcg    2580
gtcgggctga acggggggtt cgtgcacaca gcccagcttg gagcgaacga cctacaccga    2640
actgagatac ctacagcgtg agctatgaga aagcgccacg cttcccgaag ggagaaaggc    2700
ggacaggtat ccggtaagcg gcagggtcgg aacaggagag cgcacgaggg agcttccagg    2760
gggaaacgcc tggtatcttt atagtcctgt cgggtttcgc cacctctgac ttgagcgtcg    2820 attttttgtga tgctcgtcag gggggcggag cctatggaaa aacgccagca acgcggcctt   2880
tttacggttc ctggcctttt gctggccttt tgctcacatg ttctttcctg cgttatcccc    2940
tgattctgtg gataaccgta ttaccgcctt tgagtgagct gataccgctc gccgcagccg    3000
aacgaccgag cgcagcgagt cagtgagcga ggaagcggaa gagcgcccaa tacgcaaacc    3060
gcctctcccc gcgcgttggc cgattcatta atgcagctgg cacgacaggt ttcccgactg    3120
gaaagcgggc agtgagcgca acgcaattaa tgtgagttag ctcactcatt aggcaccccca   3180 ggctttacac tttatgcttc cggctcgtat gttgtgtgga attgtgagcg gataacaatt    3240
tcacacagga aacagctatg accatgatta cgccagattt aattaaggcc ttaattaggc    3300
tgcgcgctcg ctcgctcact gaggccgccc gggcaaagcc cgggcgtcgg gcgacctttg    3360
gtcgcccggc ctcagtgagc gagcgagcgc gcagagaggg agtggccaac tccatcacta    3420
ggggttcctt gtagttaatg attaacccgc catgctactt atctaccagg gtaatgggga    3480
tcctctagaa ctatagctag tcgacattga ttattgacta gttattaata gtaatcaatt    3540
acggggtcat tagttcatag cccatatatg gagttccgcg ttacataact tacggtaaat    3600
ggcccgcctg gctgaccgcc caacgacccc cgcccattga cgtcaataat gacgtatgtt    3660
cccatagtaa cgccaatagg gactttccat tgacgtcaat gggtggagta tttacggtaa    3720
actgcccact tggcagtaca tcaagtgtat catatgccaa gtacgccccc tattgacgtc    3780
aatgacggta aatggcccgc ctggcattat gcccagtaca tgaccttatg gactttcct    3840 acttggcagt acatctacgt attagtcatc gctattacca tggtcgaggt gagccccacg    3900
ttctgcttca ctctccccat ctccccccc tccccacccc caattttgta tttatttatt    3960
ttttaattat tttgtgcagc gatggggcg gggggggggg ggggcgcgc gccaggcggg     4020 gcggggcggg gcgaggggcg gggcggggcg aggcggagag gtgcggcggc agccaatcag    4080
agcggcgcgc tccgaaagtt ccttttatg gcgaggcggc ggcggcggcg ccctataaa     4140 aagcgaagcg cgcggcgggc ggggagtcgc tgcgacgctg ccttcgcccc gtgccccgct    4200
ccgccgccgc ctcgcgccgc ccgccccggc tctgactgac cgcgttactc ccacaggtga    4260
gcgggcggga cggcccttct cctccgggct gtaattagcg cttggtttaa tgacggcttg    4320
tttcttttct gtggctgcgt gaaagccttg aggggctccg ggagggccct ttgtgcgggg    4380
ggagcggctc ggggggtgcg tgcgtgtgtg tgtgcgtggg gagcgccgcg tgcggctccg    4440
cgctgcccgg cggctgtgag cgctgcgggc gcggcgcggg gctttgtgcg ctccgcagtg    4500
tgcgcgaggg gagcgcggcc ggggggcggtg ccccgcggtg cggggggggc tgcgagggga   4560
acaaaggctg cgtgcggggt gtgtgcgtgg gggggtgagc aggggtgtg ggcgcgtcgg     4620
```

```
tcgggctgca accccccctg caccccccto cocgagttgo tgagcacggo coggottcgg    4680 gtgoggggct ccgtacgggg cgtggcgcgg ggctcgccgt gccgggcggg gggtggcggc    4740 aggtggggt gccgggcggg gcggggccgc ctcgggccgg ggagggctcg ggggagggc     4800 gcggcggccc ccggagcgcc ggcggctgtc gaggcgcggc gagccgcagc cattgccttt    4860
tatggtaatc gtgcgagagg gcgcagggac ttcctttgtc ccaaatctgt gcggagccga    4920
aatctgggag gcgccgccgc acccctcta gcgggcgcgg ggcgaagcgg tgcggcgccg    4980
gcaggaagga aatgggcggg gagggccttc gtgcgtcgcc gcgccgccgt ccccttctcc    5040
ctctccagcc tcgggctgt ccgcgggggg acggctgcct tcgggggga cggggcaggg     5100 cggggttcgg cttctggcgt gtgaccggcg gctctagagc ctctgctaac catgttcatg    5160
ccttcttctt tttcctacag ctcctgggca acgtgctggt tattgtgctg tctcatcatt    5220
ttggcaaaga attcatgagg agaccctccc tgctgctgaa ggatatcctg aagtgcaccc    5280
tgctggtgtt tggcgtgtgg atcctgtaca tcctgaagct gaactacacc acagaggagt    5340
gtgacatgaa gaagatgcac tacgtggacc ctgatcacgt gaagagggcc cagaagtacg    5400
ctcagcaggt gctgcagaag gagtgtagac caaagtttgc caagacaagc atggctctgc    5460
tgttcgagca ccggtactcc gtggatctgc tgccttttgt gcagaaggcc caaaggact     5520 ctgaggctga gagcaagtac gatccccctt tcggctttcg caagttcagc tccaaggtgc    5580
agaccctgct ggagctgctg ccagagcacg acctgcccga gcacctgaag gctaagacat    5640
gcaggaggtg cgtggtcatc ggatccgag gaatcctgca cggactggag ctgggacaca    5700
ccctgaacca gttcgacgtg gtcatcaggc tgaactccgc cccagtggag ggctactctg    5760
agcacgtggg aaacaagacc acaatcagaa tgacataccc cgagggagct cctctgtctg    5820
acctggagta ctacagcaac gatctgttcg tggccgtgct gtttaagtct gtggacttca    5880
actggctgca ggctatggtg aagaaggaga ccctgccctt tgggtgcgg ctgttctttt     5940 ggaagcaggt ggccgagaag atcccactgc agcccaagca cttccgcatc ctgaaccctg    6000
tgatcatcaa ggagacagct tttgacatcc tgcagtactc cgagcccag tctaggttct    6060 gggcagaga taagaacgtg cctaccatcg gagtgatcgc cgtggtgctg gctacacacc     6120
tgtgcgacga ggtgtctctg gccggctttg gatacgatct gaaccagcct aggaccccac    6180
tgcactactt tgacagccag tgtatggccg ctatgaactt ccagaccatg cacaacgtga    6240
ccacagagac aaagttcctg ctgaagctgg tgaaagaggg ggtggtgaaa gacctgagcg    6300
ggggtattga ccgagagttt tgaacgcg                                        6328
```

<210> SEQ ID NO 14
<211> LENGTH: 6334
<212> TYPE: DNA
<213> ORGANISM: Artificial Sequence
<220> FEATURE:
<223> OTHER INFORMATION: Synthetic Polynucleotide

<400> SEQUENCE: 14

```
tggtacccaa acaccattgt cacactccac aaacaccatt gtcacactcc acaaacacca      60
ttgtcacact ccaggtacct ctagagtcga cccgggcggc ctcgaggacg gggtgaacta    120
cgcctgagga tccgatcttt ttccctctgc caaaaattat ggggacatca tgaagcccct    180
tgagcatctg acttctggct aataaaggaa atttattttc attgcaatag tgtgttggaa    240 tttttttgtgt ctctcactcg gaagcaattc gttgatctga atttcgacca cccataatac    300
```

-continued

```
ccattaccct ggtagataag tagcatggcg ggttaatcat taactacaag gaacccctag      360
tgatggagtt ggccactccc tctctgcgcg ctcgctcgct cactgaggcc gggcgaccaa      420
aggtcgcccg acgcccgggc tttgcccggg cggcctcagt gagcgagcga gcgcgcagcc      480
ttaattaacc taattcactg gccgtcgttt tacaacgtcg tgactgggaa accctggcg       540 ttacccaact taatcgcctt gcagcacatc ccctttcgc cagctggcgt aatagcgaag       600
aggcccgcac cgatcgccct tcccaacagt tgcgcagcct gaatggcgaa tgggacgcgc      660
cctgtagcgg cgcattaagc gcggcgggtg tggtggttac gcgcagcgtg accgctacac      720
ttgccagcgc cctagcgccc gctcctttcg ctttcttccc ttcctttctc gccacgttcg      780
ccggctttcc ccgtcaagct ctaaatcggg ggctccctt agggttccga tttagtgctt       840
tacggcacct cgaccccaaa aaacttgatt agggtgatgg ttcacgtagt gggccatcgc      900
cctgatagac ggttttcgc cctttgacgt tggagtccac gttctttaat agtggactct       960
tgttccaaac tggaacaaca ctcaaccctâ tctcggtcta ttcttttgat ttataaggga     1020
ttttgccgat ttcggcctat tggttaaaaa atgagctgat ttaacaaaaa tttaacgcga    1080
attttaacaa atattaacg cttacaattt aggtggcact tttcggggaa atgtgcgcgg      1140
aacccctatt tgtttatttt tctaaataca ttcaaatatg tatccgctca tgagacaata    1200
accctgataa atgcttcaat aatattgaaa aaggaagagt atgagtattc aacatttccg    1260
tgtcgccctt attccctttt ttgcggcatt ttgccttcct gtttttgctc acccagaaac    1320
gctggtgaaa gtaaaagatg ctgaagatca gttgggtgca cgagtgggtt acatcgaact    1380
ggatctcaac agcggtaaga tccttgagag ttttcgcccc gaagaacgtt ttccaatgat    1440
gagcactttt aaagttctgc tatgtggcgc ggtattatcc cgtattgacg ccgggcaaga    1500
gcaactcggt cgccgcatac actattctca gaatgacttg gttgagtact caccagtcac    1560
agaaaagcat cttacggatg gcatgacagt aagagaatta tgcagtgctg ccataaccat    1620
gagtgataac actgcggcca acttacttct gacaacgatc ggaggaccga aggagctaac    1680
cgcttttttg cacaacatgg ggatcatgt aactcgcctt gatcgttggg aaccggagct    1740
gaatgaagcc ataccaaacg acgagcgtga caccacgatg cctgtagcaa tggcaacaac    1800
gttgcgcaaa ctattaactg gcgaactact tactctagct tcccggcaac aattaataga    1860
ctggatggag gcggataaag ttgcaggacc acttctgcgc tcggcccttc cggctggctg    1920
gtttattgct gataaatctg gagccggtga gcgtgggtct cgcggtatca ttgcagcact    1980
ggggccagat ggtaagccct cccgtatcgt agttatctac acgacgggga gtcaggcaac    2040
tatggatgaa cgaaatagac agatcgctga gataggtgcc tcactgatta agcattggta    2100
actgtcagac caagtttact catatatact ttagattgat ttaaaacttc atttttaatt    2160
taaaaggatc taggtgaaga tcctttttga taatctcatg accaaaatcc cttaacgtga    2220
gttttcgttc cactgagcgt cagacccgcgt agaaaagatc aaaggatctt cttgagatcc    2280 ttttttctg cgcgtaatct gctgcttgca acaaaaaaa ccaccgctac cagcggtggt      2340
ttgtttgccg gatcaagagc taccaactct ttttccgaag gtaactggct tcagcagagc    2400
gcagatacca atactgttc ttctagtgta gccgtagtta ggccaccact tcaagaactc     2460
tgtagcaccg cctacatacc tcgctctgct aatcctgtta ccagtggctg ctgccagtgg    2520
cgataagtcg tgtcttaccg ggttggactc aagacgatag ttaccggata aggcgcagcg    2580
gtcgggctga acggggggtt cgtgcacaca gcccagcttg gagcgaacga cctacaccga    2640
actgagatac ctacagcgtg agctatgaga aagcgccacg cttcccgaag ggagaaaggc    2700
```

```
ggacaggtat ccggtaagcg gcagggtcgg aacaggagag cgcacgaggg agcttccagg    2760
gggaaacgcc tggtatcttt atagtcctgt cgggtttcgc cacctctgac ttgagcgtcg    2820
atttttgtga tgctcgtcag gggggcggag cctatggaaa aacgccagca acgcggcctt    2880
tttacggttc ctggccttt gctggccttt tgctcacatg ttctttcctg cgttatcccc     2940
tgattctgtg gataaccgta ttaccgcctt tgagtgagct gataccgctc gccgcagccg    3000
aacgaccgag cgcagcgagt cagtgagcga ggaagcggaa gagcgcccaa tacgcaaacc    3060
gcctctcccc gcgcgttggc cgattcatta atgcagctgg cacgacaggt ttcccgactg    3120
gaaagcgggc agtgagcgca acgcaattaa tgtgagttag ctcactcatt aggcacccca    3180
ggctttacac tttatgcttc cggctcgtat gttgtgtgga attgtgagcg gataacaatt    3240
tcacacagga aacagctatg accatgatta cgccagattt aattaaggcc ttaattaggc    3300
tgcgcgctcg ctcgctcact gaggccgccc gggcaaagcc cgggcgtcgg gcgacctttg    3360
gtcgcccggc ctcagtgagc gagcgagcgc gcagagaggg agtggccaac tccatcacta    3420
ggggttcctt gtagttaatg attaacccgc catgctactt atctaccagg gtaatgggga    3480
tcctctagaa ctatagctag tcgacattga ttattgacta gttattaata gtaatcaatt    3540
acggggtcat tagttcatag cccatatatg gagttccgcg ttacataact tacggtaaat    3600
ggcccgcctg gctgaccgcc caacgacccc cgcccattga cgtcaataat gacgtatgtt    3660
cccatagtaa cgccaatagg gactttccat tgacgtcaat gggtggagta tttacggtaa    3720
actgcccact tggcagtaca tcaagtgtat catatgccaa gtacgccccc tattgacgtc    3780
aatgacggta aatggcccgc ctggcattat gcccagtaca tgaccttatg ggactttcct    3840
acttggcagt acatctacgt attagtcatc gctattacca tggtcgaggt gagccccacg    3900
ttctgcttca ctctccccat ctccccccc tccccacccc caattttgta tttatttatt    3960
ttttaattat tttgtgcagc gatggggggc ggggggggg ggggcgcgc gccaggcggg     4020 gcggggcggg gcgaggggcg gggcgggcg aggcggagag gtgcggcggc agccaatcag     4080
agcggcgcgc tccgaaagtt tccttttatg gcgaggcggc ggcggcggcg gccctataaa    4140
aagcgaagcg cgcggcgggc ggggagtcgc tgcgacgctg ccttcgcccc gtgccccgct    4200
ccgccgccgc ctcgcgccgc ccgccccggc tctgactgac cgcgttactc ccacaggtga    4260
gcgggcggga cggcccttct cctccgggct gtaattagcg cttggtttaa tgacggcttg    4320
tttcttttct gtggctgcgt gaaagccttg aggggctccg ggagggccct ttgtgcgggg    4380
ggagcggctc gggggtgcg tgcgtgtgtg tgtgcgtggg gagcgccgcg tgcggctccg     4440
cgctgcccgg cggctgtgag cgctgcgggc gcggcgcggg gctttgtgcg ctccgcagtg    4500
tgcgcgaggg gagcgcggcc ggggcggtg ccccgcggtg cggggggc tgcgagggga       4560 acaaaggctg cgtgcgggt gtgtgcgtgg ggggtgagc aggggtgtg ggcgcgtcgg       4620 tcgggctgca acccccctg cacccccctc cccgagttgc tgagcacggc ccggcttcgg     4680
gtgcggggct ccgtacgggg cgtggcgcgg ggctcgccgt gccgggcggg gggtggcggc    4740
aggtgggggt gccggggcgg ggcgggccgc ctcgggccgg ggagggctcg ggggaggggc    4800
gcggcggccc ccgagcgcc ggcggctgtc gaggcgcggc gagccgcagc cattgccttt     4860
tatggtaatc gtgcgagagg gcgcaggac ttcctttgtc ccaaatctgt gcggagccga     4920
aatctgggag gcgccgccgc accccctcta gcgggcgcgg ggcgaagcgg tgcggcgccg    4980
gcaggaagga aatgggcggg gagggccttc gtgcgtcgcc gcgccgccgt cccttctcc    5040
```

```
ctctccagcc tcggggctgt ccgcgggggg acggctgcct tcggggggga cggggcaggg    5100
cggggttcgg cttctggcgt gtgaccggcg gctctagagc ctctgctaac catgttcatg    5160
ccttcttctt tttcctacag ctcctgggca acgtgctggt tattgtgctg tctcatcatt    5220
ttggcaaaga attcgccacc atgagggagac cctccctgct gctgaaggat atcctgaagt    5280
gcaccctgct ggtgtttggc gtgtggatcc tgtacatcct gaagctgaac tacaccacag    5340
aggagtgtga catgaagaag atgcactacg tggaccctga tcacgtgaag agggcccaga    5400
agtacgctca gcaggtgctg cagaaggagt gtagaccaaa gtttgccaag acaagcatgg    5460
ctctgctgtt cgagcaccgg tactccgtgg atctgctgcc ttttgtgcag aaggccccaa    5520
aggactctga ggctgagagc aagtacgatc cccctttcgg ctttcgcaag ttcagctcca    5580
aggtgcagac cctgctggag ctgctgccag agcacgacct gcccgagcac ctgaaggcta    5640
agacatgcag gaggtgcgtg gtcatcggat ccggaggaat cctgcacgga ctggagctgg    5700
gacacaccct gaaccagttc gacgtggtca tcaggctgaa ctccgcccca gtggagggct    5760
actctgagca cgtgggaaac aagaccacaa tcagaatgac ataccccgag ggagctcctc    5820
tgtctgacct ggagtactac agcaacgatc tgttcgtggc cgtgctgttt aagtctgtgg    5880
acttcaactg gctgcaggct atggtgaaga aggagaccct gcccttttgg gtgcggctgt    5940
tctttttggaa gcaggtggcc gagaagatcc cactgcagcc caagcacttc cgcatcctga    6000
accctgtgat catcaaggag acagcttttg acatcctgca gtactccgag ccccagtcta    6060
ggttctgggg cagagataag aacgtgccta ccatcggagt gatcgccgtg gtgctggcta    6120
cacacctgtg cgacgaggtg tctctggccg gcttttggata cgatctgaac cagcctagga    6180
ccccactgca ctactttgac agccagtgta tggccgctat gaacttccag accatgcaca    6240
acgtgaccac agagacaaag ttcctgctga agctggtgaa agaggggtg gtgaaagacc    6300
tgagcggggg tattgaccga gagttttgaa cgcg                                 6334
```

<210> SEQ ID NO 15
<211> LENGTH: 4725
<212> TYPE: DNA
<213> ORGANISM: Artificial Sequence
<220> FEATURE:
<223> OTHER INFORMATION: Synthetic Polynucleotide

<400> SEQUENCE: 15

```
tggtacccaa acaccattgt cacactccac aaacaccatt gtcacactcc acaaacacca      60
ttgtcacact ccaggtacct ctagagtcga cccgggcggc ctcgaggacg gggtgaacta     120
cgcctgagga tccgatcttt ttccctctgc caaaaattat ggggacatca tgaagcccct     180
tgagcatctg acttctggct aataaaggaa atttattttc attgcaatag tgtgttggaa     240
ttttttgtgt ctctcactcg gaagcaattc gttgatctga atttcgacca cccataatac     300
ccattaccct ggtagataag tagcatggcg ggttaatcat taactacaag gaaccctag     360
tgatggagtt ggccactccc tctctgcgcg ctcgctcgct cactgaggcc gggcgaccaa     420
aggtcgcccg acgcccgggc tttgcccggg cggcctcagt gagcgagcga gcgcgcagcc     480
ttaattaacc taattcactg gccgtcgttt tacaacgtcg tgactgggaa accctggcg     540
ttacccaact taatcgcctt gcagcacatc ccccttttcgc cagctggcgt aatagcgaag     600
aggcccgcac cgatcgccct tcccaacagt tgcgcagcct gaatggcgaa tgggacgcgc     660
cctgtagcgg cgcattaagc gcggcgggtg tggtggttac gcgcagcgtg accgctacac     720
ttgccagcgc cctagcgccc gctcctttcg ctttcttccc ttcctttctc gccacgttcg     780
```

```
ccggctttcc ccgtcaagct ctaaatcggg ggctcccttt agggttccga tttagtgctt    840
tacggcacct cgaccccaaa aaacttgatt agggtgatgg ttcacgtagt gggccatcgc    900
cctgatagac ggttttccgc cctttgacgt tggagtccac gttctttaat agtggactct    960
tgttccaaac tggaacaaca ctcaacccta tctcggtcta ttcttttgat ttataaggga   1020
ttttgccgat ttcggcctat tggttaaaaa atgagctgat ttaacaaaaa tttaacgcga   1080
attttaacaa aatattaacg cttacaattt aggtggcact tttcggggaa atgtgcgcgg   1140 aaccccctatt tgtttatttt tctaaataca ttcaaatatg tatccgctca tgagacaata   1200
accctgataa atgcttcaat aatattgaaa aggaagagt atgagtattc aacatttccg   1260
tgtcgccctt attccttttt tgcggcatt ttgccttcct gttttgctc acccagaaac     1320 gctggtgaaa gtaaaagatg ctgaagatca gttgggtgca cgagtgggtt acatcgaact   1380
ggatctcaac agcggtaaga tccttgagag ttttcgcccc gaagaacgtt ttccaatgat   1440
gagcactttt aaagttctgc tatgtggcgc ggtattatcc cgtattgacg ccgggcaaga   1500
gcaactcggt cgccgcatac actattctca gaatgacttg gttgagtact caccagtcac   1560
agaaaagcat cttacggatg gcatgacagt aagagaatta tgcagtgctg ccataaccat   1620
gagtgataac actgcggcca acttacttct gacaacgatc ggaggaccga aggagctaac   1680
cgcttttttg cacaacatgg ggatcatgt aactcgcctt gatcgttggg aaccggagct   1740
gaatgaagcc ataccaaacg acgagcgtga caccacgatg cctgtagcaa tggcaacaac   1800
gttgcgcaaa ctattaactg gcgaactact tactctagct tcccggcaac aattaataga   1860
ctggatggag gcggataaag ttgcaggacc acttctgcgc tcggcccttc cggctggctg   1920
gtttattgct gataaatctg gagccggtga gcgtgggtct cgcggtatca ttgcagcact   1980
ggggccagat ggtaagccct cccgtatcgt agttatctac acgacgggga gtcaggcaac   2040
tatggatgaa cgaaatagac agatcgctga gataggtgcc tcactgatta agcattggta   2100
actgtcagac caagtttact catatatact ttagattgat ttaaaacttc attttttaatt   2160 taaaaggatc taggtgaaga tcctttttga atctcatg accaaaatcc cttaacgtga   2220
gttttcgttc cactgagcgt cagaccccgt agaaaagatc aaaggatctt cttgagatcc   2280 ttttttctg cgcgtaatct gctgcttgca acaaaaaaa ccaccgctac cagcggtggt    2340
ttgtttgccg gatcaagagc taccaactct ttttccgaag gtaactggct tcagcagagc   2400
gcagatacca aatactgttc ttctagtgta gccgtagtta ggccaccact tcaagaactc   2460
tgtagcaccg cctacatacc tcgctctgct aatcctgtta ccagtggctg ctgccagtgg   2520
cgataagtcg tgtcttaccg ggttggactc aagacgatag ttaccggata aggcgcagcg   2580
gtcgggctga acggggggtt cgtgcacaca gcccagcttg gagcgaacga cctacaccga   2640
actgagatac ctacagcgtg agctatgaga aagcgccacg cttcccgaag ggagaaaggc   2700
ggacaggtat ccggtaagcg gcagggtcgg aacaggagag cgcacgaggg agcttccagg   2760
gggaaacgcc tggtatcttt atagtcctgt cgggtttcgc cacctctgac ttgagcgtcg   2820
atttttgtga tgctcgtcag gggggcggag cctatggaaa aacgccagca acgcggcctt   2880
tttacggttc ctggcctttt gctggccttt tgctcacatg ttctttcctg cgttatcccc   2940
tgattctgtg ataaccgta ttaccgcctt tgagtgagct gataccgctc gccgcagccg    3000
aacgaccgag cgcagcgagt cagtgagcga ggaagcggaa gagcgcccaa tacgcaaacc   3060
gcctctcccc gcgcgttggc cgattcatta atgcagctgg cacgacaggt ttcccgactg   3120
```

-continued

```
gaaagcgggc agtgagcgca acgcaattaa tgtgagttag ctcactcatt aggcacccca    3180
ggctttacac tttatgcttc cggctcgtat gttgtgtgga attgtgagcg gataacaatt    3240
tcacacagga aacagctatg accatgatta cgccagattt aattaaggcc ttaattaggc    3300
tgcgcgctcg ctcgctcact gaggccgccc gggcaaagcc cgggcgtcgg gcgacctttg    3360
gtcgcccggc ctcagtgagc gagcgagcgc gcagagaggg agtggccaac tccatcacta    3420
ggggttcctt gtagttaatg attaacccgc catgctactt atctaccagg gtaatgggga    3480
tcctctagaa ctatagctag tcgacattga ttattgacta gtagtgcaag tgggttttag    3540
gaccaggatg aggcggggtg ggggtgccta cctgacgacc gaccccgacc cactggacaa    3600
gcacccaacc cccattcccc aaattgcgca tccccctatca gagaggggga ggggaaacag    3660
gatgcggcga ggcgcgtgcg cactgccagc ttcagcaccg cggacagtgc cttcgccccc    3720
gcctggcggc gcgcgccacc gccgcctcag cactgaaggc gcgctgacgt cactcgccgg    3780
tcccccgcaa actccccttc ccggccacct tggtcgcgtc cgcgccgccg ccggcccagc    3840
cggaccgcac cacgcgaggc gcgagatagg ggggcacggg cgcgaccatc tgcgctgcgg    3900
cgccggcgac tcagcgctgc ctcagtctgc ggtgggcagc ggaggagtcg tgtcgtgcct    3960
gagagcgcag gaattcgcca ccatggtgag caagggcgag gagctgttca ccggggtggt    4020
gcccatcctg gtcgagctgg acggcgacgt aaacggccac aagttcagcg tgtccggcga    4080
gggcgagggc gatgccacct acggcaagct gaccctgaag ttcatctgca ccaccggcaa    4140
gctgcccgtg cccctggccca ccctcgtgac caccctgacc tacggcgtgc agtgcttcag    4200
ccgctacccc gaccacatga gcagcacga cttcttcaag tccgccatgc ccgaaggcta    4260
cgtccaggag cgcaccatct tcttcaagga cgacggcaac tacaagaccc gcgccgaggt    4320
gaagttcgag ggcgacaccc tggtgaaccg catcgagctg aagggcatcg acttcaagga    4380
ggacggcaac atcctggggc acaagctgga gtacaactac aacagccaca cgtctatat    4440
catgccgac aagcagaaga acggcatcaa ggtgaacttc aagatccgcc acaacatcga    4500
ggacggcagc gtgcagctcg ccgaccacta ccagcagaac ccccatcg cgacggccc    4560
cgtgctgctg cccgacaacc actacctgag cacccagtcc gccctgagca agacccaa    4620
cgagaagcgc gatcacatgg tcctgctgga gttcgtgacc gccgccggga tcactctcgg    4680
catggacgag ctgtacaagt ccggactcag atcctactag acgcg                    4725
```

<210> SEQ ID NO 16
<211> LENGTH: 4967
<212> TYPE: DNA
<213> ORGANISM: Artificial Sequence
<220> FEATURE:
<223> OTHER INFORMATION: Synthetic Polynucleotide

<400> SEQUENCE: 16

```
tggtacccaa acaccattgt cacactccac aaacaccatt gtcacactcc acaaacacca     60
ttgtcacact ccaggtacct ctagagtcga cccgggcggc ctcgaggacg gggtgaacta    120
cgcctgagga tccgatcttt ttccctctgc caaaaattat ggggacatca tgaagcccct    180
tgagcatctg acttctggct aataaaggaa atttattttc attgcaatag tgtgttggaa    240
ttttttgtgt ctctcactcg gaagcaattc gttgatctga atttcgacca cccataatac    300
ccattaccct ggtagataag tagcatggcg ggttaatcat taactacaag gaacccctag    360
tgatggagtt ggccactccc tctctgcgcg ctcgctcgct cactgaggcc gggcgaccaa    420
aggtcgcccg acgcccgggc tttgcccggg cggcctcagt gagcgagcga gcgcgcagcc    480
```

```
ttaattaacc taattcactg gccgtcgttt tacaacgtcg tgactgggaa accctggcg    540 ttacccaact taatcgcctt gcagcacatc ccctttcgc cagctggcgt aatagcgaag    600
aggcccgcac cgatcgccct tcccaacagt tgcgcagcct gaatggcgaa tgggacgcgc   660
cctgtagcgg cgcattaagc gcggcgggtg tggtggttac gcgcagcgtg accgctacac   720
ttgccagcgc cctagcgccc gctcctttcg ctttcttccc ttcctttctc gccacgttcg   780
ccggctttcc ccgtcaagct ctaaatcggg gctccctttt agggttccga tttagtgctt   840
tacggcacct cgaccccaaa aaacttgatt agggtgatgg ttcacgtagt gggccatcgc   900
cctgatagac ggttttcgc cctttgacgt tggagtccac gttctttaat agtggactct    960
tgttccaaac tggaacaaca ctcaacccta tctcggtcta ttcttttgat ttataaggga   1020
ttttgccgat tcggcctat tggttaaaaaa atgagctgat ttaacaaaaa tttaacgcga   1080 atttttaacaa atattaacg cttacaattt aggtggcact tttcgggaa atgtgcgcgg    1140 aaccccctatt tgtttatttt tctaaataca ttcaaatatg tatccgctca tgagacaata   1200
accctgataa atgcttcaat aatattgaaa aaggaagagt atgagtattc aacatttccg   1260
tgtcgccctt attccctttt ttgcggcatt ttgccttcct gttttttgctc acccagaaac   1320 gctggtgaaa gtaaaagatg ctgaagatca gttgggtgca cgagtgggtt acatcgaact   1380
ggatctcaac agcggtaaga tccttgagag ttttcgccc gaagaacgtt ttccaatgat    1440
gagcactttt aaagttctgc tatgtggcgc ggtattatcc cgtattgacg ccgggcaaga   1500
gcaactcggt cgccgcatac actattctca gaatgacttg gttgagtact caccagtcac   1560
agaaaagcat cttacggatg gcatgacagt aagagaatta tgcagtgctg ccataaccat   1620
gagtgataac actgcggcca acttacttct gacaacgatc ggaggaccga aggagctaac   1680
cgcttttttg cacaacatgg gggatcatgt aactcgcctt gatcgttggg aaccggagct   1740
gaatgaagcc ataccaaacg acgagcgtga ccaccacgatg cctgtagcaa tggcaacaac   1800
gttgcgcaaa ctattaactg gcgaactact tactctagct tcccggcaac aattaataga   1860
ctggatggag gcggataaag ttgcaggacc acttctgcgc tcggcccttc cggctggctg   1920
gtttattgct gataaatctg gagccggtga gcgtgggtct cgcggtatca ttgcagcact   1980
ggggccagat ggtaagccct cccgtatcgt agttatctac acgacgggga gtcaggcaac   2040 tatgatgaa cgaaatagac agatcgctga gataggtgcc tcactgatta gcattggta    2100 actgtcagac caagtttact catatatact ttagattgat ttaaaacttc attttaatt    2160 taaaaggatc taggtgaaga tcctttttga atctcatg accaaaatcc cttaacgtga    2220
gttttcgttc cactgagcgt cagaccccgt agaaaagatc aaaggatctt cttgagatcc   2280 ttttttctg cgcgtaatct gctgcttgca acaaaaaaa ccaccgctac cagcggtggt    2340
ttgtttgccg gatcaagagc taccaactct ttttccgaag gtaactggct tcagcagagc   2400
gcagatacca aatactgttc ttctagtgta gccgtagtta ggccaccact tcaagaactc   2460
tgtagcaccg cctacatacc tcgctctgct aatcctgtta ccagtggctg ctgccagtgg   2520
cgataagtcg tgtcttaccg ggttggactc aagacgatag ttaccggata aggcgcagcg   2580
gtcgggctga acggggggtt cgtgcacaca gcccagcttg gagcgaacga cctacaccga   2640
actgagatac ctacagcgtg agctatgaga aagcgccacg cttcccgaag ggagaaaggc   2700
ggacaggtat ccggtaagcg gcagggtcgg aacaggagag cgcacgaggg agcttccagg   2760
gggaaacgcc tggtatcttt atagtcctgt cgggtttcgc cacctctgac ttgagcgtcg   2820
```

```
atttttgtga tgctcgtcag gggggcggag cctatggaaa aacgccagca acgcggcctt    2880
tttacggttc ctggccttt  gctggccttt tgctcacatg ttctttcctg cgttatcccc    2940
tgattctgtg gataaccgta ttaccgcctt tgagtgagct gataccgctc gccgcagccg    3000
aacgaccgag cgcagcgagt cagtgagcga ggaagcggaa gagcgcccaa tacgcaaacc    3060
gcctctcccc gcgcgttggc cgattcatta atgcagctgg cacgacaggt ttcccgactg    3120
gaaagcgggc agtgagcgca acgcaattaa tgtgagttag ctcactcatt aggcacccca    3180
ggctttacac tttatgcttc cggctcgtat gttgtgtgga attgtgagcg gataacaatt    3240
tcacacagga aacagctatg accatgatta cgccagattt aattaaggcc ttaattaggc    3300
tgcgcgctcg ctcgctcact gaggccgccc gggcaaagcc cgggcgtcgg gcgacctttg    3360
gtcgcccggc ctcagtgagc gagcgagcgc gcagagaggg agtggccaac tccatcacta    3420
ggggttcctt gtagttaatg attaacccgc catgctactt atctaccagg gtaatgggga    3480
tcctctagaa ctatagctag tcgacattga ttattgacta gtagtgcaag tgggttttag    3540
gaccaggatg aggcggggtg ggggtgccta cctgacgacc accccgacc  cactggacaa    3600
gcacccaacc cccattcccc aaattgcgca tcccctatca gagaggggga ggggaaacag    3660
gatgcggcga ggcgcgtgcg cactgccagc ttcagcaccg cggacagtgc cttcgccccc    3720
gcctggcggc gcgcgccacc gccgcctcag cactgaaggc gcgctgacgt cactcgccgg    3780
tcccccgcaa actccccttc ccggccacct tggtcgcgtc cgcgccgccg ccggcccagc    3840
cggaccgcac cacgcgaggc gcgagatagg ggggcacggg cgcgaccatc tgcgctgcgg    3900
cgccggcgac tcagcgctgc ctcagtctgc ggtgggcagc ggaggagtcg tgtcgtgcct    3960
gagagcgcag ccaccgcggt ggcggcccta gagtcgatcg aggaactgaa aaaccagaaa    4020
gttaactggt aagtttagtc tttttgtctt ttatttcagg tcccagatct gtttaaacct    4080
gcagggatc  cggtggtggt gcaaatcaaa gaactgctcc tcagtggatg ttgcctttac    4140
ttctaggcct gtacggaagt gttacttctg ctctaaaagc tgcggaattg tacccgcggc    4200
cgatccaccg gtgaattcgc caccatggtg agcaagggcg aggagctgtt caccggggtg    4260
gtgcccatcc tggtcgagct ggacggcgac gtaaacggcc acaagttcag cgtgtccggc    4320
gagggcgagg gcgatgccac ctacggcaag ctgaccctga agttcatctg caccaccggc    4380
aagctgcccg tgcccggg   caccctcgtg accaccctga cctacggcgt gcagtgcttc    4440
agccgctacc ccgaccacat gaagcagcac gacttcttca gtccgccat  gcccgaaggc    4500
tacgtccagg agcgcaccat cttcttcaag gacgacggca actacaagac ccgcgccgag    4560
gtgaagttcg agggcgacac cctggtgaac cgcatcgagc tgaagggcat cgacttcaag    4620
gaggacggca acatcctggg gcacaagctg gagtacaact acaacagcca caacgtctat    4680
atcatggccg acaagcagaa gaacggcatc aaggtgaact tcaagatccg ccacaacatc    4740
gaggacggca gcgtgcagct cgccgaccac taccagcaga cacccccat  cggcgacggc    4800
cccgtgctgc tgcccgacaa ccactacctg agcacccagt ccgccctgag caaagacccc    4860
aacgagaagc gcgatcacat ggtcctgctg gagttcgtga ccgccgccgg gatcactctc    4920
ggcatggacg agctgtacaa gtccggactc agatcctact agacgcg              4967
```

```
<210> SEQ ID NO 17
<211> LENGTH: 5318
<212> TYPE: DNA
<213> ORGANISM: Artificial Sequence
<220> FEATURE:
<223> OTHER INFORMATION: Synthetic Polynucleotide
```

<400> SEQUENCE: 17

```
tggtacccaa acaccattgt cacactccac aaacaccatt gtcacactcc acaaacacca    60
ttgtcacact ccaggtacct ctagagtcga cccgggcggc ctcgaggacg gggtgaacta   120
cgcctgagga tccgatcttt ttccctctgc caaaaattat ggggacatca tgaagcccct   180
tgagcatctg acttctggct aataaaggaa atttattttc attgcaatag tgtgttggaa   240
ttttttgtgt ctctcactcg gaagcaattc gttgatctga atttcgacca cccataatac   300
ccattaccct ggtagataag tagcatggcg ggttaatcat taactacaag gaacccctag   360
tgatggagtt ggccactccc tctctgcgcg ctcgctcgct cactgaggcc gggcgaccaa   420
aggtcgcccg acgcccgggc tttgcccggg cggcctcagt gagcgagcga gcgcgcagcc   480
ttaattaacc taattcactg gccgtcgttt tacaacgtcg tgactgggaa accctggcg    540
ttacccaact taatcgcctt gcagcacatc ccccttttcgc cagctggcgt aatagcgaag   600
aggcccgcac cgatcgccct tcccaacagt tgcgcagcct gaatggcgaa tgggacgcgc   660
cctgtagcgg cgcattaagc gcggcgggtg tggtggttac gcgcagcgtg accgctacac   720
ttgccagcgc cctagcgccc gctcctttcg ctttcttccc ttcctttctc gccacgttcg   780
ccggctttcc ccgtcaagct ctaaatcggg ggctcccttt agggttccga tttagtgctt   840
tacggcacct cgaccccaaa aaacttgatt agggtgatgg ttcacgtagt gggccatcgc   900
cctgatagac ggttttttcg ccttttgacgt tggagtccac gttctttaat agtggactct   960
tgttccaaac tggaacaaca ctcaacccta tctcggtcta ttcttttgat ttataaggga  1020
ttttgccgat ttcggcctat tggttaaaaa atgagctgat ttaacaaaaa tttaacgcga  1080
attttaacaa atattaacg cttacaattt aggtggcact tttcggggaa atgtgcgcgg  1140
aacccctatt tgtttatttt tctaaataca ttcaaatatg tatccgctca tgagacaata  1200
accctgataa atgcttcaat aatattgaaa aaggaagagt atgagtattc aacatttccg  1260
tgtcgccctt attcccttttt tgcggcatt ttgccttcct gttttgctc acccagaaac  1320
gctggtgaaa gtaaaagatg ctgaagatca gttgggtgca cgagtgggtt acatcgaact  1380
ggatctcaac agcggtaaga tccttgagag ttttcgcccc gaagaacgtt ttccaatgat  1440
gagcactttt aaagttctgc tatgtggcgc ggtattatcc cgtattgacg ccgggcaaga  1500
gcaactcggt cgccgcatac actattctca gaatgacttg gttgagtact caccagtcac  1560
agaaaagcat cttacggatg gcatgacagt aagagaatta tgcagtgctg ccataaccat  1620
gagtgataac actgcggcca acttacttct gacaacgatc ggaggaccga aggagctaac  1680
cgcttttttg cacaacatgg ggatcatgt aactcgcctt gatcgttggg aaccggagct  1740
gaatgaagcc ataccaaacg acgagcgtga ccacgatg cctgtagcaa tggcaacaac  1800
gttgcgcaaa ctattaactg gcgaactact tactctagct tcccggcaac aattaataga  1860
ctggatggag gcggataaag ttgcaggacc acttctgcgc tcggcccttc cggctggctg  1920
gtttattgct gataaatctg gagccggtga gcgtgggtct cgcggtatca ttgcagcact  1980
ggggccagat ggtaagccct cccgtatcgt agttatctac acgacgggga gtcaggcaac  2040
tatgatgaa cgaaatagac agatcgctga gataggtgcc tcactgatta gcattggta   2100
actgtcagac caagtttact catatatact ttagattgat ttaaaacttc atttttaatt  2160
taaaaggatc taggtgaaga tccttttga taatctcatg accaaaatcc cttaacgtga  2220
gttttcgttc cactgagcgt cagacccgt agaaaagatc aaaggatctt cttgagatcc  2280
```

```
tttttttctg cgcgtaatct gctgcttgca aacaaaaaaa ccaccgctac cagcggtggt      2340
ttgtttgccg gatcaagagc taccaactct ttttccgaag gtaactggct tcagcagagc      2400
gcagatacca atactgttc ttctagtgta gccgtagtta ggccaccact tcaagaactc       2460
tgtagcaccg cctacatacc tcgctctgct aatcctgtta ccagtggctg ctgccagtgg      2520
cgataagtcg tgtcttaccg ggttggactc aagacgatag ttaccggata aggcgcagcg     2580
gtcgggctga acgggggggtt cgtgcacaca gcccagcttg gagcgaacga cctacaccga    2640
actgagatac ctacagcgtg agctatgaga aagcgccacg cttcccgaag ggagaaaggc    2700
ggacaggtat ccggtaagcg gcagggtcgg aacaggagag cgcacgaggg agcttccagg    2760
gggaaacgcc tggtatcttt atagtcctgt cgggtttcgc cacctctgac ttgagcgtcg    2820 attttttgtga tgctcgtcag ggggggcgag cctatggaaa aacgccagca acgcggcctt   2880
tttacggttc ctggccttt gctggccttt tgctcacatg ttctttcctg cgttatcccc     2940
tgattctgtg gataaccgta ttaccgcctt tgagtgagct gataccgctc gccgcagccg    3000
aacgaccgag cgcagcgagt cagtgagcga ggaagcggaa gagcgcccaa tacgcaaacc    3060
gcctctcccc gcgcgttggc cgattcatta atgcagctgg cacgacaggt ttcccgactg    3120
gaaagcgggc agtgagcgca acgcaattaa tgtgagttag ctcactcatt aggcacccca    3180
ggctttacac tttatgcttc cggctcgtat gttgtgtgga attgtgagcg gataacaatt    3240
tcacacagga aacagctatg accatgatta cgccagattt aattaaggcc ttaattaggc    3300
tgcgcgctcg ctcgctcact gaggccgccc gggcaaagcc cgggcgtcgg gcgacctttg    3360
gtcgcccggc ctcagtgagc gagcgagcgc gcagagaggg agtggccaac tccatcacta    3420
ggggttcctt gtagttaatg attaacccgc catgctactt atctaccagg gtaatgggga    3480
tcctctagaa ctatagctag tcgacattga ttattgacta gtagtgcaag tgggttttag    3540
gaccaggatg aggcggggtg ggggtgccta cctgacgacc gaccccgacc cactggacaa    3600
gcacccaacc cccattcccc aaattgcgca tcccctatca gagaggggga ggggaaacag    3660
gatgcggcga ggcgcgtgcg cactgccagc ttcagcaccg cggacagtgc cttcgccccc    3720
gcctggcggc gcgcgccacc gccgcctcag cactgaaggc gcgctgacgt cactcgccgg    3780
tcccccgcaa actccccttc ccggccacct tggtcgcgtc cgcgccgccg ccggcccagc    3840
cggaccgcac cacgcgaggc gcgagatagg ggggcacggg cgcgaccatc tgcgctgcgg    3900
cgccggcgac tcagcgctgc ctcagtctgc ggtgggcagc ggaggagtcg tgtcgtgcct    3960
gagagcgcag ccaccgcggt ggcggcccta gagtcgatcg aggaactgaa aaaccagaaa    4020
gttaactggt aagtttagtc ttttttgtctt ttatttcagg tcccagatct gtttaaacct    4080
gcaggggatc cggtggtggt gcaaatcaaa gaactgctcc tcagtggatg ttgcctttac    4140
ttctaggcct gtacggaagt gttacttctg ctctaaaagc tgcggaattg tacccgcggc    4200
cgatccaccg gtgaattcgc caccatgagg agaccctccc tgctgctgaa ggatatcctg    4260
aagtgcaccc tgctggtgtt tggcgtgtgg atcctgtaca tcctgaagct gaactacacc    4320
acagaggagt gtgacatgaa gaagatgcac tacgtggacc ctgatcacgt gaagagggcc    4380
cagaagtacg ctcagcaggt gctgcagaag gagtgtagac caaagtttgc caagacaagc    4440
atggctctgc tgttcgagca ccggtactcc gtggatctgc tgcctttttgt gcagaaggcc    4500 ccaaaggact ctgaggctga gagcaagtac gatccccctt tcggctttcg caagttcagc    4560
tccaaggtgc agaccctgct ggagctgctg ccagagcacg acctgccgga gcacctgaag    4620
gctaagacat gcaggaggtg cgtggtcatc ggatccggag gaatcctgca cggactggag    4680
```

```
ctgggacaca ccctgaacca gttcgacgtg gtcatcaggc tgaactccgc cccagtggag    4740
ggctactctg agcacgtggg aaacaagacc acaatcagaa tgcatacccc cgagggagct    4800
cctctgtctg acctggagta ctacagcaac gatctgttcg tggccgtgct gtttaagtct    4860
gtggacttca actggctgca ggctatggtg aagaaggaga ccctgccctt tgggtgcgg     4920 ctgttcttt  ggaagcaggt ggccgagaag atcccactgc agcccaagca cttccgcatc    4980
ctgaaccctg tgatcatcaa ggagacagct tttgacatcc tgcagtactc cgagcccag    5040 tctaggttct ggggcagaga taagaacgtg cctaccatcg gagtgatcgc cgtggtgctg    5100
gctacacacc tgtgcgacga ggtgtctctg gccggctttg gatacgatct gaaccagcct    5160
aggaccccac tgcactactt tgacagccag tgtatggccg ctatgaactt ccagaccatg    5220
cacaacgtga ccacagagac aaagttcctg ctgaagctgg tgaaagaggg ggtggtgaaa    5280
gacctgagcg ggggtattga ccgagagttt tgaacgcg                            5318

<210> SEQ ID NO 18
<211> LENGTH: 5480
<212> TYPE: DNA
<213> ORGANISM: Artificial Sequence
<220> FEATURE:
<223> OTHER INFORMATION: Synthetic Polynucleotide

<400> SEQUENCE: 18
tggtacccaa acaccattgt cacactccac aaacaccatt gtcacactcc acaaacacca      60
ttgtcacact ccaggtacct ctagagtcga cccgggcggc ctcgaggacg ggtgaactca    120
cgcctgagga tccgatcttt ttccctctgc caaaaattat ggggacatca tgaagcccct    180
tgagcatctg acttctggct aataaaggaa atttattttc attgcaatag tgtgttggaa    240 tttttttgtgt ctctcactcg gaagcaattc gttgatctga atttcgacca cccataatac    300
ccattaccct ggtagataag tagcatggcg ggttaatcat taactacaag gaacccctag    360
tgatggagtt ggccactccc tctctgcgcg ctcgctcgct cactgaggcc gggcgaccaa    420
aggtcgcccg acgcccgggc tttgcccggg cggcctcagt gagcgagcga gcgcgcagcc    480
ttaattaacc taattcactg gccgtcgttt tacaacgtcg tgactgggaa aaccctggcg    540
ttacccaact taatcgcctt gcagcacatc ccccttcgc cagctggcgt aatagcgaag    600
aggcccgcac cgatcgccct tcccaacagt tgcgcagcct gaatggcgaa tgggacgcgc    660
cctgtagcgg cgcattaagc gcggcgggtg tggtggttac gcgcagcgtg accgctacac    720
ttgccagcgc cctagcgccc gctcctttcg ctttcttccc ttcctttctc gccacgttcg    780
ccggctttcc ccgtcaagct ctaaatcggg ggctccctt  agggttccga tttagtgctt    840
tacggcacct cgaccccaaa aaacttgatt agggtgatgg ttcacgtagt gggccatcgc    900
cctgatagac ggtttttcgc cctttgacgt tggagtccac gttctttaat agtggactct    960
tgttccaaac tggaacaaca ctcaacccta tctcggtcta ttcttttgat ttataaggga   1020
ttttgccgat ttcggcctat tggttaaaaa atgagctgat ttaacaaaaa tttaacgcga   1080
attttaacaa aatattaacg cttacaattt aggtggcact tttcggggaa atgtgcgcgg   1140 aaccctatt  tgtttatttt tctaaataca ttcaaatatg tatccgctca tgagacaata   1200
accctgataa atgcttcaat aatattgaaa aaggaagagt atgagtattc aacatttccg   1260
tgtcgccctt attcccttt  ttgcggcatt ttgccttcct gtttttgctc acccagaaac   1320
gctggtgaaa gtaaaagatg ctgaagatca gttgggtgca cgagtgggtt acatcgaact   1380
```

```
ggatctcaac agcggtaaga tccttgagag ttttcgcccc gaagaacgtt ttccaatgat    1440 gagcacttt  aaagttctgc tatgtggcgc ggtattatcc cgtattgacg ccgggcaaga    1500
gcaactcggt cgccgcatac actattctca gaatgacttg gttgagtact caccagtcac    1560
agaaaagcat cttacggatg gcatgacagt aagagaatta tgcagtgctg ccataaccat    1620
gagtgataac actgcggcca acttacttct gacaacgatc ggaggaccga aggagctaac    1680
cgcttttttg cacaacatgg gggatcatgt aactcgcctt gatcgttggg aaccggagct    1740
gaatgaagcc ataccaaacg acgagcgtga caccacgatg cctgtagcaa tggcaacaac    1800
gttgcgcaaa ctattaactg gcgaactact tactctagct tcccggcaac aattaataga    1860
ctggatggag gcggataaag ttgcaggacc acttctgcgc tcggcccttc cggctggctg    1920
gtttattgct gataaatctg gagccggtga gcgtgggtct cgcggtatca ttgcagcact    1980
ggggccagat ggtaagccct cccgtatcgt agttatctac acgacgggga gtcaggcaac    2040
tatggatgaa cgaaatagac agatcgctga gataggtgcc tcactgatta agcattggta    2100
actgtcagac caagtttact catatatact ttagattgat ttaaaacttc atttttaatt    2160
taaaaggatc taggtgaaga tcctttttga atctcatg   accaaaatcc cttaacgtga    2220
gttttcgttc cactgagcgt cagaccccgt agaaaagatc aaaggatctt cttgagatcc    2280 ttttttctg  cgcgtaatct gctgcttgca acaaaaaaa  ccaccgctac cagcggtggt    2340
ttgtttgccg gatcaagagc taccaactct ttttccgaag gtaactggct tcagcagagc    2400
gcagatacca aatactgttc ttctagtgta gccgtagtta ggccaccact tcaagaactc    2460
tgtagcaccg cctacatacc tcgctctgct aatcctgtta ccagtggctg ctgccagtgg    2520
cgataagtcg tgtcttaccg ggttggactc aagacgatag ttaccggata aggcgcagcg    2580
gtcgggctga acggggggtt cgtgcacaca gcccagcttg gagcgaacga cctacaccga    2640
actgagatac ctacagcgtg agctatgaga aagcgccacg cttcccgaag ggagaaaggc    2700
ggacaggtat ccggtaagcg gcagggtcgg aacaggagag cgcacgaggg agcttccagg    2760
gggaaacgcc tggtatcttt atagtcctgt cgggtttcgc cacctctgac ttgagcgtcg    2820
atttttgtga tgctcgtcag gggggcggag cctatggaaa aacgccagca acgcggcctt    2880
tttacggttc ctggcctttt gctggccttt tgctcacatg ttctttcctg cgttatcccc    2940
tgattctgtg gataaccgta ttaccgcctt tgagtgagct gataccgctc gccgcagccg    3000
aacgaccgag cgcagcgagt cagtgagcga ggaagcggaa gagcgcccaa tacgcaaacc    3060
gcctctcccc gcgcgttggc cgattcatta atgcagctgg cacgacaggt ttcccgactg    3120
gaaagcgggc agtgagcgca acgcaattaa tgtgagttag ctcactcatt aggcacccca    3180
ggctttacac tttatgcttc cggctcgtat gttgtgtgga attgtgagcg gataacaatt    3240
tcacacagga aacagctatg accatgatta cgccagattt aattaaggcc ttaattaggc    3300
tgcgcgctcg ctcgctcact gaggccgccc gggcaaagcc cggcgtcgg  gcgacctttg    3360 gtcgcccggc ctcagtgagc gagcgagcgc gcagagaggg agtggccaac tccatcacta    3420
ggggttcctt gtagttaatg attaacccgc catgctactt atctaccagg gtaatgggga    3480
tcctctagaa ctatagctag tcgacattga ttattgacta gtagtgcaag tgggttttag    3540
gaccaggatg aggcggggtg ggggtgccta cctgacgacc gaccccgacc cactggacaa    3600
gcacccaacc cccattcccc aaattgcgca tccctatca  gagaggggga ggggaaacag    3660
gatgcggcga ggcgcgtgcg cactgccagc ttcagcaccg cggacagtgc cttcgccccc    3720
gcctggcggc gcgcgccacc gccgcctcag cactgaaggc gcgctgacgt cactcgccgg    3780
```

```
tcccccgcaa actcccttc ccggccacct tggtcgcgtc cgcgccgccg ccggcccagc    3840
cggaccgcac cacgcgaggc gcgagatagg ggggcacggg cgcgaccatc tgcgctgcgg    3900
cgccggcgac tcagcgctgc ctcagtctgc ggtgggcagc ggaggagtcg tgtcgtgcct    3960
gagagcgcag ccaccgcggt ggcggcccta gagtcgatcg aggaactgaa aaaccagaaa    4020
gttaactggt aagtttagtc tttttgtctt ttatttcagg tcccagatct gtttaaacct    4080 gcagggatc cggtggtggt gcaaatcaaa gaactgctcc tcagtggatg ttgcctttac    4140
ttctaggcct gtacggaagt gttacttctg ctctaaaagc tgcggaattg tacccgcggc    4200
cgatccaccg gtgaattcat gagaactaaa gcagcaggtt gtgcagagag aagaccactc    4260
cagcctagaa ctgaagcagc agcagcacca gcaggtagag caatgccatc cgagtacacc    4320
tacgtgaagc tgcggtctga ctgcagccgc ccatccctgc agtggtacac aagagcccag    4380
agcaagatga ggagaccctc cctgctgctg aaggatatcc tgaagtgcac cctgctggtg    4440
tttggcgtgt ggatcctgta catcctgaag ctgaactaca ccacagagga gtgtgacatg    4500
aagaagatgc actacgtgga ccctgatcac gtgaagaggg cccagaagta cgctcagcag    4560
gtgctgcaga aggagtgtag accaaagttt gccaagacaa gcatggctct gctgttcgag    4620
caccggtact ccgtggatct gctgcctttt gtgcagaagg ccccaaagga ctctgaggct    4680
gagagcaagt acgatccccc tttcggcttt cgcaagttca gctccaaggt gcagaccctg    4740
ctggagctgc tgccagagca cgacctgccc gagcacctga aggctaagac atgcaggagg    4800
tgcgtggtca tcggatccgg aggaatcctg cacggactgg agctgggaca cccctgaac    4860 cagttcgacg tggtcatcag gctgaactcc gccccagtgg agggctactc tgagcacgtg    4920
ggaaacaaga ccacaatcag aatgacatac cccgagggag ctcctctgtc tgacctggag    4980
tactacagca acgatctgtt cgtggccgtg ctgtttaagt ctgtggactt caactggctg    5040
caggctatgg tgaagaagga gaccctgccc ttttgggtgc ggctgttctt ttggaagcag    5100
gtggccgaga agatcccact gcagcccaag cacttccgca tcctgaaccc tgtgatcatc    5160
aaggagacag cttttgacat cctgcagtac tccgagcccc agtctaggtt ctggggcaga    5220
gataagaacg tgcctaccat cggagtgatc gccgtggtgc tggctacaca cctgtgcgac    5280
gaggtgtctc tggccggctt tggatacgat ctgaaccagc ctaggacccc actgcactac    5340
tttgacagcc agtgtatggc cgctatgaac ttccagacca tgcacaacgt gaccacagag    5400
acaaagttcc tgctgaagct ggtgaaagag ggggtggtga agacctgag cgggggtatt    5460 gaccgagagt tttgaacgcg                                               5480

<210> SEQ ID NO 19
<211> LENGTH: 5396
<212> TYPE: DNA
<213> ORGANISM: Artificial Sequence
<220> FEATURE:
<223> OTHER INFORMATION: Synthetic Polynucleotide

<400> SEQUENCE: 19
tggtacccaa acaccattgt cacactccac aaacaccatt gtcacactcc acaaacacca      60
ttgtcacact ccaggtacct ctagagtcga cccgggcggc ctcgaggacg gggtgaacta     120
cgcctgagga tccgatcttt ttccctctgc caaaaattat ggggacatca tgaagcccct     180
tgagcatctg acttctggct aataaaggaa atttattttc attgcaatag tgtgttggaa     240
ttttttgtgt ctctcactcg gaagcaattc gttgatctga atttcgacca cccataatac     300
```

```
ccattaccct ggtagataag tagcatggcg ggttaatcat taactacaag gaacccctag    360
tgatggagtt ggccactccc tctctgcgcg ctcgctcgct cactgaggcc gggcgaccaa    420
aggtcgcccg acgcccgggc tttgcccggg cggcctcagt gagcgagcga gcgcgcagcc    480
ttaattaacc taattcactg gccgtcgttt tacaacgtcg tgactgggaa acccctggcg    540
ttacccaact taatcgcctt gcagcacatc cccctttcgc cagctggcgt aatagcgaag    600
aggcccgcac cgatcgccct tcccaacagt tgcgcagcct gaatggcgaa tgggacgcgc    660
cctgtagcgg cgcattaagc gcggcgggtg tggtggttac gcgcagcgtg accgctacac    720
ttgccagcgc cctagcgccc gctcctttcg ctttcttccc ttcctttctc gccacgttcg    780
ccggctttcc ccgtcaagct ctaaatcggg ggctcccttt agggttccga tttagtgctt    840
tacggcacct cgaccccaaa aaacttgatt agggtgatgg ttcacgtagt gggccatcgc    900
cctgatagac ggttttttcgc cctttgacgt tggagtccac gttctttaat agtggactct    960
tgttccaaac tggaacaaca ctcaacccta tctcggtcta ttcttttgat ttataaggga   1020
ttttgccgat ttcggcctat tggttaaaaa atgagctgat ttaacaaaaa tttaacgcga   1080
attttaacaa atattaacg cttacaattt aggtggcact tttcggggaa atgtgcgcgg   1140
aacccctatt tgtttatttt tctaaataca ttcaaatatg tatccgctca tgagacaata   1200
accctgataa atgcttcaat aatattgaaa aaggaagagt atgagtattc aacatttccg   1260
tgtcgccctt attccctttt ttgcggcatt ttgccttcct gttttttgctc acccagaaac   1320 gctggtgaaa gtaaaagatg ctgaagatca gttgggtgca cgagtgggtt acatcgaact   1380
ggatctcaac agcggtaaga tccttgagag ttttcgcccc gaagaacgtt ttccaatgat   1440
gagcactttt aaagttctgc tatgtggcgc ggtattatcc cgtattgacg ccgggcaaga   1500
gcaactcggt cgccgcatac actattctca gaatgacttg gttgagtact caccagtcac   1560
agaaaagcat cttacggatg gcatgacagt aagagaatta tgcagtgctg ccataaccat   1620
gagtgataac actgcggcca acttacttct gacaacgatc ggaggaccga aggagctaac   1680
cgcttttttg cacaacatgg ggatcatgt aactcgcctt gatcgttggg aaccggagct   1740
gaatgaagcc ataccaaacg acgagcgtga caccacgatg cctgtagcaa tggcaacaac   1800
gttgcgcaaa ctattaactg gcgaactact tactctagct tcccggcaac aattaataga   1860
ctggatggag gcggataaag ttgcaggacc acttctgcgc tcggcccttc cggctggctg   1920
gtttattgct gataaatctg gagccggtga gcgtgggtct cgcggtatca ttgcagcact   1980
ggggccagat ggtaagccct cccgtatcgt agttatctac acgacgggga gtcaggcaac   2040
tatggatgaa cgaaatagac agatcgctga gataggtgcc tcactgatta agcattggta   2100
actgtcagac caagtttact catatatact ttagattgat ttaaaacttc attttttaatt   2160 taaaaggatc taggtgaaga tcctttttga taatctcatg accaaaatcc cttaacgtga   2220
gttttcgttc cactgagcgt cagacccccgt agaaaagatc aaaggatctt cttgagatcc   2280 ttttttctg cgcgtaatct gctgcttgca acaaaaaaa ccaccgctac cagcggtggt   2340
ttgtttgccg gatcaagagc taccaactct ttttccgaag gtaactggct tcagcagagc   2400
gcagatacca aatactgttc ttctagtgta gccgtagtta ggccaccact tcaagaactc   2460
tgtagcaccg cctacatacc tcgctctgct aatcctgtta ccagtggctg ctgccagtgg   2520
cgataagtcg tgtcttaccg ggttggactc aagacgatag ttaccggata aggcgcagcg   2580
gtcgggctga acgggggtt cgtgcacaca gcccagcttg gagcgaacga cctacaccga   2640
actgagatac ctacagcgtg agctatgaga aagcgccacg cttcccgaag ggagaaaggc   2700
```

```
ggacaggtat ccggtaagcg gcagggtcgg aacaggagag cgcacgaggg agcttccagg    2760
gggaaacgcc tggtatcttt atagtcctgt cgggtttcgc cacctctgac ttgagcgtcg    2820
atttttgtga tgctcgtcag gggggcggag cctatggaaa aacgccagca acgcggcctt    2880
tttacggttc ctggccttt  gctggccttt tgctcacatg ttctttcctg cgttatcccc    2940
tgattctgtg gataaccgta ttaccgcctt tgagtgagct gataccgctc gccgcagccg    3000
aacgaccgag cgcagcgagt cagtgagcga ggaagcggaa gagcgcccaa tacgcaaacc    3060
gcctctcccc gcgcgttggc cgattcatta atgcagctgg cacgacaggt ttcccgactg    3120
gaaagcgggc agtgagcgca acgcaattaa tgtgagttag ctcactcatt aggcacccca    3180
ggctttacac tttatgcttc cggctcgtat gttgtgtgga attgtgagcg gataacaatt    3240
tcacacagga aacagctatg accatgatta cgccagattt aattaaggcc ttaattaggc    3300
tgcgcgctcg ctcgctcact gaggccgccc gggcaaagcc cgggcgtcgg gcgacctttg    3360
gtcgcccggc ctcagtgagc gagcgagcgc gcagagaggg agtggccaac tccatcacta    3420
ggggttcctt gtagttaatg attaacccgc catgctactt atctaccagg gtaatgggga    3480
tcctctagaa ctatagctag tcgacattga ttattgacta gtagtgcaag tgggttttag    3540
gaccaggatg aggcggggtg ggggtgccta cctgacgacc gaccccgacc cactggacaa    3600
gcacccaacc cccattcccc aaattgcgca tcccctatca gagaggggga ggggaaacag    3660
gatgcggcga ggcgcgtgcg cactgccagc ttcagcaccg cggacagtgc cttcgccccc    3720
gcctggcggc gcgcgccacc gccgcctcag cactgaaggc gcgctgacgt cactcgccgg    3780
tcccccgcaa actccccttc ccggccacct tggtcgcgtc cgcgccgccg ccggcccagc    3840
cggaccgcac cacgcgaggc gcgagatagg ggggcacggg cgcgaccatc tgcgctgcgg    3900
cgccggcgac tcagcgctgc ctcagtctgc ggtgggcagc ggaggagtcg tgtcgtgcct    3960
gagagcgcag ccaccgcggt ggcggcccta gagtcgatcg aggaactgaa aaaccagaaa    4020
gttaactggt aagtttagtc ttttgtctt  ttatttcagg tcccagatct gtttaaacct    4080 gcagggatc  cggtggtggt gcaaatcaaa gaactgctcc tcagtggatg ttgcctttac    4140
ttctaggcct gtacggaagt gttacttctg ctctaaaagc tgcggaattg tacccgcggc    4200
cgatccaccg gtgaattcat gccatccgag tacacctacg tgaagctgcg gtctgactgc    4260
agccgcccat ccctgcagtg gtacacaaga gcccagagca agatgaggag accctccctg    4320
ctgctgaagg atatcctgaa gtgcaccctg ctggtgtttg gcgtgtggat cctgtacatc    4380
ctgaagctga actacaccac agaggagtgt gacatgaaga agatgcacta cgtggaccct    4440
gatcacgtga agagggccca gaagtacgct cagcaggtgc tgcagaagga gtgtagacca    4500
aagtttgcca agacaagcat ggctctgctg ttcgagcacc ggtactccgt ggatctgctg    4560
ccttttgtgc agaaggcccc aaaggactct gaggctgaga gcaagtacga tcccccttc    4620 ggctttcgca agttcagctc caaggtgcag accctgctgg agctgctgcc agagcacgac    4680
ctgcccgagc acctgaaggc taagacatgc aggaggtgcg tggtcatcgg atccggagga    4740
atcctgcacg gactggagct gggacacacc ctgaaccagt tcgacgtggt catcaggctg    4800
aactccgccc cagtggaggg ctactctgag cacgtggaa  acaagaccac aatcagaatg    4860
acataccccg agggagctcc tctgtctgac ctggagtact acagcaacga tctgttcgtg    4920
gccgtgctgt ttaagtctgt ggacttcaac tggctgcagg ctatggtgaa gaaggagacc    4980 ctgcccttt  gggtgcggct gttcttttgg aagcaggtgg ccgagaagat cccactgcag    5040
```

| | |
|---|---:|
| cccaagcact tccgcatcct gaaccctgtg atcatcaagg agacagcttt tgacatcctg | 5100 |
| cagtactccg agccccagtc taggttctgg ggcagagata agaacgtgcc taccatcgga | 5160 |
| gtgatcgccg tggtgctggc tacacacctg tgcgacgagg tgtctctggc cggcttttgga | 5220 |
| tacgatctga accagcctag gaccccactg cactactttg acagccagtg tatggccgct | 5280 |
| atgaacttcc agaccatgca acgtgacc acagagacaa agttcctgct gaagctggtg | 5340 |
| aaagagggg tggtgaaaga cctgagcggg ggtattgacc gagagttttg aacgcg | 5396 |

<210> SEQ ID NO 20
<211> LENGTH: 5311
<212> TYPE: DNA
<213> ORGANISM: Artificial Sequence
<220> FEATURE:
<223> OTHER INFORMATION: Synthetic Polynucleotide

<400> SEQUENCE: 20

| | |
|---|---:|
| tggtacccaa acaccattgt cacactccac aaacaccatt gtcacactcc acaaacacca | 60 |
| ttgtcacact ccaggtacct ctagagtcga cccgggcggc ctcgaggacg gggtgaacta | 120 |
| cgcctgagga tccgatcttt ttccctctgc caaaaattat ggggacatca tgaagcccct | 180 |
| tgagcatctg acttctggct aataaaggaa atttattttc attgcaatag tgtgttggaa | 240 |
| ttttttgtgt ctctcactcg gaagcaattc gttgatctga atttcgacca cccataatac | 300 |
| ccattaccct ggtagataag tagcatggcg ggttaatcat taactacaag gaacccctag | 360 |
| tgatggagtt ggccactccc tctctgcgcg ctcgctcgct cactgaggcc gggcgaccaa | 420 |
| aggtcgcccg acgcccgggc tttgcccggg cggcctcagt gagcgagcga gcgcgcagcc | 480 |
| ttaattaacc taattcactg gccgtcgttt tacaacgtcg tgactgggaa aaccctggcg | 540 |
| ttacccaact taatcgcctt gcagcacatc cccctttcgc cagctggcgt aatagcgaag | 600 |
| aggcccgcac cgatcgccct tcccaacagt tgcgcagcct gaatggcgaa tgggacgcgc | 660 |
| cctgtagcgg cgcattaagc gcggcgggtg tggtggttac gcgcagcgtg accgctacac | 720 |
| ttgccagcgc cctagcgccc gctcctttcg ctttcttccc ttcctttctc gccacgttcg | 780 |
| ccggctttcc ccgtcaagct ctaaatcggg ggctcccttt agggttccga tttagtgctt | 840 |
| tacggcacct cgaccccaaa aaacttgatt agggtgatgg ttcacgtagt gggccatcgc | 900 |
| cctgatagac ggtttttcgc cctttgacgt tggagtccac gttctttaat agtggactct | 960 |
| tgttccaaac tggaacaaca ctcaaccta tctcggtcta ttcttttgat ttataaggga | 1020 |
| ttttgccgat ttcggcctat tggttaaaaa atgagctgat ttaacaaaaa tttaacgcga | 1080 |
| attttaacaa atattaacg cttacaattt aggtggcact tttcggggaa atgtgcgcgg | 1140 |
| aaccctatt tgtttatttt tctaaataca ttcaaatatg tatccgctca tgagacaata | 1200 |
| accctgataa atgcttcaat aatattgaaa aaggaagagt atgagtattc aacatttccg | 1260 |
| tgtcgccctt attccctttt tgcggcatt ttgccttcct gttttgctc acccagaaac | 1320 |
| gctggtgaaa gtaaaagatg ctgaagatca gttgggtgca cgagtgggtt acatcgaact | 1380 |
| ggatctcaac agcggtaaga tccttgagag ttttcgcccc gaagaacgtt ttccaatgat | 1440 |
| gagcactttt aaagttctgc tatgtggcgc ggtattatcc cgtattgacg ccgggcaaga | 1500 |
| gcaactcggt cgccgcatac actattctca gaatgacttg gttgagtact caccagtcac | 1560 |
| agaaaagcat cttacggatg gcatgacagt aagagaatta tgcagtgctg ccataaccat | 1620 |
| gagtgataac actgcggcca acttacttct gacaacgatc ggaggaccga aggagctaac | 1680 |
| cgcttttttg cacaacatgg gggatcatgt aactcgcctt gatcgttggg aaccggagct | 1740 |

```
gaatgaagcc ataccaaacg acgagcgtga caccacgatg cctgtagcaa tggcaacaac   1800
gttgcgcaaa ctattaactg gcgaactact tactctagct tcccggcaac aattaataga   1860
ctggatggag gcggataaag ttgcaggacc acttctgcgc tcggcccttc cggctggctg   1920
gtttattgct gataaatctg gagccggtga gcgtgggtct cgcggtatca ttgcagcact   1980
ggggccagat ggtaagccct cccgtatcgt agttatctac acgacgggga gtcaggcaac   2040
tatgdatgaa cgaaatagac agatcgctga gataggtgcc tcactgatta gcattggta   2100 actgtcagac caagtttact catatatact ttagattgat ttaaaacttc attttttaatt   2160 taaaaggatc taggtgaaga tcctttttga atctcatg accaaaatcc cttaacgtga   2220
gttttcgttc cactgagcgt cagaccccgt agaaaagatc aaaggatctt cttgagatcc   2280 ttttttctg cgcgtaatct gctgcttgca acaaaaaaaa ccaccgctac cagcggtggt   2340
ttgtttgccg gatcaagagc taccaactct ttttccgaag gtaactggct tcagcagagc   2400
gcagatacca atactgttc ttctagtgta gccgtagtta ggccaccact tcaagaactc   2460
tgtagcaccg cctacatacc tcgctctgct aatcctgtta ccagtggctg ctgccagtgg   2520
cgataagtcg tgtcttaccg ggttggactc aagacgatag ttaccggata aggcgcagcg   2580
gtcgggctga acggggggtt cgtgcacaca gcccagcttg gagcgaacga cctacaccga   2640
actgagatac ctacagcgtg agctatgaga aagcgccacg cttcccgaag ggagaaaggc   2700
ggacaggtat ccggtaagcg gcagggtcgg aacaggagag cgcacgaggg agcttccagg   2760
gggaaacgcc tggtatcttt atagtcctgt cgggtttcgc cacctctgac ttgagcgtcg   2820
atttttgtga tgctcgtcag ggggcggag cctatggaaa aacgccagca acgcggcctt   2880
tttacggttc ctggccttt gctggccttt tgctcacatg ttctttcctg cgttatcccc   2940
tgattctgtg gataaccgta ttaccgcctt tgagtgagct gataccgctc gccgcagccg   3000
aacgaccgag cgcagcgagt cagtgagcga ggaagcggaa gagcgcccaa tacgcaaacc   3060
gcctctcccc gcgcgttggc cgattcatta atgcagctgg cacgacaggt ttcccgactg   3120
gaaagcgggc agtgagcgca acgcaattaa tgtgagttag ctcactcatt aggcacccca   3180
ggctttacac tttatgcttc cggctcgtat gttgtgtgga attgtgagcg gataacaatt   3240
tcacacagga aacagctatg accatgatta cgccagattt aattaaggcc ttaattaggc   3300
tgcgcgctcg ctcgctcact gaggccgccc gggcaaagcc cgggcgtcgg gcgacctttg   3360
gtcgcccggc ctcagtgagc gagcgagcgc gcagagaggg agtggccaac tccatcacta   3420
ggggttcctt gtagttaatg attaacccgc catgctactt atctaccagg gtaatgggga   3480
tcctctagaa ctatagctag tcgacattga ttattgacta gtagtgcaag tgggttttag   3540
gaccaggatg aggcggggtg ggggtgccta cctgacgacc gaccccgacc cactggacaa   3600
gcacccaacc cccattcccc aaattgcgca tcccctatca gagagggga ggggaaacag   3660 gatgcggcga ggcgcgtgcg cactgccagc ttcagcaccg cggacagtgc cttcgccccc   3720
gcctggcggc gcgcgccacc gccgcctcag cactgaaggc gcgctgacgt cactcgccgg   3780 tccccccgcaa actcccctc ccggccacct tggtcgcgtc cgcgccgccg ccggcccagc   3840
cggaccgcac cacgcgaggc gcgagatagg ggggcacggg cgcgaccatc tgcgctgcgg   3900
cgccggcgac tcagcgctgc ctcagtctgc ggtgggcagc ggaggagtcg tgtcgtgcct   3960
gagagcgcag caccgcggtg gcggcccctag agtcgatcga ggaactgaaa aaccagaaag   4020
ttaactggta agtttagtct ttttgtcttt tatttcaggt cccagatctg tttaaacctg   4080
```

| | |
|---|---|
| caggggatcc ggtggtggtg caaatcaaag aactgctcct cagtggatgt tgcctttact | 4140 |
| tctaggcctg tacggaagtg ttacttctgc tctaaaagct gcggaattgt acccgcggcc | 4200 |
| gatccaccgg tgaattcatg aggagaccct ccctgctgct gaaggatatc ctgaagtgca | 4260 |
| ccctgctggt gtttggcgtg tggatcctgt acatcctgaa gctgaactac accacagagg | 4320 |
| agtgtgacat gaagaagatg cactacgtgg accctgatca cgtgaagagg gcccagaagt | 4380 |
| acgctcagca ggtgctgcag aaggagtgta gaccaaagtt tgccaagaca agcatggctc | 4440 |
| tgctgttcga gcaccggtac tccgtggatc tgctgccttt tgtgcagaag gccccaaagg | 4500 |
| actctgaggc tgagagcaag tacgatcccc ctttcggctt tcgcaagttc agctccaagg | 4560 |
| tgcagaccct gctggagctg ctgccagagc acgacctgcc cgagcacctg aaggctaaga | 4620 |
| catgcaggag gtgcgtggtc atcggatccg gaggaatcct gcacggactg gagctgggac | 4680 |
| acaccctgaa ccagttcgac gtggtcatca ggctgaactc cgccccagtg gagggctact | 4740 |
| ctgagcacgt gggaaacaag accacaatca gaatgacata ccccgaggga gctcctctgt | 4800 |
| ctgacctgga gtactacagc aacgatctgt tcgtggccgt gctgtttaag tctgtggact | 4860 |
| tcaactggct gcaggctatg gtgaagaagg agaccctgcc cttttgggtg cggctgttct | 4920 |
| tttggaagca ggtggccgag aagatcccac tgcagcccaa gcacttccgc atcctgaacc | 4980 |
| ctgtgatcat caaggagaca gcttttgaca tcctgcagta ctccgagccc cagtctaggt | 5040 |
| tctggggcag agataagaac gtgcctacca tcggagtgat cgccgtggtg ctggctacac | 5100 |
| acctgtgcga cgaggtgtct ctggccggct ttggatacga tctgaaccag cctaggaccc | 5160 |
| cactgcacta ctttgacagc cagtgtatgg ccgctatgaa cttccagacc atgcacaacg | 5220 |
| tgaccacaga gacaaagttc ctgctgaagc tggtgaaaga gggggtggtg aaagacctga | 5280 |
| gcggggtat tgaccgagag ttttgaacgc g | 5311 |

<210> SEQ ID NO 21
<211> LENGTH: 5004
<212> TYPE: DNA
<213> ORGANISM: Artificial Sequence
<220> FEATURE:
<223> OTHER INFORMATION: Synthetic Polynucleotide

<400> SEQUENCE: 21

| | |
|---|---|
| tggtacctct agagtcgacc cgggcggcct cgaggacggg gtgaactacg cctgaggatc | 60 |
| cgatcttttt ccctctgcca aaaattatgg ggacatcatg aagccccttg agcatctgac | 120 |
| ttctggctaa taaggaaat ttattttcat tgcaatagtg tgttggaatt ttttgtgtct | 180 |
| ctcactcgga agcaattcgt tgatctgaat ttcgaccacc cataataccc attaccctgg | 240 |
| tagataagta gcatggcggg ttaatcatta actacaagga accccctagtg atggagttgg | 300 |
| ccactccctc tctgcgcgct cgctcgctca ctgaggccgg gcgaccaaag gtcgcccgac | 360 |
| gcccgggctt tgcccgggcg gcctcagtga gcgagcgagc gcgcagcctt aattaaccta | 420 |
| attcactggc cgtcgtttta caacgtcgtg actgggaaaa ccctggcgtt acccaactta | 480 |
| atcgccttgc agcacatccc cctttcgcca gctggcgtaa tagcgaagag gcccgcaccg | 540 |
| atcgcccttc ccaacagttg cgcagcctga atggcgaatg gacgcgcccc tgtagcggcg | 600 |
| cattaagcgc ggcgggtgtg tggttacgc gcagcgtgac cgctacactt gccagcgccc | 660 |
| tagcgcccgc tcctttcgct ttcttccctt cctttctcgc cacgttcgcc ggctttcccc | 720 |
| gtcaagctct aaatcggggg ctccctttag ggttccgatt tagtgcttta cggcacctcg | 780 |
| accccaaaaa acttgattag ggtgatggtt cacgtagtgg gccatcgccc tgatagacgg | 840 |

```
tttttcgccc tttgacgttg gagtccacgt tctttaatag tggactcttg ttccaaactg    900
gaacaacact caaccctatc tcggtctatt cttttgattt ataagggatt ttgccgattt    960
cggcctattg gttaaaaaat gagctgattt aacaaaaatt taacgcgaat tttaacaaaa   1020
tattaacgct tacaatttag gtggcacttt tcggggaaat gtgcgcggaa ccccta tttg   1080
tttattttc taaatacatt caaatatgta tccgctcatg agacaataac cctgataaat   1140
gcttcaataa tattgaaaaa ggaagagtat gagtattcaa catttccgtg tcgcccttat   1200
tcccttttt gcggcatttt gccttcctgt ttttgctcac ccagaaacgc tggtgaaagt   1260
aaaagatgct gaagatcagt tgggtgcacg agtgggttac atcgaactgg atctcaacag   1320
cggtaagatc cttgagagtt ttcgccccga agaacgtttt ccaatgatga gcacttttaa   1380
agttctgcta tgtggcgcgg tattatcccg tattgacgcc gggcaagagc aactcggtcg   1440
ccgcatacac tattctcaga atgacttggt tgagtactca ccagtcacag aaaagcatct   1500
tacgatggc atgacagtaa gagaattatg cagtgctgcc ataaccatga gtgataacac   1560
tgcggccaac ttacttctga caacgatcgg aggaccgaag gagctaaccg cttttttgca   1620
caacatgggg gatcatgtaa ctcgccttga tcgttgggaa ccggagctga atgaagccat   1680
accaaacgac gagcgtgaca ccacgatgcc tgtagcaatg gcaacaacgt tgcgcaaact   1740
attaactggc gaactactta ctctagcttc ccggcaacaa ttaatagact ggatggaggc   1800
ggataaagtt gcaggaccac ttctgcgctc ggcccttccg gctggctggt ttattgctga   1860
taaatctgga gccggtgagc gtgggtctcg cggtatcatt gcagcactgg ggccagatgg   1920
taagccctcc cgtatcgtag ttatctacac gacggggagt caggcaacta tggatgaacg   1980
aaatagacag atcgctgaga taggtgcctc actgattaag cattggtaac tgtcagacca   2040
agtttactca tatatacttt agattgattt aaaacttcat ttttaattta aaaggatcta   2100
ggtgaagatc cttttttgata atctcatgac caaaatccct taacgtgagt tttcgttcca   2160
ctgagcgtca gaccccgtag aaaagatcaa aggatcttct tgagatcctt ttttttctgcg   2220
cgtaatctgc tgcttgcaaa caaaaaaacc accgctacca gcggtggttt gtttgccgga   2280
tcaagagcta ccaactcttt ttccgaaggt aactggcttc agcagagcgc agataccaaa   2340
tactgttctt ctagtgtagc cgtagttagg ccaccacttc aagaactctg tagcaccgcc   2400
tacatacctc gctctgctaa tcctgttacc agtggctgct gccagtggcg ataagtcgtg   2460
tcttaccggg ttggactcaa gacgatagtt accggataag cgcagcggt cgggctgaac   2520
ggggggttcg tgcacacagc ccagcttgga gcgaacgacc tacaccgaac tgagatacct   2580
acagcgtgag ctatgagaaa gcgccacgct tcccgaaggg agaaaggcgg acaggtatcc   2640
ggtaagcggc agggtcggaa caggagagcg cacgagggag cttccagggg gaaacgcctg   2700
gtatctttat agtcctgtcg ggtttcgcca cctctgactt gagcgtcgat ttttgtgatg   2760
ctcgtcaggg gggcggagcc tatggaaaaa cgccagcaac gcggcctttt tacgttcct   2820
ggccttttgc tggccttttg ctcacatgtt ctttcctgcg ttatcccctg attctgtgga   2880
taaccgtatt accgcctttg agtgagctga taccgctcgc cgcagccgaa cgaccgagcg   2940
cagcgagtca gtgagcgagg aagcggaaga gcgcccaata cgcaaaccgc ctctccccgc   3000
gcgttggccg attcattaat gcagctggca cgacaggttt cccgactgga aagcgggcag   3060
tgagcgcaac gcaattaatg tgagttagct cactcattag gcaccccagg ctttacactt   3120
tatgcttccg gctcgtatgt tgtgtggaat tgtgagcgga taacaatttc acacaggaaa   3180
```

```
cagctatgac catgattacg ccagatttaa ttaaggcctt aattaggctg cgcgctcgct    3240
cgctcactga ggccgcccgg gcaaagcccg ggcgtcgggc gacctttggt cgcccggcct    3300
cagtgagcga gcgagcgcgc agagagggag tggccaactc catcactagg ggttccttgt    3360
agttaatgat taacccgcca tgctacttat ctaccagggt aatggggatc ctctagaact    3420
atagctagtc gacattgatt attgactagt agtgcaagtg ggttttagga ccaggatgag    3480
gcggggtggg ggtgcctacc tgacgaccga ccccgaccca ctggacaagc acccaacccc    3540
cattccccaa attgcgcatc ccctatcaga gaggggagg ggaaacagga tgcggcgagg    3600
cgcgtgcgca ctgccagctt cagcaccgcg acagtgcct tcgcccccgc ctggcggcgc    3660
gcgccaccgc cgcctcagca ctgaaggcgc gctgacgtca ctcgccggtc cccgcaaac    3720 tccccttccc ggccaccttg gtcgcgtccg cgccgccgcc ggcccagccg gaccgcacca    3780
cgcgaggcgc gagatagggg ggcacgggcg cgaccatctg cgctgcggcg ccggcgactc    3840
agcgctgcct cagtctgcgg tgggcagcgg aggagtcgtg tcgtgcctga gagcgcagga    3900
attcgccacc atgaggagac cctccctgct gctgaaggat atcctgaagt gcaccctgct    3960
ggtgtttggc gtgtggatcc tgtacatcct gaagctgaac tacaccacag aggagtgtga    4020
catgaagaag atgcactacg tggaccctga tcacgtgaag agggcccaga gtacgctca    4080 gcaggtgctg cagaaggagt gtagaccaaa gtttgccaag acaagcatgg ctctgctgtt    4140
cgagcaccgg tactccgtgg atctgctgcc ttttgtgcag aaggcccaa aggactctga    4200 ggctgagagc aagtacgatc cccctttcgg cttttcgcaag ttcagctcca aggtgcagac    4260
cctgctggag ctgctgccag agcacgacct gcccgagcac ctgaaggcta agacatgcag    4320
gaggtgcgtg gtcatcggat ccggaggaat cctgcacgga ctggagctgg acacaccct    4380 gaaccagttc gacgtggtca tcaggctgaa ctccgcccca gtgagggct actctgagca    4440 cgtgggaaac aagaccacaa tcagaatgac ataccccgag ggagctcctc tgtctgacct    4500
ggagtactac agcaacgatc tgttcgtggc cgtgctgttt aagtctgtgg acttcaactg    4560
gctgcaggct atggtgaaga aggagaccct gcccttttgg gtgcggctgt tcttttggaa    4620
gcaggtggcc gagaagatcc cactgcagcc caagcacttc cgcatcctga ccctgtgat    4680 catcaaggag acagcttttg catcctgca gtactccgag cccccagtcta ggttctgggg    4740 cagagataag aacgtgccta ccatcggagt gatcgccgtg gtgctggcta cacccctgtg    4800
cgacgaggtg tctctggccg gctttggata cgatctgaac cagcctagga ccccactgca    4860
ctactttgac agccagtgta tggccgctat gaacttccag accatgcaca acgtgaccac    4920
agagacaaag ttcctgctga agctggtgaa agaggggtg gtgaaagacc tgagcggggg    4980
tattgaccga gagttttgaa cgcg                                            5004
```

<210> SEQ ID NO 22
<211> LENGTH: 5076
<212> TYPE: DNA
<213> ORGANISM: Artificial Sequence
<220> FEATURE:
<223> OTHER INFORMATION: Synthetic Polynucleotide

<400> SEQUENCE: 22

```
tggtacccaa acaccattgt cacactccac aaacaccatt gtcacactcc acaaacacca      60
ttgtcacact ccaggtacct ctagagtcga cccgggcggc ctcgaggacg gggtgaacta    120
cgcctgagga tccgatcttt ttccctctgc caaaaattat ggggacatca tgaagcccct    180
tgagcatctg acttctggct aataaaggaa atttattttc attgcaatag tgtgttggaa    240
```

-continued

| | |
|---|---|
| tttttttgtgt ctctcactcg gaagcaattc gttgatctga atttcgacca cccataatac | 300 |
| ccattaccct ggtagataag tagcatggcg ggttaatcat taactacaag gaacccctag | 360 |
| tgatggagtt ggccactccc tctctgcgcg ctcgctcgct cactgaggcc gggcgaccaa | 420 |
| aggtcgcccg acgcccgggc tttgcccggg cggcctcagt gagcgagcga gcgcgcagcc | 480 |
| ttaattaacc taattcactg gccgtcgttt tacaacgtcg tgactgggaa accctggcg | 540 |
| ttacccaact taatcgcctt gcagcacatc ccctttcgc cagctggcgt aatagcgaag | 600 |
| aggcccgcac cgatcgccct tcccaacagt tgcgcagcct gaatggcgaa tgggacgcgc | 660 |
| cctgtagcgg cgcattaagc gcggcgggtg tggtggttac gcgcagcgtg accgctacac | 720 |
| ttgccagcgc cctagcgccc gctcctttcg ctttcttccc ttcctttctc gccacgttcg | 780 |
| ccggctttcc ccgtcaagct ctaaatcggg ggctcccttt agggttccga tttagtgctt | 840 |
| tacggcacct cgaccccaaa aaacttgatt agggtgatgg ttcacgtagt gggccatcgc | 900 |
| cctgatagac ggttttttcgc cctttgacgt tggagtccac gttctttaat agtggactct | 960 |
| tgttccaaac tggaacaaca ctcaacccta tctcggtcta ttcttttgat ttataaggga | 1020 |
| ttttgccgat tcggcctat tggttaaaaa atgagctgat ttaacaaaaa tttaacgcga | 1080 |
| attttaacaa atattaacg cttacaattt aggtggcact tttcggggaa atgtgcgcgg | 1140 |
| aaccctatt tgtttattt tctaaataca ttcaaatatg tatccgctca tgagacaata | 1200 |
| accctgataa atgcttcaat aatattgaaa aaggaagagt atgagtattc aacatttccg | 1260 |
| tgtcgccctt attccctttt ttgcggcatt ttgccttcct gttttgctc acccagaaac | 1320 |
| gctggtgaaa gtaaaagatg ctgaagatca gttgggtgca cgagtgggtt acatcgaact | 1380 |
| ggatctcaac agcggtaaga tccttgagag ttttcgcccc gaagaacgtt ttccaatgat | 1440 |
| gagcactttt aaagttctgc tatgtggcgc ggtattatcc cgtattgacg ccgggcaaga | 1500 |
| gcaactcggt cgccgcatac actattctca gaatgacttg gttgagtact caccagtcac | 1560 |
| agaaaagcat cttacggatg gcatgacagt aagagaatta tgcagtgctg ccataaccat | 1620 |
| gagtgataac actgcggcca acttacttct gacaacgatc ggaggaccga aggagctaac | 1680 |
| cgcttttttg cacaacatgg gggatcatgt aactcgcctt gatcgttggg aaccggagct | 1740 |
| gaatgaagcc ataccaaacg acgagcgtga ccacgatg cctgtagcaa tggcaacaac | 1800 |
| gttgcgcaaa ctattaactg gcgaactact tactctagct tcccggcaac aattaataga | 1860 |
| ctggatggag gcggataaag ttgcaggacc acttctgcgc tcggcccttc cggctggctg | 1920 |
| gtttattgct gataaatctg gagccggtga gcgtgggtct cgcggtatca ttgcagcact | 1980 |
| ggggccagat ggtaagccct cccgtatcgt agttatctac acgacgggga gtcaggcaac | 2040 |
| tatgatgaa cgaaatagac agatcgctga gataggtgcc tcactgatta gcattggta | 2100 |
| actgtcagac caagtttact catatatact ttagattgat ttaaaacttc atttttaatt | 2160 |
| taaaaggatc taggtgaaga tccttttga taatctcatg accaaaatcc cttaacgtga | 2220 |
| gttttcgttc cactgagcgt cagacccgt agaaaagatc aaaggatctt cttgagatcc | 2280 |
| ttttttttctg cgcgtaatct gctgcttgca acaaaaaaa ccaccgctac cagcggtggt | 2340 |
| ttgtttgccg gatcaagagc taccaactct ttttccgaag gtaactggct tcagcagagc | 2400 |
| gcagatacca aatactgttc ttctagtgta gccgtagtta ggccaccact tcaagaactc | 2460 |
| tgtagcaccg cctacatacc tcgctctgct aatcctgtta ccagtggctg ctgccagtgg | 2520 |
| cgataagtcg tgtcttaccg ggttggactc aagacgatag ttaccggata aggcgcagcg | 2580 |

```
gtcgggctga acgggggtt cgtgcacaca gcccagcttg gagcgaacga cctacaccga   2640
actgagatac ctacagcgtg agctatgaga aagcgccacg cttcccgaag ggagaaaggc   2700
ggacaggtat ccggtaagcg gcagggtcgg aacaggagag cgcacgaggg agcttccagg   2760
gggaaacgcc tggtatcttt atagtcctgt cgggtttcgc cacctctgac ttgagcgtcg   2820 attttgtga tgctcgtcag ggggcggag cctatggaaa aacgccagca acgcggcctt   2880
tttacggttc ctggcctttt gctggccttt tgctcacatg ttctttcctg cgttatcccc   2940
tgattctgtg gataaccgta ttaccgcctt tgagtgagct gataccgctc gccgcagccg   3000
aacgaccgag cgcagcgagt cagtgagcga ggaagcggaa gagcgcccaa tacgcaaacc   3060
gcctctcccc gcgcgttggc cgattcatta atgcagctgg cacgacaggt ttcccgactg   3120
gaaagcgggc agtgagcgca acgcaattaa tgtgagttag ctcactcatt aggcaccccca   3180 ggctttacac tttatgcttc cggctcgtat gttgtgtgga attgtgagcg gataacaatt   3240
tcacacagga aacagctatg accatgatta cgccagattt aattaaggcc ttaattaggc   3300
tgcgcgctcg ctcgctcact gaggccgccc gggcaaagcc cggcgtcgg gcgacctttg   3360 gtcgcccggc ctcagtgagc gagcgagcgc gcagagaggg agtggccaac tccatcacta   3420
ggggttcctt gtagttaatg attaacccgc catgctactt atctaccagg gtaatgggga   3480
tcctctagaa ctatagctag tcgacattga ttattgacta gtagtgcaag tgggttttag   3540
gaccaggatg aggcggggtg ggggtgccta cctgacgacc gaccccgacc cactggacaa   3600
gcacccaacc cccattcccc aaattgcgca tcccctatca gagaggggga gggaaacag   3660 gatgcggcga ggcgcgtgcg cactgccagc ttcagcaccg cggacagtgc cttcgcccc   3720 gcctggcggc gcgcgccacc gccgcctcag cactgaaggc gcgctgacgt cactcgccgg   3780
tcccccgcaa actccccttc ccggccacct tggtcgcgtc cgcgccgccg ccggcccagc   3840
cggaccgcac cacgcgaggc gcgagatagg ggggcacggg cgcgaccatc tgcgctgcgg   3900
cgccggcgac tcagcgctgc ctcagtctgc ggtgggcagc ggaggagtcg tgtcgtgcct   3960
gagagcgcag gaattcgcca ccatgaggag accctccctg ctgctgaagg atatcctgaa   4020
gtgcaccctg ctggtgtttg gcgtgtggat cctgtacatc ctgaagctga actacaccac   4080
agaggagtgt gacatgaaga agatgcacta cgtggaccct gatcacgtga gagggccca   4140 gaagtacgct cagcaggtgc tgcagaagga gtgtagacca aagtttgcca agacaagcat   4200
ggctctgctg ttcgagcacc ggtactccgt ggatctgctg ccttttgtgc agaaggcccc   4260
aaaggactct gaggctgaga gcaagtacga tccccctttc ggctttcgca agttcagctc   4320
caaggtgcag accctgctgg agctgctgcc agagcacgac ctgcccgagc acctgaaggc   4380
taagacatgc aggaggtgcg tggtcatcgg atccggagga atcctgcacg gactggagct   4440
gggacacacc ctgaaccagt tcgacgtggt catcaggctg aactccgccc cagtggaggg   4500
ctactctgag cacgtgggaa acaagaccac aatcagaatg catacccccg agggagctcc   4560
tctgtctgac ctggagtact acagcaacga tctgttcgtg gccgtgctgt ttaagtctgt   4620
ggacttcaac tggctgcagg ctatggtgaa gaaggagacc ctgcccttt gggtgcggct   4680 gttcttttgg aagcaggtgg ccgagaagat cccactgcag cccaagcact tccgcatcct   4740
gaaccctgtg atcatcaagg agacagcttt tgacatcctg cagtactccg agccccagtc   4800
taggttctgg ggcagagata gaaacgtgcc taccatcgga gtgatcgccg tggtgctggc   4860
tacacacctg tgcgacgagg tgtctctggc cggctttgga tacgatctga accagcctag   4920
gaccccactg cactactttg acagccagtg tatggccgct atgaacttcc agaccatgca   4980
```

```
caacgtgacc acagagacaa agttcctgct gaagctggtg aaagaggggg tggtgaaaga   5040
cctgagcggg ggtattgacc gagagttttg aacgcg                            5076

<210> SEQ ID NO 23
<211> LENGTH: 5166
<212> TYPE: DNA
<213> ORGANISM: Artificial Sequence
<220> FEATURE:
<223> OTHER INFORMATION: Synthetic Polynucleotide

<400> SEQUENCE: 23
tggtacctct agagtcgacc cgggcggcct cgaggacggg gtgaactacg cctgaggatc     60 cgatctttt ccctctgcca aaaattatgg ggacatcatg aagcccttg agcatctgac    120 ttctggctaa taaggaaat ttattttcat tgcaatagtg tgttggaatt ttttgtgtct    180
ctcactcgga agcaattcgt tgatctgaat ttcgaccacc cataatacccc attaccctgg    240 tagataagta gcatggcggg ttaatcatta actacaagga accccctagtg atggagttgg    300 ccactccctc tctgcgcgct cgctcgctca ctgaggccgg gcgaccaaag gtcgcccgac    360
gcccgggctt gcccgggcg gcctcagtga gcgagcgagc gcgcagcctt aattaaccta    420
attcactggc cgtcgtttta caacgtcgtg actgggaaaa ccctggcgtt acccaactta    480
atcgccttgc agcacatccc cctttcgcca gctggcgtaa tagcgaagag gcccgcaccg    540 atcgccttc ccaacagttg cgcagcctga atggcgaatg ggacgcgccc tgtagcggcg    600
cattaagcgc ggcgggtgtg gtggttacgc gcagcgtgac cgctacactt gccagcgccc    660
tagcgcccgc tcctttcgct ttcttccctt cctttctcgc cacgttcgcc ggctttcccc    720
gtcaagctct aaatcggggg ctccctttag ggttccgatt tagtgcttta cggcacctcg    780
accccaaaaa acttgattag ggtgatggtt cacgtagtgg gccatcgccc tgatagacgg    840
tttttcgccc tttgacgttg gagtccacgt tctttaatag tggactcttg ttccaaactg    900
gaacaacact caaccctatc tcggtctatt cttttgattt ataagggatt ttgccgattt    960
cggcctattg gttaaaaaat gagctgattt aacaaaaatt taacgcgaat tttaacaaaa   1020
tattaacgct tacaatttag gtggcacttt tcggggaaat gtgcgcggaa cccctatttg   1080
tttatttttc taaatacatt caaatatgta tccgctcatg agacaataac cctgataaat   1140
gcttcaataa tattgaaaaa ggaagagtat gagtattcaa catttccgtg tcgcccttat   1200 tcccttttt gcggcatttt gccttcctgt ttttgctcac ccagaaacgc tggtgaaagt   1260
aaaagatgct gaagatcagt tgggtgcacg agtgggttac atcgaactgg atctcaacag   1320
cggtaagatc cttgagagtt ttcgccccga agaacgtttt ccaatgatga gcacttttaa   1380
agttctgcta tgtggcgcgg tattatcccg tattgacgcc gggcaagagc aactcggtcg   1440
ccgcatacac tattctcaga atgacttggt tgagtactca ccagtcacag aaaagcatct   1500
tacggatggc atgacagtaa gagaattatg cagtgctgcc ataaccatga gtgataacac   1560
tgcggccaac ttacttctga caacgatcgg aggaccgaag gagctaaccg cttttttgca   1620
caacatgggg gatcatgtaa ctcgccttga tcgttgggaa ccggagctga atgaagccat   1680
accaaacgac gagcgtgaca ccacgatgcc tgtagcaatg gcaacaacgt tgcgcaaact   1740
attaactggc gaactactta ctctagcttc ccggcaacaa ttaatagact ggatggaggc   1800
ggataaagtt gcaggaccac ttctgcgctc ggcccttccg gctggctggt ttattgctga   1860
taaatctgga gccggtgagc gtgggtctcg cggtatcatt gcagcactgg ggccagatgg   1920
```

| | | | | |
|---|---|---|---|---|
| taagccctcc | cgtatcgtag | ttatctacac | gacggggagt | caggcaacta tggatgaacg | 1980 |
| aaatagacag | atcgctgaga | taggtgcctc | actgattaag | cattggtaac tgtcagacca | 2040 |
| agtttactca | tatatacttt | agattgattt | aaaacttcat | ttttaattta aaaggatcta | 2100 |
| ggtgaagatc | cttttgata | atctcatgac | caaaatccct | taacgtgagt tttcgttcca | 2160 |
| ctgagcgtca | gacccgtag | aaaagatcaa | aggatcttct | tgagatcctt ttttctgcg | 2220 |
| cgtaatctgc | tgcttgcaaa | caaaaaaacc | accgctacca | gcggtggttt gtttgccgga | 2280 |
| tcaagagcta | ccaactcttt | ttccgaaggt | aactggcttc | agcagagcgc agataccaaa | 2340 |
| tactgttctt | ctagtgtagc | cgtagttagg | ccaccacttc | aagaactctg tagcaccgcc | 2400 |
| tacatacctc | gctctgctaa | tcctgttacc | agtggctgct | gccagtggcg ataagtcgtg | 2460 |
| tcttaccggg | ttggactcaa | gacgatagtt | accggataag | gcgcagcggt cgggctgaac | 2520 |
| ggggggttcg | tgcacacagc | ccagcttgga | gcgaacgacc | tacaccgaac tgagatacct | 2580 |
| acagcgtgag | ctatgagaaa | gcgccacgct | tcccgaaggg | agaaaggcgg acaggtatcc | 2640 |
| ggtaagcggc | agggtcggaa | caggagagcg | cacgagggag | cttccagggg gaaacgcctg | 2700 |
| gtatctttat | agtcctgtcg | ggtttcgcca | cctctgactt | gagcgtcgat ttttgtgatg | 2760 |
| ctcgtcaggg | gggcggagcc | tatggaaaaa | cgccagcaac | gcggccttt tacggttcct | 2820 |
| ggccttttgc | tggccttttg | ctcacatgtt | ctttcctgcg | ttatcccctg attctgtgga | 2880 |
| taaccgtatt | accgcctttg | agtgagctga | taccgctcgc | cgcagccgaa cgaccgagcg | 2940 |
| cagcgagtca | gtgagcgagg | aagcggaaga | gcgcccaata | cgcaaaccgc ctctccccgc | 3000 |
| gcgttggccg | attcattaat | gcagctggca | cgacaggttt | cccgactgga aagcgggcag | 3060 |
| tgagcgcaac | gcaattaatg | tgagttagct | cactcattag | gcaccccagg ctttacactt | 3120 |
| tatgcttccg | gctcgtatgt | tgtgtggaat | tgtgagcgga | taacaatttc acacaggaaa | 3180 |
| cagctatgac | catgattacg | ccagatttaa | ttaaggcctt | aattaggctg cgcgctcgct | 3240 |
| cgctcactga | ggccgcccgg | gcaaagcccg | ggcgtcgggc | gacctttggt cgcccggcct | 3300 |
| cagtgagcga | gcgagcgcgc | agagagggag | tggccaactc | catcactagg ggttccttgt | 3360 |
| agttaatgat | taacccgcca | tgctacttat | ctaccagggt | aatggggatc ctctagaact | 3420 |
| atagctagtc | gacattgatt | attgactagt | agtgcaagtg | ggttttagga ccaggatgag | 3480 |
| gcggggtggg | ggtgcctacc | tgacgaccga | ccccgaccca | ctggacaagc acccaacccc | 3540 |
| cattccccaa | attgcgcatc | ccctatcaga | gaggggagg | ggaaacagga tgcggcgagg | 3600 |
| cgcgtgcgca | ctgccagctt | cagcaccgcg | gacagtgcct | tcgccccgc ctggcggcgc | 3660 |
| gcgccaccgc | cgcctcagca | ctgaaggcgc | gctgacgtca | ctcgccggtc ccccgcaaac | 3720 |
| tccccttccc | ggccaccttg | gtcgcgtccg | cgccgccgcc | ggcccagccg gaccgcacca | 3780 |
| cgcgaggcgc | gagataggg | ggcacgggcg | cgaccatctg | cgctgcggcg ccggcgactc | 3840 |
| agcgctgcct | cagtctgcgg | tgggcagcgg | aggagtcgtg | tcgtgcctga gagcgcagga | 3900 |
| attcatgaga | actaaagcag | caggttgtgc | agagagaaga | ccactccagc ctagaactga | 3960 |
| agcagcagca | gcaccagcag | gtagagcaat | gccatccgag | tacacctacg tgaagctgcg | 4020 |
| gtctgactgc | agccgcccat | ccctgcagtg | gtacacaaga | gcccagagca agatgaggag | 4080 |
| accctccctg | ctgctgaagg | atatcctgaa | gtgcaccctg | ctggtgtttg gcgtgtggat | 4140 |
| cctgtacatc | ctgaagctga | actacaccac | agaggagtgt | gacatgaaga agatgcacta | 4200 |
| cgtgaccct | gatcacgtga | agagggccca | gaagtacgct | cagcaggtgc tgcagaagga | 4260 |
| gtgtagacca | aagtttgcca | agacaagcat | ggctctgctg | ttcgagcacc ggtactccgt | 4320 |

```
ggatctgctg cctttttgtgc agaaggcccc aaaggactct gaggctgaga gcaagtacga      4380 tcccccttttc ggctttcgca agttcagctc caaggtgcag accctgctgg agctgctgcc      4440
agagcacgac ctgcccgagc acctgaaggc taagacatgc aggaggtgcg tggtcatcgg      4500
atccggagga atcctgcacg gactggagct gggacacacc ctgaaccagt cgacgtggt       4560 catcaggctg aactccgccc cagtggaggg ctactctgag cacgtgggaa acaagaccac      4620
aatcagaatg acatacccccg agggagctcc tctgtctgac ctggagtact acagcaacga      4680
tctgttcgtg gccgtgctgt ttaagtctgt ggacttcaac tggctgcagg ctatggtgaa      4740
gaaggagacc ctgcccttttt gggtgcggct gttcttttgg aagcaggtgg ccgagaagat      4800
cccactgcag cccaagcact tccgcatcct gaaccctgtg atcatcaagg agacagcttt      4860
tgacatcctg cagtactccg agccccagtc taggttctgg ggcagagata agaacgtgcc      4920
taccatcgga gtgatcgccg tggtgctggc tacacacctg tgcgacgagg tgtctctggc      4980 cggcttttgga tacgatctga accagcctag gaccccactg cactactttg acagccagtg      5040
tatggccgct atgaacttcc agaccatgca caacgtgacc acagagacaa agttcctgct      5100
gaagctggtg aaagagggggg tggtgaaaga cctgagcggg ggtattgacc gagagttttg      5160
aacgcg                                                                  5166
```

<210> SEQ ID NO 24
<211> LENGTH: 5238
<212> TYPE: DNA
<213> ORGANISM: Artificial Sequence
<220> FEATURE:
<223> OTHER INFORMATION: Synthetic Polynucleotide

<400> SEQUENCE: 24

```
tggtacccaa acaccattgt cacactccac aaacaccatt gtcacactcc acaaacacca       60
ttgtcacact ccaggtacct ctagagtcga cccgggcggc ctcgaggacg gggtgaacta      120
cgcctgagga tccgatcttt ttccctctgc caaaaattat ggggacatca tgaagcccct      180
tgagcatctg acttctggct aataaaggaa atttatttc attgcaatag tgtgttggaa      240
ttttttgtgt ctctcactcg gaagcaattc gttgatctga atttcgacca cccataatac      300
ccattaccct ggtagataag tagcatggcg ggttaatcat taactacaag gaacccctag      360
tgatggagtt ggccactccc tctctgcgcg ctcgctcgct cactgaggcc gggcgaccaa      420
aggtcgcccg acgcccgggc tttgcccggg cggcctcagt gagcgagcga gcgcgcagcc      480
ttaattaacc taattcactg gccgtcgttt tacaacgtcg tgactgggaa accctggcg       540 ttacccaact taatcgcctt gcagcacatc cccctttcgc cagctggcgt aatagcgaag      600
aggcccgcac cgatcgccct tcccaacagt tgcgcagcct gaatggcgaa tgggacgcgc      660
cctgtagcgg cgcattaagc gcggcgggtg tggtggttac gcgcagcgtg accgctacac      720
ttgccagcgc cctagcgccc gctccttttcg ctttcttccc ttcctttctc gccacgttcg      780 ccggcttttcc ccgtcaagct ctaaatcggg ggctcccttt agggttccga tttagtgctt      840
tacggcacct cgaccccaaa aaacttgatt agggtgatgg ttcacgtagt gggccatcgc      900
cctgatagac ggtttttcgc cctttgacgt tggagtccac gttctttaat agtggactct      960
tgttccaaac tggaacaaca ctcaacccta tctcggtcta ttcttttgat ttataaggga     1020
ttttgccgat ttcggcctat tggttaaaaa atgagctgat ttaacaaaaa tttaacgcga     1080
attttaacaa aatattaacg cttacaattt aggtggcact tttcggggaa atgtgcgcgg     1140
```

```
aacccctatt tgtttatttt tctaaataca ttcaaatatg tatccgctca tgagacaata    1200
accctgataa atgcttcaat aatattgaaa aaggaagagt atgagtattc aacatttccg    1260
tgtcgccctt attcccttt tgcggcatt ttgccttcct gttttgctc acccagaaac      1320 gctggtgaaa gtaaaagatg ctgaagatca gttgggtgca cgagtgggtt acatcgaact   1380
ggatctcaac agcggtaaga tccttgagag ttttcgcccc gaagaacgtt ttccaatgat   1440
gagcactttt aaagttctgc tatgtggcgc ggtattatcc cgtattgacg ccgggcaaga   1500
gcaactcggt cgccgcatac actattctca gaatgacttg gttgagtact caccagtcac   1560
agaaaagcat cttacggatg gcatgacagt aagagaatta tgcagtgctg ccataaccat   1620
gagtgataac actgcggcca acttacttct gacaacgatc ggaggaccga aggagctaac   1680
cgcttttttg cacaacatgg gggatcatgt aactcgcctt gatcgttggg aaccggagct   1740
gaatgaagcc ataccaaacg acgagcgtga caccacgatg cctgtagcaa tggcaacaac   1800
gttgcgcaaa ctattaactg gcgaactact tactctagct tcccggcaac aattaataga   1860
ctggatggag gcggataaag ttgcaggacc acttctgcgc tcggcccttc cggctggctg   1920
gtttattgct gataaatctg gagccggtga gcgtgggtct cgcggtatca ttgcagcact   1980
ggggccagat ggtaagccct cccgtatcgt agttatctac acgacgggga gtcaggcaac   2040
tatggatgaa cgaaatagac agatcgctga gataggtgcc tcactgatta agcattggta   2100
actgtcagac caagtttact catatatact ttagattgat ttaaaacttc atttttaatt   2160
taaaaggatc taggtgaaga tcctttttga atctcatg accaaaatcc cttaacgtga    2220
gttttcgttc cactgagcgt cagacccgt agaaaagatc aaaggatctt cttgagatcc    2280 ttttttctg cgcgtaatct gctgcttgca acaaaaaaa ccaccgctac cagcggtggt    2340
ttgtttgccg gatcaagagc taccaactct ttttccgaag gtaactggct tcagcagagc   2400
gcagatacca atactgttc ttctagtgta gccgtagtta ggccaccact tcaagaactc    2460
tgtagcaccg cctacatacc tcgctctgct aatcctgtta ccagtggctg ctgccagtgg   2520
cgataagtcg tgtcttaccg ggttggactc aagacgatag ttaccggata aggcgcagcg   2580
gtcgggctga acggggggtt cgtgcacaca gcccagcttg gagcgaacga cctacaccga   2640
actgagatac ctacagcgtg agctatgaga aagcgccacg cttcccgaag ggagaaaggc   2700
ggacaggtat ccggtaagcg gcagggtcgg aacaggagag cgcacgaggg agcttccagg   2760
gggaaacgcc tggtatcttt atagtcctgt cgggtttcgc cacctctgac ttgagcgtcg   2820
atttttgtga tgctcgtcag gggggcggag cctatggaaa aacgccagca acgcggcctt   2880
tttacggttc ctggccttt gctggccttt tgctcacatg ttctttcctg cgttatcccc    2940
tgattctgtg ataaccgta ttaccgcctt tgagtgagct gataccgctc gccgcagccg    3000
aacgaccgag cgcagcgagt cagtgagcga ggaagcggaa gagcgcccaa tacgcaaacc   3060
gcctctcccc gcgcgttggc cgattcatta atgcagctgg cacgacaggt ttcccgactg   3120
gaaagcgggc agtgagcgca acgcaattaa tgtgagttag ctcactcatt aggcacccca   3180
ggctttacac tttatgcttc cggctcgtat gttgtgtgga attgtgagcg gataacaatt   3240
tcacacagga aacagctatg accatgatta cgccagattt aattaaggcc ttaattaggc   3300
tgcgcgctcg ctcgctcact gaggccgccc gggcaaagcc cgggcgtcgg cgacctttg   3360 gtcgcccggc ctcagtgagc gagcgagcgc gcagagaggg agtggccaac tccatcacta   3420
ggggttcctt gtagtaatg attaacccgc catgctactt atctaccagg gtaatgggga    3480
tcctctagaa ctatagctag tcgacattga ttattgacta gtagtgcaag tgggttttag   3540
```

```
gaccaggatg aggcggggtg ggggtgccta cctgacgacc gaccccgacc cactggacaa    3600
gcacccaacc cccattcccc aaaattgcgca tcccctatca gagaggggga ggggaaacag    3660
gatgcggcga ggcgcgtgcg cactgccagc ttcagcaccg cggacagtgc cttcgccccc    3720
gcctggcggc gcgcgccacc gccgcctcag cactgaaggc gcgctgacgt cactcgccgg    3780
tcccccgcaa actcccctct ccggccacct tggtcgcgtc cgcgccgccg ccggcccagc    3840
cggaccgcac cacgcgaggc gcgagatagg ggggcacggg cgcgaccatc tgcgctgcgg    3900
cgccggcgac tcagcgctgc ctcagtctgc ggtgggcagc ggaggagtcg tgtcgtgcct    3960
gagagcgcag gaattcatga gaactaaagc agcaggttgt gcagagagaa gaccactcca    4020
gcctagaact gaagcagcag cagcaccagc aggtagagca atgccatccg agtacaccta    4080
cgtgaagctg cggtctgact gcagccgccc atccctgcag tggtacacaa gagcccagag    4140
caagatgagg agaccctccc tgctgctgaa ggatatcctg aagtgcaccc tgctggtgtt    4200
tggcgtgtgg atcctgtaca tcctgaagct gaactacacc acagaggagt gtgacatgaa    4260
gaagatgcac tacgtggacc ctgatcacgt gaagagggcc cagaagtacg ctcagcaggt    4320
gctgcagaag gagtgtagac caaagtttgc caagacaagc atggctctgc tgttcgagca    4380
ccggtactcc gtggatctgc tgccttttgt gcagaaggcc ccaaaggact ctgaggctga    4440
gagcaagtac gatccccctt tcggcttccg caagttcagc tccaaggtgc agaccctgct    4500
ggagctgctg ccagagcacg acctgcccga gcacctgaag gctaagacat gcaggaggtg    4560
cgtggtcatc ggatccggag gaatcctgca cggactggag ctgggacaca ccctgaacca    4620
gttcgacgtg gtcatcaggc tgaactccgc cccagtggag ggctactctg agcacgtggg    4680
aaacaagacc acaatcagaa tgacataccc cgagggagct cctctgtctg acctggagta    4740
ctacagcaac gatctgttcg tggccgtgct gtttaagtct gtggacttca actggctgca    4800
ggctatggtg aagaaggaga ccctgcccct ttgggtgcgg ctgttctttt ggaagcaggt    4860
ggccgagaag atcccactgc agcccaagca cttccgcatc ctgaaccctg tgatcatcaa    4920
ggagacagct tttgacatcc tgcagtactc cgagccccag tctaggttct ggggcagaga    4980
taagaacgtg cctaccatcg gagtgatcgc cgtggtgctg gctacacacc tgtgcgacga    5040
ggtgtctctg gccggctttg gatacgatct gaaccagcct aggaccccac tgcactactt    5100
tgacagccag tgtatggccg ctatgaactt ccagaccatg cacaacgtga ccacagagac    5160
aaagttcctg ctgaagctgg tgaaagaggg ggtggtgaaa gacctgagcg ggggtattga    5220
ccgagagttt tgaacgcg                                                  5238
```

<210> SEQ ID NO 25
<211> LENGTH: 5082
<212> TYPE: DNA
<213> ORGANISM: Artificial Sequence
<220> FEATURE:
<223> OTHER INFORMATION: Synthetic Polynucleotide

<400> SEQUENCE: 25

```
tggtacctct agagtcgacc cgggcggcct cgaggacggg gtgaactacg cctgaggatc      60
cgatcttttt ccctctgcca aaaattatgg ggacatcatg aagccccttg agcatctgac     120
ttctggctaa taaaggaaat ttattttcat tgcaatagtg tgttggaatt ttttgtgtct     180
ctcactcgga agcaattcgt tgatctgaat ttcgaccacc cataataccc attaccctgg     240
tagataagta gcatggcggg ttaatcatta actacaagga acccctagtg atggagttgg     300
```

```
ccactccctc tctgcgcgct cgctcgctca ctgaggccgg gcgaccaaag gtcgcccgac    360
gcccgggctt tgcccgggcg gcctcagtga gcgagcgagc gcgcagcctt aattaaccta    420
attcactggc cgtcgtttta caacgtcgtg actgggaaaa ccctggcgtt acccaactta    480
atcgccttgc agcacatccc cctttcgcca gctggcgtaa tagcgaagag gcccgcaccg    540
atcgcccttc ccaacagttg cgcagcctga atggcgaatg gacgcgccc  tgtagcggcg    600 cattaagcgc ggcgggtgtg gtggttacgc gcagcgtgac cgctacactt gccagcgccc    660
tagcgcccgc tcctttcgct ttcttccctt cctttctcgc cacgttcgcc ggctttcccc    720
gtcaagctct aaatcggggg ctcccttag  ggttccgatt tagtgcttta cggcacctcg    780
accccaaaaa acttgattag ggtgatggtt cacgtagtgg gccatcgccc tgatagacgg    840
tttttcgccc tttgacgttg gagtccacgt tctttaatag tggactcttg ttccaaactg    900
gaacaacact caaccctatc tcggtctatt cttttgattt ataagggatt ttgccgattt    960
cggcctattg gttaaaaaat gagctgattt aacaaaaatt taacgcgaat tttaacaaaa   1020
tattaacgct tacaatttag gtggcacttt tcggggaaat gtgcgcggaa ccctatttg   1080 tttattttc  taaatacatt caaatatgta tccgctcatg agacaataac cctgataaat   1140
gcttcaataa tattgaaaaa ggaagagtat gagtattcaa catttccgtg tcgcccttat   1200
tccctttttt gcggcatttt gccttcctgt ttttgctcac ccagaaacgc tggtgaaagt   1260
aaaagatgct gaagatcagt tgggtgcacg agtgggttac atcgaactgg atctcaacag   1320
cggtaagatc cttgagagtt ttcgccccga agaacgtttt ccaatgatga gcacttttaa   1380
agttctgcta tgtggcgcgg tattatcccg tattgacgcc gggcaagagc aactcggtcg   1440
ccgcatacac tattctcaga atgacttggt tgagtactca ccagtcacag aaaagcatct   1500 tacgatggc  atgacagtaa gagaattatg cagtgctgcc ataaccatga gtgataacac   1560
tgcggccaac ttacttctga caacgatcgg aggaccgaag gagctaaccg cttttttgca   1620
caacatgggg gatcatgtaa ctcgccttga tcgttgggaa ccggagctga atgaagccat   1680
accaaacgac gagcgtgaca ccacgatgcc tgtagcaatg gcaacaacgt tgcgcaaact   1740
attaactggc gaactactta ctctagcttc ccggcaacaa ttaatagact ggatggaggc   1800
ggataaagtt gcaggaccac ttctgcgctc ggcccttccg gctggctggt ttattgctga   1860
taaatctgga gccggtgagc gtgggtctcg cggtatcatt gcagcactgg ggccagatgg   1920
taagccctcc cgtatcgtag ttatctacac gacggggagt caggcaacta tggatgaacg   1980
aaatagacag atcgctgaga taggtgcctc actgattaag cattggtaac tgtcagacca   2040
agtttactca tatatacttt agattgattt aaaacttcat ttttaattta aaaggatcta   2100
ggtgaagatc cttttttgata atctcatgac caaaatccct taacgtgagt tttcgttcca   2160
ctgagcgtca gaccccgtag aaaagatcaa aggatcttct tgagatcctt ttttctgcg    2220 cgtaatctgc tgcttgcaaa caaaaaaacc accgctacca gcggtggttt gtttgccgga   2280
tcaagagcta ccaactcttt ttccgaaggt aactggcttc agcagagcgc agataccaaa   2340
tactgttctt ctagtgtagc cgtagttagg ccaccacttc aagaactctg tagcaccgcc   2400
tacatacctc gctctgctaa tcctgttacc agtggctgct gccagtggcg ataagtcgtg   2460
tcttaccggg ttggactcaa gacgatagtt accggataag gcgcagcggt cgggctgaac   2520
ggggggttcg tgcacacagc ccagcttgga gcgaacgacc tacaccgaac tgagatacct   2580
acagcgtgag ctatgagaaa gcgccacgct tcccgaaggg agaaaggcgg acaggtatcc   2640
ggtaagcggc agggtcggaa caggagagcg cacgagggag cttccagggg gaaacgcctg   2700
```

```
gtatctttat agtcctgtcg ggtttcgcca cctctgactt gagcgtcgat ttttgtgatg   2760
ctcgtcaggg gggcggagcc tatggaaaaa cgccagcaac gcggccttt  tacggttcct   2820 ggccttttgc tggccttttg ctcacatgtt ctttcctgcg ttatcccctg attctgtgga   2880
taaccgtatt accgcctttg agtgagctga taccgctcgc cgcagccgaa cgaccgagcg   2940
cagcgagtca gtgagcgagg aagcggaaga gcgcccaata cgcaaaccgc ctctccccgc   3000
gcgttggccg attcattaat gcagctggca cgacaggttt cccgactgga aagcgggcag   3060
tgagcgcaac gcaattaatg tgagttagct cactcattag gcaccccagg ctttacactt   3120
tatgcttccg gctcgtatgt tgtgtggaat tgtgagcgga taacaatttc acacaggaaa   3180
cagctatgac catgattacg ccagatttaa ttaaggcctt aattaggctg cgcgctcgct   3240
cgctcactga ggccgcccgg gcaaagcccg ggcgtcgggc gacctttggt cgcccggcct   3300
cagtgagcga gcgagcgcgc agagagggag tggccaactc catcactagg ggttccttgt   3360
agttaatgat taacccgcca tgctacttat ctaccagggt aatggggatc ctctagaact   3420
atagctagtc gacattgatt attgactagt agtgcaagtg ggttttagga ccaggatgag   3480
gcggggtggg ggtgcctacc tgacgaccga ccccgaccca ctggacaagc acccaacccc   3540
cattccccaa attgcgcatc ccctatcaga gaggggagg ggaaacagga tgcggcgagg   3600
cgcgtgcgca ctgccagctt cagcaccgcg gacagtgcct tcgcccccgc ctggcggcgc   3660
gcgccaccgc cgcctcagca ctgaaggcgc gctgacgtca ctcgccggtc ccccgcaaac   3720
tccccttccc ggccaccttg gtcgcgtccg cgccgccgcc ggcccagccg gaccgcacca   3780
cgcgaggcgc gagatagggg ggcacgggcg cgaccatctg cgctgcggcg ccggcgactc   3840
agcgctgcct cagtctgcgg tgggcagcgg aggagtcgtg tcgtgcctga gagcgcagga   3900
attcatgcca tccgagtaca cctacgtgaa gctgcggtct gactgcagcc gcccatccct   3960
gcagtggtac acaagagccc agagcaagat gaggagaccc tccctgctgc tgaaggatat   4020
cctgaagtgc accctgctgg tgtttggcgt gtggatcctg tacatcctga agctgaacta   4080
caccacagag gagtgtgaca tgaagaagat gcactacgtg gaccctgatc acgtgaagag   4140
ggcccagaag tacgctcagc aggtgctgca gaaggagtgt agaccaaagt tgccaagac    4200 aagcatggct ctgctgttcg agcaccggta ctccgtggat ctgctgcctt ttgtgcagaa   4260 ggcccccaaag gactctgagg ctgagagcaa gtacgatccc cctttcggct ttcgcaagtt   4320
cagctccaag gtgcagaccc tgctggagct gctgccagag cacgacctgc ccgagcacct   4380
gaaggctaag acatgcagga ggtgcgtggt catcggatcc ggaggaatcc tgcacggact   4440
ggagctggga cacaccctga accagttcga cgtggtcatc aggctgaact ccgccccagt   4500
ggagggctac tctgagcacg tgggaaacaa gaccacaatc agaatgacat accccgaggg   4560
agctcctctg tctgacctgg agtactacag caacgatctg ttcgtggccg tgctgtttaa   4620
gtctgtggac ttcaactggc tgcaggctat ggtgaagaag agaccctgc  ccttttgggt   4680 gcggctgttc tttttggaagc aggtggccga gaagatccca ctgcagccca gcacttccg   4740 catcctgaac cctgtgatca tcaaggagac agctttttgac atcctgcagt actccgagcc   4800
ccagtctagg ttctggggca gagataagaa cgtgcctacc atcggagtga tcgccgtggt   4860
gctggctaca cacctgtgcg acgaggtgtc tctggccggc tttggatacg atctgaacca   4920
gcctaggacc ccactgcact actttgacag ccagtgtatg gccgctatga acttccagac   4980
catgcacaac gtgaccacag agacaaagtt cctgctgaag ctggtgaaag aggggtggt   5040
```

```
gaaagacctg agcgggggta ttgaccgaga gttttgaacg cg              5082
```

<210> SEQ ID NO 26
<211> LENGTH: 5154
<212> TYPE: DNA
<213> ORGANISM: Artificial Sequence
<220> FEATURE:
<223> OTHER INFORMATION: Synthetic Polynucleotide

<400> SEQUENCE: 26

```
tggtacccaa acaccattgt cacactccac aaacaccatt gtcacactcc acaaacacca    60
ttgtcacact ccaggtacct ctagagtcga cccgggcggc ctcgaggacg gggtgaacta   120
cgcctgagga tccgatcttt ttccctctgc caaaaattat ggggacatca tgaagcccct   180
tgagcatctg acttctggct aataaaggaa atttattttc attgcaatag tgtgttggaa   240
ttttttgtgt ctctcactcg gaagcaattc gttgatctga atttcgacca cccataatac   300
ccattaccct ggtagataag tagcatggcg ggttaatcat taactacaag gaaccctag    360
tgatggagtt ggccactccc tctctgcgcg ctcgctcgct cactgaggcc gggcgaccaa   420
aggtcgcccg acgcccgggc tttgcccggg cggcctcagt gagcgagcga gcgcgcagcc   480
ttaattaacc taattcactg gccgtcgttt tacaacgtcg tgactgggaa aaccctggcg   540
ttacccaact taatcgcctt gcagcacatc cccctttcgc cagctggcgt aatagcgaag   600
aggcccgcac cgatcgccct tcccaacagt tgcgcagcct gaatggcgaa tgggacgcgc   660
cctgtagcgg cgcattaagc gcggcgggtg tggtggttac gcgcagcgtg accgctacac   720
ttgccagcgc cctagcgccc gctcctttcg ctttcttccc ttcctttctc gccacgttcg   780
ccggctttcc ccgtcaagct ctaaatcggg gctcccttt agggttccga tttagtgctt    840
tacggcacct cgaccccaaa aaacttgatt agggtgatgg ttcacgtagt gggccatcgc   900
cctgatagac ggtttttcgc cctttgacgt tggagtccac gttctttaat agtggactct   960
tgttccaaac tggaacaaca ctcaacccta tctcggtcta ttcttttgat ttataaggga  1020
ttttgccgat ttcggcctat tggttaaaaa atgagctgat ttaacaaaaa tttaacgcga  1080
attttaacaa aatattaacg cttacaattt aggtggcact tttcggggaa atgtgcgcgg  1140
aaccccctatt tgtttatttt tctaaataca ttcaaatatg tatccgctca tgagacaata  1200
accctgataa atgcttcaat aatattgaaa aaggaagagt atgagtattc aacatttccg  1260
tgtcgccctt attccctttt ttgcggcatt ttgccttcct gttttgtctc acccagaaac  1320
gctggtgaaa gtaaaagatg ctgaagatca gttgggtgca cgagtgggtt acatcgaact  1380
ggatctcaac agcggtaaga tccttgagag ttttcgcccc gaagaacgtt ttccaatgat  1440
gagcactttt aaagttctgc tatgtggcgc ggtattatcc cgtattgacg ccgggcaaga  1500
gcaactcggt cgccgcatac actattctca gaatgacttg gttgagtact caccagtcac  1560
agaaaagcat cttacggatg gcatgacagt aagagaatta tgcagtgctg ccataaccat  1620
gagtgataac actgcggcca acttacttct gacaacgatc ggaggaccga aggagctaac  1680
cgcttttttg cacaacatgg ggatcatgt aactcgcctt gatcgttggg aaccggagct  1740
gaatgaagcc ataccaaacg acgagcgtga ccaccacgatg cctgtagcaa tggcaacaac  1800
gttgcgcaaa ctattaactg gcgaactact tactctagct tcccggcaac aattaataga  1860
ctggatggag gcggataaag ttgcaggacc acttctgcgc tcggcccttc cggctggctg  1920
gtttattgct gataaatctg gagccggtga gcgtgggtct cgcggtatca ttgcagcact  1980
ggggccagat ggtaagccct cccgtatcgt agttatctac acgacgggga gtcaggcaac  2040
```

```
tatggatgaa cgaaatagac agatcgctga gataggtgcc tcactgatta agcattggta    2100
actgtcagac caagtttact catatatact ttagattgat ttaaaacttc atttttaatt    2160
taaaaggatc taggtgaaga tccttttga taatctcatg accaaaatcc cttaacgtga     2220
gttttcgttc cactgagcgt cagacccgt agaaaagatc aaaggatctt cttgagatcc    2280
tttttttctg cgcgtaatct gctgcttgca acaaaaaaa ccaccgctac cagcggtggt    2340
ttgtttgccg gatcaagagc taccaactct ttttccgaag gtaactggct tcagcagagc   2400
gcagatacca aatactgttc ttctagtgta gccgtagtta ggccaccact tcaagaactc    2460
tgtagcaccg cctacatacc tcgctctgct aatcctgtta ccagtggctg ctgccagtgg    2520
cgataagtcg tgtcttaccg ggttggactc aagacgatag ttaccggata aggcgcagcg    2580
gtcgggctga acgggggggtt cgtgcacaca gcccagcttg gagcgaacga cctacaccga   2640
actgagatac ctacagcgtg agctatgaga aagcgccacg cttcccgaag ggagaaaggc    2700
ggacaggtat ccggtaagcg gcagggtcgg aacaggagag cgcacgaggg agcttccagg    2760
gggaaacgcc tggtatcttt atagtcctgt cgggtttcgc cacctctgac ttgagcgtcg    2820
atttttgtga tgctcgtcag gggggcgag cctatggaaa aacgccagca acgcggcctt    2880
tttacggttc ctggcctttt gctggccttt tgctcacatg ttctttcctg cgttatcccc    2940
tgattctgtg gataaccgta ttaccgcctt tgagtgagct gataccgctc gccgcagccg    3000
aacgaccgag cgcagcgagt cagtgagcga ggaagcggaa gagcgcccaa tacgcaaacc    3060
gcctctcccc gcgcgttggc cgattcatta atgcagctgg cacgacaggt ttcccgactg    3120
gaaagcgggc agtgagcgca acgcaattaa tgtgagttag ctcactcatt aggcacccca    3180
ggctttacac tttatgcttc cggctcgtat gttgtgtgga attgtgagcg ataacaatt     3240 tcacacagga aacagctatg accatgatta cgccagattt aattaaggcc ttaattaggc    3300
tgcgcgctcg ctcgctcact gaggccgccc gggcaaagcc cgggcgtcgg gcgacctttg    3360
gtcgcccggc ctcagtgagc gagcgagcgc gcagagaggg agtggccaac tccatcacta    3420
ggggttcctt gtagttaatg attaacccgc catgctactt atctaccagg gtaatgggga    3480
tcctctagaa ctatagctag tcgacattga ttattgacta gtagtgcaag tgggttttag    3540
gaccaggatg aggcggggtg ggggtgccta cctgacgacc gaccccgacc cactggacaa    3600
gcacccaacc cccattcccc aaattgcgca tccctatca gagaggggga ggggaaacag     3660
gatgcggcga ggcgcgtgcg cactgccagc ttcagcaccg cggacagtgc cttcgccccc    3720
gcctggcggc gcgcgccacc gccgcctcag cactgaaggc gcgctgacgt cactcgccgg    3780
tcccccgcaa actcccctc ccggccacct tggtcgcgtc cgcgccgccg ccggcccagc     3840
cggaccgcac cacgcgaggc gcgagatagg ggggcacggg cgcgaccatc tgcgctgcgg    3900
cgccggcgac tcagcgctgc ctcagtctgc ggtgggcagc ggaggagtcg tgtcgtgcct    3960
gagagcgcag gaattcatgc catccgagta cacctacgtg aagctgcggt ctgactgcag    4020
ccgcccatcc ctgcagtggt acacaagagc ccagagcaag atgaggagac cctccctgct    4080
gctgaaggat atcctgaagt gcaccctgct ggtgtttggc gtgtggatcc tgtacatcct    4140
gaagctgaac tacaccacag aggagtgtga catgaagaag atgcactacg tggaccctga    4200
tcacgtgaag agggcccaga agtacgctca gcaggtgctg cagaaggagt gtagaccaaa    4260
gtttgccaag acaagcatgg ctctgctgtt cgagcaccgg tactccgtgg atctgctgcc    4320
ttttgtgcag aaggccccaa aggactctga ggctgagagc aagtacgatc cccctttcgg    4380
```

-continued

```
ctttcgcaag ttcagctcca aggtgcagac cctgctggag ctgctgccag agcacgacct    4440
gcccgagcac ctgaaggcta agacatgcag gaggtgcgtg gtcatcggat ccggaggaat    4500
cctgcacgga ctggagctgg acacaccct gaaccagttc gacgtggtca tcaggctgaa    4560
ctccgcccca gtggagggct actctgagca cgtgggaaac aagaccacaa tcagaatgac    4620
ataccccgag ggagctcctc tgtctgacct ggagtactac agcaacgatc tgttcgtggc    4680
cgtgctgttt aagtctgtgg acttcaactg gctgcaggct atggtgaaga aggagaccct    4740
gcccttttgg gtgcggctgt tcttttggaa gcaggtggcc gagaagatcc cactgcagcc    4800
caagcacttc cgcatcctga accctgtgat catcaaggag acagcttttg acatcctgca    4860
gtactccgag ccccagtcta ggttctgggg cagagataag aacgtgccta ccatcggagt    4920
gatcgccgtg gtgctggcta cacctgtg cgacgaggtg tctctggccg gctttggata    4980
cgatctgaac cagcctagga ccccactgca ctactttgac agccagtgta tggccgctat    5040
gaacttccag accatgcaca acgtgaccac agagacaaag ttcctgctga agctggtgaa    5100
agaggggtg gtgaaagacc tgagcggggg tattgaccga gagttttgaa cgcg          5154
```

<210> SEQ ID NO 27
<211> LENGTH: 4998
<212> TYPE: DNA
<213> ORGANISM: Artificial Sequence
<220> FEATURE:
<223> OTHER INFORMATION: Synthetic Polynucleotide

<400> SEQUENCE: 27

```
tggtacctct agagtcgacc cgggcggcct cgaggacggg gtgaactacg cctgaggatc      60
cgatcttttt ccctctgcca aaaattatgg ggacatcatg aagccccttg agcatctgac     120
ttctggctaa taaggaaat ttattttcat tgcaatagtg tgttggaatt ttttgtgtct     180
ctcactcgga agcaattcgt tgatctgaat ttcgaccacc cataataccc attaccctgg     240
tagataagta gcatggcggg ttaatcatta actacaagga accccctagtg atggagttgg     300
ccactccctc tctgcgcgct cgctcgctca ctgaggccgg gcgaccaaag gtcgcccgac     360
gcccgggctt tgcccgggcg gcctcagtga gcgagcgagc gcgcagcctt aattaaccta     420
attcactggc cgtcgtttta caacgtcgtg actgggaaaa cctggcgtt acccaactta     480
atcgccttgc agcacatccc cctttcgcca gctggcgtaa tagcgaagag gcccgcaccg     540
atcgcccttc ccaacagttg cgcagcctga atggcgaatg ggacgcgccc tgtagcggcg     600
cattaagcgc ggcgggtgtg gtggttacgc gcagcgtgac cgctacactt gccagcgccc     660
tagcgcccgc tcctttcgct ttcttccctt cctttctcgc cacgttcgcc ggctttcccc     720
gtcaagctct aaatcggggg ctccctttag ggttccgatt tagtgcttta cggcacctcg     780
accccaaaaa acttgattag ggtgatggtt cacgtagtgg gccatcgccc tgatagacgg     840
tttttcgccc tttgacgttg gagtccacgt tctttaatag tggactcttg ttccaaactg     900
gaacaacact caaccctatc tcggtctatt cttttgattt ataagggatt ttgccgattt     960
cggcctattg gttaaaaaat gagctgattt aacaaaaatt taacgcgaat tttaacaaaa    1020
tattaacgct tacaatttag gtggcacttt tcggggaaat gtgcgcggaa ccccatttg    1080
tttattttc taaatacatt caaatatgta tccgctcatg agacaataac cctgataaat    1140
gcttcaataa tattgaaaaa ggaagagtat gagtattcaa catttccgtg tcgcccttat    1200
tccctttttt gcggcatttt gccttcctgt ttttgctcac ccagaaacgc tggtgaaagt    1260
aaaagatgct gaagatcagt tgggtgcacg agtgggttac atcgaactgg atctcaacag    1320
```

```
cggtaagatc cttgagagtt ttcgccccga agaacgtttt ccaatgatga gcactttaa    1380 agttctgcta tgtggcgcgg tattatcccg tattgacgcc gggcaagagc aactcggtcg    1440
ccgcatacac tattctcaga atgacttggt tgagtactca ccagtcacag aaaagcatct    1500
tacggatggc atgacagtaa gagaattatg cagtgctgcc ataaccatga gtgataacac    1560
tgcggccaac ttacttctga caacgatcgg aggaccgaag gagctaaccg cttttttgca    1620
caacatgggg gatcatgtaa ctcgccttga tcgttgggaa ccggagctga atgaagccat    1680
accaaacgac gagcgtgaca ccacgatgcc tgtagcaatg gcaacaacgt tgcgcaaact    1740
attaactggc gaactactta ctctagcttc ccggcaacaa ttaatagact ggatggaggc    1800
ggataaagtt gcaggaccac ttctgcgctc ggcccttccg gctggctggt ttattgctga    1860
taaatctgga gccggtgagc gtgggtctcg cggtatcatt gcagcactgg ggccagatgg    1920
taagccctcc cgtatcgtag ttatctacac gacggggagt caggcaacta tggatgaacg    1980
aaatagacag atcgctgaga taggtgcctc actgattaag cattggtaac tgtcagacca    2040
agtttactca tatatacttt agattgattt aaaacttcat ttttaattta aaaggatcta    2100
ggtgaagatc ctttttgata atctcatgac caaaatccct taacgtgagt tttcgttcca    2160
ctgagcgtca gaccccgtag aaaagatcaa aggatcttct tgagatcctt tttttctgcg    2220
cgtaatctgc tgcttgcaaa caaaaaaacc accgctacca gcggtggttt gtttgccgga    2280
tcaagagcta ccaactcttt ttccgaaggt aactggcttc agcagagcgc agataccaaa    2340
tactgttctt ctagtgtagc cgtagttagg ccaccacttc aagaactctg tagcaccgcc    2400
tacatacctc gctctgctaa tcctgttacc agtggctgct gccagtggcg ataagtcgtg    2460
tcttaccggg ttggactcaa gacgatagtt accggataag cgcagcggt cgggctgaac    2520 ggggggttcg tgcacacagc ccagcttgga gcgaacgacc tacaccgaac tgagatacct    2580
acagcgtgag ctatgagaaa gcgccacgct cccgaaggg agaaaggcgg acaggtatcc    2640
ggtaagcggc agggtcggaa caggagagcg cacgagggag cttccagggg gaaacgcctg    2700
gtatctttat agtcctgtcg ggtttcgcca cctctgactt gagcgtcgat ttttgtgatg    2760
ctcgtcaggg gggcggagcc tatggaaaaa cgccagcaac gcggcctttt tacggttcct    2820
ggccttttgc tggccttttg ctcacatgtt ctttcctgcg ttatcccctg attctgtgga    2880
taaccgtatt accgcctttg agtgagctga taccgctcgc cgcagccgaa cgaccgagcg    2940
cagcgagtca gtgagcgagg aagcggaaga gcgcccaata cgcaaaccgc ctctccccgc    3000
gcgttggccg attcattaat gcagctggca cgacaggttt cccgactgga aagcgggcag    3060
tgagcgcaac gcaattaatg tgagttagct cactcattag gcaccccagg ctttacactt    3120
tatgcttccg gctcgtatgt tgtgtggaat tgtgagcgga taacaatttc acacaggaaa    3180
cagctatgac catgattacg ccagatttaa ttaaggcctt aattaggctg cgcgctcgct    3240
cgctcactga ggccgcccgg gcaaagcccg ggcgtcgggc gacctttggt cgcccggcct    3300
cagtgagcga gcgagcgcgc agagagggag tggccaactc catcactagg ggttccttgt    3360
agttaatgat taacccgcca tgctacttat ctaccagggt aatggggatc ctctagaact    3420
atagctagtc gacattgatt attgactagt agtgcaagtg ggttttagga ccaggatgag    3480
gcggggtggg ggtgcctacc tgacgaccga ccccgaccca ctggacaagc acccaacccc    3540
cattccccaa attgcgcatc cctatcaga gaggggagg ggaaacagga tgcggcgagg    3600
cgcgtgcgca ctgccagctt cagcaccgcg gacagtgcct tcgccccgc ctggcggcgc    3660
```

| | |
|---|---|
| gcgccaccgc cgcctcagca ctgaaggcgc gctgacgtca ctcgccggtc ccccgcaaac | 3720 |
| tcccctcc ggccaccttg gtcgcgtccg cgccgccgcc ggcccagccg gaccgcacca | 3780 |
| cgcgaggcgc gagataggg ggcacgggcg cgaccatctg cgctgcggcg ccggcgactc | 3840 |
| agcgctgcct cagtctgcgg tgggcagcgg aggagtcgtg tcgtgcctga gagcgcagga | 3900 |
| attcatgagg agaccctccc tgctgctgaa ggatatcctg aagtgcaccc tgctggtgtt | 3960 |
| tggcgtgtgg atcctgtaca tcctgaagct gaactacacc acagaggagt gtgacatgaa | 4020 |
| gaagatgcac tacgtggacc ctgatcacgt gaagagggcc cagaagtacg ctcagcaggt | 4080 |
| gctgcagaag gagtgtagac caaagtttgc caagacaagc atggctctgc tgttcgagca | 4140 |
| ccggtactcc gtggatctgc tgccttttgt gcagaaggcc ccaaaggact ctgaggctga | 4200 |
| gagcaagtac gatccccctt tcggctttcg caagttcagc tccaaggtgc agaccctgct | 4260 |
| ggagctgctg ccagagcacg acctgcccga gcacctgaag gctaagacat gcaggaggtg | 4320 |
| cgtggtcatc ggatccggag gaatcctgca cggactggag ctgggacaca ccctgaacca | 4380 |
| gttcgacgtg gtcatcaggc tgaactccgc cccagtggag ggctactctg agcacgtggg | 4440 |
| aaacaagacc acaatcagaa tgacatacc cgagggagct cctctgtctg acctggagta | 4500 |
| ctacagcaac gatctgttcg tggccgtgct gtttaagtct gtggacttca actggctgca | 4560 |
| ggctatggtg aagaaggaga ccctgcccctt ttgggtgcgg ctgttctttt ggaagcaggt | 4620 |
| ggccgagaag atcccactgc agcccaagca cttccgcatc ctgaaccctg tgatcatcaa | 4680 |
| ggagacagct tttgacatcc tgcagtactc cgagccccag tctaggttct ggggcagaga | 4740 |
| taagaacgtg cctaccatcg gagtgatcgc cgtggtgctg gctacacacc tgtgcgacga | 4800 |
| ggtgtctctg gccggctttg gatacgatct gaaccagcct aggaccccac tgcactactt | 4860 |
| tgacagccag tgtatggccg ctatgaactt ccagaccatg cacaacgtga ccacagagac | 4920 |
| aaagttcctg ctgaagctgg tgaaagaggg ggtggtgaaa gacctgagcg ggggtattga | 4980 |
| ccgagagttt tgaacgcg | 4998 |

<210> SEQ ID NO 28
<211> LENGTH: 5070
<212> TYPE: DNA
<213> ORGANISM: Artificial Sequence
<220> FEATURE:
<223> OTHER INFORMATION: Synthetic Polynucleotide

<400> SEQUENCE: 28

| | |
|---|---|
| tggtacccaa acaccattgt cacactccac aaacaccatt gtcacactcc acaaacacca | 60 |
| ttgtcacact ccaggtacct ctagagtcga cccgggcggc ctcgaggacg gggtgaacta | 120 |
| cgcctgagga tccgatcttt ttccctctgc caaaaattat ggggacatca tgaagcccct | 180 |
| tgagcatctg acttctggct aataaaggaa atttattttc attgcaatag tgtgttggaa | 240 |
| ttttttgtgt ctctcactcg gaagcaattc gttgatctga atttcgacca cccataatac | 300 |
| ccattaccct ggtagataag tagcatggcg ggttaatcat taactacaag gaaccctag | 360 |
| tgatggagtt ggccactccc tctctgcgcg ctcgctcgct cactgaggcc gggcgaccaa | 420 |
| aggtcgcccg acgcccgggc tttgcccggg cggcctcagt gagcgagcga gcgcgcagcc | 480 |
| ttaattaacc taattcactg gccgtcgttt tacaacgtcg tgactgggaa accctggcg | 540 |
| ttacccaact aatcgccctt gcagcacatc ccctttcgc cagctggcgt aatagcgaag | 600 |
| aggcccgcac cgatcgccct tcccaacagt tgcgcagcct gaatggcgaa tgggacgcgc | 660 |
| cctgtagcgg cgcattaagc gcggcgggtg tggtggttac gcgcagcgtg accgctacac | 720 |

```
ttgccagcgc cctagcgccc gctcctttcg cttcttccc ttcctttctc gccacgttcg    780
ccggctttcc ccgtcaagct ctaaatcggg ggctcccttt agggttccga tttagtgctt    840
tacggcacct cgaccccaaa aaacttgatt agggtgatgg ttcacgtagt gggccatcgc    900
cctgatagac ggttttcgc cctttgacgt tggagtccac gttctttaat agtggactct    960
tgttccaaac tggaacaaca ctcaaccta tctcggtcta ttcttttgat ttataaggga   1020
ttttgccgat ttcggcctat tggttaaaaa atgagctgat ttaacaaaaa tttaacgcga   1080
attttaacaa atattaacg cttacaattt aggtggcact tttcggggaa atgtgcgcgg   1140
aaccctatt tgtttatttt tctaaataca ttcaaatatg tatccgctca tgagacaata   1200
accctgataa atgcttcaat aatattgaaa aggaagagt atgagtattc aacatttccg   1260
tgtcgccctt attccttttt tgcggcatt ttgccttcct gttttgctc acccagaaac   1320
gctggtgaaa gtaaaagatg ctgaagatca gttgggtgca cgagtgggtt acatcgaact   1380
ggatctcaac agcggtaaga tccttgagag ttttcgcccc gaagaacgtt ttccaatgat   1440
gagcactttt aaagttctgc tatgtggcgc ggtattatcc cgtattgacg ccgggcaaga   1500
gcaactcggt cgccgcatac actattctca gaatgacttg gttgagtact caccagtcac   1560
agaaaagcat cttacggatg gcatgacagt aagagaatta tgcagtgctg ccataaccat   1620
gagtgataac actgcggcca acttacttct gacaacgatc ggaggaccga aggagctaac   1680
cgcttttttg cacaacatgg ggatcatgt aactcgcctt gatcgttggg aaccggagct   1740
gaatgaagcc ataccaaacg acgagcgtga ccaccacgatg cctgtagcaa tggcaacaac   1800
gttgcgcaaa ctattaactg gcgaactact tactctagct tcccggcaac aattaataga   1860
ctggatggag gcggataaag ttgcaggacc acttctgcgc tcggcccttc cggctggctg   1920
gtttattgct gataaatctg gagccggtga gcgtgggtct cgcggtatca ttgcagcact   1980
ggggccagat ggtaagccct cccgtatcgt agttatctac acgacgggga gtcaggcaac   2040
tatgatgaa cgaaatagac agatcgctga gataggtgcc tcactgatta gcattggta   2100
actgtcagac caagtttact catatatact ttagattgat ttaaaacttc atttttaatt   2160
taaaaggatc taggtgaaga tccttttga taatctcatg accaaaatcc cttaacgtga   2220
gttttcgttc cactgagcgt cagaccccgt agaaaagatc aaaggatctt cttgagatcc   2280
tttttttctg cgcgtaatct gctgcttgca acaaaaaaa ccaccgctac cagcggtggt   2340
ttgtttgccg gatcaagagc taccaactct ttttccgaag gtaactggct tcagcagagc   2400
gcagatacca aatactgttc ttctagtgta gccgtagtta ggccaccact tcaagaactc   2460
tgtagcaccg cctacatacc tcgctctgct aatcctgtta ccagtggctg ctgccagtgg   2520
cgataagtcg tgtcttaccg ggttggactc aagacgatag ttaccggata aggcgcagcg   2580
gtcgggctga acgggggggtt cgtgcacaca gcccagcttg gagcgaacga cctacaccga   2640
actgagatac ctacagcgtg agctatgaga aagcgccacg cttcccgaag ggagaaaggc   2700
ggacaggtat ccggtaagcg gcagggtcgg aacaggagag cgcacgaggg agcttccagg   2760
gggaaacgcc tggtatcttt atagtcctgt cgggtttcgc cacctctgac ttgagcgtcg   2820
atttttgtga tgctcgtcag ggggggcgag cctatgaaa aacgccagca acgcggcctt   2880
tttacggttc ctggcctttt gctggccttt tgctcacatg ttcttcctg cgttatcccc   2940
tgattctgtg gataaccgta ttaccgcctt tgagtgagct gataccgctc gccgcagccg   3000
aacgaccgag cgcagcgagt cagtgagcga ggaagcggaa gagcgcccaa tacgcaaacc   3060
```

```
gcctctcccc gcgcgttggc cgattcatta atgcagctgg cacgacaggt ttcccgactg    3120
gaaagcgggc agtgagcgca acgcaattaa tgtgagttag ctcactcatt aggcacccca    3180
ggctttacac tttatgcttc cggctcgtat gttgtgtgga attgtgagcg ataacaatt     3240 tcacacagga aacagctatg accatgatta cgccagattt aattaaggcc ttaattaggc    3300
tgcgcgctcg ctcgctcact gaggccgccc gggcaaagcc cgggcgtcgg gcgacctttg    3360
gtcgcccggc ctcagtgagc gagcgagcgc gcagagaggg agtggccaac tccatcacta    3420
ggggttcctt gtagttaatg attaacccgc catgctactt atctaccagg gtaatgggga    3480
tcctctagaa ctatagctag tcgacattga ttattgacta gtagtgcaag tgggttttag    3540
gaccaggatg aggcggggtg ggggtgccta cctgacgacc gaccccgacc cactggacaa    3600
gcacccaacc cccattcccc aaattgcgca tcccctatca gagaggggga ggggaaacag    3660
gatgcggcga ggcgcgtgcg cactgccagc ttcagcaccg cggacagtgc cttcgccccc    3720
gcctggcggc gcgcgccacc gccgcctcag cactgaaggc gcgctgacgt cactcgccgg    3780
tcccccgcaa actccccttc ccggccacct tggtcgcgtc cgcgccgccg ccggcccagc    3840
cggaccgcac cacgcgaggc gcgagatagg ggggcacggg cgcgaccatc tgcgctgcgg    3900
cgccggcgac tcagcgctgc ctcagtctgc ggtgggcagc ggaggagtcg tgtcgtgcct    3960
gagagcgcag gaattcatga ggagaccctc cctgctgctg aaggatatcc tgaagtgcac    4020
cctgctggtg tttggcgtgt ggatcctgta catcctgaag ctgaactaca ccacagagga    4080
gtgtgacatg aagaagatgc actacgtgga ccctgatcac gtgaagaggg cccagaagta    4140
cgctcagcag gtgctgcaga aggagtgtag accaaagttt gccaagacaa gcatggctct    4200
gctgttcgag caccggtact ccgtggatct gctgcctttt gtgcagaagg ccccaaagga    4260
ctctgaggct gagagcaagt acgatccccc tttcggcttt cgcaagttca gctccaaggt    4320
gcagaccctg ctggagctgc tgccagagca cgacctgccc gagcacctga aggctaagac    4380
atgcaggagg tgcgtggtca tcggatccgg aggaatcctg cacggactgg agctgggaca    4440
caccctgaac cagttcgacg tggtcatcag gctgaactcc gccccagtgg agggctactc    4500
tgagcacgtg ggaaacaaga ccacaatcag aatgacatac cccgagggag ctcctctgtc    4560
tgacctggag tactacagca acgatctgtt cgtggccgtg ctgtttaagt ctgtggactt    4620 caactgctg caggctatgg tgaagaagga gaccctgccc ttttgggtgc ggctgttctt     4680
ttggaagcag gtggccgaga gatcccact gcagcccaag cacttccgca tcctgaaccc     4740
tgtgatcatc aaggagacag cttttgacat cctgcagtac tccgagcccc agtctaggtt    4800
ctggggcaga gataagaacg tgcctaccat cggagtgatc gccgtggtgc tggctacaca    4860
cctgtgcgac gaggtgtctc tggccggctt tggatacgat ctgaaccagc ctaggacccc    4920
actgcactac tttgacagcc agtgtatggc cgctatgaac ttccagacca tgcacaacgt    4980
gaccacagag acaaagttcc tgctgaagct ggtgaaagag ggggtggtga aagacctgag    5040 cggggggtatt gaccgagagt tttgaacgcg                                    5070
```

<210> SEQ ID NO 29
<211> LENGTH: 4372
<212> TYPE: DNA
<213> ORGANISM: Artificial Sequence
<220> FEATURE:
<223> OTHER INFORMATION: Synthetic Polynucleotide

<400> SEQUENCE: 29

```
tggtacctct agagtcgacc cgggcggcct cgaggacggg gtgaactacg cctgaggatc      60
```

```
cgatcttttt ccctctgcca aaaattatgg ggacatcatg aagccccttg agcatctgac    120
ttctggctaa taaaggaaat ttattttcat tgcaatagtg tgttggaatt ttttgtgtct    180
ctcactcgga agcaattcgt tgatctgaat ttcgaccacc cataataccc attaccctgg    240
tagataagta gcatggcggg ttaatcatta actacaagga accccctagtg atggagttgg    300 ccactccctc tctgcgcgct cgctcgctca ctgaggccgg gcgaccaaag gtcgcccgac    360
gcccgggctt tgcccgggcg gcctcagtga gcgagcgagc gcgcagcctt aattaaccta    420
attcactggc cgtcgtttta caacgtcgtg actgggaaaa ccctggcgtt acccaactta    480
atcgccttgc agcacatccc cctttcgcca gctggcgtaa tagcgaagag gcccgcaccg    540 atcgccttc ccaacagttg cgcagcctga atggcgaatg ggacgcgccc tgtagcggcg    600
cattaagcgc ggcgggtgtg gtggttacgc gcagcgtgac cgctacactt gccagcgccc    660
tagcgcccgc tcctttcgct ttcttccctt cctttctcgc cacgttcgcc ggctttcccc    720
gtcaagctct aaatcggggg ctcccttag ggttccgatt tagtgcttta cggcacctcg    780
accccaaaaa acttgattag ggtgatggtt cacgtagtgg gccatcgccc tgatagacgg    840
tttttcgccc tttgacgttg gagtccacgt tctttaatag tggactcttg ttccaaactg    900
gaacaacact caaccctatc tcggtctatt cttttgattt ataagggatt ttgccgattt    960
cggcctattg gttaaaaaat gagctgattt aacaaaaatt taacgcgaat tttaacaaaa   1020
tattaacgct tacaatttag gtggcacttt tcggggaaat gtgcgcggaa cccctatttg   1080 tttattttc taaatacatt caaatatgta tccgctcatg agacaataac cctgataaat   1140
gcttcaataa tattgaaaaa ggaagagtat gagtattcaa catttccgtg tcgcccttat   1200 tcccttttt gcggcatttt gccttcctgt ttttgctcac ccagaaacgc tggtgaaagt   1260
aaaagatgct gaagatcagt tgggtgcacg agtgggttac atcgaactgg atctcaacag   1320
cggtaagatc cttgagagtt ttcgccccga agaacgtttt ccaatgatga gcacttttaa   1380
agttctgcta tgtggcgcgg tattatcccg tattgacgcc gggcaagagc aactcggtcg   1440
ccgcatacac tattctcaga atgacttggt tgagtactca ccagtcacag aaaagcatct   1500
tacggatggc atgacagtaa gagaattatg cagtgctgcc ataaccatga gtgataacac   1560
tgcggccaac ttacttctga caacgatcgg aggaccgaag gagctaaccg cttttttgca   1620
caacatgggg gatcatgtaa ctcgccttga tcgttgggaa ccggagctga atgaagccat   1680
accaaacgac gagcgtgaca ccacgatgcc tgtagcaatg gcaacaacgt tgcgcaaact   1740
attaactggc gaactactta ctctagcttc ccggcaacaa ttaatagact ggatggaggc   1800
ggataaagtt gcaggaccac ttctgcgctc ggcccttccg gctggctggt ttattgctga   1860
taaatctgga gccggtgagc gtgggtctcg cggtatcatt gcagcactgg ggccagatgg   1920
taagccctcc cgtatcgtag ttatctacac gacgggagt caggcaacta tggatgaacg   1980
aaatagacag atcgctgaga taggtgcctc actgattaag cattggtaac tgtcagacca   2040
agtttactca tatatacttt agattgattt aaaacttcat ttttaattta aaaggatcta   2100
ggtgaagatc cttttttgata atctcatgac caaaatccct taacgtgagt tttcgttcca   2160
ctgagcgtca gaccccgtag aaaagatcaa aggatcttct tgagatcctt ttttctgcg   2220 cgtaatctgc tgcttgcaaa caaaaaaacc accgctacca gcggtggttt gtttgccgga   2280
tcaagagcta ccaactcttt ttccgaaggt aactggcttc agcagagcgc agataccaaa   2340
tactgttctt ctagtgtagc cgtagttagg ccaccacttc aagaactctg tagcaccgcc   2400
```

```
tacatacctc gctctgctaa tcctgttacc agtggctgct gccagtggcg ataagtcgtg    2460
tcttaccggg ttggactcaa gacgatagtt accggataag gcgcagcggt cgggctgaac    2520 gggggggttcg tgcacacagc ccagcttgga gcgaacgacc tacaccgaac tgagatacct   2580
acagcgtgag ctatgagaaa gcgccacgct tcccgaaggg agaaaggcgg acaggtatcc    2640
ggtaagcggc agggtcggaa caggagagcg cacgagggag cttccagggg gaaacgcctg    2700
gtatctttat agtcctgtcg ggtttcgcca cctctgactt gagcgtcgat ttttgtgatg    2760
ctcgtcaggg gggcggagcc tatggaaaaa cgccagcaac gcggcctttt tacggttcct    2820
ggccttttgc tggccttttg ctcacatgtt ctttcctgcg ttatcccctg attctgtgga    2880
taaccgtatt accgcctttg agtgagctga taccgctcgc cgcagccgaa cgaccgagcg    2940
cagcgagtca gtgagcgagg aagcggaaga gcgcccaata cgcaaaccgc ctctccccgc    3000
gcgttggccg attcattaat gcagctggca cgacaggttt cccgactgga aagcgggcag    3060
tgagcgcaac gcaattaatg tgagttagct cactcattag gcaccccagg ctttacactt    3120
tatgcttccg gctcgtatgt tgtgtggaat tgtgagcgga taacaatttc acacaggaaa    3180
cagctatgac catgattacg ccagatttaa ttaaggcctt aattaggctg cgcgctcgct    3240
cgctcactga ggccgcccgg gcaaagcccg ggcgtcgggc gacctttggt cgcccggcct    3300
cagtgagcga gcgagcgcgc agagagggag tggccaactc catcactagg ggttccttgt    3360
agttaatgat taacccgcca tgctacttat ctaccaggt aatggggatc ctctagaact    3420
atagctagtc gacattgatt attgactagt atcgtgctct ccgattggcc gtccgcgtcc    3480
tcgtgacgtc agacccgcc cacgcgcccc tcctccgcat ctgagcgggg gagcggcggc    3540
ccccagctga atgggcgcga gagcggcgct gggggcgggt gggggcgcgg ggtaccgggc    3600
tggcggccgg ccggcgcccc ctcattagta tggtgagcaa gggcgaggag ctgttcaccg    3660
gggtggtgcc catcctggtc gagctggacg gcgacgtaaa cggccacaag ttcagcgtgt    3720
ccggcgaggg cgagggcgat gccacctacg gcaagctgac cctgaagttc atctgcacca    3780
ccggcaagct gcccgtgccc tggcccaccc tcgtgaccac cctgacctac ggcgtgcagt    3840
gcttcagccg ctaccccgac cacatgaagc agcacgactt cttcaagtcc gccatgcccg    3900
aaggctacgt ccaggagcgc accatcttct tcaaggacga cggcaactac aagacccgcg    3960
ccgaggtgaa gttcgagggc gacaccctgg tgaaccgcat cgagctgaag ggcatcgact    4020
tcaaggagga cggcaacatc ctggggcaca agctggagta caactacaac agccacaacg    4080
tctatatcat ggccgacaag cagaagaacg gcatcaaggt gaacttcaag atccgccaca    4140
acatcgagga cggcagcgtg cagctcgccg accactacca gcagaacacc cccatcggcg    4200
acggccccgt gctgctgccc gacaaccact acctgagcac ccagtccgcc ctgagcaaag    4260
accccaacga gaagcgcgat cacatggtcc tgctggagtt cgtgaccgcc gccgggatca    4320
ctctcggcat ggacgagctg tacaagtccg gactcagatc ctactagacg cg            4372
```

<210> SEQ ID NO 30
<211> LENGTH: 4729
<212> TYPE: DNA
<213> ORGANISM: Artificial Sequence
<220> FEATURE:
<223> OTHER INFORMATION: Synthetic Polynucleotide

<400> SEQUENCE: 30

```
tggtacctct agagtcgacc cgggcggcct cgaggacggg gtgaactacg cctgaggatc     60
cgatcttttt ccctctgcca aaaattatgg ggacatcatg aagcccttg agcatctgac     120
```

```
ttctggctaa taaaggaaat ttattttcat tgcaatagtg tgttggaatt ttttgtgtct    180
ctcactcgga agcaattcgt tgatctgaat ttcgaccacc cataataccc attaccctgg    240
tagataagta gcatggcggg ttaatcatta actacaagga acccctagtg atggagttgg    300
ccactccctc tctgcgcgct cgctcgctca ctgaggccgg gcgaccaaag gtcgcccgac    360
gcccgggctt tgcccgggcg gcctcagtga gcgagcgagc gcgcagcctt aattaaccta    420
attcactggc cgtcgtttta caacgtcgtg actgggaaaa ccctggcgtt acccaactta    480
atcgccttgc agcacatccc cctttcgcca gctggcgtaa tagcgaagag gcccgcaccg    540
atcgcccttc ccaacagttg cgcagcctga atggcgaatg gacgcgcccc tgtagcggcg    600
cattaagcgc ggcgggtgtg gtggttacgc gcagcgtgac cgctacactt gccagcgccc    660
tagcgcccgc tcctttcgct ttcttccctt cctttctcgc cacgttcgcc ggctttcccc    720
gtcaagctct aaatcggggg ctccctttag ggttccgatt tagtgcttta cggcacctcg    780
accccaaaaa acttgattag ggtgatggtt cacgtagtgg gccatcgccc tgatagacgg    840 ttttcgccc tttgacgttg gagtccacgt tctttaatag tggactcttg ttccaaactg    900
gaacaacact caaccctatc tcggtctatt cttttgattt ataagggatt ttgccgattt    960
cggcctattg gttaaaaaat gagctgattt aacaaaaatt taacgcgaat tttaacaaaa   1020
tattaacgct tacaatttag gtggcacttt tcggggaaat gtgcgcggaa ccccatttg   1080 tttattttc taaatacatt caaatatgta tccgctcatg agacaataac cctgataaat   1140
gcttcaataa tattgaaaaa ggaagagtat gagtattcaa catttccgtg tcgcccttat   1200
tccctttttt gcggcatttt gccttcctgt ttttgctcac ccagaaacgc tggtgaaagt   1260
aaaagatgct gaagatcagt tgggtgcacg agtgggttac atcgaactgg atctcaacag   1320
cggtaagatc cttgagagtt ttcgccccga agaacgtttt ccaatgatga gcacttttaa   1380
agttctgcta tgtggcgcgg tattatcccg tattgacgcc gggcaagagc aactcggtcg   1440
ccgcatacac tattctcaga atgacttggt tgagtactca ccagtcacag aaaagcatct   1500
tacggatggc atgacagtaa gagaattatg cagtgctgcc ataaccatga gtgataacac   1560
tgcggccaac ttacttctga caacgatcgg aggaccgaag gagctaaccg cttttttgca   1620
caacatgggg gatcatgtaa ctcgccttga tcgttgggaa ccggagctga atgaagccat   1680
accaaacgac gagcgtgaca ccacgatgcc tgtagcaatg gcaacaacgt tgcgcaaact   1740
attaactggc gaactactta ctctagcttc ccggcaacaa ttaatagact ggatggaggc   1800
ggataaagtt gcaggaccac ttctgcgctc ggcccttccg gctggctggt ttattgctga   1860
taaatctgga gccggtgagc gtgggtctcg cggtatcatt gcagcactgg ggccagatgg   1920
taagccctcc cgtatcgtag ttatctacac gacgggagt caggcaacta tggatgaacg   1980
aaatagacag atcgctgaga taggtgcctc actgattaag cattggtaac tgtcagacca   2040
agtttactca tatatacttt agattgattt aaaacttcat ttttaattta aaaggatcta   2100
ggtgaagatc cttttgata atctcatgac caaaatccct taacgtgagt tttcgttcca   2160
ctgagcgtca gaccccgtag aaaagatcaa aggatcttct tgagatcctt ttttctgcg   2220 cgtaatctgc tgcttgcaaa caaaaaaacc accgctacca gcggtggttt gtttgccgga   2280
tcaagagcta ccaactcttt ttccgaaggt aactggcttc agcagagcgc agataccaaa   2340
tactgttctt ctagtgtagc cgtagttagg ccaccacttc aagaactctg tagcaccgcc   2400 tacataccctc gctctgctaa tcctgttacc agtggctgct gccagtggcg ataagtcgtg   2460
```

```
tcttaccggg ttggactcaa gacgatagtt accggataag gcgcagcggt cgggctgaac    2520
gggggggttcg tgcacacagc ccagcttgga gcgaacgacc tacaccgaac tgagatacct    2580
acagcgtgag ctatgagaaa gcgccacgct cccgaaggga gaaaggcgg acaggtatcc     2640
ggtaagcggc agggtcggaa caggagagcg cacgagggga cttccagggg gaaacgcctg    2700
gtatctttat agtcctgtcg ggtttcgcca cctctgactt gagcgtcgat ttttgtgatg    2760
ctcgtcaggg gggcggagcc tatggaaaaa cgccagcaac gcggccttt  tacggttcct    2820
ggccttttgc tggccttttg ctcacatgtt ctttcctgcg ttatcccctg attctgtgga    2880
taaccgtatt accgcctttg agtgagctga taccgctcgc cgcagccgaa cgaccgagcg    2940
cagcgagtca gtgagcgagg aagcggaaga gcgcccaata cgcaaaccgc ctctccccgc    3000
gcgttggccg attcattaat gcagctggca cgacaggttt cccgactgga aagcgggcag    3060
tgagcgcaac gcaattaatg tgagttagct cactcattag gcaccccagg ctttacactt    3120
tatgcttccg gctcgtatgt tgtgtggaat tgtgagcgga taacaatttc acacaggaaa    3180
cagctatgac catgattacg ccagatttaa ttaaggcctt aattaggctg cgcgctcgct    3240
cgctcactga ggccgcccgg gcaaagcccg ggcgtcgggc gacctttggt cgcccggcct    3300
cagtgagcga gcgagcgcgc agagagggag tggccaactc catcactagg ggttccttgt    3360
agttaatgat taacccgcca tgctacttat ctaccagggt aatggggatc ctctagaact    3420
atagctagtc gacattgatt attgactagt atcgtgctct ccgattggcc gtccgcgtcc    3480
tcgtgacgtc agaccccgcc cacgcgcccc tcctccgcat ctgagcgggg gagcggcggc    3540
ccccagctga atgggcgcga gagcggcgct ggggcgggt gggggcgcgg ggtaccgggc     3600
tggcggccgg ccggcgcccc ctcattagtg ccaccatgag gagaccctcc ctgctgctga    3660
aggatatcct gaagtgcacc ctgctggtgt tggcgtgtg  gatcctgtac atcctgaagc    3720
tgaactacac cacagaggag tgtgacatga agaagatgca ctacgtggac cctgatcacg    3780
tgaagagggc ccagaagtac gctcagcagg tgctgcagaa ggagtgtaga ccaaagtttg    3840
ccaagacaag catggctctg ctgttcgagc accggtactc cgtggatctg ctgccttttg    3900
tgcagaaggc cccaaaggac tctgaggctg agagcaagta cgatcccct  ttcggctttc    3960
gcaagttcag ctccaaggtg cagaccctgc tggagctgct gccagagcac gacctgcccg    4020
agcacctgaa ggctaagaca tgcaggaggt gcgtggtcat cggatccgga ggaatcctgc    4080
acggactgga gctgggacac accctgaacc agttcgacgt ggtcatcagg ctgaactccg    4140
ccccagtgga gggctactct gagcacgtgg gaaacaagac cacaatcaga atgacatacc    4200
ccgagggagc tcctctgtct gacctggagt actacagcaa cgatctgttc gtggccgtgc    4260
tgtttaagtc tgtggacttc aactggctgc aggctatggt gaagaaggag accctgccct    4320
tttgggtgcg gctgttcttt tggaagcagg tggccgagaa gatcccactg cagcccaagc    4380
acttccgcat cctgaaccct gtgatcatca aggagacagc ttttgacatc ctgcagtact    4440
ccgagcccca gtctaggttc tggggcagag ataagaacgt gcctaccatc ggagtgatcg    4500
ccgtggtgct ggctacacac ctgtgcgacg aggtgtctct ggccggcttt ggatacgatc    4560
tgaaccagcc taggacccca ctgcactact tgcagcca  gtgtatggcc gctatgaact    4620
tccagaccat gcacaacgtg accacagaga caaagttcct gctgaagctg gtgaaagagg    4680
gggtggtgaa agacctgagc gggggtattg accgagagtt ttgaacgcg               4729
```

<210> SEQ ID NO 31
<211> LENGTH: 4891

<212> TYPE: DNA
<213> ORGANISM: Artificial Sequence
<220> FEATURE:
<223> OTHER INFORMATION: Synthetic Polynucleotide

<400> SEQUENCE: 31

| | | | | | |
|---|---|---|---|---|---|
| tggtacctct | agagtcgacc | cgggcggcct | cgaggacggg | gtgaactacg | cctgaggatc | 60 |
| cgatctttt | ccctctgcca | aaaattatgg | ggacatcatg | aagccccttg | agcatctgac | 120 |
| ttctggctaa | taaaggaaat | ttattttcat | tgcaatagtg | tgttggaatt | ttttgtgtct | 180 |
| ctcactcgga | agcaattcgt | tgatctgaat | ttcgaccacc | cataataccc | attaccctgg | 240 |
| tagataagta | gcatggcggg | ttaatcatta | actacaagga | acccctagtg | atggagttgg | 300 |
| ccactccctc | tctgcgcgct | cgctcgctca | ctgaggccgg | gcgaccaaag | gtcgcccgac | 360 |
| gcccgggctt | tgcccgggcg | gcctcagtga | gcgagcgagc | gcgcagcctt | aattaaccta | 420 |
| attcactggc | cgtcgtttta | caacgtcgtg | actgggaaaa | ccctggcgtt | acccaactta | 480 |
| atcgccttgc | agcacatccc | cctttcgcca | gctggcgtaa | tagcgaagag | gcccgcaccg | 540 |
| atcgcccttc | ccaacagttg | cgcagcctga | atggcgaatg | ggacgcgccc | tgtagcggcg | 600 |
| cattaagcgc | ggcgggtgtg | gtggttacgc | gcagcgtgac | cgctacactt | gccagcgccc | 660 |
| tagcgcccgc | tcctttcgct | ttcttccctt | cctttctcgc | cacgttcgcc | ggctttcccc | 720 |
| gtcaagctct | aaatcggggg | ctcccttttag | ggttccgatt | tagtgcttta | cggcacctcg | 780 |
| accccaaaaa | acttgattag | ggtgatggtt | cacgtagtgg | gccatcgccc | tgatagacgg | 840 |
| tttttcgccc | tttgacgttg | gagtccacgt | tctttaatag | tggactcttg | ttccaaactg | 900 |
| gaacaacact | caaccctatc | tcggtctatt | cttttgattt | ataagggatt | ttgccgattt | 960 |
| cggcctattg | gttaaaaaat | gagctgattt | aacaaaaatt | taacgcgaat | tttaacaaaa | 1020 |
| tattaacgct | tacaatttag | gtggcacttt | tcggggaaat | gtgcgcggaa | ccctatttg | 1080 |
| tttattttc | taaatacatt | caaatatgta | tccgctcatg | agacaataac | cctgataaat | 1140 |
| gcttcaataa | tattgaaaaa | ggaagagtat | gagtattcaa | catttccgtg | tcgcccttat | 1200 |
| tccctttttt | gcggcatttt | gccttcctgt | ttttgctcac | ccagaaacgc | tggtgaaagt | 1260 |
| aaaagatgct | gaagatcagt | tgggtgcacg | agtgggttac | atcgaactgg | atctcaacag | 1320 |
| cggtaagatc | cttgagagtt | ttcgccccga | agaacgtttt | ccaatgatga | gcacttttaa | 1380 |
| agttctgcta | tgtggcgcgg | tattatcccg | tattgacgcc | gggcaagagc | aactcggtcg | 1440 |
| ccgcatacac | tattctcaga | atgacttggt | tgagtactca | ccagtcacag | aaaagcatct | 1500 |
| tacgatggga | atgacagtaa | gagaattatg | cagtgctgcc | ataaccatga | gtgataacac | 1560 |
| tgcggccaac | ttacttctga | caacgatcgg | aggaccgaag | gagctaaccg | cttttttgca | 1620 |
| caacatgggg | gatcatgtaa | ctcgccttga | tcgttgggaa | ccggagctga | atgaagccat | 1680 |
| accaaacgac | gagcgtgaca | ccacgatgcc | tgtagcaatg | gcaacaacgt | tgcgcaaact | 1740 |
| attaactggc | gaactactta | ctctagcttc | ccggcaacaa | ttaatagact | ggatggaggc | 1800 |
| ggataaagtt | gcaggaccac | ttctgcgctc | ggcccttccg | gctggctggt | ttattgctga | 1860 |
| taaatctgga | gccggtgagc | gtgggtctcg | cggtatcatt | gcagcactgg | ggccagatgg | 1920 |
| taagccctcc | cgtatcgtag | ttatctacac | gacggggagt | caggcaacta | tggatgaacg | 1980 |
| aaatagacag | atcgctgaga | taggtgcctc | actgattaag | cattggtaac | tgtcagacca | 2040 |
| agtttactca | tatatacttt | agattgattt | aaaacttcat | ttttaattta | aaaggatcta | 2100 |
| ggtgaagatc | cttttgata | atctcatgac | caaaatccct | taacgtgagt | tttcgttcca | 2160 |

```
ctgagcgtca gaccccgtag aaaagatcaa aggatcttct tgagatcctt ttttctgcg    2220
cgtaatctgc tgcttgcaaa caaaaaaacc accgctacca gcggtggttt gtttgccgga   2280
tcaagagcta ccaactcttt ttccgaaggt aactggcttc agcagagcgc agataccaaa   2340
tactgttctt ctagtgtagc cgtagttagg ccaccacttc aagaactctg tagcaccgcc   2400
tacatacctc gctctgctaa tcctgttacc agtggctgct gccagtggcg ataagtcgtg   2460
tcttaccggg ttggactcaa gacgatagtt accggataag gcgcagcggt cgggctgaac   2520
ggggggttcg tgcacacagc ccagcttgga gcgaacgacc tacaccgaac tgagatacct   2580
acagcgtgag ctatgagaaa gcgccacgct cccgaaggga gaaaggcgg acaggtatcc    2640
ggtaagcggc agggtcggaa caggagagcg cacgagggag cttccagggg gaaacgcctg   2700
gtatctttat agtcctgtcg ggtttcgcca cctctgactt gagcgtcgat ttttgtgatg   2760
ctcgtcaggg gggcggagcc tatggaaaaa cgccagcaac gcggcctttt tacggttcct   2820
ggccttttgc tggccttttg ctcacatgtt ctttcctgcg ttatcccctg attctgtgga   2880
taaccgtatt accgcctttg agtgagctga taccgctcgc cgcagccgaa cgaccgagcg   2940
cagcgagtca gtgagcgagg aagcggaaga gcgcccaata cgcaaaccgc ctctccccgc   3000
gcgttggccg attcattaat gcagctggca cgacaggttt cccgactgga aagcgggcag   3060
tgagcgcaac gcaattaatg tgagttagct cactcattag gcaccccagg ctttacactt   3120
tatgcttccg gctcgtatgt tgtgtggaat tgtgagcgga taacaatttc acacaggaaa   3180
cagctatgac catgattacg ccagatttaa ttaaggcctt aattaggctg cgcgctcgct   3240
cgctcactga ggccgcccgg gcaaagcccg ggcgtcgggc gacctttggt cgcccggcct   3300
cagtgagcga gcgagcgcgc agagagggag tggccaactc catcactagg ggttccttgt   3360
agttaatgat taacccgcca tgctacttat ctaccagggt aatggggatc ctctagaact   3420
atagctagtc gacattgatt attgactagt atcgtgctct ccgattggcc gtccgcgtcc   3480
tcgtgacgtc agaccccgcc cacgcgcccc tcctccgcat ctgagcgggg gagcggcggc   3540
ccccagctga atgggcgcga gagcggcgct gggggcgggt ggggcgcgg ggtaccgggc    3600
tggcggccgg ccggcgcccc ctcattagta tgagaactaa agcagcaggt tgtgcagaga   3660
gaagaccact ccagcctaga actgaagcag cagcagcacc agcaggtaga gcaatgccat   3720
ccgagtacac ctacgtgaag ctgcggtctg actgcagccg cccatccctg cagtggtaca   3780
caagagccca gagcaagatg aggagaccct ccctgctgct gaaggatatc ctgaagtgca   3840
ccctgctggt gtttggcgtg tggatcctgt acatcctgaa gctgaactac accacagagg   3900
agtgtgacat gaagaagatg cactacgtgg accctgatca cgtgaagagg gcccagaagt   3960
acgctcagca ggtgctgcag aaggagtgta gaccaaagtt tgccaagaca gcatggctc    4020
tgctgttcga gcaccggtac tccgtggatc tgctgccttt tgtgcagaag gccccaaagg   4080
actctgaggc tgagagcaag tacgatcccc ctttcggctt tcgcaagttc agctccaagg   4140
tgcagaccct gctggagctg ctgccagagc acgacctgcc cgagcacctg aaggctaaga   4200
catgcaggag gtgcgtggtc atcggatccg gaggaatcct gcacggactg agctgggac    4260
acaccctgaa ccagttcgac gtggtcatca ggctgaactc cgcccagtg gagggctact    4320
ctgagcacgt gggaaacaag accacaatca gaatgacata cccgaggga gctcctctgt    4380
ctgacctgga gtactacagc aacgatctgt tcgtggccgt gctgtttaag tctgtggact   4440
tcaactggct gcaggctatg gtgaagaagg agaccctgcc ctttgggtg cggctgttct    4500
tttggaagca ggtggccgag aagatcccac tgcagcccaa gcacttccgc atcctgaacc   4560
```

```
ctgtgatcat caaggagaca gcttttgaca tcctgcagta ctccgagccc cagtctaggt    4620
tctggggcag agataagaac gtgcctacca tcggagtgat cgccgtggtg ctggctacac    4680
acctgtgcga cgaggtgtct ctggccggct ttggatacga tctgaaccag cctaggaccc    4740
cactgcacta ctttgacagc cagtgtatgg ccgctatgaa cttccagacc atgcacaacg    4800
tgaccacaga gacaaagttc ctgctgaagc tggtgaaaga gggggtggtg aaagacctga    4860
gcgggggtat tgaccgagag ttttgaacgc g                                   4891

<210> SEQ ID NO 32
<211> LENGTH: 4807
<212> TYPE: DNA
<213> ORGANISM: Artificial Sequence
<220> FEATURE:
<223> OTHER INFORMATION: Synthetic Polynucleotide

<400> SEQUENCE: 32
tggtacctct agagtcgacc cgggcggcct cgaggacggg gtgaactacg cctgaggatc      60
cgatcttttt ccctctgcca aaaattatgg ggacatcatg aagcccttg agcatctgac    120 ttctggctaa taaggaaat ttattttcat tgcaatagtg tgttggaatt ttttgtgtct    180
ctcactcgga agcaattcgt tgatctgaat ttcgaccacc cataataccc attccctgg    240 tagataagta gcatggcggg ttaatcatta actacaagga acccctagtg atggagttgg    300
ccactccctc tctgcgcgct cgctcgctca ctgaggccgg gcgaccaaag gtcgcccgac    360
gcccgggctt tgcccgggcg gcctcagtga gcgagcgagc gcgcagcctt aattaaccta    420
attcactggc cgtcgtttta caacgtcgtg actgggaaaa ccctggcgtt acccaactta    480
atcgccttgc agcacatccc cctttcgcca gctggcgtaa tagcgaagag gcccgcaccg    540 atcgccctt ccaacagttg cgcagcctga atggcgaatg ggacgcgccc tgtagcggcg    600
cattaagcgc ggcgggtgtg gtggttacgc gcagcgtgac cgctacactt gccagcgccc    660
tagcgcccgc tcctttcgct ttcttccctt cctttctcgc cacgttcgcc ggctttcccc    720
gtcaagctct aaatcggggg ctcccttag ggttccgatt tagtgcttta cggcacctcg    780
accccaaaaa acttgattag ggtgatggtt cacgtagtgg gccatcgccc tgatagacgg    840
tttttcgccc tttgacgttg gagtccacgt tctttaatag tggactcttg ttccaaactg    900
gaacaacact caaccctatc tcggtctatt cttttgattt ataagggatt ttgccgattt    960
cggcctattg gttaaaaaat gagctgattt aacaaaaatt taacgcgaat tttaacaaaa   1020
tattaacgct tacaatttag gtggcacttt tcggggaaat gtgcgcggaa cccctatttg   1080
tttatttttc taaatacatt caaatatgta tccgctcatg agacaataac cctgataaat   1140
gcttcaataa tattgaaaaa ggaagagtat gagtattcaa catttccgtg tcgcccttat   1200
tccctttttt gcggcatttt gccttcctgt ttttgctcac ccagaaacgc tggtgaaagt   1260
aaaagatgct gaagatcagt tgggtgcacg agtgggttac atcgaactgg atctcaacag   1320
cggtaagatc cttgagagtt ttcgccccga agaacgtttt ccaatgatga gcacttttaa   1380
agttctgcta tgtggcgcgg tattatcccg tattgacgcc gggcaagagc aactcggtcg   1440
ccgcatacac tattctcaga atgacttggt tgagtactca ccagtcacag aaaagcatct   1500
tacggatggc atgacagtaa gagaattatg cagtgctgcc ataaccatga gtgataacac   1560
tgcggccaac ttacttctga caacgatcgg aggaccgaag gagctaaccg cttttttgca   1620
caacatgggg gatcatgtaa ctcgccttga tcgttgggaa ccggagctga atgaagccat   1680
```

```
accaaacgac gagcgtgaca ccacgatgcc tgtagcaatg caacaacgt tgcgcaaact    1740 attaactggc gaactactta ctctagcttc ccggcaacaa ttaatagact ggatggaggc    1800
ggataaagtt gcaggaccac ttctgcgctc ggcccttccg gctggctggt ttattgctga    1860
taaatctgga gccggtgagc gtgggtctcg cggtatcatt gcagcactgg ggccagatgg    1920
taagccctcc cgtatcgtag ttatctacac gacggggagt caggcaacta tggatgaacg    1980
aaatagacag atcgctgaga taggtgcctc actgattaag cattggtaac tgtcagacca    2040
agtttactca tatatacttt agattgattt aaaacttcat ttttaattta aaaggatcta    2100
ggtgaagatc cttttttgata atctcatgac caaaatccct aacgtgagt tttcgttcca    2160 ctgagcgtca gaccccgtag aaaagatcaa aggatcttct tgagatcctt ttttttctgcg    2220 cgtaatctgc tgcttgcaaa caaaaaaacc accgctacca gcggtggttt gtttgccgga    2280
tcaagagcta ccaactcttt ttccgaaggt aactggcttc agcagagcgc agataccaaa    2340
tactgttctt ctagtgtagc cgtagttagg ccaccacttc aagaactctg tagcaccgcc    2400 tacataccctc gctctgctaa tcctgttacc agtggctgct gccagtggcg ataagtcgtg    2460
tcttaccggg ttggactcaa gacgatagtt accggataag cgcagcggt cgggctgaac    2520 ggggggttcg tgcacacagc ccagcttgga gcgaacgacc tacaccgaac tgagatacct    2580
acagcgtgag ctatgagaaa gcgccacgct tcccgaaggg agaaaggcgg acaggtatcc    2640
ggtaagcggc agggtcggaa caggagagcg cacgaggga cttccagggg gaaacgcctg    2700
gtatctttat agtcctgtcg ggtttcgcca cctctgactt gagcgtcgat ttttgtgatg    2760
ctcgtcaggg gggcggagcc tatggaaaaa cgccagcaac gcggcctttt tacggttcct    2820
ggccttttgc tggccttttg ctcacatgtt ctttcctgcg ttatcccctg attctgtgga    2880
taaccgtatt accgcctttg agtgagctga taccgctcgc cgcagccgaa cgaccgagcg    2940
cagcgagtca gtgagcgagg aagcggaaga gcgcccaata cgcaaaccgc ctctccccgc    3000
gcgttggccg attcattaat gcagctgca cgacaggttt cccgactgga aagcgggcag    3060
tgagcgcaac gcaattaatg tgagttagct cactcattag gcaccccagg ctttacactt    3120
tatgcttccg gctcgtatgt tgtgtggaat tgtgagcgga taacaatttc acacaggaaa    3180
cagctatgac catgattacg ccagatttaa ttaaggcctt aattaggctg cgcgctcgct    3240
cgctcactga ggccgcccgg gcaaagcccg ggcgtcgggc gacctttggt cgcccggcct    3300
cagtgagcga gcgagcgcgc agagagggag tggccaactc catcactagg ggttccttgt    3360
agttaatgat taacccgcca tgctactat ctaccagggt aatggggatc ctctagaact    3420
atagctagtc gacattgatt attgactagt atcgtgctct ccgattggcc gtccgcgtcc    3480
tcgtgacgtc agaccccgcc cacgcgcccc tcctccgcat ctgagcgggg gagcggcggc    3540
ccccagctga atgggcgcga gagcggcgct ggggcgggt ggggcgcgg ggtaccgggc    3600 tggcggccgg ccggcgcccc ctcattagta tgccatccga gtacacctac gtgaagctgc    3660
ggtctgactg cagccgccca tccctgcagt ggtacacaag agcccagagc aagatgagga    3720
gaccctccct gctgctgaag gatatcctga agtgcaccct gctggtgttt ggcgtgtgga    3780
tcctgtacat cctgaagctg aactacacca cagaggagtg tgacatgaag aagatgcact    3840
acgtggaccc tgatcacgtg aagagggccc agaagtacgc tcagcaggtg ctgcagaagg    3900
agtgtagacc aaagtttgcc aagacaagca tggctctgct gttcgagcac cggtactccg    3960
tggatctgct gccttttgtg cagaaggccc caaaggactg tgaggctgag agcaagtacg    4020 atccccctttt cggctttcgc aagttcagct ccaaggtgca gaccctgctg gagctgctgc    4080
```

```
cagagcacga cctgcccgag cacctgaagg ctaagacatg caggaggtgc gtggtcatcg   4140
gatccggagg aatcctgcac ggactggagc tgggacacac cctgaaccag ttcgacgtgg   4200
tcatcaggct gaactccgcc ccagtggagg gctactctga gcacgtggga aacaagacca   4260
caatcagaat gacataccc  gagggagctc ctctgtctga cctggagtac tacagcaacg   4320
atctgttcgt ggccgtgctg tttaagtctg tggacttcaa ctggctgcag gctatggtga   4380
agaaggagac cctgcccttt tgggtgcggc tgttctttg  gaagcaggtg gccgagaaga   4440
tcccactgca gcccaagcac ttccgcatcc tgaaccctgt gatcatcaag gagacagctt   4500
ttgacatcct gcagtactcc gagccccagt ctaggttctg gggcagagat aagaacgtgc   4560
ctaccatcgg agtgatcgcc gtggtgctgg ctacacacct gtgcgacgag gtgtctctgg   4620
ccggctttgg atacgatctg aaccagccta ggacccccact gcactacttt gacagccagt   4680
gtatggccgc tatgaacttc cagaccatgc acaacgtgac cacagagaca aagttcctgc   4740
tgaagctggt gaaagagggg gtggtgaaag acctgagcgg gggtattgac cgagagtttt   4800
gaacgcg                                                            4807

<210> SEQ ID NO 33
<211> LENGTH: 4723
<212> TYPE: DNA
<213> ORGANISM: Artificial Sequence
<220> FEATURE:
<223> OTHER INFORMATION: Synthetic Polynucleotide

<400> SEQUENCE: 33
tggtacctct agagtcgacc cgggcggcct cgaggacggg gtgaactacg cctgaggatc     60
cgatcttttt ccctctgcca aaaattatgg ggacatcatg aagcccccttg agcatctgac    120 ttctggctaa taaggaaat  ttattttcat tgcaatagtg tgttggaatt ttttgtgtct    180
ctcactcgga agcaattcgt tgatctgaat ttcgaccacc cataataccc attaccctgg    240
tagataagta gcatggcggg ttaatcatta actacaagga accccctagtg atggagttgg    300 ccactccctc tctgcgcgct cgctcgctca ctgaggccgg gcgaccaaag gtcgcccgac    360
gcccgggctt tgcccgggcg gcctcagtga gcgagcgagc gcgcagcctt aattaaccta    420
attcactggc cgtcgtttta caacgtcgtg actgggaaaa ccctggcgtt acccaactta    480
atcgccttgc agcacatccc cctttcgcca gctggcgtaa tagcgaagag gcccgcaccg    540 atcgccctt  ccaacagttg cgcagcctga atggcgaatg ggacgcgccc tgtagcggcg    600
cattaagcgc ggcgggtgtg gtggttacgc gcagcgtgac cgctacactt gccagcgccc    660
tagcgcccgc tcctttcgct ttcttccctt cctttctcgc cacgttcgcc ggctttcccc    720
gtcaagctct aaatcggggg ctcccttag  ggttccgatt tagtgcttta cggcacctcg    780
accccaaaaa acttgattag ggtgatggtt cacgtagtgg gccatcgccc tgatagacgg    840
tttttcgccc tttgacgttg gagtccacgt tctttaatag tggactcttg ttccaaactg    900
gaacaacact caaccctatc tcggtctatt cttttgattt ataagggatt ttgccgattt    960
cggcctattg gttaaaaaat gagctgattt aacaaaaatt taacgcgaat tttaacaaaa   1020
tattaacgct tacaatttag gtggcacttt tcggggaaat gtgcgcggaa cccctatttg   1080
tttatttttc taaatacatt caaatatgta tccgctcatg agacaataac cctgataaat   1140
gcttcaataa tattgaaaaa ggaagagtat gagtattcaa catttccgtg tcgcccttat   1200
tccctttttt gcggcatttt gccttcctgt ttttgctcac ccagaaacgc tggtgaaagt   1260
```

```
aaaagatgct gaagatcagt tgggtgcacg agtgggttac atcgaactgg atctcaacag    1320
cggtaagatc cttgagagtt ttcgccccga gaacgtttt ccaatgatga gcacttttaa    1380
agttctgcta tgtggcgcgg tattatcccg tattgacgcc gggcaagagc aactcggtcg    1440
ccgcatacac tattctcaga atgacttggt tgagtactca ccagtcacag aaaagcatct    1500
tacggatggc atgacagtaa gagaattatg cagtgctgcc ataaccatga gtgataacac    1560
tgcggccaac ttacttctga caacgatcgg aggaccgaag gagctaaccg cttttttgca    1620
caacatgggg gatcatgtaa ctcgccttga tcgttgggaa ccggagctga atgaagccat    1680
accaaacgac gagcgtgaca ccacgatgcc tgtagcaatg gcaacaacgt tgcgcaaact    1740
attaactggc gaactactta ctctagcttc ccggcaacaa ttaatagact ggatggaggc    1800
ggataaagtt gcaggaccac ttctgcgctc ggcccttccg gctggctggt ttattgctga    1860
taaatctgga gccggtgagc gtgggtctcg cggtatcatt gcagcactgg ggccagatgg    1920
taagccctcc cgtatcgtag ttatctacac gacgggagt caggcaacta tggatgaacg    1980
aaatagacag atcgctgaga taggtgcctc actgattaag cattggtaac tgtcagacca    2040
agtttactca tatatacttt agattgattt aaaacttcat ttttaattta aaaggatcta    2100
ggtgaagatc cttttgata atctcatgac caaaatccct taacgtgagt tttcgttcca    2160
ctgagcgtca gaccccgtag aaaagatcaa aggatcttct tgagatcctt ttttctgcg    2220 cgtaatctgc tgcttgcaaa caaaaaaacc accgctacca gcggtggttt gtttgccgga    2280
tcaagagcta ccaactcttt ttccgaaggt aactggcttc agcagagcgc agataccaaa    2340
tactgttctt ctagtgtagc cgtagttagg ccaccacttc aagaactctg tagcaccgcc    2400 tacataccte gctctgctaa tcctgttacc agtggctgct gccagtggcg ataagtcgtg    2460
tcttaccggg ttggactcaa gacgatagtt accggataag gcgcagcggt cgggctgaac    2520
ggggggttcg tgcacacagc ccagcttgga gcgaacgacc tacaccgaac tgagatacct    2580
acagcgtgag ctatgagaaa gcgccacgct tcccgaaggg agaaaggcgg acaggtatcc    2640
ggtaagcggc agggtcggaa caggagagcg cacgagggag cttccagggg gaaacgcctg    2700
gtatctttat agtcctgtcg ggtttcgcca cctctgactt gagcgtcgat ttttgtgatg    2760
ctcgtcaggg gggcggagcc tatggaaaaa cgccagcaac gcggcctttt tacggttcct    2820
ggccttttgc tggccttttg ctcacatgtt ctttcctgcg ttatcccctg attctgtgga    2880
taaccgtatt accgcctttg agtgagctga taccgctcgc cgcagccgaa cgaccgagcg    2940
cagcgagtca gtgagcgagg aagcggaaga gcgcccaata cgcaaaccgc ctctccccgc    3000
gcgttggccg attcattaat gcagctggca cgacaggttt cccgactgga aagcgggcag    3060
tgagcgcaac gcaattaatg tgagttagct cactcattag gcaccccagg ctttacactt    3120
tatgcttccg gctcgtatgt tgtgtggaat tgtgagcgga taacaatttc acacaggaaa    3180
cagctatgac catgattacg ccagatttaa ttaaggcctt aattaggctg cgcgctcgct    3240
cgctcactga ggccgcccgg gcaaagcccg ggcgtcgggc gacctttggt cgcccggcct    3300
cagtgagcga gcgagcgcgc agagagggag tggccaactc catcactagg ggttccttgt    3360
agttaatgat taacccgcca tgctactat ctaccagggt aatggggatc ctctagaact    3420
atagctagtc gacattgatt attgactagt atcgtgctct ccgattggcc gtccgcgtcc    3480
tcgtgacgtc agaccccgcc cacgcgcccc tcctccgcat ctgagcgggg gagcggcggc    3540
ccccagctga atgggcgcga gagcggcgct ggggcgggt gggggcgcgg ggtaccgggc    3600
tggcggccgg ccggcgcccc ctcattagta tgaggagacc ctccctgctg ctgaaggata    3660
```

```
tcctgaagtg cacccgctg gtgtttggcg tgtggatcct gtacatcctg aagctgaact    3720
acaccacaga ggagtgtgac atgaagaaga tgcactacgt ggaccctgat cacgtgaaga    3780
gggcccagaa gtacgctcag caggtgctgc agaaggagtg tagaccaaag tttgccaaga    3840
caagcatggc tctgctgttc gagcaccggt actccgtgga tctgctgcct tttgtgcaga    3900
aggccccaaa ggactctgag gctgagagca gtacgatcc ccctttcggc tttcgcaagt    3960
tcagctccaa ggtgcagacc ctgctggagc tgctgccaga gcacgacctg cccgagcacc    4020
tgaaggctaa gacatgcagg aggtgcgtgg tcatcggatc cggaggaatc ctgcacggac    4080
tggagctggg acacccctg aaccagttcg acgtggtcat caggctgaac tccgccccag    4140
tggagggcta ctctgagcac gtgggaaaca gaccacaat cagaatgaca taccccgagg    4200
gagctcctct gtctgacctg gagtactaca gcaacgatct gttcgtggcc gtgctgttta    4260
agtctgtgga cttcaactgg ctgcaggcta tggtgaagaa ggagaccctg ccctttgggg    4320
tgcggctgtt cttttggaag caggtggccg agaagatccc actgcagccc aagcacttcc    4380
gcatcctgaa ccctgtgatc atcaaggaga cagctttga catcctgcag tactccgagc    4440
cccagtctag gttctgggc agagataaga acgtgcctac catcggagtg atcgccgtgg    4500
tgctggctac acacctgtgc gacgaggtgt ctctggccgg cttttggatac gatctgaacc    4560
agcctaggac cccactgcac tactttgaca gccagtgtat ggccgctatg aacttccaga    4620
ccatgcacaa cgtgaccaca gagacaaagt tcctgctgaa gctggtgaaa gagggggtgg    4680
tgaaagacct gagcgggggt attgaccgag agttttgaac gcg                     4723
```

<210> SEQ ID NO 34
<211> LENGTH: 5796
<212> TYPE: DNA
<213> ORGANISM: Artificial Sequence
<220> FEATURE:
<223> OTHER INFORMATION: Synthetic Polynucleotide

<400> SEQUENCE: 34

```
tggtacctct agagtcgacc cgggcggcct cgaggacggg gtgaactacg cctgaggatc      60
cgatcttttt ccctctgcca aaaattatgg ggacatcatg aagccccttg agcatctgac     120
ttctggctaa taaggaaat ttattttcat tgcaatagtg tgttggaatt ttttgtgtct     180
ctcactcgga agcaattcgt tgatctgaat ttcgaccacc cataataccc attaccctgg    240
tagataagta gcatggcggg ttaatcatta actacaagga accctagtg atggagttgg     300
ccactccctc tctgcgcgct cgctcgctca ctgaggccgg gcgaccaaag gtcgcccgac     360
gcccgggctt tgcccgggcg gcctcagtga gcgagcgagc gcgcagcctt aattaaccta     420
attcactggc cgtcgtttta caacgtcgtg actgggaaaa ccctggcgtt acccaactta     480
atcgccttgc agcacatccc cctttcgcca gctggcgtaa tagcgaagag gcccgcaccg     540
atcgccttc ccaacagttg cgcagcctga atggcgaatg ggacgcgccc tgtagcggcg     600
cattaagcgc ggcgggtgtg gtggttacgc gcagcgtgac cgctacactt gccagcgccc     660
tagcgcccgc tcctttcgct ttcttccctt cctttctcgc cacgttcgcc ggctttcccc     720
gtcaagctct aaatcggggg ctccctttag ggttccgatt tagtgcttta cggcacctcg     780
accccaaaaa acttgattag ggtgatggtt cacgtagtgg gccatcgccc tgatagacgg     840
tttttcgccc tttgacgttg gagtccacgt tctttaatag tggactcttg ttccaaactg     900
gaacaacact caaccctatc tcggtctatt cttttgattt ataagggatt ttgccgattt     960
```

-continued

```
cggcctattg gttaaaaaat gagctgattt aacaaaaatt taacgcgaat tttaacaaaa    1020
tattaacgct tacaatttag gtggcacttt tcggggaaat gtgcgcggaa cccctatttg    1080
tttatttttc taaatacatt caaatatgta tccgctcatg agacaataac cctgataaat    1140
gcttcaataa tattgaaaaa ggaagagtat gagtattcaa catttccgtg tcgcccttat    1200
tccctttttt gcggcatttt gccttcctgt ttttgctcac ccagaaacgc tggtgaaagt    1260
aaaagatgct gaagatcagt tgggtgcacg agtgggttac atcgaactgg atctcaacag    1320
cggtaagatc cttgagagtt ttcgccccga agaacgtttt ccaatgatga gcacttttaa    1380
agttctgcta tgtggcgcgg tattatcccg tattgacgcc gggcaagagc aactcggtcg    1440
ccgcatacac tattctcaga atgacttggt tgagtactca ccagtcacag aaaagcatct    1500
tacggatggc atgacagtaa gagaattatg cagtgctgcc ataaccatga gtgataacac    1560
tgcggccaac ttacttctga caacgatcgg aggaccgaag gagctaaccg cttttttgca    1620
caacatgggg gatcatgtaa ctcgccttga tcgttgggaa ccggagctga atgaagccat    1680
accaaacgac gagcgtgaca ccacgatgcc tgtagcaatg gcaacaacgt tgcgcaaact    1740
attaactggc gaactactta ctctagcttc ccggcaacaa ttaatagact ggatggaggc    1800
ggataaagtt gcaggaccac ttctgcgctc ggcccttccg gctggctggt ttattgctga    1860
taaatctgga gccggtgagc gtgggtctcg cggtatcatt gcagcactgg ggccagatgg    1920
taagccctcc cgtatcgtag ttatctacac gacggggagt caggcaacta tggatgaacg    1980
aaatagacag atcgctgaga taggtgcctc actgattaag cattggtaac tgtcagacca    2040
agtttactca tatatacttt agattgattt aaaacttcat ttttaattta aaaggatcta    2100
ggtgaagatc cttttgata atctcatgac caaaatccct taacgtgagt tttcgttcca    2160
ctgagcgtca gaccccgtag aaaagatcaa aggatcttct tgagatcctt ttttctgcg    2220 cgtaatctgc tgcttgcaaa caaaaaaacc accgctacca gcggtggttt gtttgccgga    2280
tcaagagcta ccaactcttt ttccgaaggt aactggcttc agcagagcgc agataccaaa    2340
tactgttctt ctagtgtagc cgtagttagg ccaccacttc aagaactctg tagcaccgcc    2400
tacatacctc gctctgctaa tcctgttacc agtggctgct gccagtggcg ataagtcgtg    2460
tcttaccggg ttggactcaa gacgatagtt accggataag cgcagcggt cgggctgaac    2520 ggggggttcg tgcacacagc ccagcttgga gcgaacgacc tacaccgaac tgagatacct    2580
acagcgtgag ctatgagaaa gcgccacgct tcccgaaggg agaaaggcgg acaggtatcc    2640
ggtaagcggc agggtcggaa caggagagcg cacgagggag cttccagggg gaaacgcctg    2700
gtatctttat agtcctgtcg ggtttcgcca cctctgactt gagcgtcgat ttttgtgatg    2760
ctcgtcaggg gggcggagcc tatggaaaaa cgccagcaac gcggcctttt tacggttcct    2820
ggccttttgc tggccttttg ctcacatgtt ctttcctgcg ttatcccctg attctgtgga    2880
taaccgtatt accgcctttg agtgagctga taccgctcgc cgcagccgaa cgaccgagcg    2940
cagcgagtca gtgagcgagg aagcggaaga gcgcccaata cgcaaaccgc ctctccccgc    3000
gcgttggccg attcattaat gcagctggca cgacaggttt cccgactgga aagcgggcag    3060
tgagcgcaac gcaattaatg tgagttagct cactcattag gcaccccagg ctttacactt    3120
tatgcttccg gctcgtatgt tgtgtggaat tgtgagcgga taacaatttc acacaggaaa    3180
cagctatgac catgattacg ccagatttaa ttaaggcctt aattaggctg cgcgctcgct    3240
cgctcactga ggccgcccgg gcaaagcccg ggcgtcgggc gacctttggt cgcccggcct    3300
cagtgagcga gcgagcgcgc agagagggag tggccaactc catcactagg ggttccttgt    3360
```

```
agttaatgat taacccgcca tgctacttat ctaccagggt aatggggatc ctctagaact    3420
atagctagtc gacattgatt attgactagt aacagaccca gacttgagag agtccagata    3480
tcccgatatc tggagaacaa aggcattcct aattttgctt taaaaataat aatattgatt    3540
attgcaaaat atagtaatta gggaaaatta atcctttatc acaaacccTT gtagcagaag    3600
acatctgccc atatatacaa gcattacaag cattgtacct tagttggata tgtccctcct    3660
cttattttca ggaatgccct gctggagtgc agtggcgatc tcggctcact gtagcctctg    3720
cctcccgggt tcaagcgatt ctcctgcctc agcccgtga gtagctgaga caacaggctt    3780
gcgccaccac gcccggccaa tatttgtatt tctagtagag acggggtttt gccatgttgg    3840
ccagctggtc ttgaactcct gacatcaggt gatctgtccg tctcagcctc ccaaagtgct    3900
gggattacgc gtgagccact gtgcccagcc accactttac tttcttaata aacttgcttt    3960
tactttgcac tgtggactta ctctgaattg tttcttgcgt gagatcgaag aaccctctct    4020
tggggtctag atcgggaccc cttcctgta acacatgggc cttgggctga tctccaagat    4080
taagagggca agatactcag ctgcaagggt cagctgtcgc tgaccccagc agctgctctg    4140
ccttggccaa cttaccggat ttaaatcgcc cagtgacagc ttttcctcca gtattttcaa    4200
aatgctccca atatcctcac gttagaacaa tccagaaata gtcttatggt aaaactcttt    4260
tgggaaatgt gaaagtagag tcctcccacc ttttcctttg caacgctttt gccccaacct    4320
cgatcgccca ggcagcacat ttttcggc accccacca agggaagaac agagacatct    4380
ccaaaccagc tgcctgcgc caagctgtta caaatagag ccacaagtct cccggtttat    4440
gcaaacatat ttggctcggt gtctaggatc ttctttttca aactcagaag gagatcacag    4500
gcacacggcc gcggtgctgt gtacgcccct ctgaaaggaa gttctgcaag tcgaccgact    4560
tcactggctt cactgaagtc cggtccgaaa ccaccggaaa gttgcaggcg cacagtatac    4620
gttcagctgt gtccaagaaa taacctatca atcactgcct taagctttgt ttccttcctg    4680
aattttctta ttttcacgaa tatttatgct ttcacaaact gtatgtcatt tcctctccag    4740
aaccaagggg ggctcgcccc agcctggccc ccgccgggg tgcgtccctg caggggcgc    4800 cctgctctgg caatgccac cgcaccgcag ggctgactgg ccgcgcgccc ggggcgggg    4860 gccgccgcgg aggcatcgtg ctctccgatt ggccgtccgc gtcctcgtga cgtcagaccc    4920
cgcccacgcg cccctcctcc gcatctgagc ggggagcgg cggcccccag ctgaatgggc    4980
gcgagagcgg cgctgggggc gggtggggc gcggggtacc gggctggcgg ccggccggcg    5040 cccccctcatt agtatggtga gcaagggcga ggagctgttc accggggtgg tgcccatcct    5100
ggtcgagctg gacggcgacg taaacggcca caagttcagc gtgtccggcg agggcgaggg    5160
cgatgccacc tacggcaagc tgaccctgaa gttcatctgc accaccggca agctgcccgt    5220
gccctggccc accctcgtga ccaccctgac ctacggcgtg cagtgcttca gccgctaccc    5280
cgaccacatg aagcagcacg acttcttcaa gtccgccatg cccgaaggct acgtccagga    5340
gcgcaccatc ttcttcaagg acgacggcaa ctacaagacc cgcgccgagg tgaagttcga    5400
gggcgacacc ctggtgaacc gcatcgagct gaagggcatc gacttcaagg aggacggcaa    5460
catcctgggg cacaagctgg agtacaacta caacagccac aacgtctata tcatggccga    5520
caagcagaag aacggcatca aggtgaactt caagatccgc cacaacatcg aggacggcag    5580
cgtgcagctc gccgaccact accagcagaa caccccatc ggcgacggcc ccgtgctgct    5640
gcccgacaac cactacctga gcacccagtc cgccctgagc aaagacccca acgagaagcg    5700
```

```
cgatcacatg gtcctgctgg agttcgtgac cgccgccggg atcactctcg gcatggacga    5760
gctgtacaag tccggactca gatcctacta gacgcg                              5796

<210> SEQ ID NO 35
<211> LENGTH: 6153
<212> TYPE: DNA
<213> ORGANISM: Artificial Sequence
<220> FEATURE:
<223> OTHER INFORMATION: Synthetic Polynucleotide

<400> SEQUENCE: 35
tggtacctct agagtcgacc cgggcggcct cgaggacggg gtgaactacg cctgaggatc      60
cgatcttttt ccctctgcca aaattatggg ggacatcatg aagccccttg agcatctgac     120
ttctggctaa taaaggaaat ttattttcat tgcaatagtg tgttggaatt ttttgtgtct     180
ctcactcgga agcaattcgt tgatctgaat ttcgaccacc cataataccc attaccctgg     240
tagataagta gcatggcggg ttaatcatta actacaagga acccctagtg atggagttgg     300 ccactcccte tctgcgcgct cgctcgctca ctgaggccgg cgaccaaag gtcgcccgac     360 gcccgggctt tgcccgggcg gcctcagtga gcgagcgagc gcgcagcctt aattaaccta     420
attcactggc cgtcgtttta caacgtcgtg actgggaaaa ccctggcgtt acccaactta     480
atcgccttgc agcacatccc cctttcgcca gctggcgtaa tagcgaagag gcccgcaccg     540
atcgcccttc ccaacagttg cgcagcctga atggcgaatg gacgcgcccc tgtagcggcg     600
cattaagcgc ggcgggtgtg gtggttacgc gcagcgtgac cgctacactt gccagcgccc     660
tagcgcccgc tcctttcgct ttcttccctt cctttctcgc cacgttcgcc ggctttcccc     720
gtcaagctct aaatcggggg ctcccttag ggttccgatt tagtgcttta cggcacctcg     780
accccaaaaa acttgattag ggtgatggtt cacgtagtgg gccatcgccc tgatagacgg     840
tttttcgccc tttgacgttg gagtccacgt tctttaatag tggactcttg ttccaaactg     900
gaacaacact caaccctatc tcggtctatt cttttgattt ataagggatt ttgccgattt     960
cggcctattg gttaaaaaat gagctgattt aacaaaaatt taacgcgaat tttaacaaaa    1020
tattaacgct tacaatttag gtggcacttt tcggggaaat gtgcgcggaa cccctatttg    1080
tttatttttc taaatacatt caaatatgta tccgctcatg agacaataac cctgataaat    1140
gcttcaataa tattgaaaaa ggaagagtat gagtattcaa catttccgtg tcgcccttat    1200
tccctttttt gcggcatttt gccttcctgt ttttgctcac ccagaaacgc tggtgaaagt    1260
aaaagatgct gaagatcagt tgggtgcacg agtgggttac atcgaactgg atctcaacag    1320
cggtaagatc cttgagagtt ttcgccccga agaacgtttt ccaatgatga gcacttttaa    1380
agttctgcta tgtggcgcgg tattatcccg tattgacgcc gggcaagagc aactcggtcg    1440
ccgcatacac tattctcaga atgacttggt tgagtactca ccagtcacag aaaagcatct    1500
tacggatggc atgacagtaa gagaattatg cagtgctgcc ataaccatga gtgataacac    1560
tgcggccaac ttacttctga caacgatcgg aggaccgaag gagctaaccg cttttttgca    1620
caacatgggg gatcatgtaa ctcgccttga tcgttgggaa ccggagctga atgaagccat    1680
accaaacgac gagcgtgaca ccacgatgcc tgtagcaatg gcaacaacgt tgcgcaaact    1740
attaactggc gaactactta ctctagcttc ccggcaacaa ttaatagact ggatggaggc    1800
ggataaagtt gcaggaccac ttctgcgctc ggcccttccg gctggctggt ttattgctga    1860
taaatctgga gccggtgagc gtgggtctcg cggtatcatt gcagcactgg ggccagatgg    1920
taagccctcc cgtatcgtag ttatctacac gacggggagt caggcaacta tggatgaacg    1980
```

```
aaatagacag atcgctgaga taggtgcctc actgattaag cattggtaac tgtcagacca   2040
agtttactca tatatacttt agattgattt aaaacttcat tttttaattta aaaggatcta   2100 ggtgaagatc cttttttgata atctcatgac caaaatccct taacgtgagt tttcgttcca   2160
ctgagcgtca gaccccgtag aaaagatcaa aggatcttct tgagatcctt ttttttctgcg   2220 cgtaatctgc tgcttgcaaa caaaaaaacc accgctacca gcggtggttt gtttgccgga   2280
tcaagagcta ccaactcttt ttccgaaggt aactggcttc agcagagcgc agataccaaa   2340
tactgttctt ctagtgtagc cgtagttagg ccaccacttc aagaactctg tagcaccgcc   2400
tacatacctc gctctgctaa tcctgttacc agtggctgct gccagtggcg ataagtcgtg   2460
tcttaccggg ttggactcaa gacgatagtt accggataag gcgcagcggt cgggctgaac   2520
ggggggttcg tgcacacagc ccagcttgga gcgaacgacc tacaccgaac tgagatacct   2580
acagcgtgag ctatgagaaa gcgccacgct tcccgaaggg agaaaggcgg acaggtatcc   2640
ggtaagcggc agggtcggaa caggagagcg cacgagggag cttccagggg gaaacgcctg   2700
gtatctttat agtcctgtcg ggtttcgcca cctctgactt gagcgtcgat ttttgtgatg   2760
ctcgtcaggg gggcggagcc tatggaaaaa cgccagcaac gcggcctttt tacggttcct   2820
ggccttttgc tggccttttg ctcacatgtt ctttcctgcg ttatcccctg attctgtgga   2880
taaccgtatt accgcctttg agtgagctga taccgctcgc cgcagccgaa cgaccgagcg   2940
cagcgagtca gtgagcgagg aagcggaaga gcgcccaata cgcaaaccgc ctctccccgc   3000
gcgttggccg attcattaat gcagctggca cgacaggttt cccgactgga aagcgggcag   3060
tgagcgcaac gcaattaatg tgagttagct cactcattag gcaccccagg ctttacactt   3120
tatgcttccg gctcgtatgt tgtgtggaat tgtgagcgga taacaatttc acacaggaaa   3180
cagctatgac catgattacg ccagatttaa ttaaggcctt aattaggctg cgcgctcgct   3240
cgctcactga gccgcccgg gcaaagcccg ggcgtcgggc gacctttggt cgcccggcct   3300
cagtgagcga gcgagcgcgc agagagggag tggccaactc catcactagg ggttccttgt   3360
agttaatgat taacccgcca tgctactttat ctaccagggt aatggggatc ctctagaact   3420
atagctagtc gacattgatt attgactagt aacagaccca gacttgagag agtccagata   3480
tcccgatatc tggagaacaa aggcattcct aattttgctt taaaaataat aatattgatt   3540
attgcaaaat atagtaatta gggaaaatta atcctttatc acaaacccctt gtagcagaag   3600 acatctgccc atatatacaa gcattacaag cattgtacct tagttggata tgtccctcct   3660
cttattttca ggaatgccct gctggagtgc agtggcgatc tcggctcact gtagcctctg   3720
cctcccgggt tcaagcgatt ctcctgcctc agcccgtga gtagctgaga caacaggctt   3780
gcgccaccac gcccggccaa tatttgtatt tctagtagag acggggtttt gccatgttgg   3840
ccagctggtc ttgaactcct gacatcaggt gatctgtccg tctcagcctc ccaaagtgct   3900
gggattacgc gtgagccact gtgcccagcc accactttac tttcttaata aacttgcttt   3960
tactttgcac tgtggactta ctctgaattg tttcttgcgt gagatcgaag aaccctctct   4020
tggggtctag atcgggaccc ctttcctgta acacatgggc cttgggctga tctccaagat   4080
taagagggca agatactcag ctgcaagggt cagctgtcgc tgaccccagc agctgctctg   4140
ccttggccaa cttaccggat ttaaatcgcc cagtgacagc ttttcctcca gtattttcaa   4200
aatgctccca atatcctcac gttagaacaa tccagaaata gtcttatggt aaaactcttt   4260
tgggaaatgt gaaagtagag tcctcccacc ttttcctttg caacgctttt gccccaacct   4320
```

| | |
|---|---|
| cgatcgccca ggcagcacat tttttccggc acccccacca agggaagaac agagacatct | 4380 |
| ccaaaccagc tgccctgcgc caagctgtta caaaatagag ccacaagtct cccggtttat | 4440 |
| gcaaacatat ttggctcggt gtctaggatc ttcttttca aactcagaag gagatcacag | 4500 |
| gcacacggcc gcggtgctgt gtacgcccct ctgaaaggaa gttctgcaag tcgaccgact | 4560 |
| tcactggctt cactgaagtc cggtccgaaa ccaccggaaa gttgcaggcg cacagtatac | 4620 |
| gttcagctgt gtccaagaaa taacctatca atcactgcct taagctttgt ttccttcctg | 4680 |
| aattttctta ttttcacgaa tatttatgct ttcacaaact gtatgtcatt tcctctccag | 4740 |
| aaccaagggg ggctcgcccc agcctggccc ccgccccggg tgcgtccctg caggggcgc | 4800 |
| cctgctctgg caatgcccac cgcaccgcag ggctgactgg ccgcgcgccc ggggggcgggg | 4860 |
| gccgccgcgg aggcatcgtg ctctccgatt ggccgtccgc gtcctcgtga cgtcagaccc | 4920 |
| cgcccacgcg cccctcctcc gcatctgagc ggggagcgg cggccccag ctgaatgggc | 4980 |
| gcgagagcgg cgctgggggc gggtggggc gcggggtacc gggctggcgg ccggccggcg | 5040 |
| cccctcatt agtgccacca tgaggagacc ctccctgctg ctgaaggata tcctgaagtg | 5100 |
| caccctgctg gtgtttggcg tgtggatcct gtacatcctg aagctgaact acaccacaga | 5160 |
| ggagtgtgac atgaagaaga tgcactacgt ggaccctgat cacgtgaaga gggcccagaa | 5220 |
| gtacgctcag caggtgctgc agaaggagtg tagaccaaag tttgccaaga caagcatggc | 5280 |
| tctgctgttc gagcaccggt actccgtgga tctgctgcct tttgtgcaga aggccccaaa | 5340 |
| ggactctgag gctgagagca gtacgatcc cccttcggc tttcgcaagt tcagctccaa | 5400 |
| ggtgcagacc ctgctggagc tgctgccaga gcacgacctg cccgagcacc tgaaggctaa | 5460 |
| gacatgcagg aggtgcgtgg tcatcggatc cggaggaatc ctgcacggac tggagctggg | 5520 |
| acacaccctg aaccagttcg acgtggtcat caggctgaac tccgcccag tggagggcta | 5580 |
| ctctgagcac gtgggaaaca agaccacaat cagaatgaca taccccgagg gagctcctct | 5640 |
| gtctgacctg gagtactaca gcaacgatct gttcgtggcc gtgctgttta agtctgtgga | 5700 |
| cttcaactgg ctgcaggcta tggtgaagaa ggagaccctg cccttttggg tgcggctgtt | 5760 |
| cttttggaag caggtggccg agaagatccc actgcagccc aagcacttcc gcatcctgaa | 5820 |
| ccctgtgatc atcaaggaga cagcttttga catcctgcag tactccgagc cccagtctag | 5880 |
| gttctggggc agagataaga acgtgcctac catcggagtg atcgccgtgg tgctggctac | 5940 |
| acacctgtgc gacgaggtgt ctctggccgg cttttggatac gatctgaacc agcctaggac | 6000 |
| cccactgcac tactttgaca gccagtgtat ggccgctatg aacttccaga ccatgcacaa | 6060 |
| cgtgaccaca gagacaaagt tcctgctgaa gctggtgaaa gaggggtgg tgaaagacct | 6120 |
| gagcgggggt attgaccgag agttttgaac gcg | 6153 |

<210> SEQ ID NO 36
<211> LENGTH: 6315
<212> TYPE: DNA
<213> ORGANISM: Artificial Sequence
<220> FEATURE:
<223> OTHER INFORMATION: Synthetic Polynucleotide

<400> SEQUENCE: 36

| | |
|---|---|
| tggtacctct agagtcgacc cgggcggcct cgaggacggg gtgaactacg cctgaggatc | 60 |
| cgatcttttt ccctctgcca aaaattatgg ggacatcatg aagccccttg agcatctgac | 120 |
| ttctggctaa taaggaaat ttattttcat tgcaatagtg tgttggaatt ttttgtgtct | 180 |
| ctcactcgga agcaattcgt tgatctgaat ttcgaccacc cataataccc attaccctgg | 240 |

-continued

```
tagataagta gcatggcggg ttaatcatta actacaagga acccctagtg atggagttgg    300
ccactccctc tctgcgcgct cgctcgctca ctgaggccgg gcgaccaaag gtcgcccgac    360
gcccgggctt tgcccgggcg gcctcagtga gcgagcgagc gcgcagcctt aattaaccta    420
attcactggc cgtcgtttta caacgtcgtg actgggaaaa ccctggcgtt acccaactta    480
atcgccttgc agcacatccc cctttcgcca gctggcgtaa tagcgaagag gcccgcaccg    540 atcgccctt  ccaacagttg cgcagcctga atggcgaatg gacgcgccc  tgtagcggcg    600 cattaagcgc ggcgggtgtg gtggttacgc gcagcgtgac cgctacactt gccagcgccc    660
tagcgcccgc tcctttcgct ttcttccctt cctttctcgc cacgttcgcc ggctttcccc    720
gtcaagctct aaatcggggg ctcccttag  ggttccgatt tagtgcttta cggcacctcg    780
accccaaaaa acttgattag ggtgatggtt cacgtagtgg gccatcgccc tgatagacgg    840
tttttcgccc tttgacgttg gagtccacgt tctttaatag tggactcttg ttccaaactg    900
gaacaacact caaccctatc tcggtctatt cttttgattt ataagggatt ttgccgattt    960
cggcctattg gttaaaaaat gagctgattt aacaaaaatt taacgcgaat tttaacaaaa   1020
tattaacgct tacaatttag gtggcacttt tcggggaaat gtgcgcggaa cccctatttg   1080 tttattttc  taaatacatt caaatatgta tccgctcatg agacaataac cctgataaat   1140
gcttcaataa tattgaaaaa ggaagagtat gagtattcaa catttccgtg tcgcccttat   1200
tccctttttt gcggcatttt gccttcctgt ttttgctcac ccagaaacgc tggtgaaagt   1260
aaaagatgct gaagatcagt tgggtgcacg agtgggttac atcgaactgg atctcaacag   1320
cggtaagatc cttgagagtt ttcgccccga agaacgtttt ccaatgatga gcacttttaa   1380
agttctgcta tgtggcgcgg tattatcccg tattgacgcc gggcaagagc aactcggtcg   1440
ccgcatacac tattctcaga atgacttggt tgagtactca ccagtcacag aaaagcatct   1500
tacggatggc atgacagtaa gagaattatg cagtgctgcc ataaccatga gtgataacac   1560
tgcggccaac ttacttctga caacgatcgg aggaccgaag gagctaaccg cttttttgca   1620
caacatgggg gatcatgtaa ctcgccttga tcgttgggaa ccggagctga atgaagccat   1680
accaaacgac gagcgtgaca ccacgatgcc tgtagcaatg gcaacaacgt tgcgcaaact   1740
attaactggc gaactactta ctctagcttc ccggcaacaa ttaatagact ggatggaggc   1800
ggataaagtt gcaggaccac ttctgcgctc ggcccttccg gctggctggt ttattgctga   1860
taaatctgga gccggtgagc gtgggtctcg cggtatcatt gcagcactgg ggccagatgg   1920
taagccctcc cgtatcgtag ttatctacac gacggggagt caggcaacta tggatgaacg   1980
aaatagacag atcgctgaga taggtgcctc actgattaag cattggtaac tgtcagacca   2040
agtttactca tatatacttt agattgattt aaaacttcat ttttaattta aaaggatcta   2100
ggtgaagatc cttttttgata atctcatgac caaaatccct aacgtgagt  ttcgttcca   2160 ctgagcgtca gaccccgtag aaaagatcaa aggatcttct tgagatcctt ttttctgcg   2220 cgtaatctgc tgcttgcaaa caaaaaaacc accgctacca gcggtggttt gtttgccgga   2280
tcaagagcta ccaactcttt ttccgaaggt aactggcttc agcagagcgc agataccaaa   2340
tactgttctt ctagtgtagc cgtagttagg ccaccacttc aagaactctg tagcaccgcc   2400
tacatacctc gctctgctaa tcctgttacc agtggctgct gccagtggcg ataagtcgtg   2460
tcttaccggg ttggactcaa gacgatagtt accggataag gcgcagcggt cgggctgaac   2520
ggggggttcg tgcacacagc ccagcttgga gcgaacgacc tacaccgaac tgagatacct   2580
```

| | |
|---|---|
| acagcgtgag ctatgagaaa gcgccacgct tcccgaaggg agaaaggcgg acaggtatcc | 2640 |
| ggtaagcggc agggtcggaa caggagagcg cacgagggag cttccagggg gaaacgcctg | 2700 |
| gtatctttat agtcctgtcg ggtttcgcca cctctgactt gagcgtcgat ttttgtgatg | 2760 |
| ctcgtcaggg gggcggagcc tatggaaaaa cgccagcaac gcggcctttt tacggttcct | 2820 |
| ggccttttgc tggccttttg ctcacatgtt ctttcctgcg ttatcccctg attctgtgga | 2880 |
| taaccgtatt accgcctttg agtgagctga taccgctcgc cgcagccgaa cgaccgagcg | 2940 |
| cagcgagtca gtgagcgagg aagcggaaga gcgcccaata cgcaaaccgc ctctccccgc | 3000 |
| gcgttggccg attcattaat gcagctggca cgacaggttt cccgactgga aagcgggcag | 3060 |
| tgagcgcaac gcaattaatg tgagttagct cactcattag gcaccccagg ctttacactt | 3120 |
| tatgcttccg gctcgtatgt tgtgtggaat tgtgagcgga taacaatttc acacaggaaa | 3180 |
| cagctatgac catgattacg ccagatttaa ttaaggcctt aattaggctg cgcgctcgct | 3240 |
| cgctcactga ggccgcccgg gcaaagcccg ggcgtcgggc gaccttggt cgcccggcct | 3300 |
| cagtgagcga gcgagcgcgc agagagggag tggccaactc catcactagg ggttccttgt | 3360 |
| agttaatgat taacccgcca tgctacttat ctaccagggt aatggggatc ctctagaact | 3420 |
| atagctagtc gacattgatt attgactagt aacagaccca gacttgagag agtccagata | 3480 |
| tcccgatatc tggagaacaa aggcattcct aattttgctt taaaaataat aatattgatt | 3540 |
| attgcaaaat atagtaatta gggaaaatta atcctttatc acaacccctt gtagcagaag | 3600 |
| acatctgccc atatatacaa gcattacaag cattgtacct tagttggata tgtccctcct | 3660 |
| cttattttca ggaatgccct gctggagtgc agtggcgatc tcggctcact gtagcctctg | 3720 |
| cctcccgggt tcaagcgatt ctcctgcctc agcccgtga gtagctgaga caacaggctt | 3780 |
| gcgccaccac gcccggccaa tatttgtatt tctagtagag acggggtttt gccatgttgg | 3840 |
| ccagctggtc ttgaactcct gacatcaggt gatctgtccg tctcagcctc ccaaagtgct | 3900 |
| gggattacgc gtgagccact gtgcccagcc accactttac tttcttaata aacttgcttt | 3960 |
| tactttgcac tgtggactta ctctgaattg tttcttgcgt gagatcgaag aaccctctct | 4020 |
| tggggtctag atcgggaccc cttttcctgta acacatgggc cttgggctga tctccaagat | 4080 |
| taagagggca agatactcag ctgcaagggt cagctgtcgc tgaccccagc agctgctctg | 4140 |
| ccttggccaa cttaccggat ttaaatcgcc cagtgacagc ttttcctcca gtattttcaa | 4200 |
| aatgctccca atatcctcac gttagaacaa tccagaaata gtcttatggt aaaactcttt | 4260 |
| tgggaaatgt gaaagtagag tcctcccacc ttttcctttg caacgctttt gccccaacct | 4320 |
| cgatcgccca ggcagcacat ttttccggc accccacca agggaagaac agagacatct | 4380 |
| ccaaaccagc tgccctgcgc caagctgtta caaaatagag ccacaagtct cccggtttat | 4440 |
| gcaaacatat ttggctcggt gtctaggatc ttcttttca aactcagaag gagatcacag | 4500 |
| gcacacggcc gcggtgctgt gtacgcccct ctgaaaggaa gttctgcaag tcgaccgact | 4560 |
| tcactggctt cactgaagtc cggtccgaaa ccaccgaaaa gttgcaggcg cacagtatac | 4620 |
| gttcagctgt gtccaagaaa taacctatca atcactgcct taagctttgt ttccttcctg | 4680 |
| aattttctta ttttcacgaa tatttatgct ttcacaaact gtatgtcatt tcctctccag | 4740 |
| aaccaagggg ggctcgcccc agcctggccc ccgccccggg tgcgtccctg caggggcgc | 4800 |
| cctgctctgg caatgcccac cgcaccgcag ggctgactgg ccgcgcgccc ggggcgggg | 4860 |
| gccgccgcg aggcatcgtg ctctccgatt ggccgtccgc gtcctcgtga cgtcagaccc | 4920 |
| cgcccacgcg cccctcctcc gcatctgagc ggggagcgg cggcccccag ctgaatgggc | 4980 |

```
gcgagagcgg cgctgggggc gggtgggggc gcggggtacc gggctggcgg ccggccggcg    5040
ccccctcatt agtatgagaa ctaaagcagc aggttgtgca gagagaagac cactccagcc    5100
tagaactgaa gcagcagcag caccagcagg tagagcaatg ccatccgagt acacctacgt    5160
gaagctgcgg tctgactgca gccgcccatc cctgcagtgg tacacaagag cccagagcaa    5220
gatgaggaga ccctccctgc tgctgaagga tatcctgaag tgcaccctgc tggtgtttgg    5280
cgtgtggatc ctgtacatcc tgaagctgaa ctacaccaca gaggagtgtg acatgaagaa    5340
gatgcactac gtggaccctg atcacgtgaa gagggcccag aagtacgctc agcaggtgct    5400
gcagaaggag tgtagaccaa agtttgccaa gacaagcatg gctctgctgt tcgagcaccg    5460
gtactccgtg gatctgctgc cttttgtgca aaggccccca aaggactctg aggctgagag    5520
caagtacgat ccccctttcg gctttcgcaa gttcagctcc aaggtgcaga ccctgctgga    5580
gctgctgcca gagcacgacc tgcccgagca cctgaaggct aagacatgca ggaggtgcgt    5640
ggtcatcgga tccggaggaa tcctgcacgg actggagctg gacacaccc tgaaccagtt     5700 cgacgtggtc atcaggctga actccgcccc agtggagggc tactctgagc acgtgggaaa    5760
caagaccaca atcagaatga catacccga gggagctcct ctgtctgacc tggagtacta     5820
cagcaacgat ctgttcgtgg ccgtgctgtt taagtctgtg gacttcaact ggctgcaggc    5880
tatggtgaag aaggagaccc tgcccttttg ggtgcggctg ttcttttgga agcaggtggc    5940
cgagaagatc ccactgcagc caagcacttt ccgcatcctg aaccctgtga tcatcaagga    6000
gacagctttt gacatcctgc agtactccga gccccagtct aggttctggg gcagagataa    6060
gaacgtgcct accatcggag tgatcgccgt ggtgctggct acacacctgt gcgacgaggt    6120
gtctctggcc ggctttggat acgatctgaa ccagcctagg accccactgc actactttga    6180
cagccagtgt atggccgcta tgaacttcca gaccatgcac aacgtgacca cagagacaaa    6240
gttcctgctg aagctggtga agaggggggt ggtgaaagac ctgagcgggg gtattgaccg    6300
agagttttga acgcg                                                     6315

<210> SEQ ID NO 37
<211> LENGTH: 6231
<212> TYPE: DNA
<213> ORGANISM: Artificial Sequence
<220> FEATURE:
<223> OTHER INFORMATION: Synthetic Polynucleotide

<400> SEQUENCE: 37
tggtacctct agagtcgacc cgggcggcct cgaggacggg gtgaactacg cctgaggatc      60
cgatcttttt ccctctgcca aaaattatgg ggacatcatg aagccccttg agcatctgac     120
ttctggctaa taaggaaat ttattttcat tgcaatagtg tgttggaatt ttttgtgtct      180
ctcactcgga agcaattcgt tgatctgaat ttcgaccacc cataataccc attccctgg      240 tagataagta gcatggcggg ttaatcatta actacaagga accccctagtg atggagttgg    300 ccactccctc tctgcgcgct cgctcgctca ctgaggccgg gcgaccaaag gtcgcccgac     360
gcccgggctt tgcccgggcg gcctcagtga gcgagcgagc gcgcagcctt aattaaccta    420
attcactggc cgtcgtttta caacgtcgtg actgggaaaa ccctggcgtt acccaactta    480
atcgccttgc agcacatccc cctttcgcca gctggcgtaa tagcgaagag gcccgcaccg    540
atcgcccttc ccaacagttg cgcagcctga atggcgaatg gacgcgcccc tgtagcggcg    600
cattaagcgc ggcgggtgtg gtggttacgc gcagcgtgac cgctacactt gccagcgccc    660
```

```
tagcgcccgc tcctttcgct ttcttcccct cctttctcgc cacgttcgcc ggctttcccc    720
gtcaagctct aaatcggggg ctcccttag ggttccgatt tagtgcttta cggcaccctcg    780 acccaaaaa acttgattag ggtgatggtt cacgtagtgg gccatcgccc tgatagacgg    840
tttttcgccc tttgacgttg gagtccacgt tctttaatag tggactcttg ttccaaactg    900
gaacaacact caaccctatc tcggtctatt cttttgattt ataagggatt ttgccgattt    960
cggcctattg gttaaaaaat gagctgattt aacaaaaatt taacgcgaat tttaacaaaa   1020
tattaacgct tacaatttag gtggcacttt tcggggaaat gtgcgcggaa cccctatttg   1080
tttatttttc taaatacatt caaatatgta tccgctcatg agacaataac cctgataaat   1140
gcttcaataa tattgaaaaa ggaagagtat gagtattcaa catttccgtg tcgcccttat   1200 tcccttttt gcggcatttt gccttcctgt ttttgctcac ccagaaacgc tggtgaaagt   1260
aaaagatgct gaagatcagt tgggtgcacg agtgggttac atcgaactgg atctcaacag   1320
cggtaagatc cttgagagtt ttcgccccga agaacgtttt ccaatgatga gcacttttaa   1380
agttctgcta tgtggcgcgg tattatcccg tattgacgcc gggcaagagc aactcggtcg   1440
ccgcatacac tattctcaga atgacttggt tgagtactca ccagtcacag aaaagcatct   1500
tacggatggc atgacagtaa gagaattatg cagtgctgcc ataaccatga gtgataacac   1560
tgcggccaac ttacttctga caacgatcgg aggaccgaag gagctaaccg cttttttgca   1620
caacatgggg gatcatgtaa ctcgccttga tcgttgggaa ccggagctga atgaagccat   1680
accaaacgac gagcgtgaca ccacgatgcc tgtagcaatg gcaacaacgt tgcgcaaact   1740
attaactggc gaactactta ctctagcttc ccggcaacaa ttaatagact ggatggaggc   1800
ggataaagtt gcaggaccac ttctgcgctc ggcccttccg gctggctggt ttattgctga   1860
taaatctgga gccggtgagc gtgggtctcg cggtatcatt gcagcactgg ggccagatgg   1920
taagccctcc cgtatcgtag ttatctacac gacggggagt caggcaacta tggatgaacg   1980
aaatagacag atcgctgaga taggtgcctc actgattaag cattggtaac tgtcagacca   2040
agtttactca tatatacttt agattgattt aaaacttcat ttttaattta aaaggatcta   2100
ggtgaagatc cttttttgata atctcatgac caaaatccct taacgtgagt tttcgttcca   2160
ctgagcgtca gaccccgtag aaaagatcaa aggatcttct tgagatcctt ttttctgcg   2220 cgtaatctgc tgcttgcaaa caaaaaaacc accgctacca gcggtggttt gtttgccgga   2280
tcaagagcta ccaactcttt ttccgaaggt aactggcttc agcagagcgc agataccaaa   2340
tactgttctt ctagtgtagc cgtagttagg ccaccacttc aagaactctg tagcaccgcc   2400
tacatacctc gctctgctaa tcctgttacc agtggctgct gccagtggcg ataagtcgtg   2460
tcttaccggg ttggactcaa gacgatagtt accggataag gcgcagcggt cgggctgaac   2520 gggggggttcg tgcacacagc ccagcttgga gcgaacgacc tacaccgaac tgagatacct   2580
acagcgtgag ctatgagaaa gcgccacgct tcccgaaggg agaaaggcgg acaggtatcc   2640
ggtaagcggc agggtcggaa caggagagcg cacgagggag cttccagggg gaaacgcctg   2700
gtatctttat agtcctgtcg ggtttcgcca cctctgactt gagcgtcgat ttttgtgatg   2760
ctcgtcaggg gggcggagcc tatggaaaaa cgccagcaac gcggcctttt tacgttcct   2820 ggccttttgc tggccttttg ctcacatgtt ctttcctgcg ttatcccctg attctgtgga   2880
taaccgtatt accgcctttg agtgagctga taccgctcgc cgcagccgaa cgaccgagcg   2940
cagcgagtca gtgagcgagg aagcggaaga gcgcccaata cgcaaaccgc ctctccccgc   3000
gcgttggccg attcattaat gcagctggca cgacaggttt cccgactgga aagcgggcag   3060
```

```
tgagcgcaac gcaattaatg tgagttagct cactcattag gcaccccagg ctttacactt    3120
tatgcttccg gctcgtatgt tgtgtggaat tgtgagcgga taacaatttc acacaggaaa    3180
cagctatgac catgattacg ccagatttaa ttaaggcctt aattaggctg cgcgctcgct    3240
cgctcactga ggccgcccgg gcaaagcccg ggcgtcgggc gacctttggt cgcccggcct    3300
cagtgagcga gcgagcgcgc agagagggag tggccaactc catcactagg ggttccttgt    3360
agttaatgat taacccgcca tgctacttat ctaccagggt aatggggatc ctctagaact    3420
atagctagtc gacattgatt attgactagt aacagaccca gacttgagag agtccagata    3480
tcccgatatc tggagaacaa aggcattcct aattttgctt taaaaataat aatattgatt    3540
attgcaaaat atagtaatta gggaaaatta atcctttatc acaaacccct gtagcagaag    3600
acatctgccc atatatacaa gcattacaag cattgtacct tagttggata tgtccctcct    3660
cttattttca ggaatgccct gctggagtgc agtggcgatc tcggctcact gtagcctctg    3720
cctcccgggt tcaagcgatt ctcctgcctc agcccgtga gtagctgaga caacaggctt    3780
gcgccaccac gcccggccaa tatttgtatt tctagtagag acggggtttt gccatgttgg    3840
ccagctggtc ttgaactcct gacatcaggt gatctgtccg tctcagcctc ccaaagtgct    3900
gggattacgc gtgagccact gtgcccagcc accactttac tttcttaata aacttgcttt    3960
tactttgcac tgtggactta ctctgaattg tttcttgcgt gagatcgaag aaccctctct    4020
tggggtctag atcgggaccc cttttcctgta acacatgggc cttgggctga tctccaagat    4080
taagagggca agatactcag ctgcaagggt cagctgtcgc tgaccccagc agctgctctg    4140
ccttggccaa cttaccggat ttaaatcgcc cagtgacagc ttttcctcca gtattttcaa    4200
aatgctccca atatcctcac gttagaacaa tccagaaata gtcttatggt aaaactcttt    4260
tgggaaatgt gaaagtagag tcctcccacc ttttcctttg caacgctttt gccccaacct    4320
cgatcgccca ggcagcacat ttttttccggc accccccacca agggaagaac agagacatct    4380
ccaaaccagc tgccctgcgc caagctgtta caaaatagag ccacaagtct cccggtttat    4440
gcaaacatat ttggctcggt gtctaggatc ttctttttca aactcagaag gagatcacag    4500
gcacacggcc gcggtgctgt gtacgcccct ctgaaaggaa gttctgcaag tcgaccgact    4560
tcactggctt cactgaagtc cggtccgaaa ccaccggaaa gttgcaggcg cacagtatac    4620
gttcagctgt gtccaagaaa taacctatca atcactgcct taagctttgt ttccttcctg    4680
aattttctta ttttcacgaa tatttatgct ttcacaaact gtatgtcatt tcctctccag    4740
aaccaagggg ggctcgcccc agcctggccc ccgccccggg tgcgtccctg caggggggcgc    4800 cctgctctgg caatgcccac cgcaccgcag ggctgactgg ccgcgcgccc gggggcgggg    4860 gccgccgcg aggcatcgtg ctctccgatt ggccgtccgc gtcctcgtga cgtcagaccc    4920
cgcccacgcg cccctcctcc gcatctgagc gggggagcgg cggccccag ctgaatgggc    4980 gcgagagcgg cgctggggc gggtggggc gcggggtacc gggctggcgg ccggccggcg    5040 cccctcatt agtatgccat ccgagtacac ctacgtgaag ctgcggtctg actgcagccg    5100
cccatccctg cagtggtaca caagagccca gagcaagatg aggagaccct ccctgctgct    5160
gaaggatatc ctgaagtgca ccctgctggt gtttggcgtg tggatcctgt acatcctgaa    5220
gctgaactac accacagagg agtgtgacat gaagaagatg cactacgtgg accctgatca    5280
cgtgaagagg gccagaagt acgctcagca ggtgctgcag aaggagtgta gaccaaagtt    5340
tgccaagaca agcatggctc tgctgttcga gcaccggtac tccgtggatc tgctgccttt    5400
```

```
tgtgcagaag gccccaaagg actctgaggc tgagagcaag tacgatcccc ctttcggctt    5460
tcgcaagttc agctccaagg tgcagaccct gctggagctg ctgccagagc acgacctgcc    5520
cgagcacctg aaggctaaga catgcaggag gtgcgtggtc atcggatccg aggaatcct    5580 gcacggactg gagctgggac acaccctgaa ccagttcgac gtggtcatca ggctgaactc    5640
cgccccagtg gagggctact ctgagcacgt gggaaacaag accacaatca gaatgacata    5700
ccccgaggga gctcctctgt ctgacctgga gtactacagc aacgatctgt tcgtggccgt    5760
gctgtttaag tctgtggact tcaactggct gcaggctatg gtgaagaagg agaccctgcc    5820
cttttgggtg cggctgttct tttgaagca ggtggccgag aagatcccac tgcagcccaa    5880
gcacttccgc atcctgaacc ctgtgatcat caaggagaca gcttttgaca tcctgcagta    5940
ctccgagccc cagtctaggt tctgggcag agataagaac gtgcctacca tcggagtgat    6000
cgccgtggtg ctggctacac acctgtgcga cgaggtgtct ctggccggct ttggatacga    6060
tctgaaccag cctaggaccc cactgcacta ctttgacagc cagtgtatgg ccgctatgaa    6120
cttccagacc atgcacaacg tgaccacaga gacaaagttc ctgctgaagc tggtgaaaga    6180 ggggggtggtg aaagacctga gcgggggtat tgaccgagag ttttgaacgc g            6231
```

<210> SEQ ID NO 38
<211> LENGTH: 6147
<212> TYPE: DNA
<213> ORGANISM: Artificial Sequence
<220> FEATURE:
<223> OTHER INFORMATION: Synthetic Polynucleotide

<400> SEQUENCE: 38

```
tggtacctct agagtcgacc cgggcggcct cgaggacggg gtgaactacg cctgaggatc      60
cgatcttttt ccctctgcca aaaattatgg ggacatcatg aagcccttg agcatctgac     120 ttctggctaa taaggaaat ttattttcat tgcaatagtg tgttggaatt ttttgtgtct     180
ctcactcgga agcaattcgt tgatctgaat ttcgaccacc cataataccc attaccctgg    240
tagataagta gcatggcggg ttaatcatta actacaagga accctagtg atggagttgg     300 ccactccctc tctgcgcgct cgctcgctca ctgaggccgg gcgaccaaag gtcgcccgac    360
gcccgggctt tgcccgggcg gcctcagtga gcgagcgagc gcgcagcctt aattaaccta    420
attcactggc cgtcgtttta caacgtcgtg actgggaaaa ccctggcgtt acccaactta    480
atcgccttgc agcacatccc cctttcgcca gctggcgtaa tagcgaagag gcccgcaccg    540 atcgccctc caacagttg cgcagcctga atggcgaatg gacgcgccc tgtagcggcg    600 cattaagcgc ggcgggtgtg gtggttacgc gcagcgtgac cgctacactt gccagcgccc    660
tagcgcccgc tcctttcgct ttcttccctt cctttctcgc cacgttcgcc ggctttcccc    720
gtcaagctct aaatcggggg ctcccttag ggttccgatt tagtgcttta cggcacctcg    780 accccaaaa acttgattag ggtgatggtt cacgtagtgg gccatcgccc tgatagacgg    840
tttttcgccc tttgacgttg gagtccacgt tctttaatag tggactcttg ttccaaactg    900
gaacaacact caaccctatc tcggtctatt cttttgattt ataagggatt tgccgatttt    960
cggcctattg gttaaaaaat gagctgattt aacaaaaatt taacgcgaat tttaacaaaa   1020
tattaacgct tacaatttag gtggcacttt tcggggaaat gtgcgcggaa ccctatttg    1080 tttatttttc taaatacatt caaatatgta tccgctcatg agacaataac cctgataaat   1140
gcttcaataa tattgaaaaa ggaagagtat gagtattcaa catttccgtg tcgcccttat   1200
tccctttttt gcggcatttt gccttcctgt ttttgctcac ccagaaacgc tggtgaaagt   1260
```

```
aaaagatgct gaagatcagt tgggtgcacg agtgggttac atcgaactgg atctcaacag    1320
cggtaagatc cttgagagtt ttcgccccga agaacgtttt ccaatgatga gcacttttaa    1380
agttctgcta tgtggcgcgg tattatcccg tattgacgcc gggcaagagc aactcggtcg    1440
ccgcatacac tattctcaga atgacttggt tgagtactca ccagtcacag aaaagcatct    1500
tacggatggc atgacagtaa gagaattatg cagtgctgcc ataaccatga gtgataacac    1560
tgcggccaac ttacttctga caacgatcgg aggaccgaag gagctaaccg cttttttgca    1620
caacatgggg gatcatgtaa ctcgccttga tcgttgggaa ccggagctga atgaagccat    1680
accaaacgac gagcgtgaca ccacgatgcc tgtagcaatg gcaacaacgt tgcgcaaact    1740
attaactggc gaactactta ctctagcttc ccggcaacaa ttaatagact ggatggaggc    1800
ggataaagtt gcaggaccac ttctgcgctc ggcccttccg gctggctggt ttattgctga    1860
taaatctgga gccggtgagc gtgggtctcg cggtatcatt gcagcactgg ggccagatgg    1920
taagccctcc cgtatcgtag ttatctacac gacggggagt caggcaacta tggatgaacg    1980
aaatagacag atcgctgaga taggtgcctc actgattaag cattggtaac tgtcagacca    2040
agtttactca tatatacttt agattgattt aaaacttcat ttttaattta aaaggatcta    2100
ggtgaagatc cttttttgata atctcatgac caaaatccct taacgtgagt tttcgttcca    2160
ctgagcgtca gaccccgtag aaaagatcaa aggatcttct tgagatcctt ttttctgcg    2220 cgtaatctgc tgcttgcaaa caaaaaaacc accgctacca gcggtggttt gtttgccgga    2280
tcaagagcta ccaactcttt ttccgaaggt aactggcttc agcagagcgc agataccaaa    2340
tactgttctt ctagtgtagc cgtagttagg ccaccacttc aagaactctg tagcaccgcc    2400
tacatacctc gctctgctaa tcctgttacc agtggctgct gccagtggcg ataagtcgtg    2460
tcttaccggg ttggactcaa gacgatagtt accggataag gcgcagcggt cgggctgaac    2520
ggggggttcg tgcacacagc ccagcttgga gcgaacgacc tacaccgaac tgagatacct    2580
acagcgtgag ctatgagaaa gcgccacgct tcccgaaggg agaaaggcgg acaggtatcc    2640
ggtaagcggc agggtcggaa caggagagcg cacgagggag cttccagggg gaaacgcctg    2700
gtatctttat agtcctgtcg ggtttcgcca cctctgactt gagcgtcgat ttttgtgatg    2760
ctcgtcaggg gggcggagcc tatggaaaaa cgccagcaac gcggccttt tacggttcct    2820 ggccttttgc tggccttttg ctcacatgtt ctttcctgcg ttatccctg attctgtgga    2880 taaccgtatt accgcctttg agtgagctga taccgctcgc cgcagccgaa cgaccgagcg    2940
cagcgagtca gtgagcgagg aagcggaaga gcgcccaata cgcaaaccgc ctctccccgc    3000
gcgttggccg attcattaat gcagctggca cgacaggttt cccgactgga aagcgggcag    3060
tgagcgcaac gcaattaatg tgagttagct cactcattag gcaccccagg ctttacactt    3120
tatgcttccg gctcgtatgt tgtgtggaat tgtgagcgga taacaatttc acacaggaaa    3180
cagctatgac catgattacg ccagatttaa ttaaggcctt aattaggctg cgcgctcgct    3240
cgctcactga ggccgcccgg gcaaagcccg ggcgtcgggc gacctttggt cgcccggcct    3300
cagtgagcga gcgagcgcgc agagagggag tggccaactc catcactagg ggttccttgt    3360
agttaatgat taacccgcca tgctactat ctaccagggt aatggggatc ctctagaact    3420
atagctagtc gacattgatt attgactagt aacagaccca gacttgagag agtccagata    3480
tcccgatatc tggagaacaa aggcattcct aattttgctt taaaaataat aatattgatt    3540
attgcaaaat atagtaatta gggaaaatta atcctttatc acaaacccttgtagcagaag    3600
```

```
acatctgccc atatatacaa gcattacaag cattgtacct tagttggata tgtccctcct    3660 cttatttttca ggaatgccct gctggagtgc agtggcgatc tcggctcact gtagcctctg   3720
cctcccgggt tcaagcgatt ctcctgcctc agccccgtga gtagctgaga caacaggctt    3780
gcgccaccac gcccgccaa tatttgtatt tctagtagag acggggtttt gccatgttgg    3840
ccagctggtc ttgaactcct gacatcaggt gatctgtccg tctcagcctc ccaaagtgct    3900
gggattacgc gtgagccact gtgcccagcc accactttac tttcttaata aacttgcttt    3960
tactttgcac tgtggactta ctctgaattg tttcttgcgt gagatcgaag aaccctctct    4020
tggggtctag atcgggaccc ctttcctgta acacatgggc cttgggctga tctccaagat    4080
taagagggca agatactcag ctgcaagggt cagctgtcgc tgaccccagc agctgctctg    4140
ccttggccaa cttaccggat ttaaatcgcc cagtgacagc ttttcctcca gtattttcaa    4200
aatgctccca atatcctcac gttagaacaa tccagaaata gtcttatggt aaaactcttt    4260
tgggaaatgt gaaagtagag tcctcccacc ttttcctttg caacgctttt gccccaacct    4320
cgatcgccca ggcagcacat ttttccggc acccccacca agggaagaac agagacatct    4380
ccaaaccagc tgccctgcgc caagctgtta caaatagag ccacaagtct cccggtttat    4440
gcaaacatat ttggctcggt gtctaggatc ttcttttttca aactcagaag gagatcacag    4500
gcacacggcc gcggtgctgt gtacgcccct ctgaaaggaa gttctgcaag tcgaccgact    4560
tcactggctt cactgaagtc cggtccgaaa ccaccggaaa gttgcaggcg cacagtatac    4620
gttcagctgt gtccaagaaa taacctatca atcactgcct taagctttgt ttccttcctg    4680
aattttctta ttttcacgaa tatttatgct ttcacaaact gtatgtcatt tcctctccag    4740
aaccaagggg ggctcgcccc agcctggccc ccgccccggg tgcgtccctg caggggggcgc    4800 cctgctctgg caatgcccac cgcaccgcag ggctgactgg ccgcgcgccc ggggggcgggg    4860 gccgccgcgg aggcatcgtg ctctccgatt ggccgtccgc gtcctcgtga cgtcagaccc    4920
cgcccacgcg cccctcctcc gcatctgagc ggggagcgg cggccccag ctgaatgggc    4980 gcgagagcgg cgctggggc gggtggggc gcggggtacc gggctggcgg ccggccggcg    5040
ccccctcatt agtatgagga gaccctccct gctgctgaag gatatcctga agtgcaccct    5100
gctggtgttt ggcgtgtgga tcctgtacat cctgaagctg aactacacca cagaggagtg    5160
tgacatgaag aagatgcact acgtggaccc tgatcacgtg aagagggccc agaagtacgc    5220
tcagcaggtg ctgcagaagg agtgtagacc aaagtttgcc aagacaagca tggctctgct    5280
gttcgagcac cggtactccg tggatctgct gccttttgtg cagaaggccc aaaggactc    5340 tgaggctgag agcaagtacg atccccctt cggctttcgc aagttcagct ccaaggtgca    5400
gaccctgctg gagctgctgc cagagcacga cctgcccgag cacctgaagg ctaagacatg    5460
caggaggtgc gtggtcatcg gatccggagg aatcctgcac ggactggagc tgggacacac    5520
cctgaaccag ttcgacgtgg tcatcaggct gaactccgcc ccagtggagg ctactctga    5580 gcacgtggga aacaagacca caatcagaat gacatacccc gagggagctc ctctgtctga    5640
cctggagtac tacagcaacg atctgttcgt ggccgtgctg tttaagtctg tggacttcaa    5700
ctggctgcag gctatggtga agaaggagac cctgccccttt tgggtgcggc tgttcttttg    5760
gaagcaggtg gccgagaaga tcccactgca gcccaagcac ttccgcatcc tgaaccctgt    5820
gatcatcaag gagacagctt ttgacatcct gcagtactcc gagcccccagt ctaggttctg    5880 gggcagagat aagaacgtgc ctaccatcgg agtgatcgcc gtggtgctgg ctacacacct    5940
gtgcgacgag gtgtctctgg ccggctttgg atacgatctg aaccagccta ggaccccact    6000
```

```
gcactactttt gacagccagt gtatggccgc tatgaacttc cagaccatgc acaacgtgac   6060
cacagagaca aagttcctgc tgaagctggt gaaagagggg gtggtgaaag acctgagcgg   6120
gggtattgac cgagagtttt gaacgcg                                        6147
```

<210> SEQ ID NO 39
<211> LENGTH: 1257
<212> TYPE: DNA
<213> ORGANISM: Artificial Sequence
<220> FEATURE:
<223> OTHER INFORMATION: Synthetic Polynucleotide

<400> SEQUENCE: 39

```
atgcggacga aggcggcggg ctgcgcggag cggcgtcccc tgcagccgcg gaccgaggca     60
gcggcggcac ctgccggccg agcaatgcca agtgagtaca cctatgtgaa actgagaagt    120
gattgctcga ggccttccct gcaatggtac acccgagctc aaagcaagat gagaaggccc    180
agcttgttat taaagacat cctcaaatgt acattgcttg tgtttggagt gtggatcctt     240
tatatcctca agttaaatta ctactgaa gaatgtgaca tgaaaaaaat gcattatgtg       300
gaccctgacc atgtaaagag agctcagaaa tatgctcagc aagtcttgca gaaggaatgt    360
cgtcccaagt ttgccaagac atcaatggcg ctgttatttg agcacaggta tagcgtggac    420
ttactccctt ttgtgcagaa ggcccccaaa gacagtgaag ctgagtccaa gtacgatcct    480
ccttttgggt tccggaagtt ctccagtaaa gtccagaccc tcttggaact cttgccagag    540
cacgacctcc ctgaacactt gaaagccaag acctgtcggc gctgtgtggt tattggaagc    600
ggaggaatac tgcacggatt agaactgggc cacaccctga accagttcga tgttgtgata   660
aggttaaaca gtgcaccagt tgagggatat tcagaacatg ttggaaataa aactactata    720
aggatgactt atccagaggg cgcaccactg tctgaccttg aatattattc caatgactta    780
tttgttgctg ttttatttaa gagtgttgat ttcaactggc ttcaagcaat ggtaaaaaag    840
gaaaccctgc cattctgggt acgactcttc ttttggaagc aggtggcaga aaaatccca    900 ctgcagccaa acatttcag gattttgaat ccagttatca tcaaagagac tgcctttgac    960
atccttcagt actcagagcc tcagtcaagg ttctggggcc gagataagaa cgtccccaca   1020
atcggtgtca ttgccgttgt cttagccaca catctgtgcg atgaagtcag tttggcgggt   1080
tttggatatg acctcaatca acccagaaca cctttgcact acttcgacag tcaatgcatg   1140
gctgctatga actttcagac catgcataat gtgacaacgg aaaccaagtt cctcttaaag   1200
ctggtcaaag agggagtggt gaaagatctc agtggaggca ttgatcgtga attttga      1257
```

<210> SEQ ID NO 40
<211> LENGTH: 1257
<212> TYPE: DNA
<213> ORGANISM: Artificial Sequence
<220> FEATURE:
<223> OTHER INFORMATION: Synthetic Polynucleotide

<400> SEQUENCE: 40

```
atgagaacta aagcagcagg ttgtgcagag agaagaccac tccagcctag aactgaagca     60
gcagcagcac cagcaggtag agcaatgcca tccgagtaca cctacgtgaa gctgcggtct   120
gactgcagcc gcccatccct gcagtggtac acaagagccc agagcaagat gaggagaccc   180
tccctgctgc tgaaggatat cctgaagtgc accctgctgg tgtttggcgt gtggatcctg   240
tacatcctga agctgaacta caccacagag gagtgtgaca tgaagaagat gcactacgtg   300
```

```
gaccctgatc acgtgaagag ggcccagaag tacgctcagc aggtgctgca gaaggagtgt    360
agaccaaagt ttgccaagac aagcatggct ctgctgttcg agcaccgta ctccgtggat    420
ctgctgcctt ttgtgcagaa ggccccaaag gactctgagg ctgagagcaa gtacgatccc    480
cctttcggct ttcgcaagtt cagctccaag gtgcagaccc tgctggagct gctgccagag    540
cacgacctgc ccgagcacct gaaggctaag acatgcagga ggtgcgtggt catcggatcc    600
ggaggaatcc tgcacggact ggagctggga cacacccctga accagttcga cgtggtcatc    660
aggctgaact ccgccccagt ggagggctac tctgagcacg tgggaaacaa gaccacaatc    720
agaatgacat accccgaggg agctcctctg tctgacctgg agtactacag caacgatctg    780
ttcgtggccg tgctgtttaa gtctgtggac ttcaactggc tgcaggctat ggtgaagaag    840
gagaccctgc ccttttgggt gcggctgttc ttttggaagc aggtggccga aagatccca    900
ctgcagccca agcacttccg catcctgaac cctgtgatca tcaaggagac agcttttgac    960
atcctgcagt actccgagcc ccagtctagg ttctggggca gagataagaa cgtgcctacc    1020
atcggagtga tcgccgtggt gctggctaca cacctgtgcg acgaggtgtc tctggccggc    1080
tttggatacg atctgaacca gcctaggacc ccactgcact actttgacag ccagtgtatg    1140
gccgctatga acttccagac catgcacaac gtgaccacag acaaagtt cctgctgaag    1200
ctggtgaaag agggggtggt gaaagacctg agcgggggta ttgaccgaga gttttga    1257
```

<210> SEQ ID NO 41
<211> LENGTH: 1173
<212> TYPE: DNA
<213> ORGANISM: Artificial Sequence
<220> FEATURE:
<223> OTHER INFORMATION: Synthetic Polynucleotide

<400> SEQUENCE: 41

```
atgccatccg agtacaccta cgtgaagctg cggtctgact gcagccgccc atccctgcag     60
tggtacacaa gagcccagag caagatgagg agaccctccc tgctgctgaa ggatatcctg    120
aagtgcaccc tgctggtgtt tggcgtgtgg atcctgtaca tcctgaagct gaactacacc    180
acagaggagt gtgacatgaa gaagatgcac tacgtggacc ctgatcacgt gaagagggcc    240
cagaagtacg ctcagcaggt gctgcagaag gagtgtagac caaagtttgc caagacaagc    300
atggctctgc tgttcgagca ccggtactcc gtggatctgc tgccttttgt gcagaaggcc    360
ccaaaggact ctgaggctga gagcaagtac gatcccccctt tcggctttcg caagttcagc    420
tccaaggtgc agaccctgct ggagctgctg ccagagcacg acctgcccga gcacctgaag    480
gctaagacat gcaggaggtg cgtggtcatc ggatccggag gaatcctgca cggactggag    540
ctgggacaca ccctgaacca gttcgacgtg gtcatcaggc tgaactccgc cccagtggag    600
ggctactctg agcacgtggg aaacaagacc acaatcagaa tgacataccc cgagggagct    660
cctctgtctg acctggagta ctacagcaac gatctgttcg tggccgtgct gtttaagtct    720
gtggacttca actggctgca ggctatggtg aagaaggaga ccctgccctt ttgggtgcgg    780
ctgttcttt ggaagcaggt ggccgagaag atcccactgc agcccaagca cttccgcatc    840
ctgaaccctg tgatcatcaa ggagacagct tttgacatcc tgcagtactc cgagccccag    900
tctaggttct ggggcagaga taagaacgtg cctaccatcg gagtgatcgc cgtggtgctg    960
gctacacacc tgtgcgacga ggtgtctctg gccggctttg gatacgatct gaaccagcct    1020
aggaccccac tgcactactt tgacagccag tgtatggccg ctatgaactt ccagaccatg    1080
cacaacgtga ccacagagac aaagttcctg ctgaagctgg tgaaagaggg ggtggtgaaa    1140
```

```
gacctgagcg ggggtattga ccgagagttt tga                              1173
```

<210> SEQ ID NO 42
<211> LENGTH: 1089
<212> TYPE: DNA
<213> ORGANISM: Artificial Sequence
<220> FEATURE:
<223> OTHER INFORMATION: Synthetic Polynucleotide

<400> SEQUENCE: 42

```
atgaggagac cctccctgct gctgaaggat atcctgaagt gcaccctgct ggtgtttggc     60
gtgtggatcc tgtacatcct gaagctgaac tacaccacag aggagtgtga catgaagaag    120
atgcactacg tggaccctga tcacgtgaag agggcccaga agtacgctca gcaggtgctg    180
cagaaggagt gtagaccaaa gtttgccaag acaagcatgg ctctgctgtt cgagcaccgg    240
tactccgtgg atctgctgcc ttttgtgcag aaggcccaa aggactctga ggctgagagc    300
aagtacgatc ccccttttcgg ctttcgcaag ttcagctcca aggtgcagac cctgctggag    360
ctgctgccag agcacgacct gcccgagcac ctgaaggcta agacatgcag gaggtgcgtg    420
gtcatcggat ccggaggaat cctgcacgga ctggagctgg acacaccct gaaccagttc    480
gacgtggtca tcaggctgaa ctccgcccca gtggagggct actctgagca cgtgggaaac    540
aagaccacaa tcagaatgac ataccccgag ggagctcctc tgtctgacct ggagtactac    600
agcaacgatc tgttcgtggc cgtgctgttt aagtctgtgg acttcaactg gctgcaggct    660
atggtgaaga aggagaccct gcccttttgg gtgcggctgt tcttttggaa gcaggtggcc    720
gagaagatcc cactgcagcc caagcacttc cgcatcctga ccctgtgat catcaaggag    780
acagcttttg catcctgca gtactccgag ccccagtcta ggttctgggg cagagataag    840
aacgtgccta ccatcggagt gatcgccgtg gtgctggcta cacacctgtg cgacgaggtg    900
tctctggccg gctttggata cgatctgaac cagcctagga ccccactgca ctactttgac    960
agccagtgta tggccgctat gaacttccag accatgcaca acgtgaccac agagacaaag   1020
ttcctgctga gctggtgaa agagggggtg gtgaaagacc tgagcggggg tattgaccga   1080
gagttttga                                                          1089
```

<210> SEQ ID NO 43
<211> LENGTH: 1095
<212> TYPE: DNA
<213> ORGANISM: Artificial Sequence
<220> FEATURE:
<223> OTHER INFORMATION: Synthetic Polynucleotide

<400> SEQUENCE: 43

```
gccaccatga ggagaccctc cctgctgctg aaggatatcc tgaagtgcac cctgctggtg     60
tttggcgtgt ggatcctgta catcctgaag ctgaactaca ccacagagga gtgtgacatg    120
aagaagatgc actacgtgga ccctgatcac gtgaagaggg cccagaagta cgctcagcag    180
gtgctgcaga aggagtgtag accaaagttt gccaagacaa gcatggctct gctgttcgag    240
caccggtact ccgtggatct gctgcctttt gtgcagaagg ccccaaagga ctctgaggct    300
gagagcaagt acgatccccc tttcggcttt cgcaagttca gctccaaggt gcagaccctg    360
ctggagctgc tgccagagca cgacctgccc gagcacctga aggctaagac atgcaggagg    420
tgcgtggtca tcggatccgg aggaatcctg cacggactgg agctgggaca caccctgaac    480
cagttcgacg tggtcatcag gctgaactcc gccccagtgg agggctactc tgagcacgtg    540
```

-continued

| | | | | | |
|---|---|---|---|---|---|
| ggaaacaaga | ccacaatcag | aatgacatac | cccgagggag | ctcctctgtc | tgacctggag | 600 |
| tactacagca | acgatctgtt | cgtggccgtg | ctgtttaagt | ctgtggactt | caactggctg | 660 |
| caggctatgg | tgaagaagga | gaccctgccc | ttttgggtgc | ggctgttctt | ttggaagcag | 720 |
| gtggccgaga | agatcccact | gcagcccaag | cacttccgca | tcctgaaccc | tgtgatcatc | 780 |
| aaggagacag | cttttgacat | cctgcagtac | tccgagcccc | agtctaggtt | ctggggcaga | 840 |
| gataagaacg | tgcctaccat | cggagtgatc | gccgtggtgc | tggctacaca | cctgtgcgac | 900 |
| gaggtgtctc | tggccggctt | tggatacgat | ctgaaccagc | ctaggacccc | actgcactac | 960 |
| tttgacagcc | agtgtatggc | cgctatgaac | ttccagacca | tgcacaacgt | gaccacagag | 1020 |
| acaaagttcc | tgctgaagct | ggtgaaagag | ggggtggtga | aagacctgag | cgggggtatt | 1080 |
| gaccgagagt | tttga | | | | | 1095 |